United States Patent
Pelletier et al.

(10) Patent No.: US 10,542,499 B2
(45) Date of Patent: Jan. 21, 2020

(54) UPLINK TRANSMISSIONS IN WIRELESS COMMUNICATIONS

(71) Applicant: INTERDIGITAL PATENT HOLDINGS, INC., Wilmington, DE (US)

(72) Inventors: Ghyslain Pelletier, Montreal (CA); Paul Marinier, Brossard (CA); J. Patrick Tooher, Montreal (CA); Virgil Comsa, Montreal (CA); Diana Pani, Montreal (CA); Stephen E. Terry, Northport, NY (US)

(73) Assignee: INERDIGITAL PATENT HOLDINGS, INC., Wilmington, DE (US)

( * ) Notice: Subject to any disclaimer, the term of this patent is extended or adjusted under 35 U.S.C. 154(b) by 0 days.

(21) Appl. No.: 16/390,847

(22) Filed: Apr. 22, 2019

(65) Prior Publication Data

US 2019/0253978 A1    Aug. 15, 2019

Related U.S. Application Data

(63) Continuation of application No. 15/700,981, filed on Sep. 11, 2017, now Pat. No. 10,271,288, which is a continuation of application No. 15/115,511, filed as application No. PCT/US2015/013616 on Jan. 29, 2015, now Pat. No. 9,763,199.

(60) Provisional application No. 62/093,965, filed on Dec. 18, 2014, provisional application No. 62/069,739, filed on Oct. 28, 2014, provisional application No. 62/060,492, filed on Oct. 6, 2014, provisional (Continued)

(51) Int. Cl.
| | |
|---|---|
| H04W 52/14 | (2009.01) |
| H04W 72/04 | (2009.01) |
| H04W 52/36 | (2009.01) |
| H04W 52/34 | (2009.01) |

(52) U.S. Cl.
CPC ....... *H04W 52/146* (2013.01); *H04W 52/343* (2013.01); *H04W 52/365* (2013.01); *H04W 52/367* (2013.01); *H04W 72/0473* (2013.01)

(58) Field of Classification Search
None
See application file for complete search history.

(56) References Cited

U.S. PATENT DOCUMENTS

| | | |
|---|---|---|
| 8,295,779 B2 | 10/2012 | Cave et al. |
| 8,593,979 B2 | 11/2013 | Kim et al. |

(Continued)

OTHER PUBLICATIONS

LG Electronics Inc., "Management of UE Transmit Power in Dual Connectivity," 3GPP TSG-RAN WG2 Meeting #84, R2-134048, San Francisco, USA (Nov. 11-15, 2013).

(Continued)

*Primary Examiner* — Fayyaz Alam
(74) *Attorney, Agent, or Firm* — Volpe and Koenig, P.C.

(57) ABSTRACT

Methods and devices for offloading and/or aggregation of resources to coordinate uplink transmissions when interacting with different schedulers are disclosed herein. A method in a WTRU includes functionality for coordinating with a different scheduler for each eNB associated with the WTRU's configuration. Disclosed methods include autonomous WTRU grand selection and power scaling, and dynamic prioritization of transmission and power scaling priority.

20 Claims, 17 Drawing Sheets

Related U.S. Application Data application No. 62/033,993, filed on Aug. 6, 2014, provisional application No. 62/007,147, filed on Jun. 3, 2014, provisional application No. 62/002,625, filed on May 23, 2014, provisional application No. 61/989,997, filed on May 7, 2014, provisional application No. 61/978,630, filed on Apr. 11, 2014, provisional application No. 61/955,632, filed on Mar. 19, 2014, provisional application No. 61/933,169, filed on Jan. 29, 2014.

(56) References Cited

U.S. PATENT DOCUMENTS

| | | | |
|---|---|---|---|
| 8,619,654 | B2 | 12/2013 | Yang et al. |
| 9,030,890 | B2 | 5/2015 | Lee et al. |
| 9,282,521 | B2 | 3/2016 | Lim et al. |
| 2009/0197632 | A1 | 8/2009 | Ghosh et al. |
| 2010/0272091 | A1 | 10/2010 | Fabien et al. |
| 2011/0039568 | A1* | 2/2011 | Zhang ............ H04W 52/50 455/452.1 |
| 2011/0110257 | A1 | 5/2011 | Kim et al. |
| 2012/0176884 | A1* | 7/2012 | Zhang ............ H04B 7/024 370/203 |
| 2012/0281566 | A1* | 11/2012 | Pelletier ............ H04W 76/27 370/252 |
| 2012/0327866 | A1 | 12/2012 | Krishnamurthy et al. |
| 2013/0176953 | A1 | 7/2013 | Stern-Berkowitz et al. |
| 2013/0208666 | A1 | 8/2013 | Yang et al. |
| 2013/0242730 | A1* | 9/2013 | Pelletier ............ H04W 28/0284 370/230 |
| 2013/0324182 | A1* | 12/2013 | Deng ............ H04W 92/18 455/522 |
| 2014/0056278 | A1 | 2/2014 | Marinier et al. |
| 2014/0177487 | A1* | 6/2014 | Hammarwall ...... H04W 72/042 370/280 |
| 2014/0349701 | A1 | 11/2014 | Vajapeyam et al. |
| 2015/0208366 | A1 | 7/2015 | Papasakellariou et al. |
| 2015/0358998 | A1* | 12/2015 | Golitschek Edler Von Elbwart ............ H04W 48/16 370/280 |
| 2016/0150486 | A1 | 5/2016 | Park et al. |
| 2016/0174160 | A1 | 6/2016 | Shen et al. |
| 2016/0205632 | A1 | 7/2016 | Yi et al. |
| 2016/0330693 | A1* | 11/2016 | Hwang ............ H04W 52/146 |
| 2017/0142668 | A1 | 5/2017 | Takeda et al. |

OTHER PUBLICATIONS

Third Generation Partnership Project, "Technical Specification Group Radio Access Network; Evolved Universal Terrestrial Radio Access (E-UTRA); Physical Channels and Modulation (Release 12)," 3GPP TS 36.211 V12.0.0 (Dec. 2013).

Third Generation Partnership Project, "Technical Specification Group Radio Access Network; Evolved Universal Terrestrial Radio Access (E-UTRA); Physical channels and modulation (Release 12)," 3GPP TS 36.211 V12.4.0 (Dec. 2014).

Third Generation Partnership Project, "Technical Specification Group Radio Access Network; Evolved Universal Terrestrial Radio Access (E-UTRA); Multiplexing and channel coding (Release 12)," 3GPP TS 36.212 V12.0.0 (Dec. 2013).

Third Generation Partnership Project, "Technical Specification Group Radio Access Network; Evolved Universal Terrestrial Radio Access (E-UTRA); Multiplexing and channel coding (Release 12)," 3GPP TS 36.212 V12.3.0 (Dec. 2014).

Third Generation Partnership Project, "Technical Specification Group Radio Access Network; Evolved Universal Terrestrial Radio Access (E-UTRA); Physical layer; Measurements (Release 11)," 3GPP TS 36.214 V11.1.0 (Dec. 2012).

Third Generation Partnership Project, "Technical Specification Group Radio Access Network; Evolved Universal Terrestrial Radio Access (E-UTRA); Physical layer; Measurements (Release 12)," 3GPP TS 36.214 V12.1.0 (Dec. 2014).

Editor (Motorola Mobility), "Introduction of D2D (ProSe), Dual Connectivity, Small Cell Enhancements, NAICS, eIMTA, and TDD-FDD CA features," 3GPP TSG-RAN WG1 Meeting #79, R1-145461, San Francisco, USA (Nov. 17-21, 2014).(*previously cited in parent application).

Ericsson et al., "Introduction of Dual Connectivity to TS 36.101 Rel-12, RF part," 3GPP TSG-RAN WG4 Meeting #73, R4-147966, San Francisco, USA (Nov. 17-21, 2014).(*previously cited in parent application).

Ericsson, "Considerations on power control for Dual Connectivity," 3GPP TSG-RAN WG2 #84, R2-134234, San Francisco, USA (Nov. 11-15, 2013).(*previously cited in parent application).

Ericsson, "Introduction of dual connectivity in MAC," 3GPP TSG-RAN WG2 Meeting #88, R2-144711, San Francisco, USA (Nov. 17-21, 2014).(*previously cited in parent application).

Ericsson, "Power control on dual connectivity," 3GPP TSG RAN WG1 Meeting #76, R1-140762, Prague, Czech Republic (Feb. 10-14, 2014).(*previously cited in parent application).

Interdigital, "Pcmax definition for Dual Connectivity," TSG-RAN WG4 meeting #72, R4-144229, Dresden, Germany (Aug. 18-22, 2014).(*previously cited in parent application).

Interdigital, "Pcmax definition for Dual Connectivity," TSG-RAN WG4 meeting #72bis, R4-145663, Singapore, SG (Oct. 6-10, 2014).(*previously cited in parent application).

LG Electronics, Inc. (PDCP rapporteur), "Introduction of Dual Connectivity in PDCP," 3GPP TSG-RAN WG2 #88, R2-14xxxx, San Francisco, USA (Nov. 17-21, 2014).(*previously cited in parent application).

LG Electronics, Inc. (PDCP rapporteur), "Introduction of Dual Connectivity in PDCP," 3GPP TSG-RAN WG2 #87bis, R2-14xxxx, San Francisco, USA (Nov. 17-21, 2014).(*previously cited in parent application).

NSN et al., "PHR for dual connectivity," 3GPP TSG-RAN WG2 Meeting #84, R2-134089, San Francisco, USA (Nov. 11-15, 2013).(*previously cited in parent application).

NTT Docomo, Inc. et al., "Introduction of Dual Connectivity," 3GPP TSG-RAN WG2 Meeting #88, R2-145410, San Francisco, USA (Nov. 17-21, 2014).(*previously cited in parent application).

Qualcomm Incorporated, "Physical layer aspects for dual connectivity," 3GPP TSG RAN WG1 #76, R1-140455, Prague, Czech Republic (Feb. 10-14, 2014).(*previously cited in parent application).

Samsung, "Introduction of Dual Connectivity," 3GPP TSG-RAN2 Meeting #87 bis, R2-144664, Shanghai, P.R. China (Oct. 6-10, 2014).(*previously cited in parent application).

Samsung, "Introduction of Dual Connectivity," 3GPP TSG-RAN2 Meeting #88, R2-14xxxx, San Francisco, USA (Nov. 17-21, 2014).(*previously cited in parent application).

Samsung, "UL Power Control for Dual Connectivity," 3GPP TSG RAN WG1 #76, R1-140375, Prague, Czech Republic (Feb. 10-14, 2014).(*previously cited in parent application).

Third Generation Partnership Project, "Technical Specification Group Radio Access Network; Evolved Universal Terrestrial Radio Access (E-UTRA); Medium Access Control (MAC) protocol specification (Release 8)," 3GPP TS 36.321 V8.12.0 (Mar. 2012).(*previously cited in parent application).

Third Generation Partnership Project, "Technical Specification Group Radio Access Network; Evolved Universal Terrestrial Radio Access (E-UTRA); Medium Access Control (MAC) protocol specification (Release 9)," 3GPP TS 36.321 V9.6.0 (Mar. 2012).(*previously cited in parent application).

Third Generation Partnership Project, "Technical Specification Group Radio Access Network; Evolved Universal Terrestrial Radio Access (E-UTRA); Medium Access Control (MAC) protocol specification (Release 10)," 3GPP TS 36.321 V10.10.0 (Dec. 2013).(*previously cited in parent application).

Third Generation Partnership Project, "Technical Specification Group Radio Access Network; Evolved Universal Terrestrial Radio Access (E-UTRA); Medium Access Control (MAC) protocol specification (Release 11)," 3GPP TS 36.321 V11.4.0 (Dec. 2013).(*previously cited in parent application).

(56) References Cited

OTHER PUBLICATIONS

Third Generation Partnership Project, "Technical Specification Group Radio Access Network; Evolved Universal Terrestrial Radio Access (E-UTRA); Medium Access Control (MAC) protocol specification (Release 11)," 3GPP TS 36.321 V11.5.0 (Mar. 2014).(*previously cited in parent application).

Third Generation Partnership Project, "Technical Specification Group Radio Access Network; Evolved Universal Terrestrial Radio Access (E-UTRA); Medium Access Control (MAC) protocol specification (Release 12)," 3GPP TS 36.321 V12.0.0 (Dec. 2013).(*previously cited in parent application).

Third Generation Partnership Project, "Technical Specification Group Radio Access Network; Evolved Universal Terrestrial Radio Access (E-UTRA); Medium Access Control (MAC) protocol specification (Release 12)," 3GPP TS 36.321 V124.0 (Dec. 2014).(*previously cited in parent application).

Third Generation Partnership Project, "Technical Specification Group Radio Access Network; Evolved Universal Terrestrial Radio Access (E-UTRA); Radio Resource Control (RRC); Protocol specification (Release 8)," 3GPP TS 36.331 V8.20.0 (Jun. 2013).(*previously cited in parent application).

Third Generation Partnership Project, "Technical Specification Group Radio Access Network; Evolved Universal Terrestrial Radio Access (E-UTRA); Radio Resource Control (RRC); Protocol specification (Release 8)," 3GPP TS 36.331 V8.21.0 (Jun. 2014).(*previously cited in parent application).

Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.17.0 (Dec. 2013).(*previously cited in parent application).

Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.18.0 (Jun. 2014).(*previously cited in parent application).

Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.12.0 (Dec. 2013).(*previously cited in parent application).

Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.15.0 (Dec. 2014).(*previously cited in parent application).

Third Generation Partnership Project, "Technical Specification Group Radio Access Network; Evolved Universal Terrestrial Radio Access (E-UTRA); Radio Resource Control (RRC); Protocol specification (Release 11)," 3GPP TS 36.331 V11.6.0 (Dec. 2013).(*previously cited in parent application).

Third Generation Partnership Project, "Technical Specification Group Radio Access Network; Evolved Universal Terrestrial Radio Access (E-UTRA); Radio Resource Control (RRC); Protocol specification (Release 11)," 3GPP TS 36.331 V11.10.0 (Dec. 2014).(*previously cited in parent application).

Third Generation Partnership Project, "Technical Specification Group Radio Access Network; Evolved Universal Terrestrial Radio Access (E-UTRA); Radio Resource Control (RRC); Protocol specification (Release 12)," 3GPP TS 36.331 V12.0.0 (Dec. 2013).(*previously cited in parent application).

Third Generation Partnership Project, "Technical Specification Group Radio Access Network; Evolved Universal Terrestrial Radio Access (E-UTRA); Radio Resource Control (RRC); Protocol specification (Release 12)," 3GPP TS 36.331 V124.0 (Dec. 2014).(*previously cited in parent application).

Third Generation Partnership Project, "Technical Specification Group Radio Access Network; Evolved Universal Terrestrial Radio Access (E-UTRA); Radio Link Control (RLC) protocol specification (Release 8)," 3GPP TS 36.322 V8.8.0 (Jun. 2010).(*previously cited in parent application).

Third Generation Partnership Project, "Technical Specification Group Radio Access Network; Evolved Universal Terrestrial Radio Access (E-UTRA); Radio Link Control (RLC) protocol specification (Release 9)," 3GPP TS 36.322 V9.3.0 (Sep. 2010).(*previously cited in parent application).

Third Generation Partnership Project, "Technical Specification Group Radio Access Network; Evolved Universal Terrestrial Radio Access (E-UTRA); Radio Link Control (RLC) protocol specification (Release 10)," 3GPP TS 36.322 V10.0.0 (Dec. 2010).(*previously cited in parent application).

Third Generation Partnership Project, "Technical Specification Group Radio Access Network; Evolved Universal Terrestrial Radio Access (E-UTRA); Radio Link Control (RLC) protocol specification (Release 11)," 3GPP TS 36.322 V11.0.0 (Sep. 2012).(*previously cited in parent application).

Third Generation Partnership Project, "Technical Specification Group Radio Access Network; Evolved Universal Terrestrial Radio Access (E-UTRA); Radio Link Control (RLC) protocol specification (Release 12)," 3GPP TS 36.322 V12.1.1 (Dec. 2014).(*previously cited in parent application).

Third Generation Partnership Project, "Technical Specification Group Radio Access Network; Evolved Universal Terrestrial Radio Access (E-UTRA); Packet Data Convergence Protocol (PDCP) specification (Release 8)," 3GPP TS 36.323 V8.6.0 (Jun. 2009).(*previously cited in parent application).

Third Generation Partnership Project, "Technical Specification Group Radio Access Network; Evolved Universal Terrestrial Radio Access (E-UTRA); Packet Data Convergence Protocol (PDCP) specification (Release 9)," 3GPP TS 36.323 V9.0.0 (Dec. 2009).(*previously cited in parent application).

Third Generation Partnership Project, "Technical Specification Group Radio Access Network; Evolved Universal Terrestrial Radio Access (E-UTRA); Packet Data Convergence Protocol (PDCP) specification (Release 10)," 3GPP TS 36.323 V10.2.0 (Dec. 2012). (*previously cited in parent application).

Third Generation Partnership Project, "Technical Specification Group Radio Access Network; Evolved Universal Terrestrial Radio Access (E-UTRA); Packet Data Convergence Protocol (PDCP) specification (Release 10)," 3GPP TS 36.323 V10.3.0 (Jun. 2014). (*previously cited in parent application).

Third Generation Partnership Project, "Technical Specification Group Radio Access Network; Evolved Universal Terrestrial Radio Access (E-UTRA); Packet Data Convergence Protocol (PDCP) specification (Release 11)," 3GPP TS 36.323 V11.2.0 (Mar. 2013). (*previously cited in parent application).

Third Generation Partnership Project, "Technical Specification Group Radio Access Network; Evolved Universal Terrestrial Radio Access (E-UTRA); Packet Data Convergence Protocol (PDCP) specification (Release 11)," 3GPP TS 36.323 V11.4.0 (Sep. 2014). (*previously cited in parent application).

Third Generation Partnership Project, "Technical Specification Group Radio Access Network; Evolved Universal Terrestrial Radio Access (E-UTRA); Packet Data Convergence Protocol (PDCP) specification (Release 12)," 3GPP TS 36.323 V12.2.0 (Dec. 2014). (*previously cited in parent application).

Third Generation Partnership Project, "Technical Specification Group Radio Access Network; Evolved Universal Terrestrial Radio Access (E-UTRA); Physical layer procedures (Release 11)," 3GPP TS 36.213 V11.9.0 (Dec. 2014).(*previously cited in parent application).

Third Generation Partnership Project, "Technical Specification Group Radio Access Network; Evolved Universal Terrestrial Radio Access (E-UTRA); Physical layer procedures (Release 12)," 3GPP TS 36.213 V12.4.0 (Dec. 2014).(*previously cited in parent application).

(56) References Cited

OTHER PUBLICATIONS

Third Generation Partnership Project, "Technical Specification Group Radio Access Network; Evolved Universal Terrestrial Radio Access (E-UTRA); Physical layer procedures (Release 11)," 3GPP TS 36.213 V11.5.0 (Dec. 2013).(*previously cited in parent application).
Third Generation Partnership Project, "Technical Specification Group Radio Access Network; Evolved Universal Terrestrial Radio Access (E-UTRA); Physical layer procedures (Release 8)," 3GPP TS 36.213 V8.8.0 (Sep. 2009).(*previously cited in parent application).
Third Generation Partnership Project, "Technical Specification Group Radio Access Network; Evolved Universal Terrestrial Radio Access (E-UTRA); Physical layer procedures (Release 9)," 3GPP TS 36.213 V9.3.0 (Sep. 2010).(*previously cited in parent application).
Third Generation Partnership Project, "Technical Specification Group Radio Access Network; Evolved Universal Terrestrial Radio Access (E-UTRA); Physical layer procedures (Release 10)," 3GPP TS 36.213 V10.11.0 (Dec. 2013).(*previously cited in parent application).
Third Generation Partnership Project, "Technical Specification Group Radio Access Network; Evolved Universal Terrestrial Radio Access (E-UTRA); Physical layer procedures (Release 10)," 3GPP TS 36.213 V12.0.0 (Dec. 2013).(*previously cited in parent application).
Third Generation Partnership Project, "Technical Specification Group Radio Access Network; Evolved Universal Terrestrial Radio Access (E-UTRA); Physical layer procedures (Release 10)," 3GPP TS 36.213 V10.12.0 (Mar. 2014).(*previously cited in parent application).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.12.0 (Mar. 2010).(*previously cited in parent application).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.10.0 (Dec. 2012).(*previously cited in parent application).
Third Generation Partnership Project, "Technical Specification Group Radio Access Network; Evolved Universal Terrestrial Radio Access (E-UTRA); User Equipment (UE) radio transmission and reception (Release 8)," 3GPP TS 36.101 V8.23.0 (Dec. 2013).(*previously cited in parent application).
Third Generation Partnership Project, "Technical Specification Group Radio Access Network; Evolved Universal Terrestrial Radio Access (E-UTRA); User Equipment (UE) radio transmission and reception (Release 9)," 3GPP TS 36.101 V9.21.0 (Dec. 2014).(*previously cited in parent application).
Third Generation Partnership Project, "Technical Specification Group Radio Access Network; Evolved Universal Terrestrial Radio Access (E-UTRA); User Equipment (UE) radio transmission and reception (Release 8)," 3GPP TS 36.101 V8.26.0 (Dec. 2014).(*previously cited in parent application).
Third Generation Partnership Project, "Technical Specification Group Radio Access Network; Evolved Universal Terrestrial Radio Access (E-UTRA); User Equipment (UE) radio transmission and reception (Release 9)," 3GPP TS 36.101 V9.18.0 (Dec. 2013).(*previously cited in parent application).
Third Generation Partnership Project, "Technical Specification Group Radio Access Network; Evolved Universal Terrestrial Radio Access (E-UTRA); User Equipment (UE) radio transmission and reception (Release 10)," 3GPP TS 36.101 V10.13.0 (Dec. 2013).(*previously cited in parent application).
Third Generation Partnership Project, "Technical Specification Group Radio Access Network; Evolved Universal Terrestrial Radio Access (E-UTRA); User Equipment (UE) radio transmission and reception (Release 10)," 3GPP TS 36.101 V10.17.0 (Dec. 2014).(*previously cited in parent application).
Third Generation Partnership Project, "Technical Specification Group Radio Access Network; Evolved Universal Terrestrial Radio Access (E-UTRA); User Equipment (UE) radio transmission and reception (Release 11)," 3GPP TS 36.101 V11.7.0 (Dec. 2013).(*previously cited in parent application).
Third Generation Partnership Project, "Technical Specification Group Radio Access Network; Evolved Universal Terrestrial Radio Access (E-UTRA); User Equipment (UE) radio transmission and reception (Release 11)," 3GPP TS 36.101 V11.11.0 (Dec. 2014).(*previously cited in parent application).
Third Generation Partnership Project, "Technical Specification Group Radio Access Network; Evolved Universal Terrestrial Radio Access (E-UTRA); User Equipment (UE) radio transmission and reception (Release 12)," 3GPP TS 36.101 V12.2.0 (Dec. 2013).(*previously cited in parent application).
Third Generation Partnership Project, "Technical Specification Group Radio Access Network; Evolved Universal Terrestrial Radio Access (E-UTRA); User Equipment (UE) radio transmission and reception (Release 12)," 3GPP TS 36.101 V12.6.0 (Dec. 2014).(*previously cited in parent application).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 11)," 3GPP TS 36.300 V11.12.0 (Dec. 2014).(*previously cited in parent application).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 11)," 3GPP TS 36.300 V11.8.0 (Dec. 2013).(*previously cited in parent application).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300 V10.12.0 (Dec. 2014).(*previously cited in parent application).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 12)," 3GPP TS 36.300 V12.4.0 (Dec. 2014).(*previously cited in parent application).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 12)," 3GPP TS 36.300 V12.0.0 (Dec. 2013). (*previously cited in parent application).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300 V10.11.0 (Sep. 2013).(*previously cited in parent application).
TSG RAN WG2, "Status Report to TSG," 3GPP TSG RAN meeting #65, RP-141264, Edinburgh, Scotland (Sep. 9-12, 2014). (*previously cited in parent application).
LG Electronics, Inc., "3GPP-WLAN interworking," 3GPP TSG-RAN WG2 #81, R2-130503, St. Julian's, Malta (Jan. 28-Feb. 1, 2013).
ZTE, "Discussion on BSR of small cell,"3GPP TSG-RAN2 Meeting #85, R2-140119, Prague, Czech (Jan. 10-14, 2014).

* cited by examiner

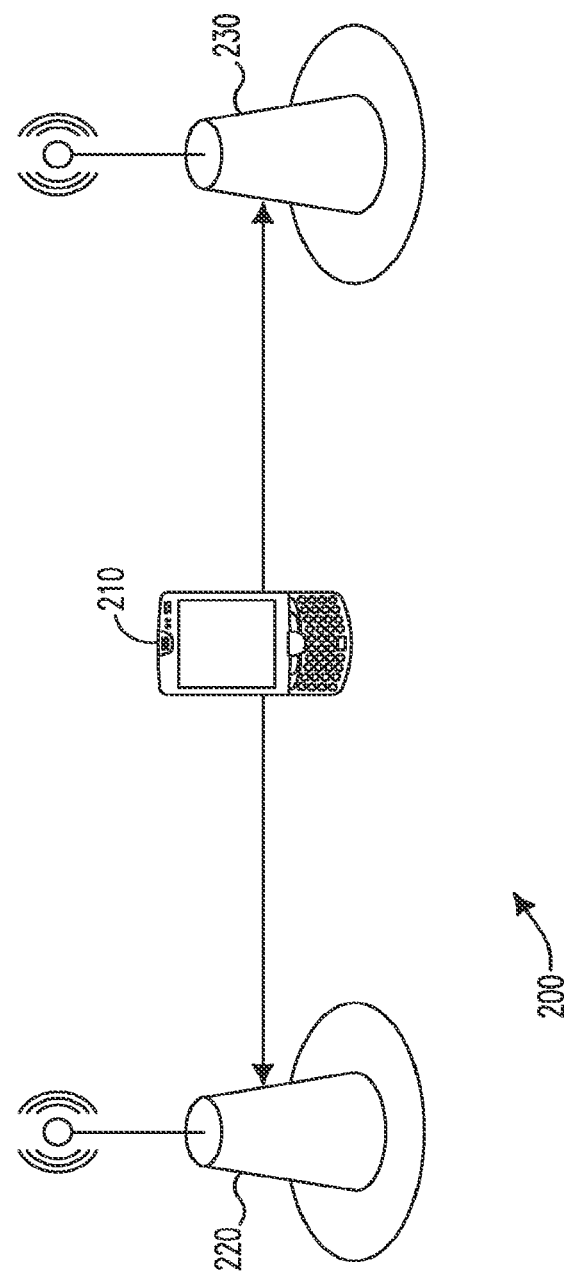

UPLINK TRANSMISSIONS IN WIRELESS COMMUNICATIONS

CROSS REFERENCE TO RELATED APPLICATIONS

This application is a continuation of Ser. No. 15/700,981 filed Sep. 11, 2017 which was a continuation of U.S. patent application Ser. No. 15/115,511 filed Jul. 29, 2016, which is the U.S. National Stage, under 35 U.S.C. § 371, of International Application No. PCT/US2015/013616 filed Jan. 29, 2015, which claims the benefit of U.S. Provisional Application Nos. 61/933,169 filed Jan. 29, 2014; 61/955,632 filed Mar. 19, 2014; 61/978,630 filed Apr. 11, 2014; 61/989,997 filed May 7, 2014; 62/002,625 filed May 23, 2014; 62/007,147 filed Jun. 3, 2014; 62/033,993 filed Aug. 6, 2014; 62/060,492 filed Oct. 6, 2014; 62/069,739 filed Oct. 28, 2014 and 62/093,965 filed Dec. 18, 2014, the contents of which are hereby incorporated by reference herein.

FIELD OF INVENTION

This application is in the field of wireless communications.

BACKGROUND

Efforts are being deployed to create different means to aggregate resources from different eNBs (e.g. R12 LTE inter-eNB aggregation using dual connectivity). The objective is typically to enable means for an operator to offload some traffic from a macro cell/eNB to another cell/eNB which cell may possibly offer some form of hot spot overlay network, or to enable higher throughput.

A WTRU may be configured for dual connectivity. Dual connectivity may be configured by the network either for throughput benefits (mainly for the downlink) or for offload purposes (relieving an eNB deployed for macro coverage from user plane traffic towards another eNB deployed for capacity enhancements). When a WTRU is configured for operation with dual connectivity, it may use radio resources associated to different eNBs where the interface corresponding to each set of resources is herein referred to as a Uu interface. Each Uu interface may itself be configured with one or a plurality of serving cells in case intra-eNB carrier aggregation is also supported. The WTRU may then be scheduled for any type of data by a Macro eNB (MeNB) which eNB controls the RRC connection, as well as by a Secondary eNB (SeNB) which may be used for exchanging user plane data. This form of dual connectivity may also be referred to as Inter-eNB Carrier Aggregation (inter-eNB CA). In this case, the WTRU may be configured with different MAC entities, one for each configured Uu interface.

Some prioritization and power scaling mechanisms have been specified for intra-eNB CA, however these mechanisms involve minimal if any coordination between schedulers, and control plane data is only transmitted using a single Uu interface.

SUMMARY

Methods and devices for offloading and/or aggregation of resources to coordinate uplink transmissions when interacting with different schedulers are disclosed herein. A method in a WTRU includes functionality for coordinating with a different scheduler for each eNB associated with the WTRU's configuration. Disclosed methods include autonomous WTRU grant selection and power scaling, and dynamic prioritization of transmission and power scaling priority.

BRIEF DESCRIPTION OF THE DRAWINGS

A more detailed understanding may be had from the following description, given by way of example in conjunction with the accompanying drawings wherein:

FIG. 2 is a system diagram of an example system operating using dual connectivity.

DETAILED DESCRIPTION

Figure 1A:
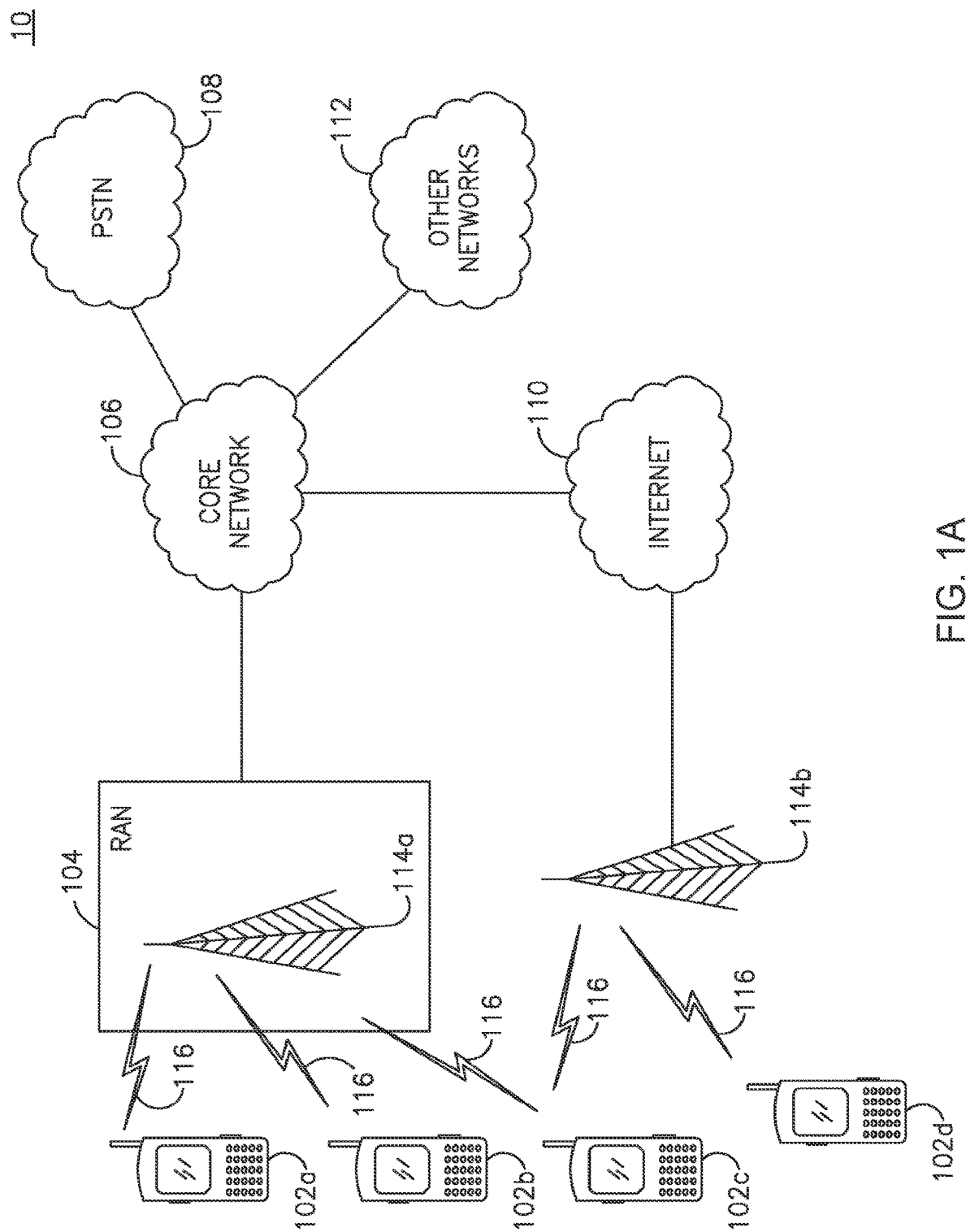
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth.

For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
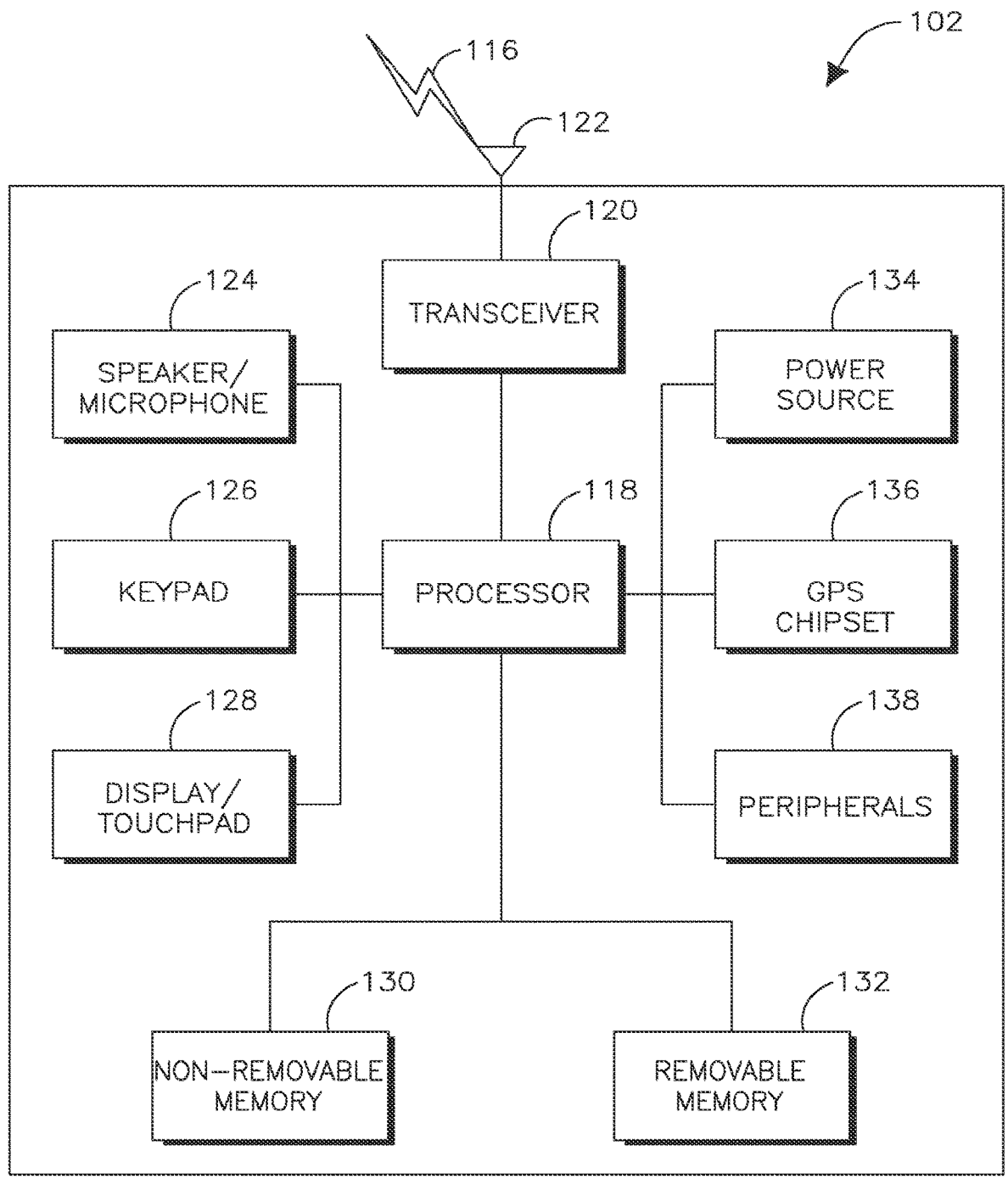
FIG. 1B is a system diagram of an example wireless transmit/receive unit (WTRU) that may be used within the communications system illustrated in FIG. 1A; and, FIG. 1C is a system diagram of an example radio access network and an example core network that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
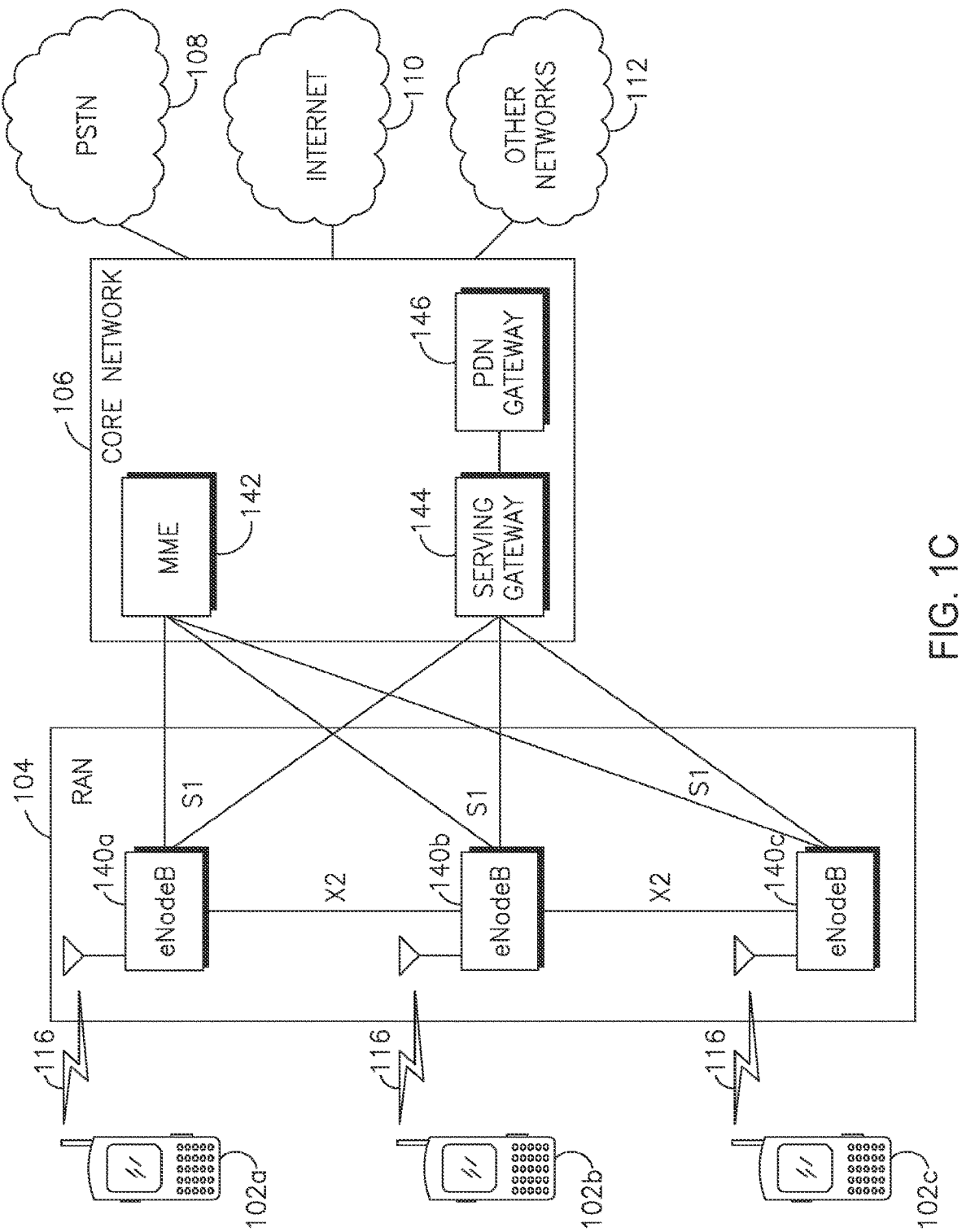

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140*a*, 140*b*, 140*c* may implement MIMO technology. Thus, the eNode-B 140*a*, for example, may use multiple antennas to transmit wireless signals to, and receive wireless signals from, the WTRU 102*a*.

Each of the eNode-Bs 140*a*, 140*b*, 140*c* may be associated with a particular cell (not shown) and may be configured to handle radio resource management decisions, handover decisions, scheduling of users in the uplink and/or downlink, and the like. As shown in FIG. 1C, the eNode-Bs 140*a*, 140*b*, 140*c* may communicate with one another over an X2 interface.

The core network 106 shown in FIG. 1C may include a mobility management entity gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140*a*, 140*b*, 140*c* in the RAN 104 via an S1 interface and may serve as a control node. For example, the MME 142 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 142 may also provide a control plane function for switching between the RAN 104 and other RANs (not shown) that employ other radio technologies, such as GSM or WCDMA.

The serving gateway 144 may be connected to each of the eNode Bs 140*a*, 140*b*, 140*c* in the RAN 104 via the S1 interface. The serving gateway 144 may generally route and forward user data packets to/from the WTRUs 102*a*, 102*b*, 102*c*. The serving gateway 144 may also perform other functions, such as anchoring user planes during inter-eNode B handovers, triggering paging when downlink data is available for the WTRUs 102*a*, 102*b*, 102*c*, managing and storing contexts of the WTRUs 102*a*, 102*b*, 102*c*, and the like.

The serving gateway 144 may also be connected to the PDN gateway 146, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The core network 106 may facilitate communications with other networks. For example, the core network 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102*a*, 102*b*, 102*c* with access to the networks 112, which may include other wired or wireless networks that are owned and/or operated by other service providers.

3GPP LTE Release 8/9 (LTE R8/9) may support up to 100 Mbps in the downlink (DL), and 50 Mbps in the uplink (UL) for a 2×2 configuration. The LTE downlink transmission scheme is based on an OFDMA air interface.

For the purpose of flexible deployment, LTE R8/9/10 systems support scalable transmission bandwidths, which may be one of [1.4, 2.5, 5, 10, 15 or 20] MHz.

In LTE R8/9 (also applicable to LTE R10), each radio frame (10 ms) comprises 10 sub-frames of 1 ms each. Each sub-frame comprises 2 timeslots of 0.5 ms each. There can be either 7 or 6 OFDM symbols per timeslot. 7 symbols per timeslot are used with normal cyclic prefix length, and 6 symbols per timeslot are used with the extended cyclic prefix length. The sub-carrier spacing for the LTE R8/9 system is 15 kHz. A reduced sub-carrier spacing mode using 7.5 kHz is also possible.

A resource element (RE) corresponds to one (1) sub-carrier during one (1) OFDM symbol interval. 12 consecutive sub-carriers during a 0.5 ms timeslot constitute one (1) resource block (RB). Therefore, with 7 symbols per timeslot, each RB comprises 12*7=84 REs. A DL carrier comprises 6 RBs to 110 RBs corresponding to an overall scalable transmission bandwidth of roughly 1 MHz to 20 MHz. Each transmission bandwidth, e.g. 1.4, 3, 5, 10 or 20 MHz, corresponds to a number of RBs.

The basic time-domain unit for dynamic scheduling is one sub-frame comprising two consecutive timeslots. This is sometimes referred to as a resource-block pair. Certain sub-carriers on some OFDM symbols are allocated to carry pilot signals in the time-frequency grid. A number of sub-carriers at the edges of the transmission bandwidth are not transmitted in order to comply with spectral mask requirements.

In LTE R8/9 and for R10 (also discussed herein) in single carrier configuration where the network may assign the WTRU only one pair of UL and DL carriers (FDD) or one carrier time shared for UL and DL (TDD), for any given subframe there may be a single Hybrid Automatic Repeat reQuest (HARQ) process active for the UL and a single HARQ process active in the DL.

Buffer status reporting may be used to indicate the amount of data the WTRU has available for transmission to help the eNB choose an appropriate transport block size. BSR may report the buffer status of logical channel groups (LCG). Logical channels can be divided in up to 4 different LCGs through RRC signalling but a logical channel does not necessarily belong to an LCG.

The following LTE specifications provide a context for describing the various methods and approaches set forth herein.

In an LTE MAC specification [36.321], the buffer size of an LCG is defined as follows:

Buffer Size: The Buffer Size field identifies the total amount of data available across all logical channels of a logical channel group after all MAC PDUs for the TTI have been built. The amount of data is indicated in number of bytes. It shall include all data that is available for transmission in the RLC layer and in the PDCP layer; the definition of what data shall be considered as available for transmission is specified in [3] and [4] respectively. The size of the RLC and MAC headers are not considered in the buffer size computation. The length of this field is 6 bits. If extendedBSR-Sizes is not configured, the values taken by the Buffer Size field are shown in Table 6.1.3.1-1. If extendedBSR-Sizes is configured, the values taken by the Buffer Size field are shown in Table 6.1.3.1-2.

In an LTE RLC specification [36.322], data available for transmission is defined as:

4.5 Data Available for Transmission

For the purpose of MAC buffer status reporting, the UE shall consider the following as data available for transmission in the RLC layer:

RLC SDUs, or segments thereof, that have not yet been included in an RLC data PDU;

RLC data PDUs, or portions thereof, that are pending for retransmission (RLC AM).

In addition, if a STATUS PDU has been triggered and the status prohibit timer is not running or has expired, the UE shall estimate the size of the STATUS PDU that will be transmitted in the next transmission opportunity, and consider this as data available for transmission in the RLC layer.

In PDCP specification [36.323], data available for transmission is defined as:

4.5 Data Available for Transmission

For the purpose of MAC buffer status reporting, the UE shall consider PDCP Control PDUs, as well as the following as data available for transmission in the PDCP layer:

For SDUs for which no PDU has been submitted to lower layers:
  the SDU itself, if the SDU has not yet been processed by PDCP, or
  the PDU if the SDU has been processed by PDCP.

In addition, for radio bearers that are mapped on RLC AM, if the PDCP entity has previously performed the re-establishment procedure, the UE shall also consider the following as data available for transmission in the PDCP layer:

For SDUs for which a corresponding PDU has only been submitted to lower layers prior to the PDCP re-establishment, starting from the first SDU for which the delivery of the corresponding PDUs has not been confirmed by the lower layer, except the SDUs which are indicated as successfully delivered by the PDCP status report, if received:
  the SDU, if it has not yet been processed by PDCP, or
  the PDU once it has been processed by PDCP.

In an LTE specicfication, the Logical Channel Prioritization (LCP) procedure is specified as follows [36.321]:

5.4.3.1 Logical Channel Prioritization

The Logical Channel Prioritization procedure is applied when a new transmission is performed.

RRC controls the scheduling of uplink data by signalling for each logical channel: priority where an increasing priority value indicates a lower priority level, prioritisedBitRate which sets the Prioritized Bit Rate (PBR), bucketSizeDuration which sets the Bucket Size Duration (BSD).

The UE shall maintain a variable $Bj$ for each logical channel j. $Bj$ shall be initialized to zero when the related logical channel is established, and incremented by the product PBR×TTI duration for each TTI, where PBR is Prioritized Bit Rate of logical channel j. However, the value of $Bj$ can never exceed the bucket size and if the value of $Bj$ is larger than the bucket size of logical channel j, it shall be set to the bucket size. The bucket size of a logical channel is equal to PBR×BSD, where PBR and BSD are configured by upper layers.

The UE shall perform the following Logical Channel Prioritization procedure when a new transmission is performed:

The UE shall allocate resources to the logical channels in the following steps:

Step 1: All the logical channels with $Bj>0$ are allocated resources in a decreasing priority order. If the PBR of a radio bearer is set to "infinity", the UE shall allocate resources for all the data that is available for transmission on the radio bearer before meeting the PBR of the lower priority radio bearer(s);

Step 2: the UE shall decrement $Bj$ by the total size of MAC SDUs served to logical channel j in Step 1

NOTE: The value of $Bj$ can be negative.

Step 3: if any resources remain, all the logical channels are served in a strict decreasing priority order (regardless of the value of $Bj$) until either the data for that logical channel or the UL grant is exhausted, whichever comes first. Logical channels configured with equal priority should be served equally.

LTE-Advanced with Carrier Aggregation (LTE CA R10) is an evolution that aims to improve single carrier LTE data rates using, among other approaches, bandwidth extensions also referred to as Carrier Aggregation (CA). With CA, the WTRU may transmit and receive simultaneously over the Physical Uplink Shared CHannel (PUSCH) and the Physical Downlink Shared CHannel (PDSCH) (respectively) of multiple serving cells; up to four secondary serving cells (SCells) may be used in addition to a Primary serving Cell (PCell), thus supporting flexible bandwidth assignments up to 100 MHz. Uplink Control Information (UCI), which may comprise HARQ ACK/NACK feedback and/or Channel State Information (CSI), may be transmitted either on Physical Uplink Control CHannel (PUCCH) resources of the PCell or on PUSCH resources available for a serving cell configured for uplink transmissions.

The control information for the scheduling of PDSCH and PUSCH may be sent on one or more Physical Data Control CHannel(s) (PDCCH); in addition to the LTE R8/9 scheduling using one PDCCH for a pair of UL and DL carriers, cross-carrier scheduling may also be supported by a given PDCCH, allowing the network to provide PDSCH assignments and/or PUSCH grants for transmissions in other serving cell(s).

For a FDD LTE R10 WTRU operating with CA, there may be one HARQ entity for each serving cell, where each entity may have up to 8 HARQ processes, e.g., one per subframe for one round-trip time (RTT); it also means that there may be more than one HARQ process active for the UL and for the DL in any given subframe, but there may be at most one UL and one DL HARQ process per configured serving cell.

In LTE R8/9/10+ the PDCCH is used by the network (NW or eNB) to assign resources for downlink transmissions on the PDSCH and to grant resources for uplink transmissions on the PUSCH to the terminal device (WTRU).

A WTRU can request radio resources for an uplink transmission by sending a scheduling request (SR) to the eNB; the SR may be transmitted either on dedicated resources (D-SR) on the Physical Uplink Control CHannel (PUCCH) if configured, or using the Random Access procedure (RACH) otherwise (RA-SR).

The eNB may grant radio resources to the WTRU for a transmission on PUSCH, indicated either in a grant received on the PDCCH in configured resources (a Semi-Persistently Scheduled UL grant).

The WTRU may include, in an uplink transmission, a Buffer Status Report (BSR), indicating the amount of data in the WTRU's buffer. The trigger to transmit a BSR may trigger a scheduling request.

The WTRU determines whether or not it needs to act on control signaling in a given sub-frame by monitoring the PDCCH for specific data control information messages (DCI formats) masked using a known radio network temporary identifier (RNTI) in specific locations, or search space, using different combinations of physical resources (i.e. control channel elements—hereafter CCEs) based on aggregation levels (AL, each corresponding to either 1, 2, 4, or 8 CCEs). A CCE comprises 36 QPSK symbols, or 72 channel coded bits.

Scheduling control information contained in an uplink grant includes a New Data Indicator (NDI) which is used to determine whether the grant is for an initial transmission or for a retransmission, a resource assignment that indicates what physical resources blocks (PRBs) in time and frequency are allocated to the transmission and a Modulation and Coding Scheme (MCS). A WTRU can determine the size of the associated transport block (TB) from the MCS and the number of PRBs allocated to the transmission.

In LTE R12 (or later, for aspects of multi-cell operation using inter-eNB carrier aggregation), the WTRU may be configured with some form of dual connectivity, e.g. a configuration whereby the WTRU may have access to resources of cells associated to different eNBs. The network may control connectivity using a single MME/S1-c connection terminating in the MeNB.

From the perspective of the control plane, the WTRU may have established a RRC connection with a first eNB (i.e. a MeNB) and may additionally support a configuration where one or more cells may be associated to a second eNB (i.e. a SeNB). If it is assumed that the RRC connection terminates in the MeNB, then the complete message may be received by the RRC entity in the MeNB.

From the perspective of the user plane architecture, the network may terminate S1-u in the MeNB only (alternative 3 including alternative a, e.g. for all EPS bearers) or it may (e.g. additionally) terminate S1-u in the SeNB (alternative 1A, for one or more EPS bearer).

From the perspective of the L2 transport of SRB data and/or user plane traffic, data for a given radio bearer may be transmitted from the network to the WTRU using a single L2 path or alternatively using either L2 path (referred to as DL multi-flow). Similarly, data transmitted may be transmitted from the WTRU to the network using a single L2 path or using either L2 path (referred to as UL multi-flow). Multi-flow may be realized by configuration of a bearer such that it may conceptually be mapped to different cells associated to more than one eNB.

A typical transport bearer function may be modeled as a combination of Quality-of-Service (QoS) related aspects as well as in terms of a routing function. QoS-related aspects may be parameterized in terms of (e.g. maximum or guaranteed) bit rate, maximum tolerable latency or the like. Routing for a bearer is typically achieved using some form of physical or logical (e.g. such as using a tunneling function based on GTP-u or based on an IP tunnel) point-to-point transport path.

The terms "primary MAC entity" and "Secondary MAC entity" herein refer either to MAC entities as separate processes each conceptually associated to cells of different eNBs (e.g. a MeNB and a SeNB), and consequently to their respective associated L1/physical layer processing, or to a single MAC entity which makes the distinction between a Uu (L1/PHY) conceptually associated to a first eNB (e.g. a MeNB) and to a second eNB (e.g. a SeNB). The WTRU may have one primary MAC entity associated to the MeNB and one secondary MAC entity associated to a SeNB.

The Primary MAC entity may correspond to the MAC entity that is configured with the PCell on which the WTRU established the RRC connection (as per the legacy R10 definition of the PCell). The Secondary MAC entity may also be configured with a special cell, in which case such cell may be configured with an uplink carrier and with additional PUCCH resources.

Additional Information on Transmission Timing for Systems such as LTE Systems: A WTRU may set its initial DL timing by detecting the Primary Synchronization Signal (PSS) and the Secondary Synchronization Signal (SSS) in a cell and by determining the first (or best received) path of the DL subframe boundaries. The WTRU then may maintain DL synchronization by measuring the first path arrival of synchronization signals and/or DL reference signals. Once the WTRU has acquired DL synchronization, the WTRU may determine the uplink timing for its transmissions using the random access procedure, during which the WTRU may first transmit a preamble on the Physical Random Access Channel (PRACH). The WTRU may align the transmission of the preamble with the start of the received DL subframe boundary (e.g. such that no timing advance is applied). The WTRU may receive a random access response (RAR) that includes a Timing Advance Command (TAC). Such TAC may include a value calculated by the eNB based on the reception time of the preamble e.g. such that the eNB can estimate the two-way propagation delay between the eNB and the concerned WTRU, and then determine a suitable value to transmit to the WTRU. The WTRU may then use this value to determine how much in advance of the DL subframe boundary it may start its uplink transmissions. Alignment of uplink transmissions for all WTRUs in a cell may help lower the levels of interference perceiver in the receiver in the eNB for the cell, in particular when the transmission timing is less than or equal to a predefined value.

Once a WTRU has initial uplink timing, further adjustments may be needed over time as a result of WTRU movement, changing multipath (i.e. change in the timing of the best received DL path), oscillator drift and/or Doppler shift. To this extent, the WTRU may track the DL timing reference and may perform some adjustments autonomously while the eNB may monitor the arrival time of the WTRU's uplink transmissions e.g. based on uplink demodulation reference signals, SRS or any other transmissions such that it may signal TA adjustments in downlink transmissions using a TAC MAC control element (CE). The WTRU may apply the signaled adjustments received in subframe N exactly at (or no later than) the beginning of subframe N+6.

The WTRU may maintain a stored value (Nta) for a Timing Advance Group (TAG). The WTRU may update Nta for the concerned TAG when it receives a TAC from the eNB that indicates a positive or a negative value. The WTRU additionally also may autonomously update the stored value to compensate for changes to the received downlink timing e.g. based on its tracking of the DL timing reference. The Nta may be used to adjust the uplink transmission time in-between reception of TAC and when the Timing Advance Timer (TAT) is running.

The WTRU may have a configurable timer, the Timing Advance Timer (TAT) per Timing Advance Group (TAG). The WTRU may determine from the TAT whether (if running) or not (otherwise) it may consider itself as having proper UL timing alignment. When the TAT is not running, the WTRU may not perform any transmission in the uplink except for the transmission of a random access preamble. The WTRU may start or restart the TAT when it receives a TAC, either in a TAC MAC CE or in a RAR. When the TAT expires, the WTRU may consider that it no longer has valid uplink timing alignment for the concerned TAG. The eNB may keep a WTRU uplink time aligned by timely transmission of MAC TAC CE to the WTRU, i.e. before the TAT expires in the WTRU.

Efforts are being deployed to create different means to aggregate resources from different eNBs (e.g. R12 LTE inter-eNB aggregation using dual connectivity). The objective is typically to enable means for an operator to offload some traffic from a macro cell/eNB to another cell/eNB which cell may possibly offer some form of hot spot overlay network, or to enable higher throughput.

A WTRU may be configured for dual connectivity. Dual connectivity may be configured by the network either for throughput benefits (mainly for the downlink) or for offload purposes (relieving an eNB deployed for macro coverage from user plane traffic towards another eNB deployed for capacity enhancements). When a WTRU is configured for operation with dual connectivity, it may use radio resources associated to different eNBs where the interface corresponding to each set of resources is herein referred to as a Uu interface. Each Uu interface may itself be configured with one or a plurality of serving cells in cases where intra-eNB carrier aggregation is also supported. The WTRU may then be scheduled for any type of data by a Macro eNB (MeNB) which eNB controls the RRC connection, as well as by a Secondary eNB (SeNB) which may be used for exchanging user plane data. This form of dual connectivity may also be referred to as Inter-eNB Carrier Aggregation (inter-eNB CA). In this case, the WTRU may be configured with different MAC entities, one for each configured Uu interface.

FIG. 2 illustrates an example system 200 operating using dual connectivity. System 200 includes a WTRU 210, a MeNB 220, and a SeNB 230. WTRU 210 is configured for dual connectivity operation and may transmit simultaneous and/or overlapping uplink communications to both MeNB 220 and SeNB 230 as discussed further herein. It is noted that in some implementations, dual connectivity may be conceptualized as simultaneous and/or overlapping communications to more than one MAC entity or using the uplink resources of more than one cell group (CG) rather than to more than one eNB.

Support for inter-eNB CA may be according to different possible architectures. A first example architecture (herein referred to as 1A) may support S1-u split, i.e. where an EPS bearer for user plane traffic is associated to a single eNB with PDCP terminating in the concerned eNB for each corresponding data radio bearer (DRB). A second example architecture (herein referred to as 3C) may support a single S1-u termination in the MeNB for user plane traffic with PDCP terminating in the MeNB for all DRBs. For both alternatives, the control plane terminates in the MeNB. Additionally, data associated to signaling radio bearers (SRBs) may only be transmitted using the Uu interface associated with the MeNB.

From the perspective of the physical layer, a WTRU configured with dual connectivity may possibly receive downlink data from both eNBs simultaneously, i.e. it can be assumed that no scheduling restriction precludes that for at least some subframes the WTRU may be scheduled for a downlink transmission from both eNBs. One implication is that each of the MAC/PHY instances may monitor PDCCH and receive PDSCH simultaneously.

Still from the perspective of the physical layer, different alternatives are possible for uplink operation for a WTRU configured with dual connectivity. Which alternative may be applicable may depend on a number of aspects including what may be assumed in terms of timing alignment between cells of different eNBs of the same WTRU configuration. For example, different approaches may perform better depending on whether or not synchronization of symbols in the uplink at the subframe boundary may be guaranteed at least within a certain margin e.g. such as within the length of a cyclic prefix.

In particular, transmissions associated to different physical layers (e.g. different Uu interfaces, and/or associated MAC entities, and/or different eNBs) may occur simultaneously such that their respective subframe timing is either synchronized (i.e. their respective timing is within a certain margin, which margin does not exceed that specified for transmissions associated to a single MAC entity) or unsynchronized (i.e., otherwise).

For the synchronized case, a simultaneous transmission may refer to at least the part of both transmissions that overlaps for a given TTI.

For the unsynchronized case, the timing of a subframe associated to a first MAC entity may partly overlap with the end of a subframe associated to a second MAC entity as well as with the beginning of the subsequent subframe associated to that second MAC entity; in this case, a simultaneous transmission may refer either to the entire overlapping part (e.g. at symbol granularity and/or across subframe boundary) or to a partial overlap (e.g. at most one subframe is considered for each MAC entity). In this case, for some methods described herein, a WTRU may take into account transmissions over more than one subframe for the second MAC entity when such occur simultaneously to a transmission in a subframe of a first MAC entity.

Figure 3:
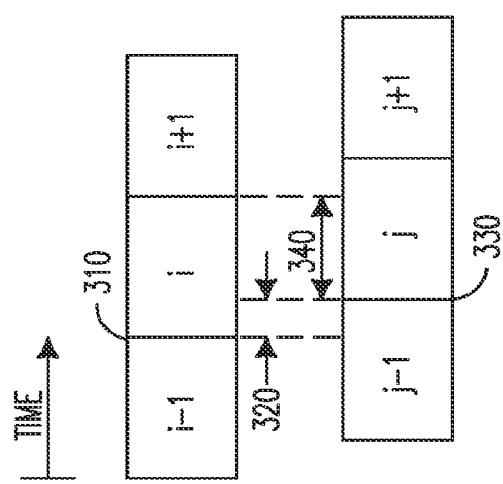
FIG. 3 is a block diagram illustrating simultaneous transmissions for a synchronized case.

FIG. 3 illustrates example simultaneous transmissions for a synchronized case. Transmissions i and j in this example are directed toward different eNBs. The eNBs may be a MeNB and a SeNB such as MeNB 220 and SeNB 230 of FIG. 2 for example. The difference in time 320 between start time 310 of transmission j and start time 330 of transmission i is within (i.e. less than) a threshold for the synchronized case. In the synchronized case, at least the portions of transmissions i and j occurring during the overlapping time interval 340 may be considered to be a simultaneous transmission. It is noted that in some implementations, transmissions i and j may be considered as corresponding to different MAC entities, or performed using the uplink resources of different cell groups (CGs) rather than as directed toward different eNBs.

Figure 4:
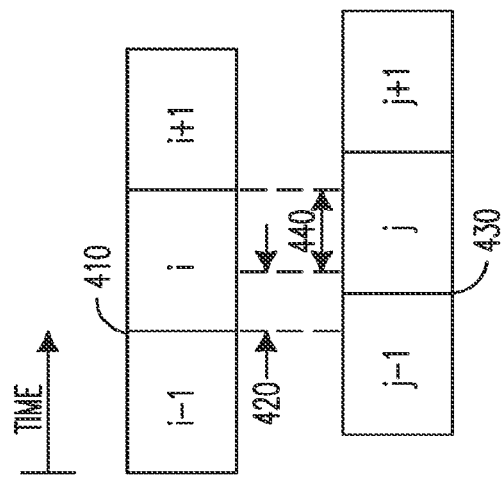
FIG. 4 is a block diagram illustrating simultaneous transmissions for an unsynchronized case.

FIG. 4 illustrates example simultaneous transmissions for an unsynchronized case. Transmissions i and j in this example are directed toward different eNBs. The eNBs may be a MeNB and a SeNB such as MeNB 220 and SeNB 230 of FIG. 2 for example. The difference in time 420 between start time 410 of transmission j and start time 430 of transmission i is outside (i.e. greater than) the threshold for the synchronized case. In the unsynchronized case, the portions of transmissions i and j occurring during the overlapping time interval 440 may be considered to be a simultaneous transmission. In some implementations, both the portions of transmissions i and j occurring during the overlapping time interval 440 and the portions of transmissions i and j−1 occurring during the overlapping time interval 420 may be referred to as a simultaneous transmission. It is noted that in some implementations, transmissions i and j may be considered as directed toward different MAC entities, or different cell groups (CGs) rather than toward different eNBs.

Possible alternatives for uplink operation for a WTRU configured with dual connectivity, when considering PUSCH, PRACH, SRS and PUCCH, include the following cases:

Case 1—No simultaneous transmissions or overlap (restrictions at subframe/symbol granularity).

This may be achieved by precluding simultaneous transmissions by different MAC/PHY instances of the WTRU, e.g. using a Time-Division Multiplexing (TDM) approach e.g. as a function of subframe allocation and/or prioritization of different signals according to specific rules. Power scaling rules/prioritization between transmissions associated to different MAC/PHY instances (e.g. across different Uu interfaces) may not be required in such case.

Thus in case 1, TDM and priority rules, e.g. per subframe, are applied.

With case 1, TDM may be applied using priority rules applicable on a time unit basis e.g. at the multi-subframes (e.g. a radio frame) granularity, at the subframe granularity or even at the symbol level. This may avoid power issues or a need for new scaling rules. This may be suitable for synchronized physical layer interfaces.

Case 2—Restricted simultaneous uplink transmissions (restrictions at physical channel granularity).

This may be achieved by precluding simultaneous transmissions for combinations of different uplink physical channels, e.g. for different combinations of PUSCH, PRACH, SRS and PUCCH e.g. as a function of subframe allocation and/or prioritization of different signals according to specific rules. Power scaling rules/prioritization between transmissions associated to different MAC/PHY instances (e.g. across different Uu interfaces) may be required for specific combinations.

Thus in case 2, TDM and priority rules on physical channels, e.g. applied per subframe, and some power-related methods are applied.

With case 2, TDM may be applied using priority rules applicable to physical channels on a time unit basis e.g. at the multi-subframes (e.g. a radio frame) granularity, at the subframe granularity or even at the symbol level; some methods still needed to address residual power issues. This may be suitable for synchronized physical layer interfaces.

Case 3—Unrestricted operation (restrictions at the level of power allocation and scaling rules only).

This may be achieved by the WTRU applying specific power scaling rules.

Thus in case 3 only power-related methods are applied. This may be suitable for both cases of either synchronized or unsynchronized physical layer interfaces.

Some prioritization and power scaling mechanisms have been specified for LTE R10 for intra-eNB carrier aggregation. However a number of aspects remain problematic. One such aspect relates to characteristics of the inter-eNB CA principles, including the minimal (if any) coordination between schedulers as well as the characteristic that control plane data may only be transmitted using a single Uu interface i.e. using the resources associated with the MeNB. Another such aspect is the different example architectures 1A and 3C (as discussed above, supporting S1-u split for 1A, and supporting a single S1-u termination for 3C) are applicable to dual connectivity, as described above, including whether or not data from a DRB may be received from a single eNB or from both. Additional considerations may also be introduced for alternative 3C if DRB data in the uplink may only be transmitted on a single Uu (e.g. using resources of the SeNB).

Methods and devices to enable dynamic operation of TDM, transmission prioritization and transmission power scaling principles and methods may be needed to avoid starvation or unnecessary delaying of transmission on the different interfaces. In addition, what rule to apply may vary based on time, scheduler implementation, ongoing procedure or even type of data to transmit.

Methods and devices described in this document relate to enabling efficient offloading and/or efficient aggregation of resources by providing for the WTRU to coordinate uplink transmissions when interacting with different schedulers, one for each eNB associated with the WTRU's configuration, for example, as shown and described with respect to FIG. 2.

While methods and devices described herein, including general principles, methods and related embodiments, are described with respect to the 3GPP LTE technology and related specifications, they may be equally applicable to any wireless technology which implements methods for accessing multiple wireless layers and/or for connecting to multiple radio access technologies, such as other 3GPP technology based on Wifi, WCDMA, HSPA, HSUPA and HSDPA.

For example, the terms "MAC entity", "MAC instance", "MAC", cell group (CG) or primary/secondary or the like as used herein may be used in referring to a power allocation function of different radio access technologies. For example, in some embodiments a "primary MAC instance" or a "MeNB CG—MCG" may correspond to a first radio access technology such as LTE while a "secondary MAC instance" or a "Secondary CG—SCG" may correspond to a second radio access technology such as HSPA or Wifi.

In addition, while they may be described in terms of connectivity to two eNBs, the methods and devices described herein are also applicable to operation using an arbitrary number of Uu interfaces (e.g. radio link towards multiple eNBs).

In the following discussion, the terms "lower" and "higher" are used to mean "lowest" or "lower than another element using similar priority assessment principles" and "highest" or "higher than another element using similar priority assessment principles". In addition, the terms "PDCCH" and "ePDCCH" will be used interchangeably with the understanding that any method or device described herein may be applicable to either type of control channel, when appropriate.

In this document, the term MAC entity is used mainly to refer to the WTRU's functions for handling transmissions to/from a specific eNB and may thus refer to the combination of the MAC and any associated physical layer aspect, to physical layer functions only or to the MAC functions only depending on the context.

Prioritization functions are described further herein and may be one possible approach to enabling a WTRU to overcome conflicting scheduling requirements in UL.

For example, a WTRU may be configured for dual connectivity. The WTRU may, in a given transmission time interval (TTI) or subframe, apply a prioritization function for one or more uplink transmissions. The WTRU may apply a prioritization function by considering more than one overlapping subframe associated to the other MAC entity, in particular in case of unsynchronized physical layers. Described herein are examples of such functions, possible configuration aspects, as well as inputs to such functions in terms of how a WTRU may determine the (absolute or relative) priority associated to the uplink transmissions, scheduling instructions or combinations thereof.

In particular, prioritization herein may include a function applied by a WTRU when the combination of more than one uplink transmission may impair the WTRU's ability to adequately perform such transmissions. For example, such impairments may include where a WTRU is unable to comply for specific combinations of transmissions (e.g. due to some hardware limitation, insufficient WTRU capabilities or the like), or where the available transmit power for two or more uplink transmission(s) may be insufficient in a given time interval to perform all expected transmissions (e.g. according to applicable scheduling instructions).

For example, such prioritization function may be applied according to at least one of the following:
 a. When the WTRU is expected to perform at least one transmission associated to more than one MAC entity, and such transmissions overlap at least partly (e.g. either at the subframe level or at the symbol granularity).
 b. When the WTRU may possibly perform at least one transmission associated to more than one MAC entity, and such transmissions overlap at least partly (e.g. either at the subframe level or at the symbol granularity) including overlapping subframes for which the WTRU is in DRX Active Time for both MAC entity.
 c. In any subframe for which the WTRU performs at least one transmission.

In some methods, using any of the above methods, a subframe may be additionally excluded when at least one of the following conditions is met for at least one of the MAC entity:
 a. The WTRU is not in DRX Active Time.
 b. The WTRU may not perform an uplink transmission due to the occurrence of a measurement gap.
 c. The WTRU is not expected to perform any uplink transmission e.g. due to an interruption introduced by the MAC activation/deactivation function such as activation time following the reception of a MAC Activation CE that activates at least one cell of the concerned MAC entity.
 d. The WTRU is not expected to perform any uplink transmission e.g. due to an interruption introduced by processing required for an RRC procedure such as a reconfiguration procedure, or such as a RRC re-establishment procedure.
 e. The WTRU is not expected to perform any uplink transmission e.g. due to the WTRU not having valid uplink timing advance for the special cell of the concerned MAC entity (e.g. PCell for the MeNBr Cell Group, pSCell for the SeNB Cell Group).
 f. The WTRU is not expected to perform any uplink transmission due to some impairment e.g. such as when detecting radio link failure for the physical layer associated to the concerned MAC entity.

In some methods, in subframes for which the WTRU does not apply such prioritization function, consequently the WTRU may instead use a behavior similar to a behavior used for single connectivity e.g. the WTRU may apply legacy power control and power allocation functions.

Figure 5:
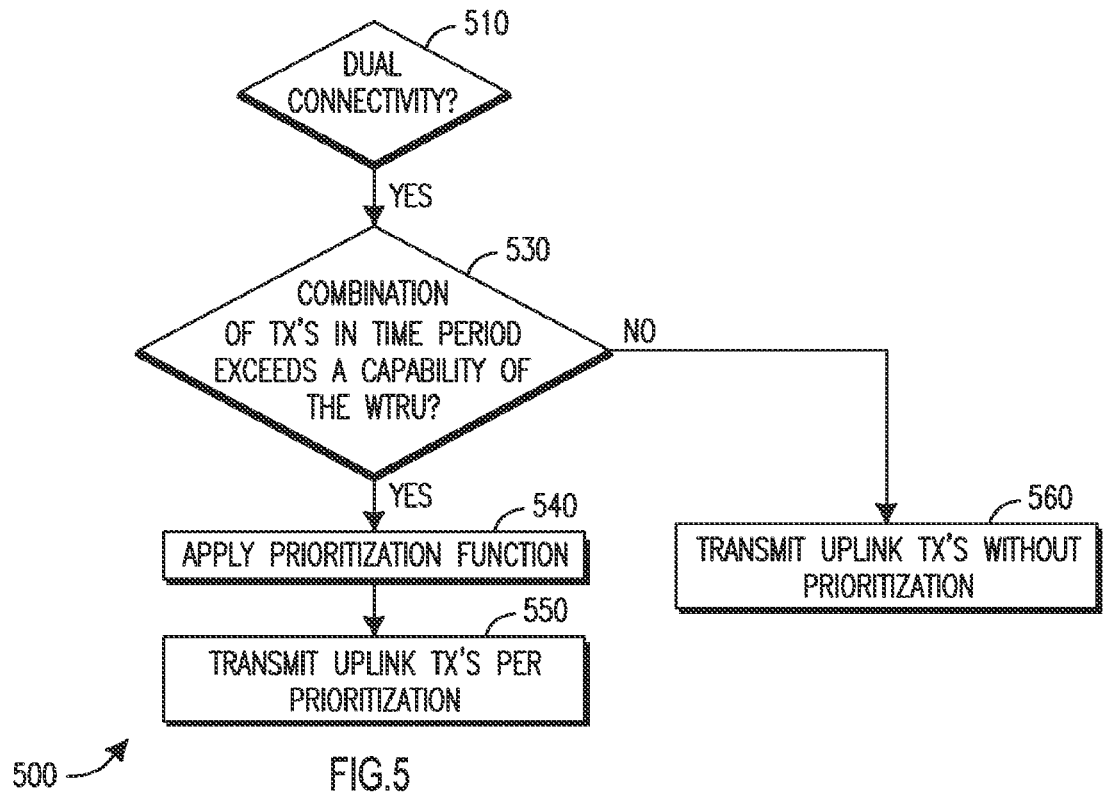
FIG. 5 is a flowchart illustrating an example application of a prioritization function.

FIG. 5 is a flowchart 500 illustrating an example application of a prioritization function. On a condition 510 that a WTRU is configured for operation in a dual connectivity mode, the WTRU may determine in step 530 whether the simultaneous transmission of the plurality of transmissions scheduled for uplink in the time interval would exceed a capability of the WTRU.

If the WTRU capability would be exceeded, the WTRU may apply a prioritization function 540 and may proceed to transmit the uplink transmissions according to the prioritization in step 550.

If the combination of uplink transmissions do not exceed a capability of the WTRU to perform all of the uplink transmissions, the WTRU may in step 560 transmit the uplink transmissions per MAC entity without applying a prioritization function.

It is noted that in some implementations of the application of the prioritization function illustrated in FIG. 5, the uplink transmissions may be conceptualized as transmissions to more than one eNB, or as uplink transmissions using the resources of more than one CG, rather than corresponding to more than one MAC entity.

Methods for selective transmission are also further described herein.

One way to realize a prioritization function is through selective transmission. For example, a transmission may be performed by selectively determining what grant information to use for a HARQ process associated to the transmission of a transport block (TB). A TB may be associated to a specific TB size (TBS) which may represent the amount of data information bits as provided by the MAC layer. The WTRU may determine the TBS as a function of the MCS and the number of PRBs associated to the transmission.

The WTRU may autonomously determine to use one of a plurality of available sets of grant parameters. More specifically, the WTRU may determine that it should perform a transmission such that it may autonomously determine one or more characteristics of the transmission as a replacement of one or more aspects of the applicable grant (the "base grant"). Such characteristic(s) may include parameter(s) associated to a grant. The WTRU may first determine one (or more) alternative values for the concerned characteristic(s). Such alternative value(s) may be grouped as sets of parameters. One such grouping may correspond to the definition of a grant for an uplink transmission (an "alternative grant"). Such set or sets may be associated to a serving cell of the WTRU's configuration. Such set or sets may have an associated validity criterion which may be modified with time explicitly (e.g. from signaling received from an eNB e.g. the MeNB) or implicitly (e.g. based on subframe timing, expiration, or the like).

The WTRU may autonomously determine to replace base grant information by an alternative grant. For example, when the WTRU applies a prioritization function according to a selective transmission method, it may use an alternative grant instead of the base grant for a given transmission.

Possibly, the WTRU may not replace a grant received in a RAR. It is also possible that a WTRU may only replace a base grant received using specific DCI types with an alternative grant. For example, the WTRU may only replace a base grant if it is received in a DCI format e.g. DCI format 0. In another example, a WTRU may not replace a base grant received in a RAR with an alternative grant.

The set of parameters, or grant, may be associated to a specific TB size. It is also possible that such set or sets of parameters (e.g. an alternative grant) may be associated with a transport block (TB) size, e.g. such that for a given transport block size the WTRU may determine that it has one or more alternative grants.

The following relates to example rules for grant substitution in the case of a new transmission or new HARQ process. Several approaches for realizing a prioritization function using grant substitution are possible.

New transmission—no restriction in TBS: In one example approach, the WTRU may replace a base grant with an alternative grant for a new transmission independently of their respective associated TBS.

Further logic for the concerned process: In such cases, the WTRU may select an alternative grant and determine the associated TBS. The WTRU may then perform the new transmission on the resource and with the MCS indicated in the alternative grant. Adaptive retransmissions may then be performed on the resource and, if provided, with the MCS indicated on PDCCH only if the resulting TBS is identical to the TBS associated to the initial transmission for this TB (otherwise, this is a case addressed further below regarding DCI indication of NDI toggling). Non-adaptive retransmissions may be performed on the same resource and with the same MCS as was used for the last made transmission attempt.

New transmission—restricted to same TBS as base grant only: In another example approach, the WTRU may replace a base grant with an alternative grant for a new transmission, where the WTRU only uses an alternative grant having the same associated TBS as the concerned base grant.

If only alternative MCS then determine alternative set of PRBs: In such case, the WTRU may select the alternative grant. If only an alternative MCS is available, the WTRU may determine an associated set of resources autonomously. If there exists one combination of the alternative MCS with the PRBs indicated in the base grant for the concerned TBS, then WTRU may use such PRBs; otherwise, the WTRU may determine a different set of PRBs. Such different set of PRBs may represent a smaller number of PRBs and may be entirely overlapping with the set of PRBs indicated by the base grant and using the same starting resource element for the initial PRB.

If only alternative PRBs then determine alternative MCS: In such cases, the WTRU may select the alternative grant. If only an alternative set of PRBs is available, the WTRU may determine the associated MCS autonomously: if there exists one combination of the alternative set of PRBs with the MCS indicated in the base grant for the concerned TBS, then WTRU may use such MCS; otherwise, the WTRU may not select the alternative grant. Alternatively, the WTRU may determine such different MCS using a different set of PRBs that may represent a smaller number of PRBs and may be entirely overlapping with the set of PRBs indicated by the alternative grant and using the same starting resource element as indicated by the alternative grant.

Further logic for the concerned process: The WTRU may then perform the new transmission on the resource and with the MCS as determined in the above described steps. Adaptive retransmissions may then be performed on the resource and, if provided, with the MCS indicated on PDCCH only if the resulting TBS is identical to the TBS associated to the initial transmission for this TB (otherwise, this is a case addressed further below regarding DCI indication of NDI toggling). Non-adaptive retransmissions are performed on the same resource and with the same MCS as was used for the last made transmission attempt.

In an example approach, the WTRU may replace a grant (i.e. either a base grant e.g. for an adaptive retransmission or an alternative grant e.g. for a non-adaptive retransmission) for a retransmission for an ongoing HARQ process using another alternative grant only if the associated TBS if the same as the TBS of the grant it replaces and/or as the TBS of the last made transmission attempt.

Rules for grant substitution—retransmission for an ongoing HARQ process: For example, the WTRU may perform one or more HARQ retransmissions associated with the same HARQ process (i.e. for retransmission of the same TB). The WTRU may then only select an alternative grant (if applicable) having a TBS which is the same as the TBS of the previous transmission attempt for this process independently of whether a base grant or an alternative grant was used.

A possible approach for handling redundancy version for a HARQ process using an alternative grant: In legacy LTE systems, the sequence of redundancy versions is 0, 2, 3, 1. The WTRU typically maintains a variable CURRENT_IRV as an index into the sequence of redundancy versions. This variable is updated modulo 4. The WTRU may use this same logic even for a HARQ process for which selective transmission and the use of alternative grant information is applicable.

Possible approach for handling other control information from a base grant when replacing with an alternative grant: The WTRU may comply with some of the downlink control information received in the DCI that contains the base grant even if the transmission for PUSCH is performed using the alternative grant.

Possible WTRU behavior for TPC command for PUSCH: The WTRU may determine that the DCI that contains the base grant also includes TPC command bits for power control of PUSCH. In an example approach the WTRU may comply with the TPC command independently of whether or not an alternative grant is used for the associated transmission.

Possible WTRU behavior for CSI/SRS triggers: The WTRU may determine that the DCI that contains the base grant also includes bits that are set such that the WTRU is requested to transmit CSI information and/or SRS (e.g. SRS trigger type 1). In this situation, in an example approach, if the WTRU replaces such base grant with an alternative grant, the WTRU may determine that the request is applicable to the alternative grant.

Possible WTRU behavior for SRS triggers: The WTRU may comply with an aperiodic SRS request in DCI independently of selected grant. In another approach, the WTRU may determine that it should transmit a SRS according to a trigger, e.g. either trigger type 0 (L3/RRC trigger) or trigger type 1 (L1/DCI trigger) independently of the type of grant used for the PUSCH transmission. The WTRU may additionally apply another prioritization function to the SRS transmission as described herein.

For example, the WTRU may receive a grant for a PUSCH transmission in a DCI on PDCCH which DCI may include a SRS request (e.g. the bit for SRS request is set). In this case, the WTRU may select an alternative grant e.g. according to any of the methods described herein and perform the transmission of SRS according to the request in the base grant.

In another approach, the WTRU may ignore any trigger to transmit SRS when it uses an alternative grant. This may lower possible interference with transmission from other WTRUs.

Possible WTRU behavior for CSI triggers: The WTRU may comply with an aperiodic CSI request in DCI independently of selected grant. The WTRU may determine that it should perform the transmission of CSI according to an aperiodic request independently of the type of grant used for the PUSCH transmission. The WTRU may additionally apply another prioritization function or functions to the CSI transmission as described herein.

For example, the WTRU may receive a grant for a PUSCH transmission in a DCI on PDCCH which DCI may include a CSI request (e.g. at least one bit of the CSI request field is set). In this case, the WTRU may select an alternative grant e.g. according to any of the methods described herein and perform the transmission of CSI according to the alternative grant if the transmission is included in the corresponding PUSCH transmission, or according to legacy methods otherwise (e.g. on PUCCH or on another PUSCH).

The WTRU may comply with configured CSI reporting independently of selected grant: In another approach, the WTRU may determine that it should perform the transmission of CSI according to a configuration for periodic CSI reporting independently of the type of grant used for the PUSCH transmission. The WTRU may additionally apply other prioritization function to the CSI transmission as described herein.

The WTRU may ignore any CSI trigger when it selects alternative grant: In another approach, the WTRU may ignore any trigger to transmit CSI when it uses an alternative grant. This may simplify blind decoding processing in the receiver (eNB).

WTRU behavior for a HARQ process configured with TTI bundling: In one approach, a WTRU configured for TTI bundling operation (e.g. in the PCell of the WTRU's configuration for the Primary MAC entity) may apply any of the approaches above to replace the base grant with an alternative grant for a bundle transmission. In another approach, a WTRU configured for TTI bundling operation for a given serving cell may not select an alternative grant for any transmission in the concerned cell.

WTRU autonomously used alternative grant, then a received DCI indicates different TB size: The WTRU may have used an alternative grant for the previous transmission for a HARQ process. The WTRU may subsequently receive a DCI that indicates a grant for the concerned HARQ process, which grant results in a different TBS than the last made transmission for this HARQ process.

Case where DCI indicates that an associated NDI has been toggled: In such case, if the WTRU determines that the NDI is considered toggled from the decoding of the base grant, the WTRU may determine that the grant is for a new transmission and consider the base grant as being valid scheduling information.

Case where DCI does not indicate that an associated NDI has been toggled: Otherwise if the WTRU determines that the NDI is not considered toggled from the decoding of the base grant, the WTRU may perform at least one of the following:

The WTRU may determine that the base grant is inconsistent with the state of the HARQ process (i.e. this may be considered as a new error case introduced by loss of synchronization between the WTRU-autonomous behavior described herein and the eNB scheduling state).

The WTRU may collapse the HARQ process, i.e., the WTRU may determine that the grant is for a new transmission and may consider the base grant as being valid scheduling information. The WTRU may then consider the NDI as having been toggled. The WTRU may first determine whether or not the physical hybrid-arq indicator channel (PHICH) associated to the last made transmission for this HARQ process indicates ACK or NACK. If NACK, then the WTRU may first determine that the transmission for the transport block associated to the last made transmission for the HARQ process has failed, and may perform similar behavior as upon reaching the maximum number of HARQ transmissions for this HARQ process and/or may initiate a scheduling request (SR) and/or a random access procedure on PRACH resources associated to the concerned cell and/or to a cell of the concerned MAC entity. Alternatively, the WTRU may first determine whether or not the PHICH associated to the last made transmission for this HARQ process indicates ACK or NACK. If NACK, then the WTRU may first determine that the transport block (and/or its contents) associated to the last made transmission for the HARQ process is to be retransmitted. Alternatively, the WTRU may, independently of the last received feedback for this HARQ process, first determine that the transport block associated to the last made transmission for the HARQ process has failed, and may perform similar behavior as upon reaching the maximum number of HARQ transmissions for this HARQ process, and/or may initiate a scheduling request (SR) and/or a random access procedure on PRACH resources associated to the concerned cell and/or to a cell of the concerned MAC entity.

The WTRU may discard the received control scheduling information and may suspend the concerned HARQ process. For example, the WTRU may consider that the last received feedback for the concerned HARQ process is set to ACK. The WTRU may keep the process suspended until it receives control signaling from which it may consider that the NDI is toggled. In this case, the eNB may detect that the HARQ process is suspended from the absence of transmission on the scheduled resources. Note: assuming that an eNB may detect the inconsistency, a WTRU could subsequently receive a grant with correct TBS information and continue the suspended process.

The WTRU may flush the uplink HARQ buffer for the HARQ process. In this case, the eNB may detect that the HARQ process is inactive. Possibly, the WTRU considers that the NDI has been toggled for the next transmission for this HARQ process.

For a given subframe (e.g. n−4) that collides with a measurement gap and in which the WTRU may have otherwise received dynamic scheduling information on PDCCH for a HARQ process, the WTRU may behave according to at least one of the following if the last made transmission was performed using an alternative grant. In one approach, the WTRU may determine that it should perform a non-adaptive retransmission in subframe n if the last received feedback is NACK and according to the last made transmission using a base grant for this transport block (if applicable), otherwise it may refrain from performing any transmission for this HARQ process in subframe n. In another approach, the WTRU may determine that it should perform a non-adaptive retransmission in subframe n if the last received feedback is NACK and according to the grant of the last made transmission for this transport block. In another approach, the WTRU may refrain from performing any transmission for this HARQ process in subframe n if the last made transmission was performed using an alternative grant, independently of the last received feedback.

For a given subframe (e.g. n) that collides with a measurement gap and in which the WTRU may have otherwise performed a PUSCH transmission for a HARQ process, the WTRU may perform as per legacy behavior.

For a given subframe (e.g. n+4) that collides with a measurement gap and in which the WTRU may have otherwise received PHICH feedback for a HARQ process, the WTRU may determine that the last received feedback is ACK as per legacy behavior.

The WTRU may associate a priority level with such set of parameters (e.g. with an alternative grant) such that it can determine the applicable set for the transmission as a function of the transmission's priority level. The WTRU may determine such priority level using similar approaches as for determination of priority level for a transmission as described herein.

The WTRU may have multiple UL transmissions granted in the same subframe and may allocate power per a priority rule. Upon satisfying all transmissions with higher priority, a WTRU may determine the appropriate grant parameters of a lower priority transmission based on the remaining available power.

The WTRU may, in one approach, use an alternative grant instead of a base grant only if the base grant indicates that the scheduling information is for a new transmission (e.g. where the WTRU determines that the NDI bit is considered to have been toggled).

According to another approach, uplink control information (UCI) that indicates the use of an alternative grant (and possibly, an indication allowing the eNB to determine one or more aspects of the alternative grant e.g. an index to an entry in a table) may be added in the corresponding PUSCH transmission. Such indication may be used by the eNB to determine how to blindly decode the transmission and possibly also any retransmissions for the same transport block.

According to another approach, the WTRU may obtain such set of transmission parameters for a given type of transmission (e.g. PUSCH) to be performed in a given subframe (e.g. subframe n+4) according to at least one of the following:

1. Multi-grant in single DCI: The WTRU may receive multiple grants in the same DCI in subframe n, on a PDCCH that schedules transmission for the WTRU on a given serving cell of the WTRU's configuration. For example, the WTRU may successfully decode one DCI that includes a base grant as well as one (or more) alternative grant(s). The priority level associated with each grant may be determined using any of the methods described herein, in particular as a function of the order of the parameters (grant information) in the concerned DCI.

2. Multi-DCI/multi-PDCCH: The WTRU may receive multiple grants in different DCIs in subframe n, on a PDCCH that schedules transmission for the WTRU on a given serving cell of the WTRU's configuration. For example, the WTRU may successfully decode multiple DCIs—one that includes a base grant as well as one (or more) DCI(s) that include an alternative grant. Such DCI may include a single alternative grant, or a plurality of alternative grants (in which case the relative priority level between each alternative grants may be a function of the order/position of the grant in the concerned DCI). The priority level associated to each successfully decoded DCI may be determined using any of the methods described herein, in particular as a function of the signaling in the DCI (e.g. an explicit indication), of the RNTI used for decoding the DCI, of the identity of the PDCCH or of the search space on which the DCI is successfully decoded.

3. Grant extrapolation: The WTRU may receive a grant in a DCI in subframe n, from which the WTRU may be allowed to derive one or more alternative grant(s) according to specific rules (such that the eNB is expected to perform blind decoding appropriately). The priority level associated to each DCI may be determined using any of the methods described herein, in particular as a function of the nature of the grant e.g. whether the grant is dynamically scheduled or is a semi-statically configured base grant (for a transmission of higher priority) or an extrapolation thereof (for a transmission of lower priority). For example, in the event that a WTRU cannot perform an UL transmission at the required and/or expected transmission power with the granted parameters, the WTRU may modify one or multiple parameters of the UL transmission. For example, a WTRU may be configured with MCS and TBS tables such that an indication in a grant maps to a set of possible MCS and/or TBS values. The WTRU may use a different MCS and/or TBS value based on being able to achieve the required transmission power. The selection of the MCS and/or TBS value may be based on satisfying an optimization function. For example, the WTRU may select the MCS and/or TBS value that is largest, smallest, requires most transmission power, requires least transmission power or preconfigured as a fallback value from the one indicated in a grant. The example provided herein may be applicable to transmission rank, precoder, cyclic shift for DM-RS and OCC and/or CSI Request;

4. Configured alternative grant: The WTRU may be configured (e.g. by RRC) with a semi-static alternative grant (e.g. some form of persistent alternative grant). This is herein referred to as a configured alternative grant (CAG). When the WTRU is configured with such grant, the WTRU may select and use the CAG when it determines that it should apply a prioritization function for a given transmission. In other words, the WTRU may use a CAG instead of another, possibly less suitable, grant (e.g. a base grant) for a given transmission. A CAG may also be restricted in time, such that it may apply to one or to a plurality of subframes within a certain time interval (e.g. a radio frame) and/or may be available according to a given (possibly configurable) period.

The WTRU may, in some implementations, use such CAG only when the WTRU has received a DCI that dynamically schedules the corresponding transmission (i.e. in case of a dynamically scheduled base grant). In other words, the validity of a CAG may be a function of the WTRU's PDCCH decoding for the concerned serving cell. The validity of a CAG may also be a function of the availability of any base grant for an uplink transmission for the concerned cell, e.g. including where the WTRU has a semi-persistent grant (i.e., a R8-like semi-persistent scheduling (SPS) grant) for the concerned subframe (i.e. in case of a semi-persistent scheduled grant without dynamic adaptation). In other words, the WTRU may autonomously adapt a dynamically scheduled transmission (i.e. a base grant) or a first configured grant for a semi-persistent scheduled transmission (i.e. a semi-static base grant) by using a second configured (semi-persistent) grant (i.e. an alternative grant).

In some implementations, the WTRU may receive additional control signaling that activates and deactivates such CAG. Such signaling may be received in a DCI on PDCCH. Such signaling may include the corresponding grant information for the CAG. The WTRU may transmit HARQ feedback e.g. in subframe n+4 for such control signaling received in subframe n. Alternatively, such signaling may be a L2 MAC Control Element (CE).

In some implementations, the WTRU may determine that it may autonomously select one or more transmission parameters, e.g. that it may replace a base grant with an alternative grant from the reception of an explicit indication in a DCI. Such indication may be a specific value and/or codepoint in the TPC field of the DCI. According to one possibility, the WTRU may determine that it may autonomously select one or more transmission parameters only for a DCI for which the WTRU considers that the NDI bit is toggled and/or for a DCI indicating a new transmission. The eNB may then detect a situation where a WTRU becomes power limited and indicate for every new transmission whether or not the WTRU may autonomously replace a grant. This may be useful in a situation where no specific priority is associated to any MAC instance but for which the WTRU determines itself how to prioritize uplink transmissions, and also because a scheduler may not know a priori whether or not the WTRU is being scheduled for both MAC entities in a given TTI.

In some implementations, the WTRU may determine that there are two or more of such additional sets of transmission parameter(s) (e.g. alternative grants) that are valid and available in a given subframe (i.e. in addition to the base grant). In such case, the WTRU may select the grant that maximizes the allocation of power and/or that minimizes the scaling of the transmission power e.g. across all transmissions of a given MAC entity (e.g. if the corresponding transmissions are given higher priority in a MAC-specific manner), across all transmission of the WTRU for a given subframe, or across types of cell (e.g. PCell of primary MAC entity first, then Special cell of secondary MAC entity, SCells of primary MAC instance and finally the remaining SCells).

For example, selective transmission may be useful to perform some form of WTRU autonomous decision to avoid a situation where a WTRU performs blanking of (or scaling to zero power) a transmission, to avoid a situation where power scaling is applied to a transmission, or to avoid truncating a transmission. The corresponding eNB may perform blind decoding of the transmission according to two or more grants that may be applicable in the concerned subframe. The eNB may transmit control signaling that activates and deactivates such alternative sets of transmission parameters or grant(s) e.g. such that those are available to the WTRU only on a condition that the eNB (e.g. the MeNB) determines that the WTRU may be power-limited, or on a condition that processing requirements for the associated blind decoding in the eNB exceeds the capabilities of the eNB for a given period. In particular, this may be useful where it cannot be assumed that timing of the uplink transmission can be synchronized within some margin, e.g. at the symbol duration and within the length of a cyclic prefix.

From the network perspective, the implication is that the eNB may perform additional blind detection processing in a subframe for which a WTRU may have one (or more) alternative grant(s) available for a given HARQ process.

The eNB may perform such blind decoding to detect uplink control information that indicates that an alternative grant is used (and possibly also, which alternative grant is used) in the PUSCH transmission (if/when such UCI is applicable) for every concerned such subframe.

The eNB may perform such blind decoding of the transport block using the different possible alternatives. In such case, the eNB may perform such actions only where the transmission of a new transport block is expected if the WTRU is only allowed to first use an alternative grant for a given HARQ process for a new transmission (e.g. only where the WTRU determines that the NDI associated to the concerned HARQ process has been toggled and/or where the HARQ process obtains a new MAC PDU for transmission). Otherwise, the eNB may perform such actions also where a retransmission for a transport block may be expected if the WTRU is allowed to use a first alternative grant for a given HARQ process where applied to a HARQ retransmission (e.g. where the grant selection is restricted by the size of the transport block associated to the associated base grant). If the WTRU may only select an alternative grant of a TBS that matches that of the base grant and/or that of the previous transmission of the same HARQ process, the eNB may only perform blind decoding using those alternative grant(s) that matches that TBS if one or more alternative grant(s) of different TBS are also configured for the concerned WTRU.

The following relates to various approaches to adaptive prioritization. One example approach for realizing a prioritization function may be to dynamically adjust how the prioritization function is applied. The WTRU may then use a different prioritization function or apply the prioritization function differently such as by allocating transmission power in different manner from one time unit (e.g. a TTI, a radio frame or another possibly configured period) to another. Such configured period may include a configured power allocation period. For simplicity, the term TTI may be used below to represent any form of time unit. Such dynamicity may be introduced using a function that may vary the priority associated to one or a subset of transmissions. Such subset may be transmissions associated to a same MAC entity.

Figure 6:
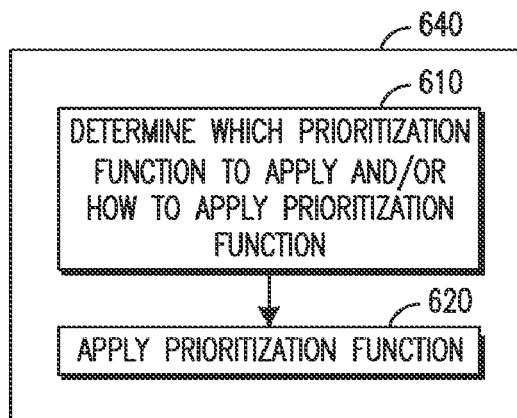
FIG. 6 is a flowchart illustrating an example of dynamic adjustment of a prioritization function.

FIG. 6 illustrates one example of dynamic adjustment of a prioritization function. Step 640 illustrates an example implementation of a prioritization function, such as may be useable with step 540 shown and described with respect to of FIG. 5. In step 610, the WTRU may determine which prioritization function to apply and/or how to apply the prioritization function for the given time interval, and in step 620, the WTRU may apply the determined prioritization function. It is noted that in other implementations (not shown) the prioritization function may be fixed, or may be varied for time intervals other than the given time interval.

One possible approach is to implement a method that can change the priority applied to transmissions associated to different MAC entities. Such approach may be useful to realize some form of fairness between scheduling events from a plurality of eNBs and may contribute to avoiding starvation that could occur in the presence of uncoordinated schedulers unaware of each other's impact on the WTRU's transmissions. Such an approach may be useful to realize some form of fairness when power allocation is performed according to the principles described herein where a WTRU simultaneously transmits using physical layers associated to different radio access technologies.

The approaches described herein may be applicable to the total available uplink transmission power (e.g. up to $P_{CMAX}$ in the case of transmissions associated to LTE) or to a portion of the available uplink transmission power. Such portion may be up to an amount of power for which each MAC instance may contend, such as any remaining power that is not part of an amount that is guaranteed to a specific MAC entity. The approaches described herein may be applicable to a subset of the transmissions of a WTRU, such as transmissions of a specific priority.

For example, one example principle may that "the one who gets penalized can change dynamically". For example, for every TTI that leads to a need to scale the power (a scaling event), power may first be allocated to the MAC entity with highest priority and remaining power may then be allocated to other MAC entit(y/ies) in decreasing priority order. The priority associated to each MAC entity that contends for the total available power may change prior to (or following) every collision event, or alternatively prior to (or following) the beginning of a period that starts with such collision event. Each MAC instance is allocated a probability of having the highest priority level, which probability is updated such that it is increased in case contention is lost and such that it is lowered in case contention is won. The probability may be updated also after a given period (including possibly in a periodic manner during periods without contention) without any scaling event such that the entity with the highest probability is updated such that it gets lower—and conversely—until each MAC entity reaches a specific value (e.g. an initial possibly configured value or an equal probability for each MAC entity). In a given TTI for which the WTRU determines that scaling is required, the WTRU may first determine which MAC entity has highest priority by using a random generator that uses the probability of each MAC entity as input. For example, in case where two MAC entities contend for the total available WTRU transmit power, the WTRU only needs to maintain a probability and to determine the priority for a single MAC entity.

In another approach each MAC instance may be allocated a priority value. Upon a collision, the MAC(s) with highest (or lowest) priority value may perform transmissions without scaling while transmissions associated to other MAC(s) may be scaled. Prior to (or following) a collision, the priority values of some or all affected MACs may be modified such that any MAC entity that performed at least one transmission with or without scaling may have its priority value increased or decreased (respectively) by a predetermined amount. Furthermore, prior to (or following) a period that starts with such a collision and possibly contains no other collision, the priority levels of the affected MACs may increase (or decrease) by a (possibly different) predetermined amount, such that they may reach a specific value (e.g. an initial value or an equal probability for each MAC entity).

For conciseness and without limiting the applicability of the methods described herein to specific transmissions by type of physical channel, by type/identity of a serving cell or for individual transmissions, the following will assume that priority is allocated to all transmissions of a given MAC entity (unless explicitly stated otherwise). In addition, without limiting the applicability of the methods described herein to an arbitrary number of elements (e.g. more than two transmissions or more than two MAC entities), the following will assume that transmissions associated to two MAC entities are contending for available power. In addition, power scaling is used as prioritization function but the method described herein may be applicable to any other prioritization function.

In an example approach, such method may be applied only in TTIs for which the WTRU determines that a prioritization function (e.g. power scaling) should be applied. For example, such method may be used to associate varying priority to one or more transmissions. For example, the WTRU may use such method to determine that it will first allocate transmission power to transmissions associated to one of two MAC entities by varying the priority of the concerned MAC entities.

Where power scaling is needed, the WTRU may first determine a priority for the applicable MAC entities such that a priority order is established, then allocate power to transmissions of the MAC entity with the highest priority, and any remaining power to the other entities either in decreasing priority order or by splitting remaining power equally to the different MAC entities. In any case, if the power available to a concerned MAC entity is insufficient for all transmissions, power scaling may be applied to the transmissions associated to the concerned MAC entity e.g. according to legacy R11 behavior, or more generally according to the power allocation behavior of the concerned radio access technology once the total amount of WTRU power available to the concerned MAC entity is determined.

For example, if no power remains for the second MAC entity and if it is insufficient for all transmissions of the first MAC entity, power scaling may be applied to transmissions of the first MAC entity e.g. according to legacy R11 power scaling function. If power remains for the second MAC entity, power scaling may be applied to transmissions of the second MAC entity e.g. according to legacy R11 power scaling function. If power scaling is applied for a SMAC, it may be assumed that one of the cells of the concerned MAC entity is a special cell for which scaling is applied similarly as for the PCell in legacy R11 scaling.

Figure 7:
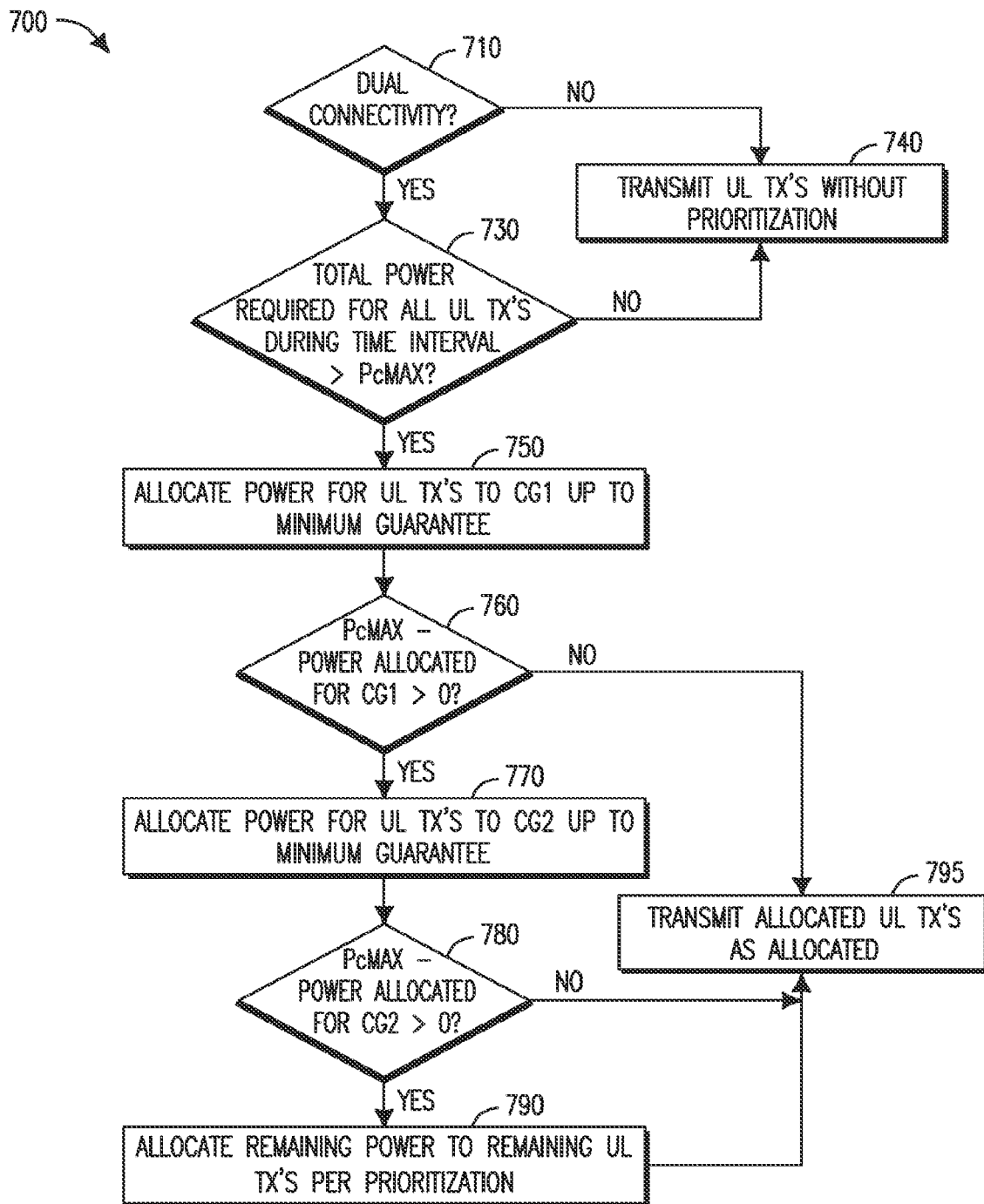
FIG. 7 is a flowchart illustrating an example application of adaptive prioritization.

FIG. 7 is a flowchart 700 illustrating an example application of adaptive prioritization. In 700, a WTRU is configured with a maximum power for all uplink transmissions during a given time interval (Pcmax), a minimum guaranteed power for uplink transmission from the WTRU using the uplink resources of a first cell group CG1, and a minimum guaranteed power for uplink transmission from the WTRU using the uplink resources of a second cell group CG2.

On a condition 710 that the WTRU is configured for operation in a dual connectivity mode during a particular time interval, the WTRU may determine in a step 730 whether the total power required for all unscaled uplink transmissions scheduled for the time interval will exceed Pcmax. If it will not, the WTRU may transmit uplink transmissions without applying a prioritization function in step 740.

If the total power required for all unscaled uplink transmissions scheduled for the time interval will exceed Pcmax, the WTRU may in step 750 allocate power to uplink transmissions scheduled for transmission to CG1 up to the minimum guaranteed power for CG1. In some implementations these transmissions may be allocated in decreasing priority order and/or by scaling power if the required transmit power for all uplink transmissions scheduled for transmission to CG1 exceeds the minimum guaranteed power for CG1.

On a condition 760 that no unallocated power remains after allocating CG1 uplink transmissions, the WTRU may transmit all allocated uplink transmissions as allocated in step 795. If any unallocated power remains after allocating CG1 uplink transmissions (i.e. Pcmax—power allocated for uplink transmissions using the uplink resources of CG1>0), the WTRU may in step 770 allocate power to uplink transmissions scheduled for transmission using the uplink resources of CG2 up to the minimum guaranteed power for CG2. In some implementations these allocations may be made to transmissions in decreasing priority order and/or by scaling power if the required transmit power for all uplink transmissions scheduled for transmission using the uplink resources of CG2 exceeds the minimum guaranteed power for CG2.

On a condition 780 that no unallocated power remains after allocating CG2 uplink transmissions, the WTRU may transmit all allocated uplink transmissions as allocated in step 795. If any unallocated power remains after allocating CG2 transmissions (i.e. Pcmax—allocated power for uplink transmissions using the uplink resources of CG1—allocated power for uplink transmissions using the uplink resources of CG2>0), the remaining power may be allocated by the WTRU in step 790 for any remaining unallocated uplink transmissions using the uplink resources of CG1 or CG2. In some implementations, these allocations may be made to transmissions in decreasing priority order and/or by scaling power. After the remaining unallocated power has been allocated, the WTRU may transmit all allocated uplink transmissions as allocated in step 795.

Figure 8:
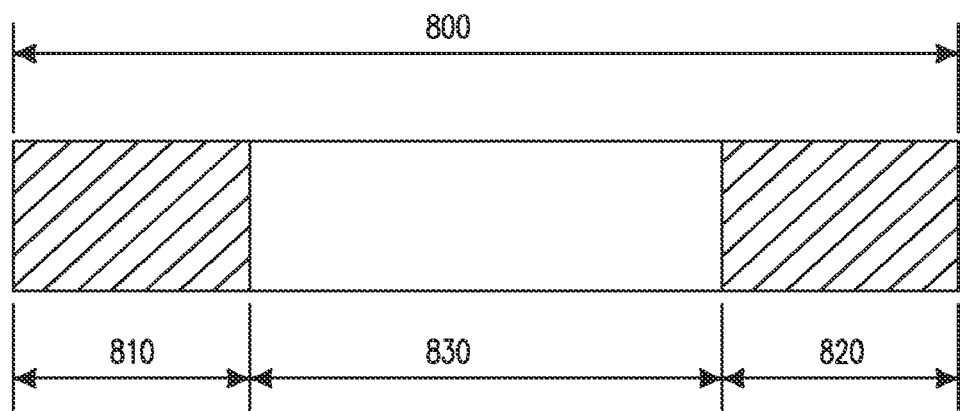
FIG. 8 is a block diagram illustrating an example allocation of power to uplink transmissions.

FIG. 8 is a block diagram illustrating allocation of power to uplink transmissions according to the example described with respect to FIG. 7. FIG. 8 shows Pcmax 800, the minimum guaranteed power 810 for uplink transmissions using the uplink resources of CG1, and the minimum guaranteed power 820 for uplink transmissions using the uplink resources of CG2. Minimum guaranteed power 810 and minimum guaranteed power 820 are each a ratio (i.e. percentage or proportion) of Pcmax, and FIG. 8 illustrates example proportions for an application of the adaptive prioritization method shown and described with respect to FIG. 7.

For these example proportions, guaranteed power 810 shows the proportion of Pcmax 800 which may be allocated as minimum guaranteed power for uplink transmissions using the uplink resources of CG1 in step 750 of FIG. 7, and guaranteed power 820 shows the proportion of Pcmax 800 which may be allocated as minimum guaranteed power for uplink transmissions using the uplink resources of CG2 in step 770 of FIG. 7. 830 will correspond to the proportion of Pcmax 800 which may be allocated to any remaining uplink transmissions in step 790 of FIG. 7 if power is allocated for CG1 and CG2 transmissions each at the minimum guaranteed power.

In one example approach, adaptation may be derived randomly. For example, the WTRU may use a stateless and fair probability function. The outcome of the function (e.g. similar to the toss of a coin) may be applied to determine the priority associated to each MAC entity. For example, the WTRU may apply the probability function (e.g. a Bernoulli distribution with probability=0.5) to one of two MAC entities; if the concerned MAC entity gets associated to value 1, then all transmissions associated to this MAC entity are allocated power first; if any power remains, transmissions associated to the second MAC entity may be allocated remaining power. This may be generalized to any number of MAC entities using the appropriate probability distribution.

In an example approach that may generalize the previous approach, such probability function may use a different probability for the respective MAC entities. For example, the WTRU may apply the probability function (e.g. a Bernoulli distribution with probability=x) to one of two MAC entities, where x is in the range [0, 1]. Such probability x may be a configuration aspect of the concerned MAC entity.

In another example approach, the probability x may vary with time. Such time may be a TTI or may be a configured power allocation period. For example, the probability x may be updated in any TTI for which the WTRU performs at least one transmission such that its value may be decreased if the transmission is associated to the concerned MAC entity and possibly also if no prioritization function (e.g. power scaling) is applied, or its value may be decreased otherwise.

In another example approach, such adaptation may be derived from previous prioritization (e.g. scaling) events applied on transmissions performed by the WTRU. For example, the probability x may be updated in any TTI for which the WTRU performs at least one transmission associated to each MAC entities and where a prioritization function (e.g. power scaling) is applied, such that its value may be increased if the WTRU has applied power scaling to the transmission power (or an equivalent function e.g. selective transmission) of at least one transmission associated to the concerned MAC entity, or decreased otherwise.

In another example approach, the value of x may be one of a discrete set of values e.g. [0.1, . . . , 0.9] with intermediate values in step increment of 0.1.

In another example approach, such adaptation may use a probability function associated with a state. Such state may be a priority level associated to the concerned MAC entity. Such state may be based on a period of time, such as based on a single previous TTI (or alternatively a period during which the priority was not subject to change from one TTI to the other). Such previous TTI may include either: the TTI immediately before the TTI for the current transmission; or the TTI of the previously made transmission; or the TTI in which the WTRU may at least one transmission associated to each of the MAC entities that contend for power in the concerned TTI.

Such previous TTI may be a TTI in which the WTRU applied one of the prioritization functions (e.g. power scaling). For example, such TTI may be the last TTI in which the WTRU applied power scaling to at least one of its transmissions.

For example, the WTRU may determine the priority associated to transmissions of a first MAC entity using a Markov chain where the current state associated to the concerned MAC entity is the outcome determined in the previous TTI for which the WTRU applied power scaling and for which the WTRU had at least one transmission for at least each of two MAC entities. Alternatively, such period may be a configured power allocation period.

In some deployment scenarios, timing of transmissions associated to different MAC entities may differ such that some overlap may occur between a transmission performed in subframe n for a first MAC entity and a transmission performed in subframe n+1 for a second MAC entity. In such case, the total transmission power may exceed the maximum WTRU transmit power WTRU temporarily. It may be problematic for a WTRU to scale power properly for consecutive subframes if the priority changes from one TTI to the other.

In one example approach, the WTRU may modify the priority associated to a MAC entity only for a TTI that immediately follows a TTI for which power scaling was not applied. Possibly, for stateful functions as described above, the WTRU may consider only such TTIs; in other words, the WTRU may only keep track of the outcome of the function used to determine priority when such priority may be changed. Alternatively, the WTRU may consider any TTI in which power scaling is applied when it maintains state; in other words, the WTRU may keep track of the assigned priority when applying power scaling for the function used to determine priority.

In a case where two different MAC entities are each configured with a different TTI duration (e.g. such as where each MAC entity is configured using a different Radio Access Technology), similar methods may be used for the time for which the WTRU has overlapping transmissions or for a configured power allocation period.

In an example approach, the WTRU may first allocate transmission power to any transmission that contains UCI (including PUCCH and/or PUSCH with UCI) and, for remaining transmissions it may use any of the above functions to determine the identity of the MAC entity for which the associated transmissions may then be allocated any remaining power; if any power remains, it may finally be allocated to the MAC entity that lost contention.

In another example approach, the WTRU may first allocate transmission power to any transmission that contains UCI (including PUCCH and/or PUSCH with UCI). If total available power is insufficient, a prioritization function may be applied (e.g. power scaling) at this step e.g. PMAC first then SMAC. For remaining transmissions it may use any of the above functions to determine the identity of the MAC entity for which the associated transmissions may then be allocated any remaining power; if any power remains, it may finally be allocated to the MAC entity that lost contention.

In another example approach, the WTRU may first allocate transmission power to any transmission associated to the PCell of the PMAC and, for remaining transmissions it may use any of the above functions to determine the identity of the MAC entity for which the associated transmissions may then be allocated any remaining power; if any power remains, it may finally be allocated to the MAC entity that lost contention.

In another example approach, the WTRU may first allocate transmission power to any transmission associated to the PCell of the PMAC and to any transmission associated to a special cell of the SMAC. If total available power is insufficient, a prioritization function may be applied (e.g. power scaling) at this step e.g. PMAC first then SMAC. For remaining transmissions it may use any of the above functions to determine the identity of the MAC entity for which the associated transmissions may then be allocated any remaining power; if any power remains, it may finally be allocated to the MAC entity that lost contention.

Figure 9:
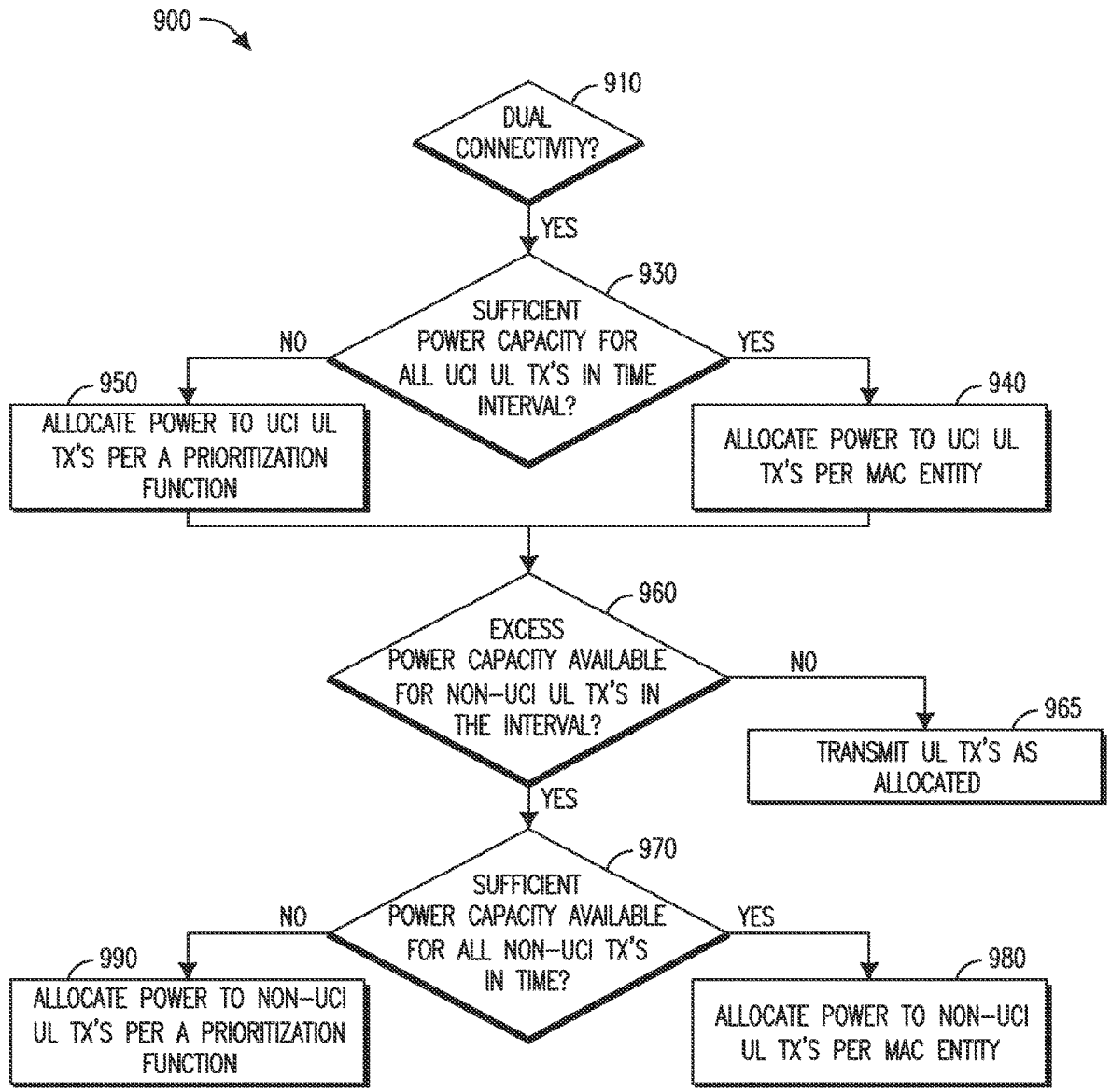
FIG. 9 is a flowchart illustrating another example application of adaptive prioritization.

FIG. 9 is a flowchart 900 illustrating an example application of adaptive prioritization functions. On a condition 910 that the WTRU is configured for operation in a dual connectivity mode the WTRU may determine in a step 930 whether the maximum amount of power available to the WTRU for uplink transmissions in a time interval is sufficient for all UCI uplink transmissions during the time interval without power scaling. If so, the WTRU may allocate power to UCI uplink transmissions per MAC entity without prioritization in step 940 (for example, by not scaling the power for these transmissions). Otherwise, the WTRU may allocate power to UCI uplink transmissions in step 950 during the transmission using a prioritization function (for example, by scaling the allocated transmission power for each of the transmissions, possibly according to priority).

The WTRU may also determine in step 960 whether, after allocating power to UCI uplink transmissions, any excess power is available to allocate to any non-UCI transmissions (i.e., whether the power allocated to UCI transmissions in step 940 or 950 is less than the maximum amount of power available to the WTRU for all uplink transmissions in the time interval). If power is not available for non-UCI transmissions, the WTRU may, in step 965, transmit the transmissions as allocated. If power is available for non-UCI transmissions, the WTRU may determine in step 970 whether the remaining power is sufficient for all non-UCI transmissions scheduled during the time interval to be transmitted without scaling. If so, the WTRU may allocate power to non-UCI uplink transmissions in step 980 by not scaling the power for these transmissions. Otherwise, the WTRU may allocate power to non-UCI uplink transmissions in step 990 using a prioritization function (for example, by scaling the allocated transmission power for each of the transmissions, possibly according to priority).

Figure 10:
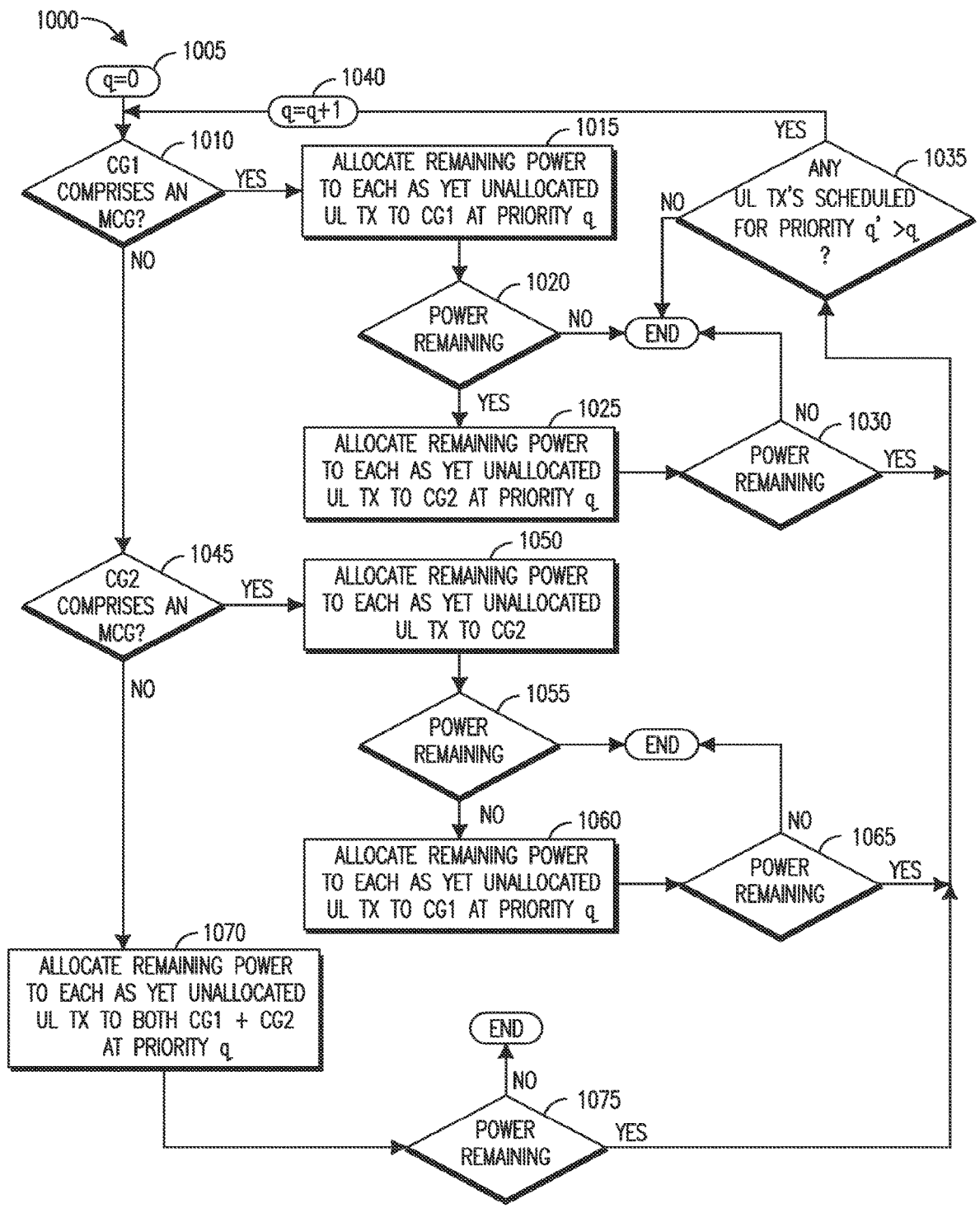
FIG. 10 is a flow chart illustrating an example of prioritization by cell group type.

FIG. 10 shows a flow chart 1000 which illustrates an example prioritization of transmissions according to CG type. In the example of FIG. 10, transmissions to a master cell group (MCG) are prioritized above transmissions to other types of cell group, such as secondary cell groups (SCG), although in principle another priority order may be implemented. The procedure illustrated in flow chart 1000 may be used to prioritize transmissions when allocating remaining power such as in step 1260 of FIG. 12, for example.

In step 1005 priority is set to q=0 to begin prioritization at the greatest priority level. On a condition 1010 that CG1 comprises an MCG, the WTRU allocates remaining power in step 1015 to each as yet unallocated uplink transmission having priority q which is scheduled for transmission using the uplink resources of CG1 in a time interval. In step 1020 the WTRU may determine whether any unallocated remaining power is available and if not, the procedure ends. If unallocated remaining power is available, the WTRU may allocate the available power in step 1025 to each as yet unallocated uplink transmission having priority q which is scheduled for transmission using the uplink resources of CG2. In step 1030 the WTRU may determine whether any unallocated remaining power is available and if not, the procedure ends. If unallocated remaining power is available, the WTRU may determine in step 1035 whether any uplink transmissions of priority level q'>q are scheduled for the time interval (i.e. whether any transmissions are scheduled for uplink during the time interval having lesser priority than q). If not, the procedure ends. If so, the value of q may be incremented in step 1040 and the procedure may return to condition 1010 in order to consider the next priority level.

If the WTRU determines in condition 1010 that CG1 does not comprise an MCG, the WTRU may determine in step 1045 whether CG2 comprises an MCG. If CG2 comprises an MCG, the WTRU may allocate remaining power in step 1050 to each as yet unallocated uplink transmission having priority q which is scheduled for transmission using the uplink resources of CG2 in the time interval. In step 1055 the WTRU may determine whether any unallocated remaining power is available, and if not, the procedure ends. If unallocated remaining power is available, the WTRU may allocate the available remaining power in step 1060 to each as yet unallocated uplink transmission having priority q which is scheduled for transmission using the uplink resources of CG1. In step 1065 the WTRU may determine whether any unallocated remaining power is available and if not, the procedure ends. If unallocated remaining power is available, the WTRU may determine in step 1035 whether any uplink transmissions of priority level q'>q are scheduled for the time interval (i.e. whether any transmissions are scheduled for uplink during the time interval having lesser priority than q). If not, the procedure ends. If so, the value of q is incremented in step 1040 and the procedure may return to condition 1010 in order to consider the next priority level.

If the WTRU determines in step 1045 that CG2 does not comprise an MCG, then the WTRU in step 1070 may allocate any remaining power to each as yet unallocated uplink transmission having priority q which is scheduled for transmission using the uplink resources of either CG1 or CG2 in the time interval. In step 1075 the WTRU may determine whether there is any remaining unallocated power for uplink transmissions in the time interval and if not, the procedure ends. If so, the WTRU may determine in step 1035 whether any uplink transmissions of priority level q'>q are scheduled for the time interval (i.e. whether any transmissions are scheduled for uplink during the time interval having lesser priority than q). If not, the procedure ends. If so, the value of q is incremented in step 1040 and the procedure may return to condition 1010 in order to consider the next priority level.

Further methods for adaptive prioritization are described herein.

Similarly as for approaches described above, the WTRU may maintain other type(s) of state to determine how to change the priority associated to a given MAC entity.

For example, the WTRU may maintain a configured power allocation period that it may use to vary, from one period to another, the priority of different transmissions and/or the priority associated to different MAC entities.

For example, the WTRU may maintain some state of the amount of power it has scaled for each MAC entity, such that a specific ratio may be enforced. Possibly, such state may be maintained using a moving window. Such ratio and/or such window may be configurable aspect(s) of the WTRU's configuration.

One possible approach is to implement some form of fairness and/or means to avoid starvation for bearers associated with a given MAC entity using methods that can change the scaling rate applied to each MAC entity according to the principle where "a (possible unequal) share of the penalty due to the prioritization function (e.g. power scaling) is applied to each MAC entity". In an example, for every TTI that lead to the need to scale the power (a scaling event), a power scaling ratio for each MAC instance may be used similar to the above.

In one example approach, such state may be a ratio of the total scaling to be applied to different transmissions. The ratio of the total scaling applied to one or more transmissions may be changed dynamically.

In one example approach, such state may be based on one or more metric(s) that each describes one aspect of previous transmissions. Such state may be averaged over time using a (possibly configured) duration. Such duration may be useful to determine the reactiveness of a MAC entity to different scheduling or transmission events as well as to make it more predictable. How well a guaranteed "serving level" is met may be tracked dynamically.

The prioritization may be a function of a metric. Such metric may include accumulated quantities such as output power, number of transmitted L1 bits, number of L1 transmissions, number of TBs transmitted, number of grants for initial transmissions, the sum of size of the transmitted TBs, the number of PRBs used of transmissions, the number of L2 bits transmitted, accumulated power scaling applied (or the corresponding penalty) or the like. State may be expressed as a remaining amount of such quantities to be allowed or served for the given duration.

Such state may be specific to each MAC instance, possibly to the granularity of the type of transmissions. Such metric(s) may be maintained per MAC entities. Additional state may also be maintained per type of transmissions e.g. for PUSCH. Additional state may also be maintained by period of time e.g. for a power allocation period. Possibly, such metric may be maintained per configured (and activated) serving cell. In the following discussion, metrics per MAC entity are used for exemplary purposes.

Such metrics may be tied directly to or related to the Logical Channel Prioritization (LCP) state for each MAC instance. Such metric may be related to the state of the MAC LCP function. For example, one metric may be how well configured logical channel(s) (LCH(s)) (or logical channel group(s) LCG(s)) are satisfied for the concerned MAC entity in terms of QoS. For example, this may be based on the sum of the Bj state for all LCHs of the concerned MAC entities. In this case, the WTRU may first allocate power to transmissions associated to the MAC entity with the highest sum (i.e. the one with the most outstanding amount of data to transmit to meet QoS requirements). Alternatively, the WTRU may first allocate power to transmissions associated to the MAC entity for which such sum is considered only for LCHs associated to at least a minimum priority level. For example, the WTRU may consider only LCHs associated to the highest LCG for each MAC entity.

One example implementation may involve Per-CG Minimum Guaranteed Power and Remaining Power. The WTRU may have a rate control function for the allocation of uplink power. Possibly, such power prioritization function (PPF) may be used only when the WTRU determines that the total required amount of transmit power exceeds the maximum power allowed for the WTRU in a given time instant.

The WTRU may use such PPF function to allocate a prioritization rate for the usage of available power (a prioritizedMetricRate) to each MAC entity. For the purpose of example, in the following discussion the metric used will be output power (a prioritizedPowerRate or PPR) e.g. dBm per MAC entity (or per associated physical layer).

Methods for adaptive prioritization may be configurable per MAC/PHY combination. L3/RRC may be used to control the allocation of power for each MAC entity for situations where power scaling may be required by configuration. Such configuration may include a priority for each MAC entity and a value for the PPR (the rate at which the WTRU allocates that total available power). For example, the PPR may correspond to the minimum guaranteed power for the associated CG.

Figure 11:
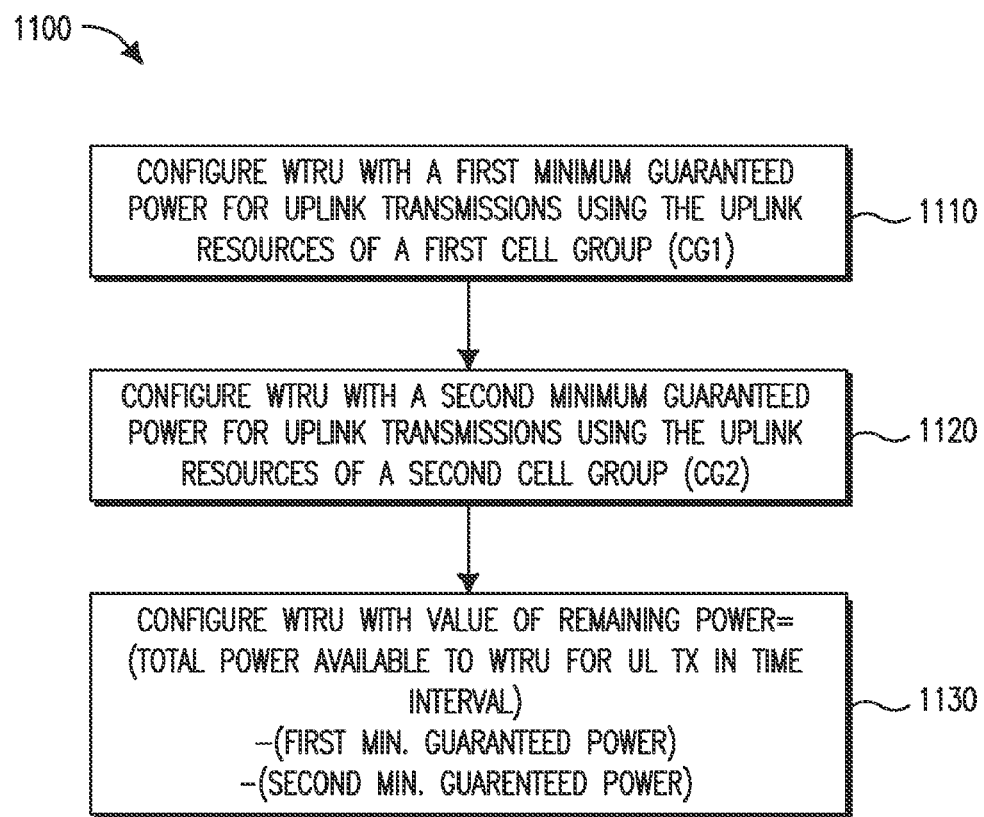
FIG. 11 is a flow chart illustrating an example power configuration for uplink transmissions from a WTRU.

FIG. 11 is a flowchart 1100 illustrating an example configuration of a WTRU for uplink transmissions scheduled to occur during a given time interval. In step 1110, the WTRU is configured with a first minimum guaranteed power for uplink transmissions using uplink resources of a first cell group (CG1) scheduled for the time interval. In 1120, the WTRU is configured with a second minimum guaranteed power for uplink transmissions using uplink resources of a second cell group (CG2) scheduled for the time interval. In step 1130, the WTRU is configured with a value for remaining power, which may be equal to a total available power for uplink transmissions in the time interval less the total of the first and second minimum guaranteed powers.

It is noted that in some implementations, the configuration of the WTRU may be considered for uplink transmissions corresponding to first and second MAC entities or uplink transmissions to first and second eNBs rather than as uplink transmissions using the uplink resources of CG1 and CG2.

Figure 12:
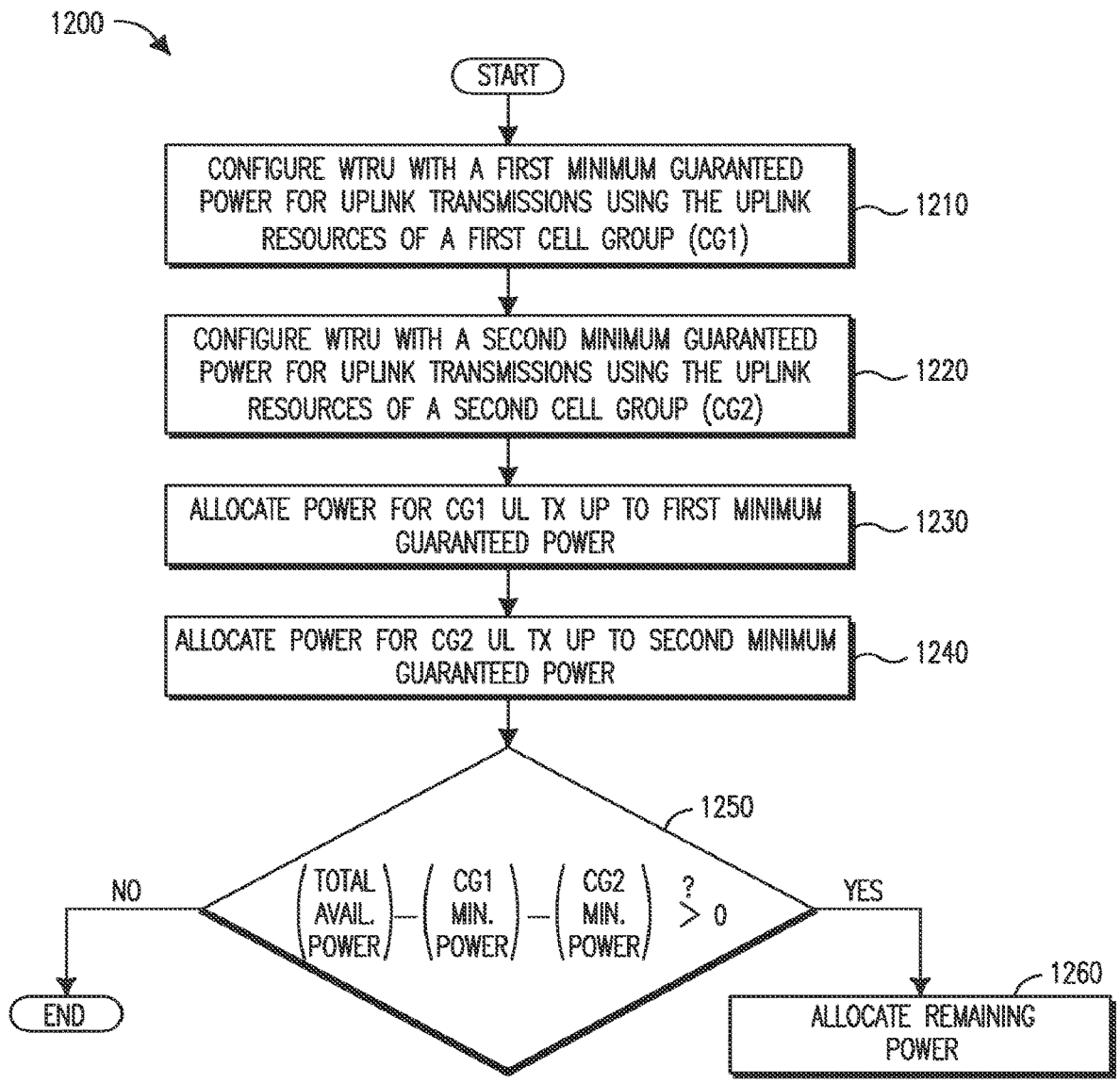
FIG. 12 is a flow chart illustrating an example of power scaling for uplink transmissions.

FIG. 12 is a flowchart 1200 illustrating an example of power scaling. In step 1210, the WTRU is configured with a first minimum guaranteed power for uplink transmissions scheduled for the time interval using the uplink resources of a first cell group (CG1). In 1220, the WTRU is configured with a second minimum guaranteed power for uplink transmissions scheduled for the time interval using the uplink resources of a second cell group (CG2). In step 1230, power is allocated for uplink transmissions using the uplink resources of CG1 scheduled for the time interval up to the first minimum guaranteed power. In step 1240, power is allocated for uplink transmissions using the uplink resources of CG2 scheduled for the time interval up to the second minimum guaranteed power. In step 1250, the WTRU may determine whether there is any remaining power to allocate for uplink transmissions from the WTRU in the time interval (i.e., whether the total available power for uplink transmissions in the time interval less the total of the first and second minimum guaranteed powers is greater than zero). If so, the remaining power is allocated to uplink transmissions in step 1260 according to one of various methods described herein.

Figure 13:
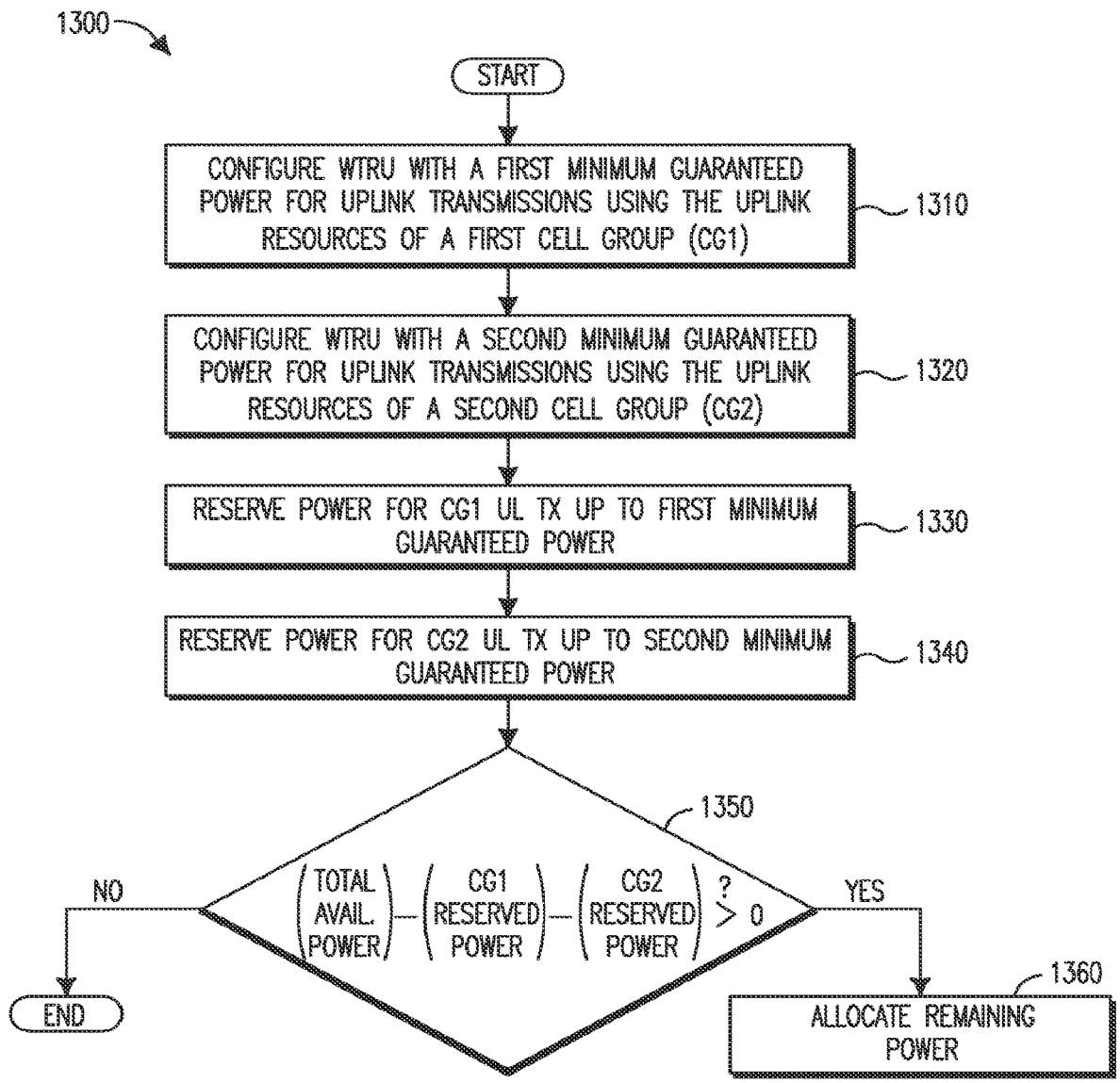
FIG. 13 is a flow chart illustrating another example of power scaling for uplink transmissions.

FIG. 13 is a flowchart 1300 illustrating another example of power scaling. In step 1310, the WTRU is configured with a first minimum guaranteed power for uplink transmissions scheduled for the time interval using the uplink resources of a first cell group (CG1). In 1320, the WTRU is configured with a second minimum guaranteed power for uplink transmissions scheduled for the time interval using the uplink resources of a second cell group (CG2). In step 1330, power is reserved for uplink transmissions using the uplink resources of CG1 scheduled for the time interval up to the first minimum guaranteed power. In step 1340, power is reserved for uplink transmissions using the uplink resources of CG2 scheduled for the time interval up to the second minimum guaranteed power. In step 1350, the WTRU may determine whether there is any remaining power to allocate for uplink transmissions from the WTRU in the time interval (i.e., whether the total available power for uplink transmissions in the time interval less the total of the first and second reserved powers is greater than zero). If so, the remaining power is allocated to uplink transmissions in step 1360 according to one of various methods described herein.

It is noted that in some implementations, the configuration of the WTRU may be conceptualized as for uplink transmissions corresponding to a first MAC entity and to a second MAC entity or transmitted to a first eNB and to a second eNB, rather than as using the uplink resources of CG1 and CG2.

In one example approach, the WTRU may use the PPF function to ensure that it serves scheduling instructions and expected transmissions according to the following:

The WTRU may first allocate transmission power to transmissions associated to a first MAC entity up to the concerned MAC entity's PPR (e.g. up to its minimum guaranteed power), possibly in decreasing priority order if such is associated to different transmission and/or transmission types and if power scaling is required for the first MAC entity (i.e. the allocated transmit power required for all transmissions of the concerned MAC entity exceeds the available PPR for the MAC entity);

The WTRU may then allocate remaining transmission power (if any) to transmissions associated to a second MAC entity up to the concerned MAC entity's PPR (e.g. up to its minimum guaranteed power), possibly in decreasing priority order if such is associated to different transmission and/or transmission types and if power scaling is required for the concerned MAC entity (i.e. the allocated transmit power required for all transmissions of the first MAC entity exceeds the available PPR for the MAC entity);

For the above, if any power remains after a first round of power allocation to each applicable MAC entity, the WTRU may allocate remaining power in decreasing priority order, either:

a. In decreasing priority of the concerned MAC entities; or
b. In decreasing priority associated to different transmission and/or transmission types across all concerned MAC entities; or
c. Using a combination of both in the same order (i.e. first for transmissions of the first MAC entity, then for transmissions of the second MAC entity); and, For the above, where the first MAC entity is assigned a higher priority that a second MAC entity, the WTRU may allocate remaining power according to any other method described herein.

For the above, where transmissions associated to a MAC entity may be assigned different relative priorities, the WTRU may allocate remaining power according to any other method described herein.

In some cases, configuration of the minimum guaranteed power/PPR may be used for adaptive prioritization. The above realization may work with any levels configured with a PPR (or minimum guaranteed power) for example, where the sum of the configured PPR is less than the maximum available WTRU power. The flexibility of such realization may be further illustrated using a number of configuration aspects and/or combinations/settings of values as discussed herein.

In some cases, minimum guaranteed power may be "infinite" for one CG—Absolute Priority. Possibly, a specific PPR value may be defined to indicate absolute priority for the associated MAC instance, e.g. "infinity". In this case, the WTRU first allocates as much of the available transmit power to transmissions of the concerned MAC entity and possibly in decreasing priority order if such is applicable and if power scaling is required for this step.

In some cases, minimum guaranteed power for a CG may equal zero (0)—CG only participates in the Flat Scaling part. Possibly, a specific PPR value may be defined to indicate that transmissions associated to a MAC entity may only be allocated power that remains once the WTRU has distributed non-zero guaranteed power to at least one applicable MAC entity.

In some cases, the sum of minimum guaranteed power for each CG may equal zero (0). In particular, the WTRU may be configured with minimum guaranteed power equal to zero for all applicable MAC entities. In this case, the WTRU allocates any available power as "remaining power."

In such cases, if the WTRU allocates remaining power in (as discussed above) decreasing priority of the MAC entities, this may become equivalent to a configuration where a MAC entity may have absolute priority; for example, this may be used in combination with other methods described herein such as methods that dynamically assign priorities.

In such cases, if the WTRU allocates remaining power in (as discussed above) decreasing priority of transmissions across all applicable MAC entities, this may become similar to the WTRU performing flat scaling using applicable priority rules applied between transmissions across all of the WTRU's transmissions.

In such cases, if the WTRU allocates remaining power using a combination of prioritization methods for MAC entities and across transmissions (as discussed above) this may become similar to the WTRU assigning absolute priority to the MAC instance with the transmission that has absolute highest priority based on applicable priority rules applied between transmissions across all of the WTRU's transmissions.

In some cases the sum of minimum guaranteed power for all CGs may equal 100% of maximum WTRU available power. In such cases, the WTRU may be configured such that the sum of the configured PPR values for all applicable MAC entities exceeds the maximum amount of power available to the WTRU. In this case, the WTRU may allocate power using prioritization methods as described in other sections herein and the PPR may behave as a maximum power for transmissions associated to a MAC entity when the WTRU is power-limited.

An example of power allocation formulation is discussed further herein. Where power is allocated according to the above principles, the maximum power $S_n$ that is available to transmissions associated to a given MAC entity CG1 and priority level n may correspond to the power not allocated to (1) transmissions of higher priority and (2) transmissions of lower priority of the other MAC entity for which guaranteed power is available. This may be represented as follows:

$$S_n = P_{CMAX} - P_{u,n} - P_{q,n} - \min(P_{av,gua}, P'_{q,n}) \quad \text{Equation (1)}$$

where $P_{CMAX}$ is the configured maximum power of the WTRU, $P_{u,n}$ is the power allocated to transmissions of higher priority of the same MAC entity (CG1), $P_{q,n}$ is the power allocated to transmissions of higher priority of the other MAC entity CG2, $P'_{q,n}$ is the power required for transmissions of lower priority of the other MAC entity CG2, and $P_{av,gua}$ is the portion of the guaranteed power of the other MAC entity that may still be available for transmissions of lower priority of the other MAC entity CG2. This portion may be represented as:

$$P_{av,gua} = \max(0, P_{CMAX} R_{CG2}^g - P_{q,n})  \quad \text{Equation (2)}$$

where $R^g_{CG2}$ is the guaranteed power of the other MAC entity expressed as a ratio of $P_{CMAX}$.

The WTRU may be configured such that the sum of the configured PPR values for all applicable MAC entities corresponds to the maximum amount of power available to the WTRU. In this case, the WTRU may allocate power to each CG up to their minimum guaranteed; if there is remaining power following this step, the WTRU may allocate it to transmissions of a MAC entity that requires more than the minimum guaranteed such that some form of semi-static split with sharing may be realized for power allocation. More specifically, where the WTRU is power-limited for transmissions of both MAC entities then this may be equivalent to a semi-static split; where the WTRU is power-limited for transmissions in only one MAC entity then some sharing of any unused power may be performed between MAC entities and if insufficient, the WTRU may perform a prioritization function (e.g. power scaling) across transmissions associated to the concerned MAC entity only.

The WTRU may be configured with a maximum power per serving cell $P_{CMAX,c}(i)$ in subframe i for the purpose of determining the power of transmission(s) for serving cell c, before scaling. In some approaches, the WTRU may also be configured with a maximum power per MAC instance, $P_{CMAXM,m}(i)$, which may be used in the determination of the final transmission powers (after scaling). In some solutions, the WTRU may also be configured to use a guaranteed available power per MAC instance $P^g_m(i)$. The above parameters may also be used for the calculation of power headrooms or of additional types of power headroom.

In some approaches, one or more of the above power limits, or guaranteed available power, for a first MAC instance, or cells of a first MAC instance, may be reduced in a subframe when the WTRU determines that all bearers associated to this first MAC instance meet or exceed a set of at least one QoS criteria, while at least one bearer associated to a second MAC instance do not meet at least one QoS criterion. Such adjustment may prevent, for instance, a scenario where starvation of bearers of a lower-priority MAC instance occurs while bearers exceed their QoS in a higher-priority MAC instance.

The amount of reduction may be configured by higher layers. For instance, higher layers may configure an adjustment of 1 dB or 3 dB to apply to either or all of the $P_{CMAX,c}(i)$ of each serving cell c and $P_{CMAXM,m}(i)$ or $P^g_m(i)$ of the MAC instance to which the reduction applies.

In an example approach, the determination of whether a reduction should apply or not may be performed periodically (e.g. once per RTT, one per integer multiple of a radio frame), possibly as frequently as on a subframe basis. The reduction may remain in force until the next determination. In another approach extending the previous one, the reduction may apply only in a subframe during which the WTRU performs at least one transmission for each concerned MAC entity and/or power scaling is required. In another approach, such determination may be applicable and/or performed only for a period (or for a subframe) for which the WTRU is performing at least one uplink transmission and possibly, only if there is at least one such transmission for each concerned MAC entity.

In one approach, the reduction may be applied to a first MAC instance if all of the bearers of this MAC instance are "satisfied", while at least one bearer of a second MAC instance is "not satisfied".

A number of criteria may be used for determining if a bearer is satisfied or not, including at least one of:

For a logical channel with finite prioritized bit rate, the bearer may be satisfied if the bucket size of the corresponding logical channel does not exceed a threshold, in a reference subframe. The threshold may be, for instance, the product of the prioritized bit rate and of the bucket size duration.

For a logical channel with infinite prioritized bit rate, the bearer may be satisfied if there is no data available for transmission, in a reference subframe. Possibly, this may also be applicable for a logical channel with finite prioritized bit rate.

The reference subframe may be the subframe for which a power limit reduction would apply, or possibly a previous subframe (e.g. 1 subframe earlier).

In another approach, the reduction may be applied to a first MAC instance if the logical channel prioritization procedure for this MAC instance reaches the "satisfaction point" in a reference subframe, while the logical channel prioritization procedure does not reach the "satisfaction point" in a second MAC instance in the reference subframe. The logical channel prioritization procedure is said to reach the "satisfaction point" if it reaches the point where all variables Bj are non-positive (i.e. equal or less than zero) in the reference subframe. Possibly, the satisfaction pint is also reached if resources are still remaining in at least one transport block in the reference subframe.

In another approach, the reduction may be applied to a first MAC entity as a function of the state of the HARQ processes. For example, a WTRU may be configured with a HARQ operating point value. If the WTRU determines that it operates below such HARQ operating point for a MAC entity, it may apply the power limit reduction for the concerned MAC entity. The WTRU may determine its HARQ operating state using e.g. a moving average of the number of transmissions for each processes associated to the concerned MAC entity. In one approach, the WTRU may consider all such HARQ processes. In another approach, the WTRU may consider only ongoing HARQ processes e.g. HARQ processes for which the last received feedback is NACK.

In another approach, the reduction may be applied to a first MAC entity as a function of the rate of new HARQ processes e.g. at the rate at which it determines that NDI has been toggled for a given HARQ process. For example, a WTRU may be configured with a new transmission rate (NTR) value. If the WTRU determines that it operates above such NTR value for a MAC entity, it may apply the power limit reduction for the concerned MAC entity (e.g. to implicitly force fairness to a too greedy scheduler). The WTRU may determine its NTR value using e.g. a moving average of the number of HARQ processes for which it has considered the NDI bits to have been toggled for processes associated to the concerned MAC entity. The corresponding period may be set to RTT (i.e. 8 ms for LTE)*the maximum number of HARQ transmissions.

One approach for realizing a prioritization function is by performing scaling of transmission power. The following discussion describes approaches for determining the transmission powers of different types of transmissions for a WTRU operating in dual connectivity, taking into account for instance the following aspects:

The possibility of simultaneous transmission of PUCCH or UCI in multiple serving cells (for multiple MAC instances);

The possibility of a multiplicity of priority levels between transmissions, as well as sub-priority levels;

The possibility of multiple limits for the total power over subsets of transmissions; and The possibility of non-alignment between subframe boundaries of different subset of transmissions, or different MAC instances.

In a subframe i, a WTRU may be configured with a maximum power per serving cell $P_{CMAX,c}(i)$, and a total configured maximum output power $P_{CMAX}(i)$.

In addition, the WTRU may be configured with a maximum output power per MAC entity (or per layer or per eNB), $P_{CMAXM,m}(i)$. In this case, the sum of the powers of all transmissions pertaining to this MAC entity cannot exceed $P_{CMAXM,m}(i)$ in subframe i. In a dual connectivity system, m can take the values 0 or 1. Without loss of generality, m=0 may refer to a Primary MAC instance and m=1 may refer to a Secondary MAC instance. In some solutions, the maximum output power per MAC entity may correspond to a Prioritized Power Rate (PPR) for this MAC entity.

The WTRU may perform one or more transmissions in a subframe for one or more physical channels (e.g. PUCCH, PUSCH, PRACH) or signal (SRS) pertaining to one or more MAC instances. For each type of transmission t, the WTRU may first calculate a transmission power in subframe i, $P_t(i)$, that does not take into account any power limitation over multiple transmissions such as $P_{CMAX}(i)$ or $P_{CMAXM,m}(i)$. Such transmission power value is referred to as the "pre-scaled" power in the following. The calculation of the pre-scaled power $P_t(i)$ for a transmission t may be performed based on a path loss reference, closed-loop adjustments, grants or other parameters associated to the MAC instance controlling t, according to existing rules specific to the type of transmission (PUCCH, PUSCH, SRS, PRACH).

In some solutions, some or all pre-scaled powers $P_t(i)$ may have been obtained as the output of a previous scaling procedure. For instance, for at least one MAC instance m, the subset of transmissions $P_t(i)$ pertaining to MAC instance m may itself have been calculated from an earlier step of scaling within this subset of transmissions and using $P_{CMAXM,m}(i)$, or some other value as maximum power. More generally, the pre-scaled power $P_t(i)$ in the scaling procedure set forth in the following may correspond to an amount of desired power, (or, in certain solutions, an amount of desired portion of power), for a transmission t, where a limitation exists for the total desired power or total desired portion of power over transmissions.

For various approaches described herein, it should be understood that even though the transmission powers calculations are shown on a subframe basis, the WTRU may determine different transmission powers between two slots of the same subframe or between the last SC-FDMA symbol and other SC-FDMA symbols, based for instance on possible variations of the maximum power per serving cell $P_{CMAX,c}(i)$ within a subframe, or based on a different power requirement in the last symbol due to transmission of SRS. In other words, the calculations shown below may be applied by portions of subframes, e.g. on a per-slot basis, or separately between the last SC-FDMA symbol containing SRS and the earlier SC-FDMA symbols.

Scaling with single maximum total level and multiple priority levels (single scaling): Where the WTRU operates in dual connectivity, a transmission t may be associated to a priority level q for at least the purpose of scaling. There may be one, two or more priority levels Q. There may be zero, one or more transmissions t associated to a certain priority level q. The priority level (or order) may be obtained using any of the approaches described in earlier sections, such as dynamic methods or semi-static methods.

The sum of pre-scaled transmission powers for a set of transmissions T may exceed a maximum total $P_{MAX}(i)$ applicable to this set of transmissions in subframe i. For instance, the set of transmissions T may correspond to all transmissions in subframe (i), or all transmissions for a subset of physical channels (e.g. PUCCH and PUSCH transmissions only) in which case the maximum total $P_{MAX}(i)$ may correspond to $P_{CMAX}(i)$. In another example, the set of transmissions T may correspond to all transmissions pertaining to a specific MAC instance, in which case the maximum total $P_{MAX}(i)$ may correspond to $P_{CMAXM,m}(i)$. When this occurs, the final transmission power $P'_t(i)$ of at least one transmission t may be scaled down by a factor $w_t(i)$ ranging from 0 to 1, such that $P'_t(i)=w_t(i) P_t(i)$ in linear units. In the description of solutions involving scaling, the WTRU may be said to be performing a scaling procedure over a set of pre-scaled powers using a maximum total power level, and the outcome (or output) of this procedure is a set of final transmission powers. In the following paragraphs describing how a scaling procedure may be performed, the set of pre-scaled powers is denoted as $P_t(i)$ and the set of final transmission powers is denoted as $P'_t(i)$, but other notations may be used in the description of solutions involving multiple applications of a scaling procedure.

In an example approach, scaling may be applied such that the scaling factor is as high as possible for higher priority transmissions. When the scaling factor is less than 1 for a transmission of priority q, any transmission of lower priority (e.g. any transmission with q'>q, where a larger value of q means lower priority) is scaled down to zero, i.e. no transmission takes place for the lower priority transmissions. In addition, no scaling is allowed to take place for any transmission of higher priority, i.e. the scaling factor is 1 for any transmission with q'<q.

With this approach, the procedure to determine the scaling factors for each transmission may be as follows. Start with the set of transmissions $T_0$ associated to the highest priority level q=0 and determine if the sum of pre-scaled transmission powers exceeds the maximum, i.e.:

$$\Sigma_{t \in T_0} P_t(i) > P_{MAX}(i) \qquad \text{Equation (3)}$$

In case the sum exceeds the maximum, the scaling factors may be set according to the following:

$$w_t(i)=0 \forall t \in T_q, q>0 \qquad \text{Equation (4)}$$

$$\Sigma_{t \in T_0} w_t(i) P_t(i) = P_{MAX}(i) \qquad \text{Equation (5)}$$

In case the sum does not exceed the maximum, the scaling factors for the highest priority transmissions $T_0$ may be set to 1 (i.e., no scaling is applied) and scaling may be applied to transmissions of lower priority. This can be determined in the following way for transmissions of priority level(s) q>0:

Determine if scaling is to be applied to transmissions of priority q by summing the powers of all transmissions of equal or higher priority and comparing to the maximum:

$$\Sigma_{t \in T_{q'}, q' \leq q} < P_t(i) > P_{MAX}(i) \qquad \text{Equation (6)}$$

In case the condition is satisfied, apply scaling to transmissions of priority q (and all lower priority transmissions) by setting scaling factors in the following way (and the procedure ends):

$$w_t(i)=0 \forall t \in T_{q'}, q'>q \qquad \text{Equation (7)}$$

$$\Sigma_{t \in T_q} w_t(i) P_t(i) = P_{MAX}^q(i) \qquad \text{Equation (8)}$$

Where $P_{MAX}^q(i)$ is defined as the available total power of transmissions of priority q:

$$P_{MAX}^q(i) = P_{MAX}(i) - \Sigma_{t \in T_{q'}, q' q} P_t(i) \quad \text{Equation (9)}$$

In case the condition is not satisfied, set $w_t(i)=1$ for all transmissions t of priority q, and go back to step (a) for transmissions of priority q+1. If no such transmission exists then no scaling needs to be applied.

In the above, where scaling is to be applied on more than one transmission of the same priority multiple approaches are possible for the setting of scaling of individual transmissions, as described in the following.

In one approach, the same scaling value is applied to all transmissions of the same priority. This means that:

$$w_t(i) = w_q(i) \forall t \in T_q \quad \text{Equation (10)}$$

This implies that the value of $w_t(i)$ is set according to:

$$w_t(i) = w_q(i) = \frac{P_{MAX}^q(i)}{\Sigma_{t \in T_q} P_t(i)}, \forall t \in T_q \quad \text{Equation (11)}$$

Figure 14:
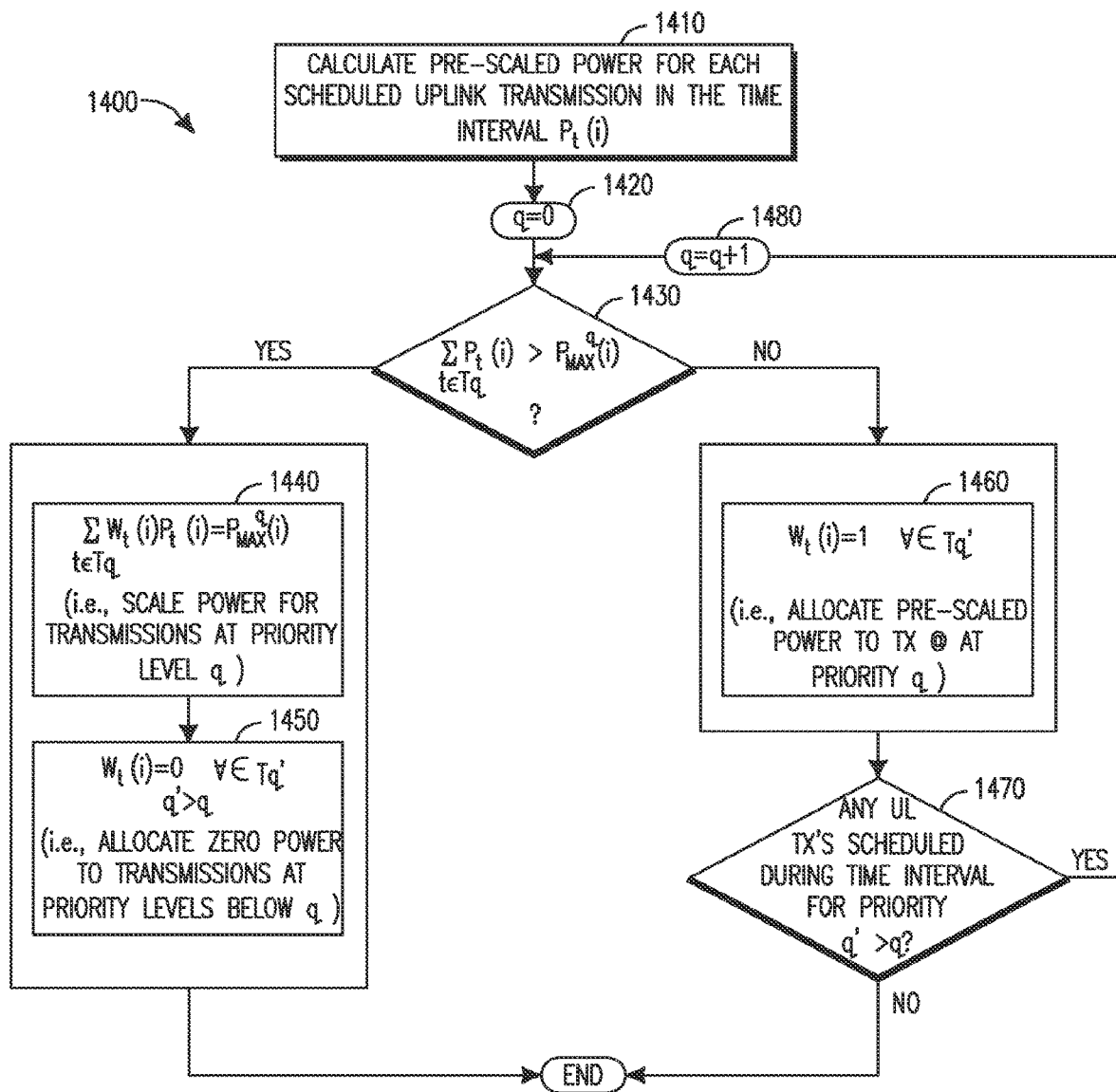
FIG. 14 is a flowchart illustrating another example of power scaling for uplink transmissions.

FIG. 14 is a flowchart 1400 illustrating an example of power scaling. In step 1410, the WTRU may first calculate a pre-scaled power for each uplink transmission scheduled in the time interval (Pt(i)). In step 1420, a priority level q under consideration is set to zero, which in this example represents the greatest priority level. It is noted that the numbering of the priority levels is illustrative, and any other suitable representation of priority levels may be used.

In step 1430, the WTRU may determine whether the sum of prescaled power for all uplink transmissions of priority q scheduled in the time interval is greater than the maximum amount of power available for all uplink transmissions at that priority level. For instance, at q=0, the greatest priority level, the maximum amount of power available is the total maximum amount of power available for all uplink transmissions, while at a lesser priority level (i.e. q>0) the maximum amount of power available is the total maximum amount of power available for all uplink transmissions less the amount of power already allocated to transmissions having greater priority.

If the WTRU determines in step 1430 that the sum of prescaled power for all uplink transmissions of priority q scheduled in the time interval is greater than the maximum amount of power available at that priority level, the power for each transmission at priority q is scaled in step 1440. Here, each transmission at priority q may be scaled (e.g. using a weighting factor $w_t(i)$) such that the total scaled power required for all transmissions at priority q is equal to the maximum amount of power available for all uplink transmissions at priority q. In step 1450, zero power is allocated to transmissions (e.g. by setting the corresponding weighting factor to zero) at priority levels q'>q (i.e. lower in importance than q), and the procedure ends.

If on the other hand the WTRU determines in step 1430 that the sum of prescaled power for all uplink transmissions of priority q which are scheduled in the time interval is less than the maximum amount of power available for uplink transmissions at that priority level, the full pre-scaled power may be allocated to each uplink transmission at priority q in step 1460. For example, a weighting factor of 1 may be applied to the pre-scaled power of each transmission at priority q.

In step 1470 the WTRU may determine whether any uplink transmissions of priority level q'>q are scheduled for the time interval (i.e. whether any transmissions are scheduled for uplink during the time interval having lesser priority than q). If not, the procedure ends. If so, the value of q may be incremented in step 1480 and the procedure returns to step 1430 in order to consider the next priority level.

It is noted that in some implementations, the uplink transmissions may be considered as corresponding to different MAC entities, or transmitted to different eNBs rather than as performed using the uplink resources of different CGs.

In another approach, the scaling values within transmissions associated to a priority level q may be determined according to a sub-priority level $S_q$. In this case, the scaling values of transmissions of priority q may be set to different values depending on their sub-priority levels. The procedure for determining the set of scaling values for transmissions of priority q may be similar to the above procedure, but with the maximum total power set to $P_{MAX}^q(i)$ instead of $P_{MAX}(i)$ and the sub-priority levels $S_q$ used in place of priority levels q.

In some approaches, some types of transmissions may be either transmitted at their pre-scaled power or not transmitted at all, i.e. dropped. This may be the case, for instance, for transmissions such as SRS or transmissions including HARQ A/N for which a transmission at a scaled power could potentially result in worse performance than dropping the transmission, or for transmissions for which the required scaling weight $w_t(i)$ is so low that successful reception is determined to be very unlikely. Such transmissions may be referred to as "non-scalable" transmissions. The scaling procedure in such solutions may be generally the same as previously described, with the following modification. Where it is determined that scaling (with $w_t(i)$ less than 1) would need to be applied to a non-scalable transmission, the scaling procedure may be stopped and a new scaling procedure may be initiated with a set of transmissions not including this non-scalable transmission. This may be done multiple times until there are no remaining non-scalable transmissions on which scaling would need to be applied. Alternatively, instead of stopping the scaling procedure, the scaling factor of the non-scalable transmission may be set to 0 and the remaining available power of other transmissions of equal or lower priority may be re-calculated for the purpose of determining scaling factors of these other transmissions.

In some solutions, the scaling weights may be determined to be such that the sum of scaled transmission powers over transmission of a given priority level is less than the maximum available, i.e.:

$$\Sigma_{t \in T_q} w_t(i) P_t(i) < P_{MAX}^q(i) \quad \text{Equation (12)}$$

Setting weights satisfying the above condition may be referred to as "power under-allocation" at priority level q in the following. Power under-allocation at a priority level q may be performed, for instance, when there is at least one transmission to that is "non-scalable" as described in the above, at least if the scaling weights would be set to identical non-zero values for all transmissions of this priority level, i.e. to:

$$\frac{P_{MAX}^q(i)}{\Sigma_{t \in T_q} P_t(i)} \quad \text{Equation (13)}$$

Such transmission to may be dropped (i.e. scaling weight set to 0) and the scaling weights for remaining transmissions may be set to:

$$w_t(i) = w_q(i) = \min\left(\frac{P_{MAX}{}^q(i)}{\sum_{t \in T_q, t \neq t_0} P_t(i)}, 1\right), \forall t \in T_q, t \neq t_0 \quad \text{Equation (14)}$$

When $w_t(i)=1$ for all transmissions other than $t_0$, the power reallocated from $t_0$ to other transmissions may be sufficient to prevent scaling for these transmissions, such that power under-allocation may occur.

In some solutions, power under-allocation at a priority level q may be performed such that the unused power:

$$P_{MAX}{}^q(i) - \Sigma_{t \in T_q} w_t(i) P_t(i) \quad \text{Equation (15)}$$

is minimized. Alternatively, power under-allocation may be performed such that the number of transmissions for which the scaling weight is zero (dropped) is minimized. Alternatively, power under-allocation may be performed such that for a transmission scaled down to zero, not scaling down this transmission to zero would not result in power under-allocation.

In some solutions, power under-allocation at a priority level q may be performed only in case there is no transmission of lower priority. In some of such solutions, when at least one transmission is of lower priority in subframe i, all transmissions of priority level q may be considered scalable.

In some solutions, power under-allocation at a priority level q may be allowed even if there is at least one transmission of lower priority. However in some such solutions, when power under-allocation occurs for a priority level q, no power may be allocated or re-allocated to any transmission of lower priority, even if power would be available for these transmissions due to under-allocation at priority level q. For example, if priority level q corresponds to PUSCH transmissions without UCI for MCG, and scaling would need to be applied to transmissions of priority level q, no power would be allocated to transmissions of lower priority such as PUSCH transmissions without UCI for SCG (possibly aside from any power reserved or guaranteed to SCG transmissions that may still be available). Expressed differently, in some such solutions no remaining power would be allocated to PUSCH transmissions without UCI for SCG.

In some solutions, where power under-allocation occurs for a priority level q, the unused power:

$$P_{MAX}{}^q(i) - \Sigma_{t \in T_q} w_t(i) P_t(i) \quad \text{Equation (16)}$$

may be re-allocated to transmissions of a lower priority (q'>q). Such re-allocation may be unconditional. Alternatively, whether re-allocation is performed or not may depend on at least one of the following conditions:

a) The MAC instance or cell group to which the transmissions of lower priority (q') and/or higher priority (q) are associated. For instance, reallocation may be performed if transmissions of lower priority are associated to a cell group different than the one for transmissions of higher priority. Alternatively, re-allocation may be performed if transmissions of lower priority are associated to the same cell group. In another example, reallocation may be permitted if transmissions of lower priority are associated to the MCG.

b) At least one criterion determining the priority level of q or q', or the relative priority of priority levels q and q'. For instance, re-allocation may occur only if transmissions associated to q and q' are of the same UCI type, and/or differ only with respect to the cell group (MCG versus SCG). For instance, reallocation may be performed from a transmission of the MCG containing HARQ A/N to a transmission of the SCG containing HARQ A/N.

c) The type of transmission of lower priority (q') and/or higher priority (q). For instance, reallocation may be performed from a PRACH transmission to another type of transmission. In another example, re-allocation may not be performed from a PUCCH transmission (i.e. from a priority level q, if the scaled down transmission is PUCCH) to another transmission.

Scaling based on power sharing between MAC instances (multiple scaling): In some approaches, transmissions taking place in a subframe i may be subject to more than one limitation. For instance, the sum of the powers of all transmissions associated to a MAC instance (or cell group) m may be configured to be limited to a value $P_{CMAXM,m}(i)$, for each MAC instance. At the same time, the sum of the powers of all transmissions (over all MAC instances) may also be configured to be limited to a value $P_{CMAX}(i)$. In some solutions, the configured maximum power $P_{CMAXM,m}(i)$ for MAC instance m may be equal to $P_{CMAX}(i)$, possibly by default. The maximum power $P_{CMAXM,m}(i)$ of one MAC instance m may be equivalent to the difference between $P_{CMAX}(i)$ and a guaranteed power $P^g{}_{m'}(i)$ configured for the other MAC instance m', for example, when the power requirement of the other MAC instance is not known.

Determination of configured maximum powers in case of limitation per MAC instance: In solutions where a configured maximum power $P_{CMAXM,m}$ is defined for each MAC instance (or cell group), the applicable lower and upper bounds of this quantity, and well as the lower and upper bounds of the total configured maximum output power $P_{CMAX}$ and of the configured maximum output power $P_{CMAX,c}$ for a serving cell c, may be dependent on an assigned maximum power $P_{eNB,m}$ determined for each MAC instance (or cell group) m. The determination of the assigned maximum power $P_{eNB,m}$ may be performed according to solutions described herein. In addition, the assigned maximum power $P_{eNB,m}$ may correspond to the maximum power from the WTRU power class PPowerClass (and formulas may be simplified accordingly) at least in the following cases: In a case where no parameters are provided or defined to determine assigned maximum powers PeNB,m; in a case where transmissions from at most one MAC instance or cell group are on-going in a given subframe (i.e. the WTRU transmits to a single eNB), i.e. no overlap exists between transmissions of different cell groups; or in a case where the WTRU is configured to transmit over a single cell group (or configured with a single MAC instance), e.g. following a reconfiguration procedure (RRC signaling) or following MAC signaling.

In the following the notation $P_{eNB,m}$ refers to the assigned maximum power in logarithmic units (e.g. dBm) while $p_{eNB,m}$ refers to the assigned maximum power in linear units.

Configured maximum power per MAC instance (cell group) $P_{CMAXM,m}$: In some solutions, the configured maximum power $P_{CMAXM,m}$ applicable to a MAC instance (or cell group) may be bounded by a lower bound $P_{CMAXM\_L,m}$ and an upper bound $P_{CMAXM\_H,m}$, such that:

$$P_{CMAXM\_L,m} \leq P_{CMAXM,m} \leq P_{CMAXM\_H,m} \quad \text{Equation (17)}$$

The upper bound $P_{CMAXM\_H,m}$ may be set as the minimum value between a maximum WTRU power $P_{PowerClass}$, the sum of linear powers $p_{EMAX,c}$ over all serving cells c belonging to MAC instance (or cell group) m, and the assigned maximum power $P_{eNB,m}$, where each term is converted to logarithmic (dB) units. The power $p_{EMAX,c}$ corresponds to the linear value of $P_{EMAX,c}$ which is provided by higher layers for serving cell c.

$$P_{CMAXM\_H,m} = \text{MIN}\{10 \log_{10} \Sigma p_{EMAX,c}, P_{PowerClass}, P_{eNB,m}\} \quad \text{Equation (18)}$$

In the above, the sum may be over serving cells c belonging to cell group m only.

The lower bound may be set according to the following:

$$P_{CMAXM\_L,m} = \text{MIN}\{10 \log_{10}(P_{eNB,m}) - \Delta T_C, 10 \log_{10} \Sigma p_{EMAX,c} - \Delta T_C, P_{PowerClass} - \text{MAX}(MPR + A - MPR + \Delta T_{IB,c} + \Delta T_C, P-MPR)\} \quad \text{Equation (19)}$$

In the above, the sum may be over serving cells c belonging to cell group m only. The parameters $\Delta T_{IB,c}$ and $\Delta T_C$ may correspond to tolerance values that depend on the specific combination of frequency bands configured, P-MPR may correspond to a power management term, MPR and A-MPR may correspond to allowed maximum power reduction and additional maximum power reduction, respectively, where the allowances may be due to higher order modulation and contiguously aggregated transmit bandwidth configuration, as well as possible additional RF requirements.

The configured maximum power per MAC instance (or cell group) for a given MAC instance m may be reported to the network using MAC or higher layer signaling, for instance as part of a power headroom report. The value for both MAC instances may be included in any power headroom report transmitted to any eNB (or from any MAC instance). Alternatively, the value for a given MAC instance may be included in any report that contains power headroom information for at least one serving cell belonging to this MAC instance.

Configured maximum power per cell $P_{CMAX,c}$: In some solutions, the configured maximum power $P_{CMAX,c}$ applicable to a serving cell may be bounded by a lower bound $P_{CMAX\_L,c}$ and an upper bound $P_{CMAX\_H,c}$, such that:

$$P_{CMAX\_L,c} \leq P_{CMAX,c} \leq P_{CMAX\_H,c} \quad \text{Equation (20)}$$

The upper bound $P_{CMAX\_H,c}$ may be set as the minimum value between a maximum WTRU power $P_{PowerClass}$, the assigned maximum power $P_{eNB,m}$ for the MAC instance (or cell group) m to which serving cell c belongs, and a parameter $P_{EMAX,c}$ which is provided by higher layers for serving cell c.

$$P_{CMAX\_H,c} = \text{MIN}\{P_{eNB,m}, P_{EMAX,c}, P_{Powerclass}\} \quad \text{Equation (21)}$$

The lower bound $P_{CMAX\_L,c}$ may be set according to the following:

$$P_{CMAX\_L,c} = \text{MIN}\{\text{MIN}(P_{EMAX,c}, P_{eNB,m}) - \Delta T_{C,c}, P_{PowerClass} - \text{MAX}(MPR_c + A-MPR_c + \Delta T_{IB,c} + \Delta T_C, P-MPR_c)\} \quad \text{Equation (22)}$$

In the above, the parameters $\Delta T_{IB,c}$ and $\Delta T_{C,c}$ may correspond to tolerance values that depend on the specific combination of frequency bands configured and the specific frequency band of the cell group to which serving cell c belongs, P-MPR$_c$ may correspond to a power management term for serving cell c, MPR$_c$ and A-MPR$_c$ may correspond to allowed maximum power reduction and additional maximum power reduction, respectively, for serving cell c, where the allowances may be due to higher order modulation and transmit bandwidth configuration, as well as possible additional RF requirements.

Total configured maximum output power $P_{CMAX}$: In some solutions, the total configured maximum output power may be bounded by a lower bound $P_{CMAX\_L}$ and an upper bound $P_{CMAX\_H}$, such that:

$$P_{CMAX\_L} \leq P_{CMAX} \leq P_{CMAX\_H} \quad \text{Equation (23)}$$

The upper bound $P_{CMAX\_H}$ may be set as the minimum value between a maximum WTRU power $P_{PowerClass}$, the sum of powers $p_{EMAX,c}$ over all serving cells c (of all cell groups), and the sum of linear values of the assigned maximum power $p_{eNB,m}$ over all cell groups m, where each term is converted to logarithmic (dB) units. The power $p_{EMAX,c}$ corresponds to the linear value of $P_{EMAX,c}$ which is provided by higher layers for serving cell c.

$$P_{CMAX\_H} = \text{MIN}\{10 \log_{10} \Sigma p_{EMAX,c}, P_{PowerClass}, 10 \log_{10} \Sigma p_{eNB,m}\} \quad \text{Equation (24)}$$

The lower bound $P_{CMAX\_L}$ may be set according to the following:

$$P_{CMAX\_L} = \text{MIN}\{10 \log_{10} \Sigma \text{ MIN}[p_{EMAX,c}/(\Delta t_{C,c}), p_{PowerClass}/(mpr_c \cdot a\text{-}mpr_c \cdot \Delta t_{C,c} \cdot \Delta t_{IB,c}), p_{PowerClass}/(pmpr_c \cdot \Delta t_{C,c})], \text{MIN}(P_{PowerClass}, 10 \log_{10} \Sigma p_{eNB,m})\} \quad \text{Equation (25)}$$

In the above, the first sum is over all serving cells c (of all cell groups), and the second sum is over all cell groups m. The parameters $\Delta t_{IB,c}$ and $\Delta t_{C,c}$ may correspond to the linear values of tolerances that depend on the specific combination of frequency bands configured and the specific frequency band of the cell group to which serving cell c belongs, pmpr$_c$ may correspond to the linear value of a power management term for serving cell c, mpr$_c$ and a-mpr$_c$ may correspond to the linear values of an allowed maximum power reduction and an additional maximum power reduction, respectively, for serving cell c, where the allowances may be due to higher order modulation and transmit bandwidth configuration, as well as possible additional RF requirements.

Alternatively, the lower and upper bounds $P_{CMAX\_L}$ and $P_{CMAX\_H}$ may be derived using the following formulas:

$$P_{CMAX\_L} = \text{MIN}\{P_{PowerClass}, \Sigma P_{CMAXM\_L,m}\} \quad \text{Equation (26)}$$

$$P_{CMAX\_H} = \text{MIN}\{P_{PowerClass}, \Sigma P_{CMAXM\_H,m}\} \quad \text{Equation (27)}$$

Power sharing—general case: In some approaches, the WTRU first determines an adjusted maximum total power, (or assigned total power), $P'_{CMAXM,m}(i)$ for each MAC instance. The adjusted maximum total power $P'_{CMAXM,m}(i)$ may correspond to a value lower than the non-adjusted maximum $P_{CMAXM,m}(i)$ if scaling needs to be performed because of the maximum over all transmissions $P_{CMAX}(i)$. Once the adjusted maximum total power $P'_{CMAXM,m}(i)$ is determined for each MAC instance, the WTRU may determine the transmission power of all transmissions associated to a MAC instance m by applying the scaling procedure over these transmissions for a single maximum total power level of $P'_{CMAXM,m}(i)$. In case an adjusted maximum power per MAC instance is not defined, the scaling procedure may be applied directly using the non-adjusted maximum $P_{CMAXM,m}(i)$ The determination of the adjusted maximum total power for each MAC instance may be performed using the following procedure. In a first step, the following sum of powers is calculated for each MAC instance:

$$p_m^{tot}(i) = \min(\Sigma_{t \in M_m} P_t(i), P_{CMAXM,m}(i)) \quad \text{Equation (28)}$$

Where $M_m$ refers to the set of transmissions associated to the MAC instance m. In some approaches, there may not be a hard limit on the sum of transmissions of a MAC instance $P_{CMAXM,m}(i)$. In this case, the above formula would simplify to:

$$p_m^{tot}(i) = \Sigma_{t \in M_m} P_t(i) \quad \text{Equation (29)}$$

The sum over MAC instances $P^{tot}(i)$ is then calculated as:

$$p^{tot}(i) = \Sigma_m P_m^{tot}(i) \quad \text{Equation (30)}$$

In case the sum over MAC instances $P^{tot}(i)$ is smaller than or equal to $P_{CMAX}(i)$, the adjusted maximum total power for each MAC instance, $P'_{CMAXM,m}(i)$, is set to $P^{tot}_m(i)$. Otherwise, the set of adjusted maximum total powers $P'_{CMAXM,m}(i)$ may be determined based on the set of $P^{tot}_m(i)$ using one of different possible approaches.

Power sharing between MAC instances based on equal scaling: In one approach, the adjusted maximum total powers are determined by applying the same scaling factor $w_{MAC}(i)$ to each MAC instance, such that the maximum $P_{CMAX}(i)$ is not exceeded:

$$w^{MAC}(i) = \frac{P_{CMAX}(i)}{P^{tot}(i)} \quad \text{Equation (31)}$$

$$P'_{CMAXM,m}(i) = w^{MAC}(i) P^{tot}_m(i) \quad \text{Equation (32)}$$

Power sharing between MAC instances based on absolute priority: In another approach, the adjusted maximum total powers of each MAC instance are determined based on a priority level (or order) r associated to each MAC instance, such that any necessary adjustment is preferably applied to the lower priority MAC instance(s). In the case of 2 MAC instances, without loss of generality MAC instance m=0 may have higher priority than MAC instance m=1. In this case the adjusted maximum total power of each MAC instance may be determined such that the total power assigned to the higher priority MAC instance is the sum of powers $P^{tot}_0(i)$, but not exceeding $P_{cmax}(i)$, while any remaining power may be assigned to the lower priority MAC instance, as follows:

$$P'_{CMAXM,0}(i) = \min(P_{CMAX}(i), P_0^{tot}(i)) \quad \text{Equation (33)}$$

$$P'_{CMAXM,1}(i) = P_{CMAX}(i) - P'_{CMAXM,0}(i) \quad \text{Equation (34)}$$

Power sharing between MAC instances based on unequal scaling factors: In another approach, the scaling factors that are applied to each MAC instance $W^{MAC}_m(i)$ to ensure that the total configured power $P_{CMAX}(i)$ is not exceeded, may be unequal according to a configured ratio. The ratio may be pre-determined or provided by higher layers. For instance, the value of the scaling factor applied to a primary MAC instance may be K times the value of the scaling factor applied to a secondary MAC instance:

$$w_0^{MAC}(i) = K w_1^{MAC}(i) \quad \text{Equation (35)}$$

$$P'_{CMAXM,m}(i) = w_m^{MAC}(i) P_m^{tot}(i) \quad \text{Equation (36)}$$

Thus, $$w_0^{MAC}(i) = \frac{K P_{CMAX}(i)}{K P_0^{tot}(i) + P_1^{tot}(i)} \quad \text{Equation (37)}$$

$$w_1^{MAC}(i) = \frac{P_{CMAX}(i)}{K P_0^{tot}(i) + P_1^{tot}(i)} \quad \text{Equation (38)}$$

Power sharing between MAC instances based on guaranteed available power: The scaling factors $w^{MAC}_m(i)$ may also be set to ensure that the adjusted maximum power per MAC instance m cannot be scaled down to a value less than a guaranteed available power $P^g_m(i)$. Expressed differently, in case the total maximum power over transmissions of all MAC instances would exceed $P_{cmax}(i)$, scaling may be applied to the adjusted maximum power of one or more MAC instances, such that the total transmission power per MAC instance on which scaling is applied is not less than a guaranteed available power $P^g_m(i)$.

In such a case, the scaling factor can be calculated as follows:

$$w_m^{MAC}(i) = \frac{1}{P_m^{tot}(i)} \quad \text{Equation (39)}$$

$$\max\left[P_m^g(i),\; P_{CMAX}(i) - \sum_{m' \neq m} P_{m'}^{tot}(i)\right] \text{ if } P_m^{tot}(i) > P_m^g(i)$$

where the above scaling may only be applied if the total power over MAC instances $P^{tot}(i)$ exceeds $P_{cmax}(i)$. In the case of two MAC instances, the above expression simplifies to:

$$w_0^{MAC}(i) = \quad \text{Equation (40)}$$
$$\frac{1}{P_0^{tot}(i)} \max[P_0^g(i),\; P_{CMAX}(i) - P_1^{tot}(i)] \text{ if } P_0^{tot}(i) > P_0^g(i)]$$

$$w_1^{MAC}(i) = \quad \text{Equation (41)}$$
$$\frac{1}{P_1^{tot}(i)} \max[P_1^g(i),\; P_{CMAX}(i) - P_0^{tot}(i)] \text{ if } P_1^{tot}(i) > P_1^g(i)]$$

The above means that the adjusted maximum power per MAC instance would be set according to:

$$P'_{CMAXM,0}(i) = w_0^{MAC}(i) P_0^{tot}(i) = \max[P_0^g(i), P_{CMAX}(i) - P_1^{tot}(i)] \text{ if } P_0^{tot}(i) > P_0^g(i) \quad \text{Equation (42)}$$

$$P'_{CMAXM,1}(i) = w_1^{MAC}(i) P_1^{tot}(i) = \max[P_1^g(i), P_{CMAX}(i) - P_0^{tot}(i)] \text{ if } P_1^{tot}(i) > P_1^g(i) \quad \text{Equation (42)}$$

In the case of two MAC instances (e.g. corresponding to MeNB and SeNB), the guaranteed available power of one MAC instance (say MeNB) may be derived from the guaranteed available power of the other MAC instance (say MeNB). For instance, the guaranteed available power for SeNB may be determined as the difference between $P_{CMAX}(i)$. and the guaranteed available power for MeNB (in linear units), such that the sum of guaranteed available powers corresponds to the total configured maximum output power $P_{CMAX}(i)$.

In some approaches, the guaranteed available power for a certain MAC instance may be defined to be zero. For example, the guaranteed available power for a MAC instance corresponding to SeNB may be determined to be zero.

In some approaches, the WTRU may ensure that at least the guaranteed available power is available to a first MAC instance at any given time and may allocate remaining power, if any, as a function of its capability to consider transmissions of a second MAC instance that occurs later in time for the unsynchronized mode of operation. For example, in case the WTRU is capable of considering power allocated to overlapping transmissions of a second MAC instance that would start later in time, the WTRU may allocate additional power to a first MAC instance up to the difference between the maximum transmit power available to the WTRU and the power required by the second MAC instance. For example, in case the WTRU is not capable of considering power allocated to transmissions of a second MAC instance that would start later in time, the WTRU may allocate power to a first MAC instance up to the difference between the maximum transmit power available to the WTRU and the guaranteed available power of the second MAC instance. Alternatively, in case the WTRU is not capable of considering power allocated to transmissions of a second MAC instance that would start later in time, the WTRU may allocate power to a first MAC instance up to the difference between the maximum transmit power available to the WTRU and the power allocated for transmissions of the second MAC instance at the time the WTRU starts transmission for the first MAC instance.

Figure 15:
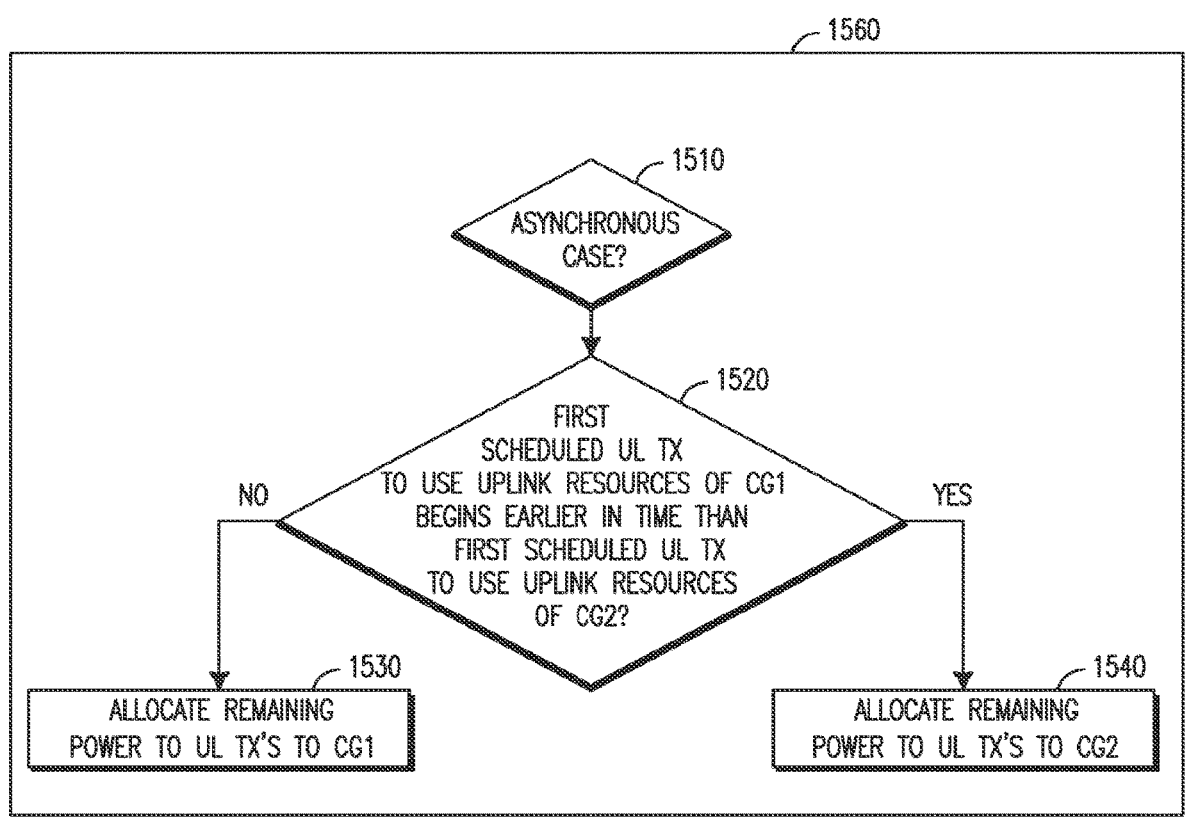
FIG. 15 is a flowchart illustrating an example allocation of remaining power on a first-in-time basis to a cell group.

FIG. 15 illustrates an example procedure 1560 which may be implemented, for example, for allocation of remaining power as shown and described with respect to step 1260 of FIG. 12. In the example shown in FIG. 15, remaining power is allocated on a first-in-time basis to CG1 or CG2 for the asynchronous case.

Within step 1560, the WTRU may first determine in step 1510 whether uplink transmissions scheduled to be transmitted from the WTRU using the uplink resources of CG1 and to CG2 are asynchronous (as shown and described with respect to FIG. 4 for example). If so, the WTRU may determine in step 1520 whether the first uplink transmission using the uplink resources of CG1 which is scheduled in the time interval begins earlier in time than the first uplink transmission using the resources of CG2 which is scheduled in the time interval. If so, the remaining power is allocated for uplink transmissions using the uplink resources of CG1 in step 1530. If not, the remaining power is allocated for uplink transmissions using the uplink resources of CG2 in step 1540. In some implementations, the allocation in step 1530 and/or step 1540 may be performed using prioritization of the scheduled uplink transmissions according to any of the methods described herein.

In some approaches, the WTRU may be configured with a different set of values for the power levels (either for maximum power, or minimum guaranteed power) for each MAC entity. For example, the WTRU may be configured with a first set, that may contain one value of each MAC entity that corresponds to a minimum guaranteed power and for which the sum of all values corresponds to a value that is less than the total amount of available power for the WTRU, and with a second set for which the sum corresponds to the total amount of available power for the WTRU. In this case, the WTRU may use the first set of values if it is capable of considering the transmissions of both MAC entities when it determines how to allocate power to each transmission in a given subframe while it may use the second set of values otherwise. For example, the network may determine suitable values for both types of behavior such that a WTRU implementation may be given the freedom to determine what power allocation method to use depending on the observed timing between transmissions for both MAC entities.

In some approaches, the WTRU may ensure that at least the guaranteed available power is available to a first MAC instance at any given time and may allocate remaining power, if any, as a function of its capability to perform only reactive power allocation or also proactive power allocation when the WTRU also performs transmissions for a second MAC instance that occur later in time for the unsynchronized mode of operation. For example, in case the WTRU is only capable of reactive power allocation or if the first MAC instance has higher priority, the WTRU may perform reactive power allocation and limit the power available to a second MAC instance to the maximum between the minimum guaranteed power for the second MAC instance and the difference between the maximum transmit power available to the WTRU and the power required for the first MAC instance. For example, in case the WTRU is only capable of reactive power allocation or if the second MAC instance has higher priority, the WTRU may perform reactive power allocation and limit the power available to the first MAC instance to the minimum guaranteed power for the first MAC instance. For example, in case the WTRU is capable of proactive power allocation and if the second MAC instance has higher priority, the WTRU may perform proactive power allocation and limit the power available to a first MAC instance to the maximum between the minimum guaranteed power for the first MAC instance and the difference between the maximum transmit power available to the WTRU and the power required for the second MAC instance.

Approaches used for the determination of the guaranteed available power are further described herein.

Unequal scaling for multiple priority levels: In another approach, all transmissions may be scaled with different scaling values depending on the priority level. To determine the appropriate scaling value, a WTRU may be preconfigured with a scaling ratio to be applied to different transmissions of different priority. The scaling ratio may be provided for each priority level. For example, a transmission of priority q 0 may have a scaling ratio when compared to a transmission of priority q=0, namely $\Delta_q = w_q(i)/w_0(i)$. A WTRU that is expected to have multiple transmissions in a TTI may determine the total required power for all transmissions as $$\Sigma_{t \in T_q} \forall q P_t(i) = \Sigma_q \alpha_q(i) P_{CMAX}(i) \quad \text{Equation (44)}$$

where $\Sigma_{t \in T_q} \forall q P_t(i) = \alpha_q(i) P_{CMAX}(i)$

If the total required power does not exceed $P_{CMAX}(i)$, the WTRU need not scale any transmissions. However, if the total required power exceeds $P_{CMAX}(i)$, the WTRU may perform scaling on all transmissions by using the appropriate scaling ratios. The WTRU may thus solve the following equations to determine the set of scaling factors $w_t(i) = w_q(i)$ $\forall t \in T_q$:

$$\Sigma_q w_q(i) \alpha_q(i) P_{CMAX}(i) = P_{CMAX}(i) \quad \text{Equation (45)}$$

$$w_q(i) = w_0(i) \Delta_q, \forall q > 0 \quad \text{Equation (46)}$$

The values of $\Delta_q$ may be updated based on the results of the most recent scaling in manners described herein for updating priority of MACs. Furthermore, a WTRU may be configured with minimum transmission power such that a higher priority transmission may never be below a preconfigured value. In such a case, solving for the above equations may result in high priority transmissions being allocated insufficient power. The WTRU may thus first solve for the equations, then if a first priority transmission is allocated insufficient power, the WTRU may remove power allocated from a (or multiple) lowest priority transmission(s) and assign it to the first priority transmission until sufficient power is achieved. The same can be done for the second priority transmission until all transmission power is exhausted and so on so forth in order of decreasing priority. In such an approach it is possible that one or multiple lower priority transmissions are no longer allocated any transmission power and in such a case the UL transmission is considered interrupted due to priority rules.

As an illustrative example, based on the above formulas, a first priority transmission (q=0) may be allocated p W, a second priority transmission (e.g. q=1) may be allocated p W and a third priority transmission (e.g. q=2) may be allocated φ W. However, the first priority transmission may have a minimum required transmission power of γ W, where γ>β. The WTRU may thus reallocate γ−β W from the lowest priority transmission and the resulting power allocation may be given by β W for the first priority transmission, ρ W for the second priority transmission φ−(γ−β) W for the third priority transmission. If φ−(γ−β)<0 then to satisfy the power requirements of the first priority transmission, some power allocated from the second priority transmission may be reallocated to the first priority transmission, such that the resulting power allocation may be given by β W for the first priority transmission, ρ−(γ−β−φ) W for the second priority transmission and 0 W for the third priority transmission. After satisfying the power requirements for transmission(s) of a certain priority, the same can be done for the transmissions of the next priority.

In a different approach to achieve unequal scaling, a WTRU may be provided a set of scaling ratios ($\delta_1$, $\delta_2$, ...) that may be used in a recursive manner as explained below. First the WTRU determines the transmission power for all intended transmissions of any priority q ($\Sigma_{t \in T_q} P_t(i) = \alpha_q(i) P_{CMAX}(i)$). If the sum of those powers is greater than $P_{CMAX}(i)$, unequal scaling may apply. The unequal power scaling algorithm is performed by following these steps:

Determine the scaling of the highest priority (e.g. q=0) transmission(s) when compared to all other priority transmissions. The WTRU is configured with a first scaling ratio, $\delta_1$ to be used in the following manner:

$$w_0(i)\alpha_0(i)P_{CMAX}(i) + \delta_1 w_0(i) \Sigma_{q>0} \alpha_q(i) P_{CMAX}(i) = P_{CMAX}(i) \quad \text{Equation (47)}$$

The scaling used for the highest priority transmissions ($w_0(i)$) may remain fixed for the remainder of this algorithm. To determine the scaling factor of subsequent priority transmissions (e.g. q=1, 2, 3, ...), first remove the power allocated to the $(k-1)^{th}$ priority transmissions from the remaining available power:

$$P_k(i) = P_{k-1}(i) - w_{k-1}(i) \alpha_{k-1}(i) P_{CMAX}(i), k > 0 \quad \text{Equation (48)}$$

Where $$P_0(i) = P_{CMAX}(i) \quad \text{Equation (49)}$$

Next, determine the power scaling of the $k^{th}$ priority transmissions in a similar manner to the first step:

$$w_k(i)\alpha_k(i) P_{CMAX}(i) + \delta_k q_k(i) \Sigma_{q>k} \alpha_q(i) P_{CMAX}(i) = P_k(i) \quad \text{Equation (50)}$$

Repeat steps (b) and (c) until all transmissions have been allocated power.

Power scaling with combination of guaranteed available power and priority criteria: The following paragraphs describe how power scaling could be performed using a combination of concepts described herein, such as guaranteed available power for a cell group and the use of priority levels. Such procedure may be referred to as an "overall scaling procedure" and may involve multiple applications of scaling procedures as will be described.

The following description assumes, without loss of generality, that two (2) cell groups (CGs) are defined. The starting point (input) of the overall scaling procedure is a set of desired power levels for a transmission t denoted as $P^d_t(i)$, and the output of the overall scaling procedure is a set of scaled power levels for transmission t denoted as $P^s_t(i)$. The overall scaling weight $w_t(i)$ may then be defined as the ratio between the scaled power level and the desired power level, i.e. $w_t(i)$ may be set as $P^s_t(i)/P^d_t(i)$.

The calculation of the desired power level $P^d_t(i)$ may be obtained from known power control solutions involving an open-loop component, closed-loop adjustments, parameters obtained from physical layer or higher layer signaling. The desired power level may be assumed to have been subject to a limitation on a per-cell basis such as $P_{CMAX,c}(i)$. Additionally, in some solutions, in case the sum of desired powers of transmissions for a cell group m exceeds a configured maximum power per cell group $P_{CMAXM,m}(i)$, the WTRU may perform the scaling procedure over the desired powers $P^d_t(i)$ of transmissions for this cell group using a maximum total power level corresponding to $P_{CMAXM,m}(i)$. To simplify the subsequent description the output of such scaling procedure, if applied, is still referred to as "desired power" $P^d_t(i)$.

The WTRU may be configured with a guaranteed available power for one or both cell groups m, $P^g_m(i)$. In case no guaranteed available power is configured for a cell group, the WTRU may assume that the guaranteed available power for this cell group is zero.

The WTRU may first calculate the sum of powers for each cell group m, $P_m^{tot}(i)$, and the sum of powers over MAC instances $P^{tot}(i)$ according to formulas already described but where $P_t(i)$ may correspond to the desired power $P^d_t(i)$. In case the sum over MAC instances $P^{tot}(i)$ is smaller than or equal to $P_{CMAX}(i)$, no further action may be required to scale down the powers, such that $P^s_t(i) = P^d_t(i)$ for all transmissions.

Otherwise, if $P^{tot}(i)$ is larger than $P_{CMAX}(i)$, the WTRU may determine, for each of the cell groups, whether the sum of desired powers $P_m^{tot}(i)$ is less than or equal to the corresponding guaranteed available power $P^g_m(i)$. In case this condition would be satisfied for a first cell group (m=0), the WTRU may not perform any scaling of the powers of transmissions of this first cell group, i.e. $P^s_t(i) = P^d_t(i)$ for transmissions belonging to this first cell group. The WTRU may then perform the scaling procedure over the desired powers $P^d_t(i)$ of transmissions of the second cell group (m=1) using a maximum total power level corresponding to the difference between $P_{CMAX}(i)$ and the sum of powers of the first cell group $P_0^{tot}(i)$, i.e. $P_{CMAX}(i) - P_0^{tot}(i)$, and the outcome of this procedure is the set of scaled power levels $P^s_t(i)$ for transmissions belonging to the second cell group.

Conversely, in case this condition would be satisfied for a second cell group (m=1), the WTRU may not perform any scaling of the powers of transmissions of this second cell group, i.e. $P^s_t(i) = P^d_t(i)$ for transmissions belonging to this second cell group. The WTRU may perform the scaling procedure over the desired powers $P^d_t(i)$ of transmissions of the first cell group (m=0) using a maximum total power level corresponding to the difference between $P_{CMAX}(i)$ and the sum of powers of the second cell group $P_1^{tot}(i)$, and the outcome of this procedure is the set of scaled power levels $P^s_t(i)$ for transmissions belonging to the first cell group.

Otherwise, in case the sum of desired powers $P_m^{tot}(i)$ is more than the corresponding guaranteed available power $P^g_m(i)$ for both cell groups m=0 and m=1, different solutions may be envisioned to share the power between cell groups and scale powers, including solutions as described in the following.

First solution: scaling by cell group followed by scaling over both cell groups. In a first solution, the WTRU may start by performing, for each cell group m, the scaling procedure over the desired powers of transmissions of the cell group using a maximum total power level corresponding to the difference between $P_{CMAX}(i)$ and the guaranteed available power $P^g_{m'}(i)$ of the other group m'. In other words, the maximum total power level considered for a first cell group m=0 may be set to $P_{CMAX}(i) - P^g_1(i)$ and the maximum total power level considered for a second cell group m=1, may be set to $P_{CMAX}(i) - P^g_0(i)$. As a result of this process, the WTRU has obtained a set of initially scaled transmission powers $P^{is}_t(i)$ from both cell groups. However, the sum of these initially scaled transmission powers $P^{is}_t(i)$ over both cell groups may in general still exceed $P_{CMAX}(i)$. If this is the case, the WTRU may perform an additional scaling procedure over all initially scaled transmission powers $P^{is}_t(i)$ of both cell groups for a maximum of $P_{CMAX}(i)$, to obtain the scaled transmission powers $P^s_t(i)$. As described previously, multiple priority levels may be considered for the transmissions when performing the scaling procedure. A priority order may be defined, based for instance on the type of physical channel of each transmission, the type of uplink control information carried by each transmission, the cell group to which the transmission belongs, and may depend on whether a network indication was received. The overall procedure is completed after the final transmission powers have been obtained.

Second solution: scaling on guaranteed power followed by scaling on non-guaranteed power over both cell groups. In a second solution, the scaled power levels $P^s_t(i)$ are calculated as the sum of two portions $P^{gua}_t(i)$ and $P^{ngua}_t(i)$, where $P^{gua}_t(i)$ is a portion obtained from the guaranteed available power for the cell group to which the transmission t belong, and $P^{ngua}_t(i)$ is a portion obtained from power that is not guaranteed to any cell group. Each or both portions may be zero, or may correspond to the desired power level.

The WTRU may start by performing, for each cell group m, the scaling procedure over the desired powers of transmissions of the cell group for a maximum level corresponding to the guaranteed available power $P^g_m(i)$ of the cell group. As a result of this process, the WTRU has obtained the set of portions from the guaranteed available power $P^{gua}_t(i)$.

In case the sum of guaranteed available power $P^g_m(i)$ over cell groups is smaller than $P_{CMAX}(i)$, the portion obtained from power not guaranteed to any cell group $P^{ngua}_t(i)$ may be more than zero. The set of portions $P^{ngua}_t(i)$ may be calculated as the output of an additional scaling procedure performed over all transmissions of both cell groups for which the portions from the guaranteed available power $P^{gua}_t(i)$ is less than the desired power $P^d_t(i)$. The pre-scaled power used as a input to this scaling procedure for each such transmission may be the difference between the desired power and the portion from the guaranteed available power $P^d_t(i)-P^{gua}_t(i)$. The maximum power used in the scaling procedure may be the non-guaranteed available power $P_{CMAX}(i)-P^g_0(i)-P^g_1(i)$. The priority order used in the scaling procedure may be defined as in the previous solution.

Third solution: allocation by cell group followed by scaling by cell group for one or both cell group(s). In a third solution, the WTRU may start by identifying a relative priority (i.e. ranking) between cell groups, based on at least one priority criteria. The priority criteria may include one or more of the type of UCI contained in transmissions of the cell group, or the highest priority type of UCI among transmissions of the cell group, the identity of the cell group itself (i.e. whether it is a master or secondary CG), and may depend on whether a network indication was received. When a priority criterion based on the type of UCI or transmission is used (such as PUCCH over PUSCH without UCI, or HARQ A/N over CSI over no UCI) the priority for a CG may be determined based on the highest priority among all transmissions of the cell group, or alternatively only among transmissions of the cell group for which scaling would need to be applied if only the guaranteed available power would be available to the cell group. Without loss of generality, the high-priority CG may be identified with index m=H and the low-priority CG with index m=L. Then, the portion of the total available power $P_{CMAX}(i)$ that is not guaranteed to any cell group may be assigned in priority to the highest priority cell group, while the low priority cell group can be assigned any remaining power, such that the assigned maximum total power for the high and low priority cell groups, $P'_{CMAXM,H}(i)$ and $P'_{CMAXM,L}(i)$, respectively, may be set according to:

$$P'_{CMAXM,H}(i)=\min[P_{CMAX}(i)-P^L_g(i),P^{tot}_H(i)] \quad \text{Equation (51)}$$

$$P'_{CMAXM,L}(i)=P_{CMAX}(i)-P'_{CMAXM,H}(i) \quad \text{Equation (52)}$$

In a second step, the WTRU performs the scaling procedure over transmissions of the low priority cell group using a maximum of $P'_{CMAXM,L}(i)$, and the output of this procedure is the set of scaled powers for transmissions of the low priority cell group. In case the sum of desired powers $P^{tot}_H(i)$ of the high priority cell group would exceed the difference $P_{CMAX}(i)-P^g_L(i)$, the WTRU also performs the scaling procedure over transmissions of the high priority cell group using a maximum of $P'_{CMAXM,H}(i)$, and the output of this procedure is the set of scaled powers for transmissions belonging to the high-priority cell group. Otherwise no scaling is applied on the powers of the transmissions of the high-priority cell group, i.e. $P^s_t(i)=P^d_t(i)$ for transmissions of this cell group.

Power scaling with unsynchronized transmissions: Transmissions taking place for different MAC instances (or for different sets of serving cells) may not be synchronized at the subframe level. This means that transmissions pertaining to a first MAC instance for a subframe may have already started at the time transmission pertaining to a second MAC instance start. The following paragraphs describe approaches to handle power scaling in such situations. Possibly, solutions described in the following may apply in case the timing difference between subframes is more than a specific duration, such as that of a single OFDM symbol.

It is assumed that transmissions may be categorized in two subsets A and B, where all transmissions of a given subset (for a subframe) start at the same time, while transmissions in different subsets may not start at the same time. For instance, subframe i of transmissions of subset A may start at the third OFDM symbol of subframe i of transmissions of subset B. In an example, the subsets A and B may correspond to transmissions of a primary and a secondary MAC instance, respectively.

In a case where transmissions are not synchronized between cell groups (or MAC instances), the total configured maximum output power in subframe i, $P_{CMAX}(i)$, may be determined according to the following procedure. The WTRU may determine a lower limit $P_{CMAX\_L}$ and a higher limit $P_{CMAX\_H}$ for two portions of subframe i of subset A, where the first portion overlaps with subframe j of subset B and the second portion overlaps with subframe j+1 of subset B. These limits are denoted as follows:

$P_{CMAX\_L}(i,j)$, is the lower limit for the portion of subframe i of subset A that overlaps with subframe j of subset B;

$P_{CMAX\_L}(i,j+1)\}$ is the lower limit for the portion of subframe i of subset A that overlaps with subframe j+1 of subset B;

$P_{CMAX\_H}(i,j)$ is the higher limit for the portion of subframe i of subset A that overlaps with subframe j of subset B;

$P_{CMAX\_H}(i, j+1)$ is the higher limit for the portion of subframe i of subset A that overlaps with subframe j+1 of subset B.

These limits may be determined based on formulas already described, where it is understood that the values of the parameters (such as maximum power reduction) may depend on the actual transmissions taking place in the corresponding portion of the subframe. The total configured maximum output power in subframe i, $P_{CMAX}(i)$, may then be bounded according to the following:

$$P_{CMAX\_L}(i) < P_{CMAX}(i) < P_{CMAX\_H}(i), \qquad \text{Equation (53)}$$

where $$P_{CMAX\_L}(i) = \text{MIN}\{P_{CMAX\_L}(i,j), P_{CMAX\_L}(i,j+1)\} \qquad \text{Equation (54)}$$

$$P_{CMAX\_H}(i) = \text{MAX}\{P_{CMAX\_H}(i,j), P_{CMAX\_H}(i,j+1)\} \qquad \text{Equation (55)}$$

In addition, $P_{PowerClass}$ cannot be exceeded during any period of time. Alternatively, one may calculate the limits according to the following:

$$P_{CMAX\_L} = \text{MIN}\{P_{PowerClass}, P_{CMAXM\_L,A}(i) + \text{MIN}\{P_{CMAXM\_L,B}(j), P_{CMAXM\_L,B}(j+1)\}\} \qquad \text{Equation (56)}$$

$$P_{CMAX\_H} = \text{MIN}\{P_{PowerClass}, P_{CMAXM\_H,A}(i) + \text{MAX}\{P_{CMAXM\_H,B}(j), P_{CMAXM\_HB}(j+1)\}\}, \qquad \text{Equation (57)}$$

Where $P_{CMAXM\_L,A}(i)$, $P_{CMAXM\_H,A}(i)$ are the lower and upper limits of the configured maximum power per MAC instance (or cell group) A in subframe i, and $P_{CMAXM\_L,B}(j)$, $P_{CMAXM\_H,A}(j)$ are the lower and upper limits of the configured maximum power per MAC instance (or cell group) B in subframe j.

Taking subset A as a reference, power scaling in a subframe i for this subset may be dependent on, or jointly determined with, the powers of the following transmissions:

Transmissions of subset B for subframe j; and
Transmissions of subset B for subframe j+1;
where the end of subframe j for subset B occurs between the start and end of subframe i for subset A.

Figure 16:
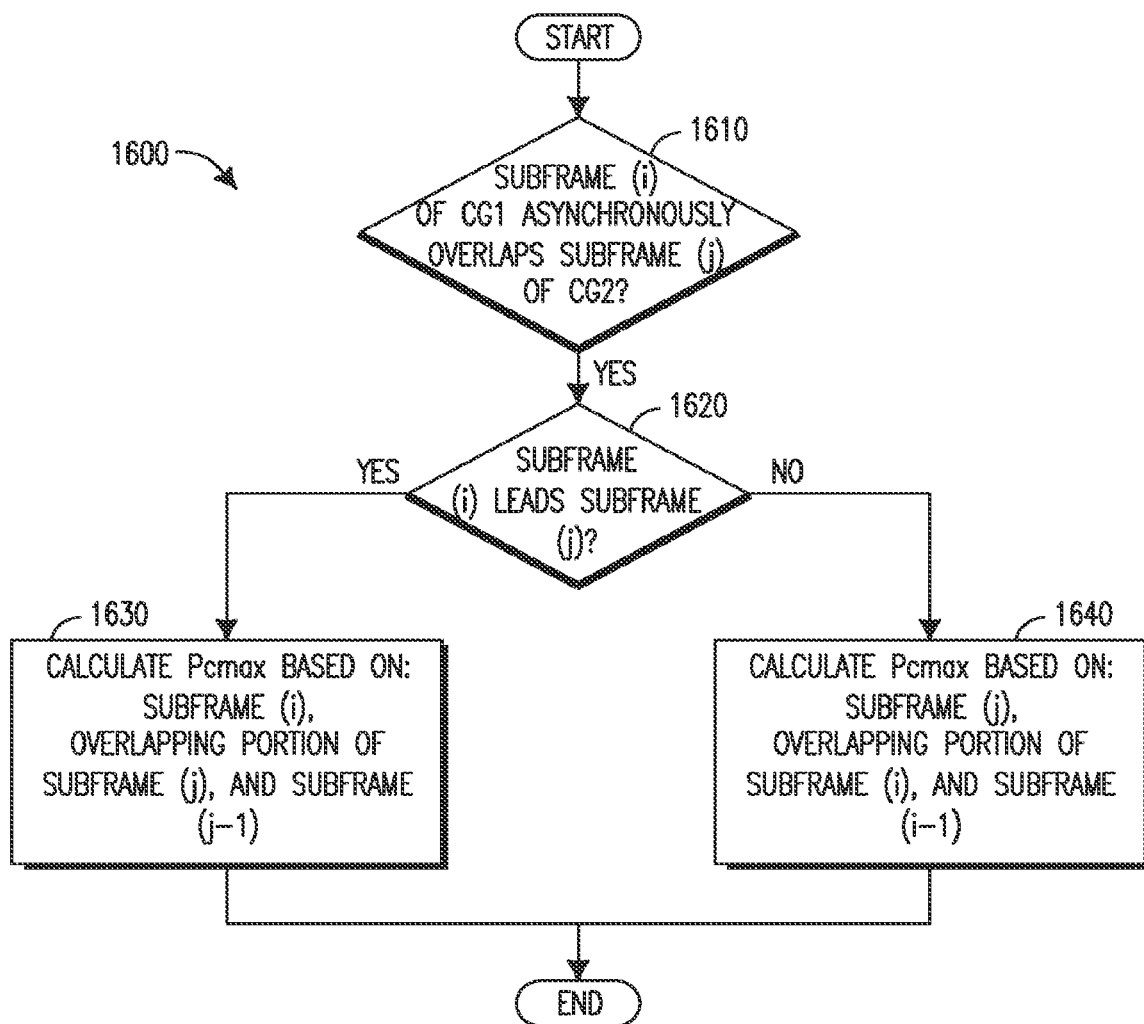
FIG. 16 is a flow chart illustrating determination of a maximum power for all uplink transmissions during a time interval for an asynchronous case.

FIG. 16 shows a flow chart 1600 which illustrates determination by a WTRU of a maximum power available for all uplink transmissions during a time interval (Pcmax) for an asynchronous case.

In step 1610, the WTRU may determine whether a subframe i scheduled for transmission using the uplink resources of CG1 asynchronously overlaps a subframe j scheduled for transmission using the uplink resources of CG2 (i.e. the difference in start times of subframe i and subframe j exceeds a threshold for synchronicity as described with respect to FIGS. 2 and 3). If frames i and j overlap asynchronously, the WTRU may determine in step 1620 whether subframe i begins before subframe j.

If subframe i begins before subframe j, the WTRU may determine Pcmax in step 1630 based on subframe i, subframe j, and subframe j−1 (i.e., the preceding frame scheduled for uplink transmission using the uplink resources of CG2) overlapping subframe i in time. A first range may be determined by the WTRU based on subframe i and subframe j, and a second range may be determined by the WTRU based on subframe i and subframe j−1. A minimum value for Pcmax may then be determined by the WTRU as the lesser of the lowest value of the first and second ranges, and a maximum value for Pcmax may then be determined by the WTRU as the greater of the highest value of the first range and the highest value of the second range. Pcmax will thus fall within a range between the minimum value and maximum value.

If subframe i does not begin before subframe j, then the WTRU may determine Pcmax in step 1640 based on subframe j, the portion of subframe i overlapping subframe j in time, and the portion of subframe i−1 (i.e., the preceding frame scheduled for uplink transmission to CG1) overlapping subframe j in time. A first range may be determined by the WTRU based on subframe i and subframe j, and a second range may be determined by the WTRU based on subframe i−1 and subframe j. A minimum value for Pcmax may then be determined by the WTRU as the lesser of the lowest value of the first and second ranges, and a maximum value for Pcmax may then be determined by the WTRU as the greater of the highest value of the first range and the highest value of the second range. Pcmax will thus fall within a range between the minimum value and maximum value. It is noted that for the asynchronous case, subframe i and subframe j by definition will never begin simultaneously.

Figure 17:
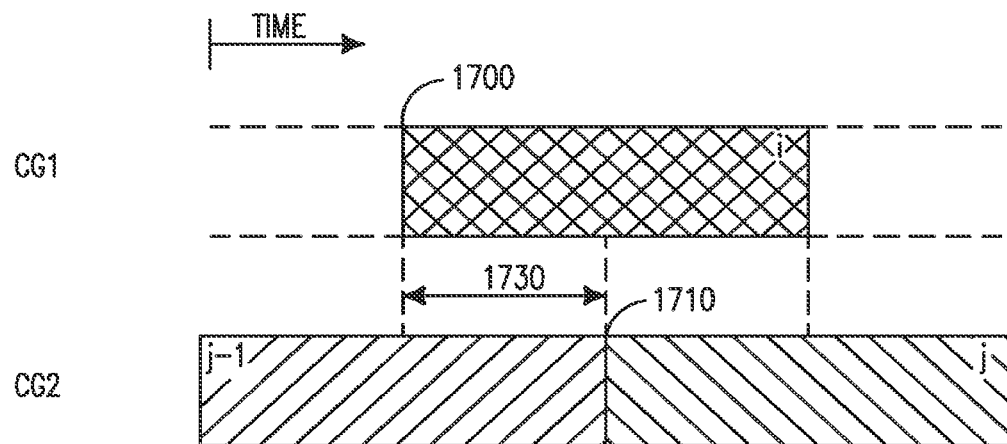
FIG. 17 is a block diagram illustrating subframes used by the WTRU to calculate the maximum power for uplink transmissions during a time interval.

FIG. 17 illustrates the subframes used by the WTRU to calculate Pcmax in step M30 as shown and described with respect to FIG. M. Subframe i is scheduled for transmission from the WTRU using the uplink resources of CG1. Subframes j and j−1 are scheduled for transmission from the WTRU using the uplink resources of CG2. Start time 1700 of subframe i precedes start time 1710 of subframe j by time 1730, which exceeds a threshold for synchronicity as described with respect to FIGS. 2 and 3. For this asynchronous case, a first range may be determined by the WTRU based on subframe i and subframe j, and a second range may be determined by the WTRU based on subframe i and subframe j−1. A minimum value for Pcmax may then be determined by the WTRU as the lesser of the lowest value of the first and second ranges, and a maximum value for Pcmax may then be determined by the WTRU as the greater of the highest value of the first range and the highest value of the second range. Pcmax for time interval 1730 will thus fall within a range between the minimum value and maximum value.

Figure 18:
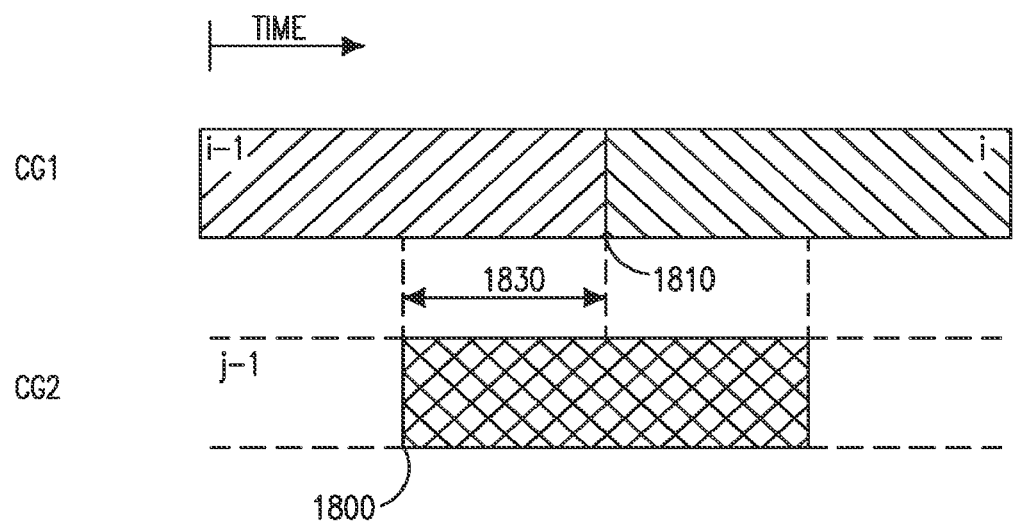
FIG. 18 is another block diagram illustrating subframes used by the WTRU to calculate the maximum power for uplink transmissions during a time interval.

FIG. 18 illustrates the subframes used by the WTRU to calculate Pcmax in step 1640 as shown and described with respect to FIG. 16. Subframes i and i−1 are scheduled for transmission from the WTRU to CG1. Subframe j is scheduled for transmission from the WTRU to CG2. Start time 1800 of subframe i precedes start time 1810 of subframe j by time 1830, which exceeds a threshold for synchronicity as described with respect to FIGS. 3 and 4. For this asynchronous case, a first range may be determined by the WTRU based on subframe i and subframe j, and a second range may be determined by the WTRU based on subframe i−1 and subframe j. A minimum value for Pcmax may then be determined by the WTRU as the lesser of the lowest value of the first and second ranges, and a maximum value for Pcmax may then be determined by the WTRU as the greater of the highest value of the first range and the highest value of the second range. Pcmax for time interval 1830 will thus fall within a range between the minimum value and maximum value.

In an approach, power scaling of transmissions of subset A in subframe i may be performed taking into account the powers of transmissions of subset B for subframe j after scaling, which are on-going when subframe i of subset A starts. For the purpose of determining the scaling factors, the maximum configured output power $P_{CMAX}(i)$ may be replaced with a value $P'_{CMAX}(i)$ (or remaining available power) corresponding to the difference between this value and the sum of the powers of transmissions of subset B for subframe j after scaling, $w_t(j) P_t(j)$:

$$P'_{CMAX}(i) = P_{MAX}(i) - \Sigma_{t \in B} w_t(j) P_t(j) \qquad \text{Equation (58)}$$

In a case where the term $$P_{CG,B}^{1} = \Sigma_{t \in B} w_t(j) P_t(j) \qquad \text{Equation (59)}$$

is not constant over subframe j for transmissions of subset B, its maximum value over subframe j may be used. For instance, this could occur when SRS is transmitted in the last SC-FDMA symbol. The term $$P_{CG,B}^1 = \Sigma_{t \in B} w_t(j) P_t(j) \qquad \text{Equation (60)}$$

may be equivalent to the minimum value between the maximum power level available to transmissions of subset B in subframe j, $P'_{CMAXM,B}(j)$, and the sum of required powers for transmissions of subset B, $$P_{CG,B}^1 = \Sigma_{t \in B} P_t(j) \qquad \text{Equation (61)}$$

or possibly its maximum value over a subframe.

If subframe i has intra-subframe frequency hopping configured and the overlapping period with subframe j of the subset B is less than or equal to a slot duration, then $P'_{CMAX}(i)$ may take into consideration only the power level of the overlapping slot since the WTRU can change PA power level between slots in this case for the weight determination. In addition, if subframe i has scheduled SRS transmissions and the overlapping period is less than a symbol, then $P'_{CMAX}(i)$ may take into consideration only the power level of the overlapping symbol since the WTRU can change PA power level between SRS and shorten PUCCH/PUSCH in this case for the weight determination.

Reactive scaling: In an approach, the determination of scaling factors for transmissions of subset A in subframe i may be performed taking into account the modified maximum power $P'_{CMAX}(i)$ as above and including in the scaling procedure only the set of pre-scaled transmission powers of subset A in subframe i. In case there is an additional configured power limitation $P_{CMAXM,A}(i)$ (or $P'_{CMAXM,A}(i)$) over transmissions of subset A, the scaling procedure may be performed using a maximum power level corresponding to the minimum value between $P'_{CMAX}(i)$ and $P_{CMAXM,A}(i)$ (or $P'_{CMAXM,A}(i)$). Expressed differently, the maximum power level used for the scaling procedure for transmissions of subset A in subframe i, $P'_{CMAXM,A}(i)$, may correspond to the minimum value between $P'_{CMAX}(i) = P_{CMAX}(i) - P^1_{CG,B}(j)$ and a configured power limitation $P_{CMAXM,A}(i)$, where the latter may correspond to $P_{CMAX}(i) - P^g_B$ where $P^g_B$ is a guaranteed power configured for the cell group corresponding to transmissions of subset B (equivalently, to $P_{CMAX}(i) \times (1 - R^g_B)$ if the guaranteed power is configured as a ratio of $P_{CMAX}(i)$). In this case, the maximum power level $P'_{CMAXM,A}(i)$ may also be expressed as $P_{CMAX}(i) - \max[P_{CMAX}(i) R^g_B, P^1_{CG,B}(j)]$.

Using this approach, the transmission powers of subset A are maximized taking into account the limitation brought by transmissions from subset B finishing in this subframe, without considering the power requirements of transmissions from subset B that will start in the subframe. Such approach may be referred to as "reactive scaling" herein.

Proactive scaling: Alternatively, the determination of scaling factors for transmissions of subset A in subframe i may be performed taking into account the following:

The modified maximum power $P'_{CMAX}(i)$ applicable to the portion of the subframe i that ends when subframe j of subset B ends;

The maximum configured output power $P_{CMAX}(i)$ applicable to the portion of the subframe i that starts when subframe j+1 of subset B starts;

The set of pre-scaled or desired $P^d_t(j+1)$ transmission powers for subframe j+1 of subset B.

Possible additional configured maximum power limits over subsets A and B in subframes i and j+1, $P_{CMAXM,A}(i)$ and $P_{CMAXM,B}(j+1)$.

Using this approach, the transmission powers of subset A are maximized taking into account both the limitation brought by transmissions from subset B finishing in this subframe as well as the limitation brought by transmissions from subset B starting in this subframe. Such approach may be referred to as "proactive scaling" herein. When this approach is used, the scaling factors for transmission powers of subset A in subframe i, $w_t(i)$ may be determined according to the following procedure.

Determine the scaling factors $w^{(1)}_t(i)$ or the scaled powers $P^{s(1)}_t(i)$ by applying a first scaling procedure over the pre-scaled transmission powers $P_t(i)$ or desired powers $P^d_t(i)$ of subset A only and using the modified maximum power $P'_{CMAX}(i)$, or the minimum value between $P'_{CMAX}(i)$ and a configured power limitation $P_{CMAXM,A}(i)$ (or $P'_{CMAXM,A}(i)$) over transmissions of subset A;

Determine the scaling factors $w^{(2)}_t(i)$ or the scaled powers $P^{s(2)}_t(i)$ by applying a second scaling procedure over the pre-scaled transmission powers $P_t(i)$ or desired powers $P^d_t(i)$ of subset A in subframe i, as well as the pre-scaled transmission powers $P_t(j+1)$ or desired powers $P^d_t(j+1)$ of subset B in subframe j, and using the maximum configured output power $P_{CMAX}(i)$; in case configured power limitations over subsets A and B, $P_{CMAXM,A}(i)$ and $P_{CMAXM,B}(j+1)$, (or $P'_{CMAXM,A}(i)$ and $P'_{CMAXM,B}(j)$) are defined, the scaling procedure may be performed according to an approach already described for the case of power sharing between MAC instances (or multiple scaling).

Select the minimum value between the two values for each scaling factor (or for each scaled power):

$$w_t(i) = \min[w^{(1)}_t(i), w^{(2)}_t(i)] \qquad \text{Equation (62)}$$

Or equivalently:

$$P^s_t(i) = \min[P^{s(1)}_t(i), P^{s(2)}_t(i)] \qquad \text{Equation (63)}$$

Another possible solution may include the following, if subset A and B correspond to MAC instances A and B respectively: Determine a tentative assigned total power $P'^{(1)}_{CMAXM,A}(i)$ for the first part of the subframe, corresponding to the minimum between the value $P'_{CMAX}(i)$ as previously described and the configured maximum power $P_{CMAXM,A}(i)$ for MAC instance A; determine a tentative assigned total power $P'^{(2)}_{CMAXM,A}(i)$ for the second part of the subframe, using one of the previously described solution for power sharing between MAC instances, where transmissions of a second MAC instance B for subframe j+1 are considered, as well as associated priorities if applicable; determine the assigned total power $P'_{CMAXM,A}(i)$ for (the whole) subframe i as the minimum between both tentative assigned total powers, i.e. $P'_{CMAXM,A}(i) = \min\{P'^{(1)}_{CMAXM,A}(i), P'^{(2)}_{CMAXM,A}(i)\}$; and, determine the transmission powers of all transmissions associated to MAC instance A in subframe (i) by applying the scaling procedure over these transmissions for a single maximum total power level of $P'_{CMAXM,A}(i)$.

In some solutions, the calculation may be performed by assuming that the assigned total power of subset B in subframe j+1 $P'_{CMAXM,B}(j+1)$ is equal to a configured value corresponding to a guaranteed assigned power for subset B. Such approach may be useful if the actual required transmission powers of subset B are not known at the time where the transmission powers of subset A in subframe i need to be calculated. In some solutions, whether a configured value of $P'_{CMAXM,B}(j+1)$ is used or whether a value is calculated based on actual required transmission powers may depend on whether the difference in timing between subframe i and subframe j+1 is below a threshold, or whether the available WTRU processing time between reception of control information applicable to subset B in subframe j+1 and transmission of subset A in subframe i is below a threshold. For example, the WTRU may determine such difference in timing according to any of the methods described herein regarding synchronous and unsynchronous uplink transmissions across cell groups, such as based on the type of uplink operation (synchronous or asynchronous) between subsets of transmissions. Alternatively, the WTRU may determine the difference in timing according to any of the methods described herein regarding processing a time budget, such as based on WTRU processing time.

When proactive scaling is performed as in the above, the determination of scaling for transmissions of subset B in subframe j+1 may be performed immediately after by applying the reactive scaling procedure (applied from the perspective of subset B) using the scaling factors calculated as above for subset A in the determination of $P'_{CMAX}(j+1)$. This means that the scaling factors for both sets of transmissions may be calculated without any interval in between.

With respect to the performance of a scaling procedure over transmissions belonging to both subsets in the above, priorities and possibly sub-priorities may be defined on each separate transmission. In addition, or alternatively, priorities may be defined on a subset basis. For instance, subset B may have higher priority than subset A if those subsets correspond to a primary MAC instance and a secondary MAC instance, respectively.

The WTRU may determine whether to apply "reactive scaling" or "proactive scaling" for a subset of transmissions based on at least one of the following criteria.

In one example approach, the WTRU may apply reactive scaling to both subsets of transmissions always. In this case, a separate calculation is performed at at least every start of a subframe of either subset of transmissions.

In another example approach, the WTRU may apply reactive scaling on a subset of transmissions if the corresponding MAC instance is of higher priority than the other MAC instance, based on any prioritization solution described herein.

In another example approach, the WTRU may apply proactive scaling for subset A (and reactive scaling for subset B immediately after) if the time difference between the start of subframe i and the start of subframe j+1 is less than a threshold. The threshold may be pre-defined and may correspond, for instance, to an allowable reduction of the available processing time for the WTRU to determine the required pre-scaled transmission powers of subset B. The threshold, or whether proactive scaling is possible at all, may be dependent on a WTRU capability signaled to the network. Alternatively, the threshold may correspond to half of a subframe, or to one slot. In this case, effectively a pairing of subframes is performed such that the time interval between the starts of paired subframes is minimized. Proactive scaling is then applied on the earlier subframe of this pair, and reactive scaling is applied on the later subframe. In another example case, this approach is only used if the earlier subframe corresponds to transmissions for a MAC instance of lower priority.

Reactive scaling with pre-emption: In some approaches, the WTRU may calculate transmission powers for a first MAC instance in subframe i according to a reactive scaling procedure (i.e. taking into account only transmissions of a second MAC instance of subframe j which overlaps in the early portion of subframe i) and drop transmissions for this first MAC instance over all or a portion of the subframe in case it determines that the second MAC instance (or transmissions thereof) has higher priority in subframe j+1 than the first MAC instance in subframe i.

In other words, the transmission powers of a first MAC instance in subframe i in at least a portion of subframe i, may be either the result of the reactive scaling procedure, or zero, depending on whether the second MAC instance in subframe j+1 has higher priority than the first MAC instance in subframe i.

In some approaches, the WTRU may calculate transmission powers for a first MAC instance in subframe i according to a reactive scaling procedure if it determines that the second MAC instance has lower priority (or possibly lower or equal priority) in subframe j+1, or if it determines that no transmission is present for the second MAC instance in subframe j+1. Otherwise, the WTRU may determine the transmission powers for the first MAC instance in subframe i based on applying scaling using a pre-defined assigned total power $P^{preempt}_{CMAXM,A}(i)$ as maximum power, possibly only if such value is smaller than the remaining available power $P'_{CMAX}(i)$ determined as part of reactive scaling.

Such solutions may have the benefit of avoiding extensive calculations or recalculations of powers when information about transmissions for the second MAC instance in subframe j+1 becomes available.

Further example applicable prioritization functions are described in the following discussion. Related approaches include those that may be applied when a WTRU is limited with respect to uplink operation. For example, such prioritization function may include at least one of the following:

Selective blanking: The WTRU may determine that it should perform a transmission of a higher priority, and it may determine that it should not perform a transmission of a lower priority (or allocate it zero power, in which case it may be considered as a power scaling event).

This may be useful, for example, to perform some form of TDM between a plurality of MAC entities (e.g. primary, secondary) and/or between a plurality of physical channel (or signal) types (e.g. PUSCH, PUCCH, PRACH, SRS) and/or between a plurality of transmissions for a same type of physical channel (e.g. PUSCH and PUSCH, PUCCH and PUCCH, etc.).

In particular, this may be useful when it can be assumed that timing of the uplink transmission can be synchronized within some margin, e.g. at the symbol duration and within the length of a cyclic prefix.

Selective transmission: As described herein, the WTRU may determine that it should perform a transmission such that it may autonomously determine one or more characteristics of the transmission as a replacement of one or more aspects of the applicable grant (referred to as the base grant).

Truncated transmission: The WTRU may determine that it should perform a transmission of a higher priority, and it may determine that it should truncate one or more symbols for a transmission of a lower priority.

For example, this may be useful to perform some form of TDM between a plurality of MAC entities (e.g. primary, secondary) and/or between a plurality of physical channel (or signal) types (e.g. PUSCH, PUCCH, PRACH, SRS) and/or between a plurality of transmissions for a same type of physical channel (e.g. PUSCH and PUSCH, PUCCH and PUCCH, etc.).

In particular, this may be useful when it cannot be assumed that timing of the uplink transmission can be synchronized within some margin, e.g. at the symbol duration and within the length of a cyclic prefix.

Power scaling: The WTRU may determine that it should apply a scaling function on the transmission power of one or more uplink transmissions, such that power may be first allocated to a transmission of a higher priority, and the remaining power may be allocated in decreasing order of priority. Possibly, if the WTRU determines that the priority of two or more transmissions is equal, the WTRU may apply additional priority rules, it may allocate the remaining power equally or it may be a function of the WTRUs implementation such that transmission power may be optimized (e.g. the WTRU may determine the power allocation that requires the least backoff e.g. MPR applied).

Resource used for HARQ A/N or other UCI transmission: The WTRU may determine a type of resource (PUCCH or PUSCH) and/or an amount or a proportion of resources used for HARQ A/N or other UCI within PUSCH, to increase the probability of successful detection of such UCI in case of power limitation. For instance, the number of coded symbols Q' used for HARQ A/N or for rank indication (RI) may be determined as the output of a prioritization function. For instance, the number of coded symbols Q' may be set to 4 times the number of sub-carriers of the PUSCH allocation instead of the number calculated as per existing solutions, as a result of the prioritization function. In another example, the prioritization function may determine that HARQ A/N should be transmitted over PUCCH instead of PUSCH and drop any PUSCH transmission.

The WTRU may determine a priority according to one or more rules, such as those described herein. Such priority may be used as prioritization level in association to a prioritization function such as described above.

Such prioritization function and prioritization level may be applicable to the selection of a grant to be used for uplink transmission(s) in a given TTI (e.g. as in case 1 above). For example, the WTRU may have valid grant for a primary MAC instance and one for a secondary MAC instance for a given TTI. If the WTRU applies selective transmission, the WTRU may select the grant for which to perform a transmission as a function of the applicable priority level.

Alternatively, such prioritization function and prioritization level may be applicable to the allocation of transmit power used for uplink transmission(s) in a given TTI (e.g. as for case 2 and 3 above). For example, the WTRU may have a valid grant for a primary MAC instance and one for a secondary MAC instance for a given TTI. If the WTRU applies a power scaling function, the WTRU may determine what transmission associated to what MAC entity should be first allocated available transmission power, and then allocate any remaining power to uplink transmission(s) associated to the other MAC entity. Possibly, if the remaining power is insufficient for the concerned transmission, the WTRU may perform selective transmission (if applicable).

For any of the above prioritization functions, parameters representing the concerned prioritization function may be a configuration aspect of the WTRU.

In an example, a prioritization function may be parametrized, i.e., the network may be in control. For example, the WTRU may be configured for a power scaling function that includes a minimal amount of power to allocate to a specific MAC instance (e.g., a guaranteed available power for a MAC instance, $P^g_m(i)$, as previously described), or to a target power ratio to allocate for a specific MAC instance. Possibly, such threshold may be applied per physical channel (e.g. PUCCH, PUSCH).

In another example, in an approach, a guaranteed available power for a MAC instance $P^g_m(i)$ may be derived from a value provided from higher layer signaling. The value may be expressed in terms of an absolute value (e.g. in dBm or mW) or in terms of a fraction of a total configured maximum output power $P_{CMAX}(i)$ or of a maximum WTRU power $P_{PowerClass}$. For instance, the guaranteed available power for a MAC instance in subframe (i) may be determined to be X dB below $P_{CMAX}(i)$ (expressed in dBm units), or may be determined to be Y times $P_{CMAX}(i)$ (expressed in linear units), where Y corresponds to a ratio of power that is guaranteed to be available. The value of X (or Y) may be provided by higher layers.

In another example, the WTRU may be configured with one or more set of parameters for a given prioritization function. When multiple configuration are available for a given function, the WTRU may determine what function to apply in a given subframe as a function of semi-static aspects (as described below) and/or as a function of dynamic aspects (as described below). For example, for a power scaling function, different thresholds may be configured e.g. such that default value(s) may be available and such that a non-default parameter (or set thereof) may be addressed e.g. by control signaling received by the WTRU.

In other words, the WTRU may receive control signaling that dynamically modify the set of applicable prioritization rules.

In an example, the WTRU may be configured to use one of a possible set of guaranteed available powers for at least one MAC instance. The set may be provided from higher layer signaling (e.g., RRC). The specific value of the guaranteed available power to use from the set may be provided from physical layer signaling or from MAC signaling (MAC control element). For instance, the WTRU may determine the value of the set that should be used (for each MAC instance) based on a field of a received DCI, possibly only if received from a specific MAC instance. The value may be applied only to a subframe associated to the DCI or to an uplink transmission associated to this DCI. Alternatively, the value may apply to all subsequent uplink transmissions until reception of a new indication.

In another example, the specific value of the guaranteed available power to use from the set for a first MAC instance may depend on the relative priority of this MAC instance compared to the second MAC instance. Such relative priority may depend on whether HARQ A/N is included in a transmission of the first or the second MAC instance. For instance, a set of possible values of the guaranteed available power for a first MAC instance may be 80%, 50% or 20% of $P_{cmax}(i)$. In a case where this first MAC instance has a lower priority than a second MAC instance, the guaranteed available power for the first MAC instance may be 20% of $P_{cmax}(i)$. In case both MAC instances have the same relative priority, the guaranteed available power for the first MAC instance may be 50% of $P_{cmax}(i)$. In a case where the first MAC instance has a higher priority than a second MAC instance, the guaranteed available power for the first MAC instance may be 80% of $P_{cmax}(i)$.

This may be useful to enable operation whereby an eNB may control the switching of the applicable priorities between transmissions for a given WTRU using dynamic control signaling.

In another example, the values of parameters that may be used in a given prioritization function may be function of a priority between MAC instances (cell groups) or between transmissions. For instance, the maximum power for MAC instance m, $P_{CMAXM,m}$, may be a first value $P_{CMAXM,HIGH}$ in case this MAC instance is prioritized over the other(s), and a second value $P_{CMAXM,LOW}$ in case this MAC instance is not prioritized or has lower priority. In another example, the guaranteed available power $P^g_m(i)$ may be a first value $P^g_{HIGH}(i)$ in case this MAC instance is prioritized over the other(s), and a second value $P^g_{LOW}(i)$ in case this MAC instance is not prioritized or has lower priority.

Control of P_MeNB and P_SeNB are further discussed below.

Hard split between MAC entities for WTRU available power: The WTRU may be configured (e.g. by RRC) with a value for PeNB,m=PeNB,0 for the MAC entity associated to transmissions towards a MeNB (e.g. the primary MAC entity) herein referred to as P_MeNB, and with a value for PeNB,m=PeNB,1 for the MAC entity associated to transmissions towards a SeNB (e.g. the secondary MAC entity) herein referred to as P_MeNB when configured with dual connectivity. Conceptually, such value may impact how much transmission power is needed before the WTRU determines that power scaling should be applied; it also may impact the uplink coverage of the WTRU's transmission. When such values are semi-statically configured using L3 signalling, it may become challenging for the system to optimize the WTRU's power usage while ensuring that uplink coverage (such as for the transmission of critical L3 signalling) can be maintained. Methods to adjust such values dynamically are further described herein.

Coefficient-based variable split between MAC entities for WTRU available power: In an example approach, the WTRU may additionally determine a coefficient value alpha to apply to the values of P_MeNB and P_SeNB. The WTRU may then use alpha*P_MeNB and (1-alpha)*P_SeNB (in linear units), if necessary, for example, where the WTRU needs to determine how to split power for transmissions associated to more than one MAC entity and/or where the WTRU needs to apply a prioritization function (e.g. the WTRU is in a power-limited situation).

Adjustable split levels between MAC entities for WTRU available power: In an example approach, the WTRU may instead be configured such that different power allocation ratio may be applied. For example, the WTRU may be configured with multiple pairs of values for [P_MeNB, P_SeNB]. Alternatively, the WTRU may be configured with a set of alpha values. Possibly, each pair may be indexed.

WTRU-autonomous adjustment: The WTRU may autonomously determine the applicable power allocation ratio.

The WTRU may become power-limited and change the ratio to allocate unused power to the concerned transmissions: In one example, the WTRU may adjust such ratio if it determines that it is power-limited; the WTRU may determine that it has insufficient transmit power for a specific period of time for transmissions associated to a given MAC entity and determine that power may be reallocated such that more power is made available to transmissions of the concerned MAC entity. This may be done, for example, only if sufficient transmit power remains available for transmissions associated to the other MAC entity, if any. Such period of time may be a single TTI (e.g. the occurrence of the application of a prioritization—e.g. power scaling—for a single TTI may trigger such adjustment) or a plurality of TTIs. The WTRU may determine the adjustment as a function of the power scaling levels applied during such period such that power scaling may be minimized.

The WTRU may determine average power over a certain period and reallocate power levels accordingly: In one example, the WTRU may adjust such ratio if it determines that the power split used and the average power allocated to transmissions associated to each MAC entity do not match each other over a certain period. For example, the WTRU may determine that power used for transmissions associated to a first MAC entity do not exceed in average an amount that correspond to another value in the WTRU's configuration, which value (either alpha, or a P_MeNB, P_SeNB pair) may be used without impairing transmissions associated to the second MAC entity.

The WTRU may prioritize transmissions to which more power should be allocated: In another example, the WTRU may adjust such ratio if it determines that a change in prioritization of transmissions (e.g. according to any of the method described herein) should be applied. For example, the WTRU may adjust the ratio such that more power is made available to transmissions associated to a primary MAC entity (i.e. the MAC entity associated to the eNB used for macro coverage) where data of higher priority (e.g. RRC signaling, including measurement report) is available for transmission. In another example, the WTRU may perform such adjustment where it triggers a Scheduling Request (SR), or for a subframe in which the WTRU performs a SR transmission (either a preamble transmission for RA-SR, or a transmission on PUCCH for D-SR). In another example, the WTRU may perform such adjustment when it performs a preamble transmission. Possibly, in the latter case, only for a preamble transmission associated to a contention-based random access procedure.

The WTRU may determine that it is moving towards the edge of a cell e.g. macro cell edge: In another example, the WTRU may adjust such ratio if it determines that a change in its pathloss estimation for the physical layer associated to a specific MAC entity changes by a certain amount. For example, the WTRU may adjust the ratio such that more power is made available to transmissions associated to the primary MAC entity (i.e. the MAC entity associated to the eNB used for macro coverage) where the associated pathloss estimate drops by a certain amount.

The rate of WTRU-autonomous adjustment may be limited: In one approach, the WTRU may limit how often it may autonomously adjust the split of available power between transmissions of different MAC entities. For example, the WTRU may start a prohibit timer (which usage and/or value may possibly be configurable by the network) when it performs such adjustment, such that no further WTRU-autonomous adjustment may be made while the timer is running. If used in combination with network-controlled adjustments, the WTRU may restart such timer every time it performs such adjustment as a result of a network-controlled procedure. Possibly, the WTRU may consider only subframes for which it performs simultaneous transmissions. Possibly, such timer may be the PHR prohibit timer, in particular if the WTRU triggers a PHR whenever it perform such adjustments autonomously.

The WTRU may determine that it operates according to single connectivity: In another example, the WTRU may adjust its power allocation function such that a split is not applicable. In such case, the WTRU may revert to R11 power allocation functions. For example, the WTRU may determine that it may no longer perform any uplink transmission (possibly except for a preamble transmission) for the secondary MAC entity e.g. when it no longer has a valid uplink timing advance (e.g. TAT is not running for any cell of the secondary MAC entity) or e.g. following a failure event for a procedure of the concerned MAC entity such as a RACH failure, a RLC failure or a radio link problem detected by RLM and applicable to cell(s) of the concerned MAC entity. For example, the WTRU may determine that the configuration of the secondary MAC entity is either removed or invalidated. For example, the WTRU may initiate a RRC connection re-establishment procedure.

NW-controlled adjustment: The WTRU may adjust the applicable power allocation ratio when it receives control signaling from the network. For example, such control signaling may be received in a DCI on PDCCH (possibly only on the PDCCH associated to the PCell of the WTRU's configuration), in a L2 MAC Control Element or in L3 RRC signaling (e.g. RRC reconfiguration procedure). For example, the WTRU may determine the index of a pair of values for [P_MeNB, P_SeNB] or a coefficient alpha in a DCI. Possibly, such DCI may be a format 3 or 3a received by TPC-PU*CH-RNTI or similar. Possibly, such signaling may be a set of bits (e.g. TPC field, or frequency hopping field) in a DCI that grants uplink resources for a transmission. Such adjustment may be applicable only to a single subframe, e.g. in particular if signaling together with the allocation of uplink resources for a transmission, or until further logic is executed by the WTRU that adjusts the applicable power ratio to different values.

Applying the selected adjustments: If the WTRU determines that it should adjust the split of available power, it may apply the new value according to at least one of the following: The WTRU may apply the adjustment only for the applicable transmission e.g. if received together with a DCI that allocated resources for an uplink transmission; the WTRU may apply the adjustment after a certain processing time e.g. X subframes after the subframe in which the WTRU could first determine that an adjustment was required (for example, in case of network-controlled adjustment, in subframe n+x for control signaling received in subframe n); the WTRU may apply the adjustment in the first subframe that immediately follows a subframe for which the WTRU did not perform simultaneous transmissions i.e. after a subframe in which the WTRU either allocate power only for transmissions associated to a single MAC entity or did not perform any transmission at all; (possibly, for the first such subframe after a specific processing time); t WTRU may autonomously determine that at least one transmission should be blanked such that such subframe is induced (such subframe may be part of a configured gap e.g. a measurement gap or a period for which the WTRU was not in DRX active time).

The WTRU may trigger PHR if it autonomously adjusts the power split for WTRU available power between MAC entities: In one approach, the WTRU may trigger a notification to the network (e.g. either towards the MeNB only, or possibly also to the SeNB) where it autonomously determines that a different split of available transmit power is used, e.g. according to any of the method described above. For example, the WTRU may trigger a PHR in such case.

The WTRU may be configured for multiple prioritization functions: For example, the WTRU may be configured with one or more prioritization function(s). When multiple functions are configured, the WTRU may determine what function to apply in a given subframe as a function of semi-static aspects (as described below) and/or as a function of dynamic aspects (as described below). For example, different functions thresholds may be configured e.g. such that a default function may be available and such that a non-default function may be addressed by control signaling received by the WTRU.

In an example, the WTRU may receive control signaling that dynamically modify the set of applicable prioritization function.

This may be useful to enable operation whereby an eNB may control the switching of the prioritization function applied between transmissions for a given WTRU using dynamic control signaling.

In another example, the prioritization function applied by the WTRU in a subframe may depend on a priority level or priority order associated to a transmission pertaining to this MAC instance in this subframe, and/or on a relative priority between a transmission pertaining to this MAC instance and a transmission pertaining to another MAC instance. For instance, it may depend on whether HARQ A/N is included in a transmission of one or both MAC instances. In a case where a transmission with HARQ A/N is included in a first MAC instance but not in a second MAC instance, the prioritization function may comprise "power sharing based on an absolute priority" described further herein, where the higher priority MAC instance is the first MAC instance. In case a transmission with HARQ A/N is included in both MAC instances, the prioritization function may comprise "power sharing based on an absolute priority", where the higher priority MAC instance is a pre-defined MAC instance (e.g. a primary MAC instance). In case no transmission with HARQ A/N is included in any MAC instance, the prioritization function may comprise "power sharing based on guaranteed available power" described further herein using a configured set of values for the guaranteed available power.

In another example, the prioritization function applied by the WTRU may depend on an explicit indication received from a DCI from an existing field (e.g. TPC command field) or a newly defined field. For instance, the WTRU may determine that "power sharing based on absolute priority" is performed in case this indication is received, and that "power sharing based on guaranteed available power" is performed otherwise.

Multiple prioritization functions may also be combined using precedence rules, as described further herein.

A function may be configured such that it is applicable in subset of TTIs. For example, The WTRU may be configured such that a first priority function may be applicable to a subset of subframes within a given radio frame, while a second priority function may be used for a second subset of subframes within the concerned frame.

For example, the WTRU may be configured such that in a given set of TTIs (e.g. first TTI of a radio frame or subframe #0) the WTRU determines that selective transmission function may be applied to uplink transmission of different priority levels while it may determine that for a second set of TTIs (e.g. the other TTIs in the radio frame or subframe #1-#9) a power scaling function may be applied to uplink transmissions of different priority levels. Possibly, in the configuration, all subframes may refer to timing associated to a single MAC entity.

This may be useful to enable operation whereby some TDM is applied for the uplink between MAC/PHY entities, while for other subframes power distribution and power scaling may be used between MAC/PHY entities in a given subframe.

For any of the above prioritization functions, the WTRU may first determine the priority level to associate to a given transmission in the concerned TTI when applying the prioritization function. The WTRU may determine such priority level according to a number of approaches, or any combinations thereof, according to at least one of the following:

Dynamic aspects: The WTRU may determine the priority level of a transmission as a function of the received control signaling and/or operational state of the WTRU. Examples of such rules are described herein.

Semi-static aspects: The WTRU may determine the priority level of a transmission as a function of configurable rules. Examples of such rules are described herein.

Static aspects: The WTRU may determine the priority level of a transmission as a function of pre-defined rules. Examples of such rules are described herein.

Similarly, the WTRU may determine the prioritization function (and/or the corresponding set of parameters) to apply according to any of the above aspects using similar approaches as those described to determine the priority level to associate to a given transmission in a given TTI. In other words, the selection of the function to apply may itself be considered as a priority level for the concerned TTI.

In the approaches described below, a transmission may refer to any type of uplink transmission; for example, while not limiting the below approaches to any other type of uplink transmissions, a WTRU may use a prioritization function and approaches to determine the prioritization level according to at least one of the following:

An uplink transmission as indicated by a grant. In this case, the concerned transmission may be the corresponding PUSCH transmission (typically in subframe n+4 for control signaling received in subframe n), possibly at the granularity of what information is included in the signal e.g. a PUSCH transmission may be further split as a UCI component, one (or more, in case of spatial multiplexing) transport block(s) component, and possibly also a SRS component (typically the last symbol of the PUSCH transmission).

An uplink transmission as a consequence of a downlink assignment. In this case, the concerned transmission may be the corresponding HARQ feedback sent either on PUCCH or on PUSCH (typically in subframe n+4 for control signaling received in subframe n), possibly at the granularity of what physical channel is used for the transmission.

A transmission for UCI, SRS or D-SR i.e. a transmission that is for HARQ feedback or for UCI (periodic or aperiodic) either on PUCCH or PUSCH, a SRS transmission (periodic or aperiodic) or scheduling request (D-SR) on PUCCH. The granularity may be at the physical channel (e.g. PUSCH, PUCCH), the type of signal (e.g. SRS, D-SR) or the type of information (e.g. HARQ feedback, CQI/PMI/RI, D-SR). For example, a WTRU may apply power scaling and to allocate lower priority to a transmission that contains UCI if it excludes HARQ A/N information but not otherwise.

A transmission that is part of a random access procedure (either as indicated by a DCI, or initiated autonomously by the WTRU): In this case, the concerned transmission may be at least one of the corresponding initial preamble transmission, any retransmission(s) of the preamble and if applicable the transmission of the msg3 (including retransmissions, if any) for a contention-based procedure.

In other words, the granularity at which the prioritization level and/or function may be applied can be according to at least one of the following:

Initial transmission: The concerned transmission is only the initial preamble transmission. As an example, the WTRU may determine that only the initial transmission of a preamble may be given a lower priority level than other transmission(s) that may overlap at least partly in time with the preamble, while the WTRU may determine that any retransmission(s) of the preamble for the concerned RACH procedure is given higher priority than other transmission(s) that may overlap at least partly in time with the preamble. In this case, the WTRU may then apply a first power allocation method (e.g. it may apply scaling of the power, possibly even down to zero level) to the transmission of the initial preamble when it determines that the preamble may be given lower priority than other transmissions (e.g. PUSCH/PUCCH), and otherwise it may apply a second power allocation method such as a method applicable when the preamble does not collide with a transmission or transmissions of another CG or such that power available to the CG (or to the WTRU) may be available for the transmission of a preamble. In some cases this may be done only when the preamble and the other transmissions are associated to different groups of cells (e.g. different CGs or MAC instances.)

Preamble transmission only: The concerned transmission may include any of the preamble transmission for the concerned procedure. Possibly, the transmission of msg3 (if applicable) may be treated as a separate transmission from the perspective of applying a prioritization function whereby the WTRU may determine how to handle such transmission according to any approaches described herein. For example, how the WTRU received the RAR (and/or its content) that includes the grant (and/or its content) for msg3 transmission may determine how to handle such transmission.

Msg3 transmission only: The concerned transmission may be only the transmission, and retransmissions if any, of the msg3 for a contention-based procedure. For example, transmission of msg3 on PUSCH for a serving cell of a CG may have higher priority that a transmission on PUSCH for another CG.

Procedure-specific: The concerned transmission may include any of the uplink transmissions associated to the concerned procedure, e.g. including any preamble transmission as well as the transmission of msg3 (and any retransmission, if needed).

Different granularity may be associated as a function of how the WTRU initiates the procedure, i.e. whether the preamble transmission is triggered by the reception of a DCI on PDCCH (DL data arrival, e.g. preamble transmission only) or whether it is initiated by the WTRU (RA-SR for UL data arrival, e.g. procedure-specific).

As an example of the above method, the WTRU may assign a lower priority to the initial transmission of a preamble than to other transmissions (e.g. PUSCH/PUCCH) only in a case where the RACH procedure was initiated by the reception of a DCI on PDCCH, if the WTRU would be otherwise power-limited. In some cases this may be done only if the WTRU determines that it may have insufficient processing time to adjust the transmission power levels of the overlapping PUSCH/PUCCH transmission(s). As a further example, the WTRU may scale (including down to zero level, or may drop) the transmission power of the initial preamble transmission for a PDCCH-initiated RACH procedure only if the time between the reception of the DCI and the first PRACH occasion is less than or equal to a specific amount of time (e.g. 6 ms) and if the WTRU would be otherwise power-limited due to the overlapping transmissions.

Different granularity may be associated as a function of what MAC entity is associated with the procedure, e.g. whether the preamble transmission is triggered for the PMAC (e.g. possibly for control plane signaling using procedure-specific granularity) or for the SMAC (e.g. for offload data using preamble transmission only).

Priority may be a function of a component of a function as discussed further herein. In one example, the WTRU may allocate a higher priority to one or more type(s) of transmission for a given CG as a function of a sub-component of a procedure or a function.

In an example which may relate to msg3, the WTRU may allocate a higher priority to any transmissions (e.g. including initial HARQ transmissions and any HARQ retransmission) for PUSCH for a given CG while contention resolution is ongoing for a contention-based random access procedure (e.g. while the contention resolution timer is running) on the uplink resources of a serving cell of the concerned CG. The higher priority may be allocated only for the special cell of a CG. The higher priority may be allocated only for the PCell of the MCG. The WTRU may allocate transmission power for transmission(s) on PUSCH up to a minimum guaranteed power, and allocate remaining power (if any) first to such transmissions during that period.

In an example which may relate to measurement reports, the WTRU may allocate a higher priority to any transmissions (e.g. including initial HARQ transmissions and any HARQ retransmission) for PUSCH for the measurement reporting procedure. For example, this may be from the time the measurement report is triggered or submitted to lower layers for transmission until the WTRU receives positive HARQ feedback for the corresponding transmission. A timer may also be introduced for this purpose. The WTRU may allocate transmission power for transmission(s) on PUSCH up to a minimum guaranteed power, and allocate remaining power (if any) first to such transmissions during that period.

In an example which may relate to radio link problems, re-establishment, and/or radio link failure (RLF) of the secondary cell group (S-RLF), the WTRU may allocate a higher priority to any transmissions (e.g. including initial HARQ transmissions and any HARQ retransmission) for PUSCH while timer T310 (which is started when RRC receive an indication of radio link problem from lower layers) is running. The WTRU may allocate transmission power for transmission(s) on PUSCH up to a minimum guaranteed power, and allocate remaining power (if any) first to such transmissions during that period. The WTRU may perform a similar behavior when timer T311 (which is started when the WTRU initiates the RRC Connection re-establishment procedure) is running, although an alternative would be that the WTRU releases any configuration for a SCG in such case.

The following discussion relates to determination of priority as input to a prioritization function. In one approach, the WTRU may determine a priority level (or order), and/or a prioritization function, dynamically. A WTRU may determine a priority level as a function of a dynamic aspect. Such dynamic aspect may be the reception of downlink control signaling and/or the WTRUs operational state (e.g. HARQ state, whether or not a specific function e.g. SPS is activated, etc.). Such determination may additionally be a function of one or more configuration aspect(s). Such configuration aspect may include a configured grant (either for uplink transmission e.g. to determine the priority level of a PUSCH transmission, or for downlink transmission e.g. to determine the priority level of HARQ feedback). Such configuration aspect may include any parameters related to the elements listed below, when applicable.

The WTRU may determine the priority level applicable to transmission(s) for a given TTI as a function of the received control signaling and/or operational state of the WTRU, for example according to at least one of the following:

Identity of control channel (e.g. (e)PDCCH): Such priority level or prioritization function may be a function of (the identity, or type of) a control channel.

For example, the WTRU may determine that control signaling received on a first PDCCH has higher priority level than control signaling received on a second PDCCH for a given TTI. For example, in such case, the WTRU would give highest priority to any uplink transmission associated to any DCI (e.g. PUSCH, PRACH, HARQ A/N on PUCCH for SPS activation) received on the first PDCCH or associated to any corresponding downlink transmissions (e.g. CSI and/or HARQ A/N on PUCCH).

For example, a grant (and/or a request) received on the PDCCH of the PCell of the primary MAC instance may have higher priority that a grant (and/or a request) received on the PDCCH of a special cell of a secondary MAC instance. For example, a grant (and/or a request) received on the PDCCH of a SCell of the primary MAC instance may have higher priority that a grant (and/or a request) received on the PDCCH of a SCell of a secondary MAC instance.

For example, the WTRU may be configured explicitly such that a PDCCH may have an explicit priority.

For example, the WTRU may determine that control signaling received on a PDCCH has a first priority level (e.g. higher than) while control signaling received on ePDCCH may have a second priority level (lower than).

PDCCH search space: Such priority level or prioritization function may be a function of the location of the first Control Channel Element (CCE) of the DCI that the WTRU has successfully decoded by using the applicable RNTI (e.g. C-RNTI). For example, the WTRU may determine that different subsets of one or more CCEs represent different priority level for the associated DCI. The latter may be a configuration aspect of the WTRU. Possibly, such logical fragmentation of the resources of a control channel may be only applicable to the WTRU-specific search space (WTRUSS).

For example, the WTRU may determine the set of resources that corresponds to a WTRUSS for a given control channel. Additionally, the WTRU may be configured such that it may determine the starting location (first CCE) of a first subset of such WTRUSS as well as the number of subsequent CCE(s) (if any) that corresponds to the concerned subset. The WTRU may determine that CCEs that are part of the concerned WTRUSS but that are not associated to such subset represent a second subset of the WTRUSS. The WTRU may additionally determine (e.g. by configuration) that the first subset is associated with a first priority level and that the second subset is associated to a second priority level. In a subframe for which a prioritization function is applicable, the WTRU may determine the priority of a transmission associated with a successfully decoded DCI as a function of the location of the DCI in the WTRUSS.

Carrier Field Indicator (CFI): Such priority level or prioritization function may be a function of a field received in a DCI on a control channel.

For example, the WTRU may determine that control signaling received for a specific serving cell may have higher priority level than control signaling received for a second serving cell.

For example, the WTRU may determine that an uplink transmission for a specific serving cell may have higher priority level than an uplink transmission for a second serving cell.

For example, the Carrier Field Indicator (CFI) may be allocated to different serving cells such that a transmission associated to a cell with lowest CFI has the highest priority level, and subsequent (in increasing order of) CFI values are associated a lower priority level (in decreasing order of priority level).

As an example of a combination with another aspect described herein, the WTRU may determine such priority level in between cells with uplink resources associated to a specific MAC entity by first applying the highest levels to the MAC entity with highest priority. In particular, when the CFI space is WTRU-specific and common to all MAC entities of the concerned WTRU.

One possible consequence is that any cell may be configured to have highest priority when such prioritization level is applicable, assuming that any cell may be assigned any CFI value. Also, the PCell of the primary MAC entity and/or the special cell of the secondary MAC entity could be excluded from such rule or may be assigned specific priorities by configuration or by default.

TPC command: Such priority level or prioritization function may be a function of a TPC command received in a DCI (from PDCCH or E-PDCCH). The WTRU may apply a first prioritization function when the TPC command field has a first value and a second prioritization function when the TPC command field has a second value. For instance, the WTRU may determine that a transmission associated to a DCI with a specific value of the TPC field has a higher priority level than other transmissions. A transmission associated to a DCI may include a PUSCH in case the DCI contains an UL grant, or of PUCCH in case the DCI contains a DL assignment. Possibly, such determination is only made if the DCI is received from a specific cell, or from a cell of a specific MAC instance (say a primary MAC instance). Possibly, the prioritization may be applied to all transmissions of the MAC instance from which the DCI is received. Possibly, the prioritization may be applied until reception of signaling indicating a change of prioritization function.

In one example, reception of a TPC command field with value "3" from a primary MAC instance may result in the determination that the associated transmission has highest priority and/or that power sharing between MAC instances is performed according to an absolute priority. The WTRU may apply the TPC adjustment normally associated with the value "3". In another example, no such TPC adjustment is performed.

In another example, the WTRU may interpret a TPC command as a priority indication if such TPC command is received from a specific type of DCI or search space, such as if the TPC command is received from a DCI format 3/3A or is received from a common search space. In this case, the WTRU may still (or not) apply a TPC adjustment as per the legacy use of the TPC command. Possibly, such interpretation of the TPC command in DCI format 3/3A may be performed only if the WTRU also received at least one TPC command in one or more DCI's in the same subframe, such as DCI's containing an uplink grant and/or a downlink assignment. In other words, the TPC command received in DCI format 3/3A may be interpreted as a priority indication only in case an uplink transmission (either PUCCH or PUSCH) is dynamically scheduled in the same subframe.

In another example, reception of a TPC command field with value "3" from a primary MAC instance in the DCI containing a DL assignment may result in the determination that the number of coded symbols Q' used for HARQ A/N, in case HARQ A/N is sent over PUSCH, should be set to a higher value maximizing the chances of successful detection at the eNB. Such value may correspond, for instance, to 4 times the number of sub-carriers of the PUSCH allocation. Alternatively, such value may correspond to a different (e.g. higher) value $\beta_{offset}^{HARQ-ACK}$ applicable to this case, which may be provided by higher layers.

This approach may allow, for instance, the MeNB to request that a transmission of the primary MAC instance be assigned a higher priority to maximize chances of successful transmission of critical information. Such indication may override other prioritization rules such as those based on the type of transmission.

Serving Cell Index (servCell-index): such priority level or prioritization function may be a function of a configuration of the serving cell index (or identity) associated to the cell with uplink resources associated to a given MAC entity. This may be applicable in combination with a prioritization rule between MAC instances.

For example, the WTRU may determine that control signaling received for a specific serving cell may have higher priority level than control signaling received for a second serving cell as a function of the associated cell index and/or MAC entity.

For example, the WTRU may determine that an uplink transmission for a specific serving cell may have higher priority level than an uplink transmission for a second serving cell as a function of the associated cell index and/or MAC entity.

For example, the serving cell index may be allocated to different serving cells such that a transmission associated to a cell with lowest index has the highest priority level, and subsequent (in increasing order of) index values are associated a lower priority level (in decreasing order of priority level).

As an example of a combination with another aspect described herein, the WTRU may determine such priority level in between cells with uplink resources associated to a specific MAC entity by first applying the highest levels to the MAC entity with highest priority. In particular, when the serving cell index space is WTRU-specific and common to all MAC entities of the concerned WTRU.

One possible consequence is that the PCell of the primary MAC instance would have highest priority when such prioritization level is applicable, assuming that it remains with zero value by default. If the index of the PCell of the primary MAC instance may be configured, then the cell could be given flexible priority level by configuration.

Explicit indication (e.g. function/parameter set index)/flag (e.g. normal, absolute priority): such priority level or prioritization function may be a function of an indication in a DCI associated with the concerned transmission.

For example, the WTRU may receive a DCI that includes a grant for an uplink transmission and control bit(s) that indicates e.g. that the corresponding uplink transmission has absolute/highest priority (1 bit), that it has a priority level within a given range (e.g. multiple bits given the level as well as the range), that it should be handled according to a given prioritization function (e.g. multiple bits indicating the function) or that it may be transmitted using an alternative grant according to the indicated configuration (e.g. multiple bits indicating an index to an alternative grant).

This may be useful if control plane signaling is only transmitted in the uplink of a cell associated to a primary MAC entity (i.e. towards the MeNB), and if a WTRU is otherwise assuming that transmissions on a cell associated to a secondary MAC entity (i.e. towards a SeNB) has higher priority.

For example, the WTRU may receive a DCI that includes a downlink assignment for a transmission with control bit(s) that indicates e.g. that the corresponding uplink transmission for HARQ feedback has absolute/highest priority (1 bit), that it has a priority level within a given range (e.g. multiple bits given the level as well as the range), that it should be handled according to a given prioritization function (e.g. multiple bits indicating the function).

This may be useful if control plane signaling is only transmitted in the downlink of a cell associated to a primary MAC entity (i.e. towards the MeNB), and if a WTRU is otherwise assuming that transmissions on a cell associated to a secondary MAC entity (i.e. towards a SeNB) has higher priority.

For the purpose of explicit indication, a new field may be defined in a new or existing DCI format. Alternatively, it may be possible to overload an existing field, such that at least one value of such existing field may be interpreted as a priority indication. For instance, one may overload the "frequency hopping" field of DCI format 0 or DCI format 4, such that a specific value of this field is interpreted as an indication of high priority. In this case the existing interpretation of the frequency hopping field may not be followed.

In case an explicit indication (including possibly an indication from a TPC command) is received in both MAC entities in a given subframe, and both MAC entities indicate a high priority, the WTRU may determine which of the MAC entities will have high priority, based on a pre-defined priority rule (e.g. primary MAC entity has priority) or another priority rule.

Associated MAC entity (e.g. Primary, Secondary): Such priority level or prioritization function may be a function of the identity of the MAC entity associated to the concerned transmission.

For example, the WTRU may receive a grant on a PDCCH that schedules an uplink transmission that is associated with a serving cell that is applicable to a specific MAC entity (for the uplink). For such transmission i.e. PUSCH, the priority level may be higher for a primary MAC entity than for other transmissions associated to a cell of another MAC entity.

This may be useful if only control plane signaling is transmitted in the uplink of a cell associated to a MeNB.

For example, the WTRU may determine that it should transmit a signal (e.g. HARQ feedback on PUCCH, D-SR, or a preamble) in the uplink of a serving cell, which cell is associated to a primary MAC entity. For such signals, the priority level may be higher for a primary MAC entity than for other transmissions associated to a cell of another MAC entity.

This may be useful if only control plane signaling is transmitted in the downlink of a cell associated to a MeNB.

Type of grant (e.g. semi-persistent, dynamic, alternative grant): Such priority level or prioritization function may be a function of the type of the applicable grant, for example, semi-persistent, dynamic, or alternative grant.

For example, the WTRU may give higher priority to a configured grant than to a dynamically scheduled grant, if the grant received on the PDCCH does not otherwise override the configured grant. In other words, a priority rule may be associated to a subframe that may be periodically recurring as a function of the activation of a configured grant (uplink semi-persistent scheduling).

This could be useful to implicitly give higher priority to a SPS grant used for VoIP in the uplink of a cell of a primary MAC entity (e.g. a macro cell of the MeNB) when the WTRU receives a grant for a transmission for the secondary MAC instance (i.e. towards the SeNB).

Type of transmission (e.g. adaptive synchronous, non-adaptive synchronous): Such priority level or prioritization function may be a function of the type of transmission, for example, adaptive synchronous or non-adaptive synchronous.

For example, the WTRU may associate a priority level to a grant and/or to a corresponding transport block. For HARQ retransmissions for the concerned transport block, the WTRU may determine a first priority level (e.g. a lower priority) to a WTRU-autonomous, synchronous non-adaptive retransmission while it may determine a second priority level (e.g. a higher priority) to a dynamically scheduled, synchronous adaptive retransmission. Possibly, in the latter case, only if the corresponding control scheduling includes an explicit indication of the priority level.

This could be useful to ensure that a transmission for which a WTRU has actually received downlink control signaling has a higher priority level than otherwise, e.g. in case PDCCH misdetection may be an issue (for example, at the edge of a cell of the secondary MAC instance).

Type of HARQ transmission (e.g. initial, retransmission): Such priority level or prioritization function may be a function of the HARQ transmission, for example, initial transmission or retransmission.

For example, the WTRU may associate a priority level to a HARQ process e.g. at the time of the initial transmission for the concerned HARQ process. Possibly, such associated priority level may be modified for the ongoing process as a function of another event, e.g. reception of control signaling for an adaptive retransmission that indicates a higher priority level than the level determine in a previous HARQ transmission for the concerned process. For example, the WTRU may determine that a grant for an initial HARQ transmission for a first transport block may be given a higher priority level than e.g. a grant for an adaptive retransmission or a non-adaptive retransmission for a second transport block, possibly for which the corresponding initial transmission had a lower priority level. For example, the WTRU may determine the relative priority level between a grant for an initial HARQ transmission and a HARQ retransmission by comparing the priority level of the corresponding initial transmission for the respective ongoing HARQ process.

As another example, the WTRU may determine that the priority level associated with the previous transmission for a given HARQ process is extended to the next HARQ transmission for the same transport block, unless the WTRU determines that a different priority level should be applied (e.g. according to any of the approaches described herein).

In an example approach, in case of resegmentation for a retransmission, the extension of the priority may apply to any transmission that may contain a segment of the data included in the resegmented transmission unit.

This could be useful to ensure that a transmission that initially benefits from some priority can continue with such priority until it either succeeds or fail in either the DL offload or the DL throughput cases.

HARQ process identity (e.g. range of TTIs, ongoing process): Such priority level or prioritization function may be a function of the timing of the HARQ process that handles the transmission.

For example, the WTRU may implement rules such that in a given (possibly configurable) set of TTIs (e.g. first TTI of a radio frame or subframe #0) any uplink transmission(s) associated to the primary MAC entity is associated to a higher priority level while for a second set (possibly configurable) of TTIs (e.g. the other TTIs in the radio frame or subframe #1-#9) any uplink transmission(s) associated to the secondary MAC entity is associated to a lower priority level.

Possibly, in the configuration, all subframes may refer to timing associated to a single MAC entity.

Alternatively, the WTRU may receive control signaling that sets a specific priority to a given HARQ process and/or TTI. Such control signaling may activate such priority. Such priority may be time-limited such as until the WTRU receives further control signaling that deactivates the non-default priority. Possibly, such signaling may only be applicable to a single MAC entity (e.g. it may be controlled by a single eNB).

Number of transmission for the concerned HARQ process (threshold): Such priority level or prioritization function may be a function of the number of transmissions for a HARQ process.

For example, the WTRU may determine that for a given HARQ process, if the number of HARQ transmissions reaches the maximum number of HARQ transmissions minus X (where X may be a configuration aspect), the WTRU may determine that any subsequent transmission(s) for the concerned HARQ process may have a higher priority level. Possibly, only if one or more prioritization functions have been applied to at least one transmission for this HARQ process. Possibly, only for a subset of the HARQ processes, which subset may be a configuration aspect of the WTRU. In other words, some (or all) HARQ processes may be configured such that the priority level associated to the corresponding transmission may vary as the number of retransmissions increase. Possibly, this may be configured per serving cell, of for all cells of a given MAC entity, or for all cells of the WTRU's configuration.

Redundancy version (RV) for the HARQ transmission (e.g. 0-4): Similarly as for the number of transmission for the HARQ process as described above, such priority level or prioritization function may be a function of the RV applicable for the concerned transmissions. For example, the WTRU may determine that the priority level of a transmission increases as it cycles through the sequence of RV for each HARQ transmissions. Alternatively, a specific priority may be associated to a specific redundancy version index.

Type of data/signal for the transmission (UP/CP vs UCI, HARQ A/N vs D-SR vs SRS, PMI/CQI/RI): Such priority level or prioritization function may be a function of the type of data that is included in the concerned transmission. For example, the WTRU may determine that a transmission that includes control plane data (i.e. from SRB) has higher priority than a transmission of user plane data (e.g. for either a primary or a secondary MAC entity) or than transmission of HARQ A/N feedback on PUCCH (e.g. for a secondary MAC entity).

Such priority level or prioritization function may be a function of the type of signal for the concerned transmission. For example, the WTRU may determine that a transmission for HARQ A/N feedback (either on PUCCH or on PUSCH) has higher priority than any other transmissions.

For example, the WTRU may determine that the priority levels are according to the following (in decreasing priority order):
PUCCH that includes HARQ A/N feedback;
PUSCH that includes HARQ A/N feedback;
PUSCH that includes control plane signaling;
Preamble on PRACH;
PUCCH that includes SR;
UCI on PUCCH;
UCI on PUSCH;
PUSCH that includes user plane data;
SRS.

As an example of a combination with another approach herein, the WTRU may determine that the priority levels are according to the following (in decreasing priority order):
PUCCH that includes HARQ A/N feedback, for PCell of Primary MAC entity;
PUSCH that includes HARQ A/N feedback, for PCell of Primary MAC entity;
PUSCH that includes control plane signaling, for PCell of Primary MAC entity;
Preamble on PRACH, for PCell of Primary MAC entity;
HARQ A/N and/or UCI on PUCCH, Secondary MAC entity;
HARQ A/N and/or UCI on PUSCH, Secondary MAC entity;
PUSCH that includes user plane data, for any cell of the Secondary MAC entity;
Preamble on PRACH, for any cell of Secondary MAC entity;
PUSCH that includes user plane data, for any cell of the Primary MAC entity;
Any other type of transmissions (e.g. UCI, SRS) on any configured serving cell.

Type of data in the transport block for the transmission (RRC/NAS PDU, RRC procedure, SRB vs DRB, RB_id): Such priority level or prioritization function may be a function of the type of bearer that is associated with the data included in the uplink transmission.

For example, the WTRU may determine that a transmission associated to control plane data, e.g. for transport blocks that include data from a SRB, has a higher priority level than any user plane data.

This could be useful to ensure that control plane signaling always have priority in any scenario.

RNTI used to decode DCI (e.g. first and second RNTI have different priority levels: Such priority level or prioritization function may be a function of the RNTI used to successfully decode a DCI on PDCCH. For example, the WTRU may attempt to decode DCIs using a plurality of RNTIs (possibly configured) such that a first RNTI indicates a higher priority level while a second DCI indicates a lower priority level. In another possibility, a standalone priority indication may be included in a new or modified DCI format decoded with a specific RNTI.

Aggregation level (e.g. AL8 may indicate higher priority level): Such priority level or prioritization function may be a function of the aggregation level associated to a successfully decoded DCI on PDCCH. For example, the WTRU may determine that a DCI decoded with the highest applicable AL indicates a higher priority level while other AL indicates a lower priority level.

Type of physical channel/signal (PUCCH vs PUSCH, SRS, D-SR, PRACH): Such priority level or prioritization function may be a function of the type of physical channel associated with the transmission. For example, the WTRU may determine that any PUCCH transmission has higher priority level than other types of transmissions. For example, the WTRU may determine that any SRS transmission has a lower priority level.

Type of trigger that initiated the transmission: Such priority level or prioritization function may be a function of the event following which the WTRU has initiated the transmission.

For example, the WTRU may determine that the transmission (or retransmission) of a first preamble associated to a contention-free random access procedure (e.g. such as initiated from the reception of a DCI from the network) has higher priority than the transmission of a second preamble associated to a contention-based random access procedure (e.g. such as initiated autonomously by the WTRU from a scheduling request). In such case, the WTRU may determine that it should perform the transmission of the first preamble according to any applicable control information, while the transmission of the second preamble may be postponed to a subsequent PRACH occasion.

Determination that scaling would be required: Such priority level or prioritization function may be a function of whether power scaling would need to be applied or not applied based on the selected transmission. For instance, a WTRU may determine that scaling may be applied on a PUSCH transmission containing UCI or a specific type of UCI (e.g. HARQ A/N) in a certain subframe. In this case, the WTRU may determine that such UCI or HARQ A/N is transmitted over PUCCH instead of PUSCH, and drop the PUSCH transmission. Possibly, such determination may be subject to the additional condition that the WTRU determines that scaling would not need to be applied on the PUCCH transmission. The PUCCH resource used in this case may be the resource tied to the DL assignment according to existing rules for the case of no PUSCH transmission.

Amount of power backoff required (MPR, A-MPR): Such priority level or prioritization function may be based on the amount of power backoff required. For example, the WTRU may determine that a certain amount of power backoff (e.g. MPR) is required for transmissions associated to a first MAC entity and another amount for transmissions associated to a second MAC entity; it may determine to prioritize transmission(s) associated to the MAC entity that requires the largest amount. Possibly, only if the resulting power allocated is above a certain threshold.

Furthermore, it should be noted that such priority level may be a function of any combination of the above.

In one approach, the WTRU may determine the priority level or prioritization function applicable to transmission(s) for a given TTI as a function of configurable rules.

In one approach, the WTRU may be configured with a (possibly semi-static) priority for uplink transmissions. Such priority may be applicable for uplink transmissions between different MAC instances. For example, the WTRU may be configured such that in a given transmission time interval (TTI), the WTRU always prioritizes an uplink transmission associated to the Uu interface of the MeNB (herein referred to as the primary MAC entity). For example, such priority may be configured by physical channel type (e.g. PUSCH, PUCCH, PRACH), signal type (e.g. SRS), type of content in a transport block (e.g. SRB, DRB), by subframe configuration, or the like (similarly as for elements described in dynamic rules below).

For example, a WTRU may be configured such that any uplink transmission associated to a primary MAC entity has higher priority than those associated to a secondary MAC instance. This could be useful in a DL offload scenario where only control plane data is being scheduled by the MeNB using the primary instance.

For example, a WTRU may be configured such that any uplink transmission associated to a SRB has higher priority than those associated to a DRB. This could be useful in a UL/DL throughput scenario.

For example, a WTRU may be configured such that any uplink transmission associated to a SRB has higher priority than those associated to any DRB, while any uplink transmission associated to a DRB of a secondary MAC entity and which DRB is only associated to the secondary MAC entity has higher priority than other DRB(s).

This could be useful in a DL throughput scenario with L2 architecture 1A such that starvation may be avoided for such DRB. A MeNB that determines that DL throughput is impacted possibly from such prioritization may reconfigure the WTRU accordingly (the converse may not be possible).

Static rules are described further herein.

In one approach, the WTRU may determine the priority level or prioritization function applicable to transmission(s) for a given TTI as a function of pre-defined rules.

For example, the WTRU may allocate a higher priority to the transmissions of a HARQ process associated with a configured grant than to a transmission associated to another process. For example, the WTRU may perform power scaling such that a PUSCH transmission that is dynamically scheduled for a HARQ process that is not associated with a configured grant is allocated power after a process with a configured grant (whether or not the transmission is adaptive).

For example, the WTRU may allocate a higher priority to the transmissions of HARQ feedback for a HARQ process associated with a configured assignment than to a transmission associated to another HARQ process. For example, the WTRU may perform power scaling such that a transmission that includes HARQ feedback for a HARQ process that is not associated with a configured grant is allocated power after a transmission that includes HARQ feedback for a process with a configured assignment (whether or not the downlink transmission was adaptive).

Precedence between priority rules and prioritization functions is described further herein.

In case it is not possible to differentiate between two transmissions according to a first priority rule, a second priority rule may be utilized to determine which of the two transmissions is prioritized, according to a pre-determined precedence order between priority rules. For instance, a first priority rule may be to prioritize a transmission that includes HARQ A/N feedback. In case two transmissions carry HARQ A/N feedback, the prioritized transmission may be determined according to a second priority rule which may be to prioritize a transmission associated to a primary MAC entity over a transmission associated to a secondary MAC entity. In the above case the priority rule based on carrying of HARQ A/N feedback has precedence over the priority rule based on associated MAC instance. It would also be possible that the priority is determined first based on associated MAC instance, and only if the associated MAC instance is the same the priority is then determined according to whether the transmissions carry HARQ A/N.

In one example, a first priority rule may be based on a type of transmission and/or type of UCI, such as whether a transmission carries HARQ A/N in PUCCH or PUSCH. In case two transmissions from different MAC instances (or cell groups) have equal priority with respect to the first priority rule (e.g. both carry HARQ A/N, or both carry HARQ A/N over the same physical channel), the prioritized transmission may be selected according to at least one of:
  a. Signaling or configuration from the network. For instance, the WTRU may be receive an indication from higher layers of which cell group's transmission is prioritized in this case. In another example, the WTRU may determine the priority based on a downlink control information field associated to one of the transmissions. For instance, the WTRU may prioritize a transmission of a primary MAC instance (MCG) if the TPC field of the associated grant or assignment indicates an increase of power, and a secondary MAC instance (SCG) otherwise.

b. The values of other parameters that may be related to power prioritization. For instance, the transmission selected for prioritization may be the one associated to the cell group for which the highest, or the lowest, amount of guaranteed power is configured. In another example, the transmission selected for prioritization may be the one taking place on the serving cell which has the lowest (or highest) cell identity (PCI), the lowest (or highest) serving cell identity, or the lowest (or highest) frequency (or E-ARFCN).
c. The amount of UCI information bits in the transmission (CSI and/or HARQ-A/N information).
d. The transmission timing. For instance, the WTRU may prioritize the earliest (or the latest) between the two transmissions.
e. A function of at least one amount of power that may be associated to the transmissions to be prioritized, in absolute units (linear) or relative to a configured maximum power, such as an amount of desired (or required) power, a portion of power allocated from the guaranteed power, a portion of the non-guaranteed power that is still available, or an amount of power that would be allocated if a transmission would be prioritized. For instance, the following quantities could be used:
  i. The difference between the desired power and the allocated power for each transmission (i.e., the "missing power"), either in linear or in dB terms, that would exist assuming that one transmission was prioritized over the other. For instance, the WTRU may select the transmission such that the minimum value between the missing powers is the smallest possible, thus maximizing the probability that at least one transmission is successful. For instance, if the missing powers of both transmissions would be 0 dB and 3 dB if a first transmission would be prioritized, and the missing powers would be 1 dB and 1.5 dB if a second transmission would be prioritized, the WTRU may determine that the first transmission is prioritized. Alternatively, the WTRU may select the transmission such that the maximum value between the missing powers is the smallest possible. Using the same example as above, the WTRU would then determine that the second transmission is prioritized.
  ii. The amount of desired power of the transmission, possibly net of any portion already allocated from a guaranteed power. For instance, the WTRU may prioritize the transmission for which the desired power is the smallest (or the largest).

In another example, a first prioritization function, such as MAC sharing based on guaranteed available power, may be applied only in a case where the same priority (e.g. between MAC instances) is determined according to a second prioritization function. For instance, the second prioritization function may determine priority based on whether a HARQ A/N is included in a transmission of a MAC instance.

Additional power headroom report (PHR) triggers are discussed further herein.

In an example approach, PHR may be triggered as a consequence of insufficient transmit power resulting from concurrent scheduling.

More specifically, the WTRU may trigger a PHR if it determines that it has insufficient available power. Possibly, the WTRU may trigger a PHR only if the WTRU performs transmissions that at least partly overlap between two subset of transmissions, e.g. between transmissions associated to different CGs. Possibly, the WTRU may trigger a PHR only if such transmissions correspond to the same subframe in both CGs.

PHR trigger condition may be based on insufficient available power or due to scaling event: The WTRU may trigger the PHR if it determines that it should perform scaling of power to at least one transmission. Possibly, the WTRU only triggers PHR where such scaling is performed if the WTRU performs transmissions that at least partly overlap between two subset of transmissions, e.g. between transmissions associated to different CGs. Possibly, the WTRU may trigger a PHR only if such transmissions correspond to the same subframe in both CGs. Possibly, the WTRU may trigger a PHR only if scaling occurs because the WTRU would have otherwise exceeded the total available transmission power for the WTRU.

The terms "Scaling event" or "determination of insufficient power" may be used interchangeably in methods below: In the description of methods below either a scaling event or determination that power is insufficient may be used interchangeably. When a method refers to a scaling event, it is understood that the method is equally applicable to a trigger based on determination that power is insufficient, and vice-versa. It is understood that those methods may be also equally applicable with any other prioritization function described herein. Methods described herein may be used by themselves or in different combinations.

Trigger may be conditional to the definition of insufficient power—e.g. total WTRU power is exceeded: In one method, the WTRU may trigger such PHR only if it determines that the required transmission power for all transmissions of the WTRU for the concerned subframe exceeds the total WTRU available power.

Example with P_MeNB and P_SeNB has maximum power per CG: For example, the WTRU may be configured with a maximum transmit power for different subsets of transmissions (or cells) i.e. the WTRU has a maximum available transmission power per CG. The sum of the maximum allocated for each may exceed the total available WTRU power. In this case, the WTRU may trigger a PHR only if the power required in each subset does not exceed its maximum allocation but the sum of the required power across all transmissions of the WTRU exceeds the total available WTRU power. In other words, the WTRU may have insufficient power to allocate to a subset of transmissions (e.g. power available per CG may be insufficient) but the WTRU may not trigger a PHR if the total WTRU available power is not exceeded.

Example with P_MeNB (and optionally P_SeNB) as minimum guaranteed power per CG: For example, the WTRU may be configured with a minimum guaranteed power for at least one subset of transmissions (or cells) i.e. the WTRU may have a minimum guaranteed available transmission power for at least one CG. In this case, the WTRU may trigger a PHR only if the sum of the required power across all transmissions of the WTRU exceeds the total available WTRU power.

A PHR trigger may be conditional to specific criterion that increased the power requirement—e.g. scheduling. In one method, a PHR may be triggered if power-limited/scaling occurs and a power requirement increases.

The WTRU may trigger a PHR only on a condition that it determines that it has insufficient available power (or that power scaling was applied) due to an increase in the required power for at least one CG.

For example, the WTRU may determine that the increase in power requirement for a CG is mainly due to scheduling requirement from control signaling received for the concerned CG, and not mainly due to a change in pathloss (e.g. the change in pathloss estimation did not exceed a threshold e.g. similar to the condition for the PHR trigger due to change in pathloss). For example, the WTRU may be scheduled for transmissions with increased number of PRBs, such that power requirement is exceeded for the WTRU at least in part due to such increase.

PHR triggered if a power requirement increases by a certain amount: For example, the WTRU may determine that the power requirement of a CG has increased by a certain amount. The WTRU may consider the difference in power used from one subframe to another, or over a certain period (e.g. using a window-based mechanism) during which the WTRU is scheduled for transmissions in the CG. For instance, the WTRU may consider an average over the window or a maximum value over the window. Possibly, the period may correspond to the period since the last time PHR was triggered or transmitted, or alternatively a period corresponding to the last N subframes where N may be fixed or configured. Possibly, the WTRU may only consider subframes in which it performs transmissions. Possibly, only for such subframes in which the WTRU is scheduled for transmissions in both CG. The threshold used by the WTRU to determine that power for a CG has increased such that the WTRU should trigger a PHR may be a configuration aspect of the WTRU. The reference value for the increase may correspond to the value at the time PHR was last triggered or was last reported, or may be a configured value.

PHR triggered if a power requirement increases to a certain level: For example, the WTRU may determine that the power requirement of a CG has increased beyond a certain value in a given subframe or during a certain period (e.g. by tracking power using using a moving average). Possibly, the WTRU may only consider subframes in which it performs transmissions. Possibly, only for such subframes in which the WTRU is scheduled for transmissions in both CG. Possibly, the threshold used by the WTRU may also be a configurable aspect. Possibly, the threshold used by the WTRU may correspond to the amount of reserved power for the concerned CG e.g. the WTRU triggers such PHR when it determines that the power requirement for the CG exceeds the minimum guaranteed power for the CG.

Methods for determining an increase in power requirements or power requirement level: Possibly, for any of the above, the WTRU may consider only the power allocated to transmission(s) associated to a subset of transmissions, such as transmissions of a certain physical channel or signal or for certain serving cells. For instance, the WTRU may consider PUSCH transmissions only, or PUSCH and PUCCH transmissions only. Possibly, for any of the above, the WTRU may consider only the power allocated to transmission(s) that are dynamically scheduled. Possibly, for any of the above, the WTRU may consider an increase in power requirement based on the amount of increase in total bandwidth (or number of resource blocks), for PUSCH transmissions, or in a factor related to the modulation and coding (Delta_TF) or format of the PUSCH or PUCCH transmission, or a factor related to a TPC command (or accumulation thereof) for the PUSCH or PUCCH transmission. Possibly, for any of the above, the WTRU may consider an increase in power requirement based on an increase of downlink path loss estimate. The WTRU may consider a potential increase in power requirement based on an increase of configured maximum power per cell or a configured maximum power per cell group. Possibly, for any of the above, the WTRU may determine a power requirement based on a power headroom or a virtual power headroom, and correspondingly consider an increase in power requirement based on a reduction in power headroom or a reduction in virtual power headroom.

For any of the above, the WTRU may consider the total power requirements from transmissions of all serving cells of the CG. Alternatively, the WTRU may consider the power requirements from each cell of the CG separately and trigger PHR if the condition is met for at least one of the cells. Alternatively, the WTRU may consider an average power requirement.

PHR may be triggered from decrease in power requirement: In some solutions, the WTRU may trigger PHR if the power requirement of a CG has decreased by a certain amount. The WTRU may use any metrics or criteria described herein for determining the power requirement, however the trigger may occur upon a determination of decrease of power requirement instead of an increase. If the power requirement of the cell group is determined from power headroom, the trigger may then occur when the power headroom increases.

PHR is triggered as a function of the amount of scaling applied, or amount by which available power is exceeded: Possibly, the WTRU may trigger such PHR only if the amount of scaling applied exceeds a specific value.

PHR may be triggered only if the power situation is non-transient: Possibly, the WTRU may trigger such PHR only if scaling has occurred (or if power has been insufficient) for a certain period of time that exceeds a specific amount of time, or for a number of subframes in which the WTRU had overlapping transmissions that exceed a specific number of subframes, i.e. such that the condition for triggering the PHR is not transient but persistent. Such specific value may be either specified or configured (e.g. using a timer). Such value may be set to 1 subframe (or 1 ms) such that a single event may trigger the PHR, or set to 0 to disable such PHR trigger. The WTRU's count in this case may be reset for any transmission of a PHR (or for any trigger) for the concerned CG(s).

PHR may be triggered to both CGs, or a single CG: Possibly, a PHR is triggered for both CGs. Possibly, the WTRU may perform additional processing to determine whether a PHR is triggered towards one CG only or both. For example, the WTRU may trigger a PHR for both CG as a result of any type of scaling event. For example, the WTRU may trigger a PHR for a second CG when it scales the power (possibly even down to 0) of at least one transmission associated to a first CG. For example, the WTRU may trigger a PHR for both CGs when it scales the power (possibly even down to 0) of at least one transmission associated to each CG. Possibly, if the WTRU determines that scaling was applied due to an increase in power required for transmissions for one CG, the WTRU triggers the PHR only for that CG. For all cases, optionally the WTRU may trigger the PHR for the concerned CG only if the associated prohibit timer is not running. A prohibit timer may be associated to a specific PHR type and/or trigger.

The PHR trigger may be cancelled once a PHR is transmitted. Possibly, such trigger may be cancelled earlier if the WTRU determines in a subframe subsequent to the one that triggered the PHR that the condition that triggered the PHR is no longer met, e.g. that power scaling is not applied while both CGs are performing uplink transmissions that overlap, and possibly only if there is at least one PUSCH transmission for each CG in the concerned subframe.

Possibly, PHR is triggered as a consequence of insufficient transmit power resulting from concurrent scheduling only if WTRU functionality is impacted negatively.

The WTRU may apply a prioritization function such that the resulting outcome impairs the WTRU from performing another function.

In an example approach, PHR may be triggered in a second MAC entity following SR failure in first MAC entity.

For example, such function may be one of a scheduling request e.g. transmission of SR on PUCCH failed and at least one of: the WTRU has scaled the transmission power for at least one of the transmission attempt(s) and/or dropped the transmission. Alternatively, it may be any SR including one performed using random access (RACH).

In an example approach, PHR may be triggered in a second MAC entity following HARQ failure in first MAC entity.

For example, such function may be a HARQ process that reaches maximum number of transmissions (i.e. the process is unsuccessful) and at least one of: the WTRU has scaled the transmission power for at least one of the transmission attempt(s) and/or has dropped at least one of its associated (re)transmissions and/or has used an alternative grant for the transmission of a TB.

In an example approach, PHR may be triggered in a second MAC entity following a determination that QoS not met in first MAC entity.

For example, such function may be a Logical Channel Prioritization procedure that fails to meet the required prioritized bitrate and at least one of: the WTRU has scaled the transmission power for at least one of the transmission attempt(s) and/or has dropped at least one of its associated (re)transmissions and/or has used an alternative grant for the transmission of a TB. Possibly, over certain period of time e.g. integer multiple of a bucket delay.

For example, such function may be the discarding of at least one PDCP SDU due to the expiration of the associated PDCP Discard Timer and at least one of: the WTRU has scaled the transmission power for at least one of the transmission attempt(s) and/or has dropped at least one of its associated (re)transmissions and/or has used an alternative grant for the transmission of a TB. Possibly, when a certain number of SDUs have been discarded over a specific period of time.

For example, such function may be the state of the WTRU's buffers, such as when the head of queue delay (or when the oldest SDU in the PDCP buffer) becomes larger than a specific threshold. This may be based on the SDU Discard Timer reaching a specific value. In another approach, this may be based on the average value of the SDU Discard Timer at the time where the SDU is removed from the queue (including due to successful transmission and due to discard events) and maintained for all SDUs in the WTRU's buffer; the WTRU may determine that further action(s) is needed when such average exceeds a specific threshold (e.g. the time of stay in the WTRU's buffer is generally increasing beyond a certain limit). Possibly, when computer over a specific period of time. Possibly, when combined with at least one of: the WTRU has scaled the transmission power for at least one of the transmission attempt(s) and/or has dropped at least one of its associated (re)transmissions and/or has used an alternative grant for the transmission of a TB.

For example, such function may be the state of the WTRU's buffers, for example where the amount of data in the WTRU's buffer becomes larger than a specific threshold. This may be based on the reported BSR reaching a specific value (possibly in terms of the sum for all configured LCGs). In another approach, this may be based on the rate at which the data accumulates in the WTRU's buffer is generally increasing beyond a certain limit). Possibly, when computer over a specific period of time. Possibly, when combined with at least one of: the WTRU has scaled the transmission power for at least one of the transmission attempt(s) and/or has dropped at least one of its associated (re)transmissions and/or has used an alternative grant for the transmission of a TB.

In an example approach, PHR may be triggered upon change of prioritization function or associated parameters. For example, the WTRU may receive physical layer, MAC signaling or RRC signaling indicating a change of parameter(s) affecting power sharing between MAC instances, such as a set of guaranteed available power(s) for at least one MAC instance. In another example, the WTRU may receive signaling indicating a change of prioritization function, such as from power sharing between MAC instances performed according to an absolute priority to power sharing between MAC instances performed based on a guaranteed available power, or vice versa. In another example, the WTRU may reduce or increase a guaranteed available power for at least one MAC instance as a result of determining that at least one bearer does not meet a QoS criterion, as described herein (PHR may be triggered upon change of priority between MAC instances and scaling may be applied.)

In an example approach, PHR may be triggered upon change of priority between MAC entity and with the condition that the WTRU applies a prioritization function. For example, the WTRU may receive physical layer signaling or MAC signaling indicating a change of parameter(s) affecting power sharing between MAC instances, such that absolute priority is assigned to a specific MAC instance. The WTRU may trigger a PHR if a prioritization function is required such that power scaling is applied to the MAC instance with lower priority in the first TTI subsequent to the reception of the control signaling in which the WTRU performs at least one transmission associated to each MAC instances. Possibly, the WTRU triggers the PHR in the TTI corresponding to the concerned transmissions.

In another example, the WTRU may reduce or increase a guaranteed available power for at least one MAC instance as a result of determining that at least one bearer does not meet a QoS criterion, as described herein above.

In an example approach, triggered reporting may include a PHR report, or something else e.g. QoS satisfaction, UL Radio Link Problems, etc.

In any of the cases above, the WTRU may initiate a procedure that reports some state to an eNB.

For example, the WTRU may trigger a PHR in a second MAC entity if the WTRU determines that at least one of the above events has occurred for a first MAC entity.

For example, the WTRU may trigger a PHR report for each of the configured MAC entities when it receives a first grant following the initial configuration of a secondary MAC entity. In one approach, the WTRU may transmit a PHR report that includes a PH value computed based on all the transmission(s) performed in the TTI corresponding to the transmission of the PHR (i.e. using all received grants). Possibly, only if the WTRU performs at least one transmission associated to each of the configured MAC entities. In one approach, the WTRU may transmit a PHR report that includes PH value(s) computed according to legacy approaches for the concerned first MAC entity (the one associated with the transmission of the concerned PHR) and that additionally includes PH value(s) for a second MAC entity which values are computed using a pseudo grant. Such grant may be a grant equivalent to the one used for the transmission of the PHR, or a predefined grant. Possibly, the same approach may be applied for the PHR associated to the second MAC entity. For the latter case, the PHR is transmitted according to the principle where (the WTRU reports its power situation if the same grant was used in the same time instant for transmissions towards each eNB).

PHR reporting—When to transmit PHR may be a function of the type of trigger: In legacy systems, where a PHR is triggered the WTRU may include a PHR in the first subframe for which the WTRU has uplink resources available for a transmission. With dual connectivity, where a PHR is triggered, the WTRU may determine that the PHR may be transmitted in a given subframe using more specific rules.

In one approach, the WTRU may determine in what subframe (or using what uplink resources) it should include a PHR for a given trigger as a function of the type of event that triggered the PHR (or PHR trigger). For example, if the event that triggered the PHR is related to a change in the power situation of the WTRU that may affect the power situation only for transmissions in a single CG then the WTRU may include a PHR in the first subframe for which it only has uplink resources for transmission(s) in that CG (hereafter a "CG-specific PHR trigger"); otherwise, it may include a PHR only in the first subframe for which it has uplink transmissions in both CGs (hereafter a "WTRU-specific PHR trigger"). Examples of events that may be considered to affect the power situation for both CGs include a configuration received by the WTRU that modifies PHR reporting for both CG (e.g. such that PHR reporting is enabled for both), a configuration that modifies the prioritization function (e.g. a function for sharing power between CGs changing between semi-static power split and dynamic power sharing) and/or one or more parameters of the prioritization function used for power sharing between CGs (e.g. P_MeNB, P_SeNB), determination of a change in the synchronization between CGs (a change between synchronized and asynchronous) and the like. Examples of events that may be considered to affect the power situation of a single CG include a configuration received by the WTRU that modifies PHR reporting for that CG (such that PHR reporting is enabled or reconfigured, and not disabled), a change in activation state for one or more SCell(s) of the CG with configured uplink, the expiration of a CG-specific periothcPHR-Timer, a change in the path loss for at least one cell of the CG e.g. that triggers a PHR for the CG, and the like.

If multiple PHR triggers occur before any PHR can first be transmitted, and if at least one is of the "CG-specific PHR trigger" type and at least one is of the "WTRU-specific PHR trigger" type, the WTRU may perform at least one of the following: The WTRU may include a PHR according to logic associated to each PHR trigger, e.g. which may result in PHR being included in multiple transmissions across more than one subframe. For example, in this case the WTRU may perform PHR reporting in the first subframe for which it only allocate power for transmissions associated to a single CG (possibly, once for each CG in case there is at least one CG-specific trigger for each CG) and also for in the first subframe for which it allocates power for at least one transmission for each CGs. In this case, the result may be that the WTRU would transmit PHR for the CG-specific trigger with value(s) associated to the CG only as well as associated with both CGs by considering "virtual transmission" parameters for the other CG, while the WTRU would transmit PHR for the WTRU-specific trigger with value(s) associated to actual transmissions in each CG. The WTRU may include a PHR according to logic applicable to the first subframe for which the WTRU has uplink resources available for transmissions. For example, in this case the WTRU would perform PHR reporting according to the CG-specific trigger if the first subframe with available uplink resources for transmissions is for transmission(s) a single CG. For example, in this case the WTRU would perform PHR reporting according to the WTRU-specific trigger if the first subframe with available uplink resources for transmissions is for at least one transmission for each CG.

Prohibit timer for PHR type: The WTRU may support different PHR types (e.g. formats). For example, one format may be used to report power information related to scheduling in a single CG while another format may be used to report power information related to concurrent scheduling in more than one CG. For each type, a different trigger may be defined.

Possibly, the WTRU may be configured with a prohibit timer (e.g. to limit the frequency of the reporting mechanism) for a specific type of PHR. For example, the WTRU may be configured to report PHR for concurrent scheduling in more than one CG at most once per specific period, or alternatively using a different restriction period than for another PHR type.

Periodic by PHR type: The WTRU may be configured to periodically report PHR for a specific type. For example, the WTRU may be configured to report PHR for concurrent scheduling in more than one CG only, or alternatively using a different period than for another PHR type.

Reporting QoS not met: In an example, the WTRU may trigger a report related to QoS state for the concerned MAC entity (e.g. the victim MAC entity for which one or more function(s) has not been successful). Such report may be transmitted using resources associated to a second MAC entity (e.g. the MAC entity).

In an example, a WTRU may initiate a notification procedure For example, the WTRU may trigger a L3 notification procedure.

Another possible approach to handle D-SR is to not increment the SR count is the transmission of SR on PUCCH may not be performed, e.g. according to the following:

For this MAC entity, as long as one SR is pending, the WTRU shall for each TTI:
if no UL-SCH resources are available for a transmission in this TTI:
if the WTRU has no valid PUCCH resource for SR configured in any TTI: initiate a Random Access procedure (see subclause 5.1) on the PCell and cancel all pending SRs;
else if the WTRU has a valid PUCCH resource for SR configured for this TTI and if this TTI is not part of a measurement gap and if sr-ProhibitTimer is not running:
if SR_COUNTER<dsr-TransMax:
increment SR_COUNTER by 1;
instruct the physical layer to signal the SR on PUCCH;
if the WTRU can allocate sufficient power for the transmission of SR on PUCCH in this TTI:
increment SR_COUNTER by 1;
start the sr-ProhibitTimer.
else:
notify RRC to release PUCCH/SRS for all serving cells;
clear any configured downlink assignments and uplink grants;
initiate a Random Access procedure (see subclause 5.1) on the PCell and cancel all pending SRs.

Possibly, the above approach may be bounded in time. For example, the WTRU may delay a D-SR transmission due to insufficient available power only up to a maximum amount of time. The WTRU may thus additionally consider that it has reached the maximum amount of D-SR transmission attempts when the delay reaches or exceeds such maximum.

The following discussion relates to uplink control information transmission approaches. In some approaches, transmission of UCI, or of certain type of UCI such as HARQ, CSI or SR may be restricted to a subset of subframes for a given MAC instance. Furthermore, the subsets of subframes may be configured such that there is never simultaneous transmission of UCI in two MAC instances, as will be shown in examples below. The restriction may apply only to UCI, or to a subset of UCI (such as HARQ), while not applying to other types of uplink transmissions such as PUSCH without UCI. Alternatively the restriction may apply to all types of uplink transmissions. This approach has the benefit of preventing scaling down the transmission power of UCI for one (or both) of the MAC instances when the maximum configured transmission power would be exceeded in a subframe. The approach may be combined with approaches for prioritization wherein transmissions carrying UCI or certain types of UCI are prioritized over transmissions not carrying UCI, possibly irrespective of which MAC instance they pertain to. The restriction may be applied for either FDD or TDD, with different configurations.

When a restriction is configured on UCI transmission for a MAC instance, the timeline of HARQ feedback with respect to the PDSCH transmission for which feedback is provided may be modified to allow for continuous transmission in the DL. This is demonstrated in the following example approaches.

In one example approach (for FDD), HARQ feedback may be restricted to 4 out of 10 subframes for a MAC instance, where the 4 subframes may occur in two consecutive pairs of subframes. For instance, in one MAC instance the set of subframes configured for HARQ feedback may be the set {0, 1, 5, 6}. With this approach, for instance, subframe 0 may carry HARQ feedback for PDSCH transmissions having occurred in subframes {3, 4} of the previous frame, subframe 1 may carry HARQ feedback for PDSCH transmissions having occurred in subframes {5, 6, 7} of the previous frame, subframe 5 may carry HARQ feedback for transmissions having occurred in subframes {8, 9} of the previous frame and subframe 0 of the current frame, and subframe 6 may carry HARQ feedback for transmissions having occurred in subframes {1, 2} of the current frame. Other arrangements are possible. In a second MAC instance, the set of subframes configured for HARQ feedback may be the set {2, 3, 7, 8} if subframe 0 of the second MAC instance starts between the beginning and the end of subframe 0 of the first instance. This configuration completely avoids simultaneous transmission of HARQ feedback, even if transmissions from both MAC instances are not synchronized at the subframe level.

In a second example approach (for FDD), HARQ feedback may be restricted to 3 out of 8 subframes for a MAC instance, where the 3 subframes may occur consecutively. With this type of approach, the subframes that may be used for HARQ feedback (as well as other UCI) cannot be identified only with a subframe number as these will change from one frame to another. The pattern repeats over a period of multiple frames (e.g. 4 in this case), and may be identified with an offset indicating the number of subframes between the start of a period of 4 frames (e.g. the beginning of a frame whose system frame number divides 4) and the first subframe of a group of 3 subframes that are configured to be used for HARQ feedback. Alternatively, the pattern may be identified with a bitmap of 40 subframes. When this type of approach is employed, the first subframe of a group may for instance carry HARQ feedback for PDSCH transmissions having occurred 9, 8 and 7 subframes earlier, the second subframe may carry HARQ feedback for PDSCH transmissions having occurred 7, 6 and 5 subframes earlier (than the second subframe) and the third subframe may carry HARQ feedback for PDSCH transmissions having occurred 5 and 4 subframes earlier. This (and the previous approach) may require an increase of the number of configured HARQ processes for PDSCH to support continuous transmissions. Similar to the previously described approach, the second MAC instance may be configured with a similar pattern that is designed to completely avoid simultaneous HARQ feedback transmission between MAC instances, even when transmissions are not synchronized at subframe level. This can be achieved provided that the pattern of the second MAC instance is offset by between 3 and 4 subframes with respect to the pattern of the first MAC instance (e.g. in case of synchronized system frame number and subframe 0 of the second MAC instance starts between the start and the end of subframe 0 of the first MAC instance, the offset of the pattern of the second MAC instance may correspond to the offset of the pattern of the first MAC instance, plus 3).

One potential benefit of the above arrangement is that all (synchronous) retransmissions of PUSCH may occur either in subframes that are configured to transmit HARQ A/N, or in subframes that are not configured to transmit HARQ A/N. In case a higher priority is applied to transmissions carrying UCI (or HARQ A/N) over transmissions not carrying UCI, all PUSCH retransmissions for a HARQ process in the UL may have either a high priority or a low priority. In case high-priority data (e.g. signaling or voice) needs to be transmitted by the WTRU, the network may elect to schedule PUSCH in those subframes configured for UCI transmission thus ensuring that any retransmission would suffer minimally from possible scaling.

Reporting functions for UL split bearers: A WTRU may be configured with dual connectivity, i.e. with one or more cells associated to a plurality of eNBs (e.g. one MeNB and one SeNB). In such case, the WTRU may implement separate MAC entities, e.g. one for all cells associated to each eNB in the WTRU's configuration. A WTRU configured with dual connectivity may also be configured with one or more Data Radio Bearers (DRB) which DRB may be configured for uplink split. A WTRU may transmit data associated to a DRB configured with UL split on either a cell of a first MAC entity, of a second MAC entity, or both, either simultaneously or not.

In such case, the WTRU may be required to include a Buffer Status Report (BSR) in one or more of its uplink transmissions e.g. according to legacy triggers possibly applied per MAC entity or duplicated across both MAC entities in a case where the trigger is associated with a DRB configured with UL split.

Regarding the amount of data reported by the WTRU in such BSR for such DRB, the following alternatives may be considered: The WTRU may report the same amount of data to both eNBs using legacy methods; or, the WTRU may tailor the report using a configured ratio for the part applicable to PDCP.

However, the former alternative implies that schedulers may schedule unnecessary uplink resources e.g. up to twice the required amount of resources in the worst case, while for the latter case the uplink transmission rate may be artificially limited as a consequence of the semi-static ratio.

In a first approach, a new BSR trigger may be based based on an impact from another scheduler.

This approach may, while not limited to such case, be used when the WTRU report the same amount of data (or possibly, only for PDCP data) to both eNBs. To mitigate the possibility that both eNBs over allocate uplink resources, the WTRU may implement additional BSR triggers.

This approach is based on a principle that even if the WTRU reports the same (or similar) amount of data for a DRB configured with UL split, over-provisioning of uplink resources from the combined effect of both independent schedulers may be mitigated if the WTRU sends more BSR reports. However, to avoid unnecessary increase in the amount of BSR, rules may be defined such that BSR is included in an uplink transmission only if the status of the WTRU's buffer changes such that the likelihood of receiving grants for too many uplink resources increases. Indeed, there may be no need to send BSR more often other than when the buffer is depleting quicker than the effect of a single scheduler.

For approaches discussed above, the BSR trigger may not lead to a SR trigger.

In an approach, the WTRU MAC entity may trigger a BSR when it determines that the rate at which the buffer occupancy (and possibly, for the PDCP buffer only) for a given DRB configured with UL split is being drained by the other MAC entity exceeds a certain (possibly configurable) threshold. For example, a first WTRU MAC entity may determine that the amount of (e.g. PDCP) data transmitted using resources of a second WTRU MAC entity exceeds the amount of new data available for transmission by a value X during a given period since last time the WTRU MAC reported BSR using uplink resources of the first MAC entity.

In another approach, the WTRU MAC entity may trigger a BSR when it determines that the amount of data in the WTRU's buffer (and possibly, for the PDCP buffer only) for a given DRB configured with UL split has dropped by an amount that is a (possibly configurable) amount of data e.g. a factor X of the amount of data transmitted by the concerned MAC entity. For example, a WTRU may trigger BSR when it determines that the amount of data available for transmission (e.g. either for the DRB i.e. both RLC and PDCP or for PDCP only) has dropped by an amount equivalent to a percentage larger than X % (where X is typically larger than 100) of the amount of corresponding data transmitted for the concerned DRB since the last transmission of a BSR that included a value for such LCH (or LCG) using uplink resources of the first MAC entity.

PDCP buffer drops below a certain level as an effect of grants received in the other MAC entity: In another approach, the WTRU MAC entity may trigger a BSR when it determines that the transmission rate of data in the WTRU's buffer (and possibly, for the PDCP buffer only) for a given DRB configured with UL split has changed by an amount that is a (possibly configurable) value X since the last transmission of a BSR that included a value for such LCH (or LCG) using uplink resources of the first MAC entity.

Similarly, in another approach, this trigger could be based on an increase in average transmission delay for PDCP SDUs, or reaching a certain amount of delay for the head-of-queue (i.e. the oldest PDCP SDU in the WTRU's buffer) or when the gap between the rate at which the WTRU's (e.g. PDCP only) buffer is drained by the other MAC entity and the fill rate for such buffer increases beyond a certain value. Additional triggers may also be introduced for the opposite events.

In another approach, a BSR report may include RLC buffer occupancy only, and dynamic reporting may be used for PDCP.

This approach may, while not limited to such case, be used when the WTRU reports only the amount of RLC data in its buffer to each eNB inside the BSR. PDCP buffer occupancy may then rely on a separate mechanism and on additional signaling from the WTRU which may be more dynamic. For example, such signaling may be included in some (or all) MAC PDUs for a given MAC entity e.g. by re-using reserved bits inside the MAC subheader (e.g. "R" bits, or equivalent). Possibly, both MAC entities associated to a DRB configured with UL split may implement such signaling and BSR reporting.

This approach may be based on the principle that a WTRU may always report the amount of data that it knows to be already associated to the concerned MAC, e.g. RLC buffer occupancy and such as (possibly an estimation of the size of a) RLC STATUS PDU and/or RLC retransmission(s), and dynamically signal some approximate level for the PDCP occupancy for the concerned DRB. The dynamic signaling may provide information on the aggregated PDCP occupancy for one or more, or all DRBs configured for UL split. The BSR framework where PDCP occupancy is also reported (but less frequently than the dynamic signalling) may be used in complement.

Such dynamic signaling may hereafter be referred to as Happy Bit(s). Possibly, happy bits are applicable only when at least one DRB is configured with UL split. The happy bits may signal information related to a single LCG and/or DRB or to the aggregation of a plurality of LCGs and/or DRBs configured with UL split, when such LCG only relate to DRB configured with UL split. The use of happy bits may also be a configuration aspect.

In another example that is a variant of the approaches below, the happy bits are applicable to the DRB as determined by the LCID value in the subheader in which the happy bits are included, if applicable.

In an approach, the WTRU MAC entity may report using BSR (or only for a subset thereof) only RLC buffer occupancy for a DRB configured with UL split. The WTRU may then include happy bit(s) according to e.g. at least one of the following.

Single bit: when a single bit is used, the WTRU may signal whether the amount of PDCP data in the buffer is increasing or decreasing. For example, the WTRU may set the bit is the amount of data in the PDCP buffer(s) has increased by an amount X since last transmission of a BSR (if used in complement) that reported a value for the concerned LCG(s) and/or DRB(s) or (if legacy BSR calculation is not applicable to UL split bearer) simply if that amount of data is larger than an (possibly configurable) amount X. If a format is used whereby a single bit is used per MAC PDU, such signaling may reflect the total amount of PDCP data in the WTRU's buffer for all DRB configured with UL split. Alternatively, the WTRU may set the bit such that it indicates that the WTRU requests uplink resources for the concerned LCG(s) and/or DRBs.

Two-bit field: when more than one bit is used, the WTRU may use codepoints such as according to at least one of the following:
 a. 00, 01, 10, 11 indicates relative buffer levels for the concerned LCG(s) and/or DRB(s). Such values may be absolute values. Alternatively, such values may be in relation to the size of the transport block in which it is sent. Such values may include "empty buffer" e.g. "00", larger than or "infinite" e.g. "11" with "01" and "10" as intermediate levels;

b. 00, 01, 10, 11 indicates approximate transmission rate for the concerned LCG(s) and/or DRB(s) as calculated from transmissions in the other MAC entity. Such values may be absolute values.

Alternatively, such values may be in relation to the size of the transport block in which it is sent. Alternatively, such values may be in relation to the configuration of the (possibly aggregate) PBR for the concerned DRB(s) and/or LCG(s).

The approach described above may be described in terms of LTE standards. For example, in LTE A MAC PDU subheader comprises the six header fields R/R/E/LCID/F/L but for the last subheader in the MAC PDU and for fixed sized MAC control elements. The last subheader in the MAC PDU and subheaders for fixed sized MAC control elements consist solely of the four header fields R/R/E/LCID. A MAC PDU subheader corresponding to padding comprises the four header fields R/R/E/LCID.

Further, a Reserved Bit is set to "0", and a Buffer Size field indicates the total amount of data available across all logical channels of a logical channel group after all MAC PDUs for the TTI have been built. The amount of data is indicated in number of bytes, and includes all data that is available for transmission in the RLC layer and in the PDCP layer.

In these terms, if configured, the header fields R/R may become the HB (Happy Bit) field, and For a LCG associated to DRBs configured with UL split in the corresponding BSR format, data may include all data that is available for transmission in the RLC layer only.

The data available for transmission for RLC and for PDCP may remain as per legacy.

In another approach, the WTRU MAC entity may report using BSR (or only for a subset thereof) only RLC buffer occupancy for a DRB configured with UL split. The WTRU may then include happy bit(s) such that the WTRU signals average time-of-stay, head of queue delay, whether the PDCP buffer levels tend to increase or decrease, or the difference between the PDCP fill rate and what's drained by the MAC entity that signals the happy bits. Similar signaling as described in the previous method may be used.

Prioritization of Data for Uplink Transmissions: A WTRU may be configured with dual connectivity, i.e. with one or more cells associated to a plurality of eNBs (e.g. one MeNB and one SeNB). In such case, the WTRU may implement separate MAC entities, e.g. one for all cells associated to each eNB in the WTRU's configuration. A WTRU configured with dual connectivity may additionally be configured with one or more Data Radio Bearers (DRB) which DRB may be configured for uplink split. A WTRU may transmit data associated to a DRB configured with UL split on either a cell of a first MAC entity, of a second MAC entity or both either simultaneously or not.

In such case, the WTRU may receive a configuration for the DRB that includes an association with one Logical Channel (LCH) for each MAC entity. In other words, a DRB may be associated to a plurality of LCHs, one for each MAC entity. For each LCH, the WTRU may additionally be configured with a priority value for the LCH, a PBR value and a BSD value; such value may be the same for all LCHs associated to the DRB (i.e. DRB-specific value) or may have separate values (i.e. LCH-specific).

Possible implementations for the LCP function in such case include:

a. Common bucket: the bucket Bj is shared across MAC entities for the LCHs associated to the concerned DRB when performing both LCP loops; and b. Separate bucket: the bucket Bj is specific for each MAC entity for the LCHs associated to the concerned DRB. The WTRU performs the LCP loops separately for each MAC entity.

Each of these example implementations may have potential drawbacks. For example, the common bucket implementation may incur the risk of introducing starvation of RLC data (e.g. RLC STATUS PDU(s) and/or RLC retransmission) that is MAC-specific (i.e. RLC PDUs not associated to a PDCP SDU) e.g. when one scheduler (and consequently on MAC entity) consumes the entire bucket for an extended period of time thus denying the other MAC entity from serving the concerned DRB. The separate bucket implementation may introduce jitter and/or may unexpectedly enable lower priority bearers to be served before higher priority bearers when schedulers are poorly coordinated in the manner in which they assign transmission resources.

Possibly, in combination with the methods described below, a LCH associated with a bearer configured for UL split may only be assigned a LCG by itself or in combination with other LCH of the same type for the given MAC entity. Possibly, all such LCG have MAC-specific configuration for the purpose of LCP.

In an approach, data for a split UL DRB subject to LCP procedure may be a function of the type of data in LCH. For bearers configured with UL split, assuming that the WTRU performs the LCP procedure for each MAC entity using a common bucket Bj i.e. using a value for Bj that is DRB-specific as described above, in a first method the MAC entity determines what LCH to serve as part of the LCP procedure as a function of the size of the bucket Bj but also as a function of the type of data in the RLC buffer. For example, the WTRU may include a LCH and serve it as part of the LCP procedure independently of the value of Bj at the time it performs LCP if the concerned LCH has data of a specific type either pending (e.g. RLC STATUS PDU) or present in its buffer (e.g. RLC retransmission). For example, if the WTRU has a pending RLC STATUS PDU but the associated Bj is zero or less, the WTRU may still include the LCH in the LCP procedure that results in allocation of data for transmissions using resources of the concerned MAC entity. In such case, the WTRU may set the bucket Bj to the estimated (or actual) size of the RLC STATUS PDU. For example, if the WTRU has a RLC retransmission in its RLC buffer but the associated Bj is less than the size of the RLC retransmission (including the case where it is zero or less), the WTRU may still include the LCH in the LCP procedure that results in allocation of data for transmissions using resources of the concerned MAC entity. In such case, the WTRU may set the bucket Bj to the estimated (or actual) size of the RLC retransmission(s). Possibly, such operation is limited to the retransmission of one (e.g. no re-segmentation) or more PDU(s) (e.g. in case of re-segmentation) associated to the retransmission of a single RLC PDU. For example, in an example case where both RLC STATUS PDUs and RLC retransmission(s) are subject to such an approach, the WTRU may set the value of the Bj to the combined value of their respective size.

The approach described above may be described in terms of LTE standards for logical channel prioritization. For example, in current LTE standards resources are allocated to logical channels in a decreasing priority order. According to the method described above, where Bj is a variable maintained by the WTRU indicating priority for each logical channel j, Bj for logical channels may be set as follows prior to allocating resources:

If Bj for a logical channel configured with UL split is less or equal to 0, the UE shall If there is a RLC STATUS PDU pending, the UE shall set Bj to the size of the PDU.

If there is data in the RLC retransmission buffer, the UE shall increment Bj to the size of the buffer.

Further, in current LTE standards a WTRU may take into account a relative priority of certain kinds of data. According to the method described above, a pending RLC STATUS PDU for any Logical Channel for a DRB configured with UL split may take priority over data in the RLC retransmission buffer for any Logical Channel for a DRB configured with UL split, but be lower in priority than a MAC control element for PHR or Extended PHR. Data in the RLC retransmission buffer for any Logical Channel for a DRB configured with UL split may take priority over data from any Logical Channel, except data from UL-CCCH.

In another approach, a primary loop or loops may use MAC-specific parameters, and a secondary loop may use bearer-associated parameters. In an example, a WTRU may perform a LCP loop in a given MAC entity where the drain of the bucket associated to a LCH for a DRB configured with UL split may modify the value of the bucket for the LCH associated to the other MAC entity. In other words, exceeding the bucket size for a DRB configured with UL split in one MAC may be reflected in the bucket value of the other MAC for the same DRB. More specifically, for bearers configured with UL split the WTRU may perform the LCP procedure such that the primary loop(s) (i.e. either only step 1 and step 2, or step 1 up to step 3) for each MAC entity using parameters specific to each MAC entity (LCH-specific parameters). It should be noted that here and in the following discussion of LCP procedures, steps 1, 2, and 3 refer to the steps of the LCP procedure described in the LTE specifications set forth above. Possibly, the priority is associated to the DRB itself or the same value is used for all LCH(s) associated to the concerned DRB.

In a first example of this approach, a first MAC entity may perform step 1 and step 2 using the PBR value and the BSD value configured for the LCH or, accordingly, the bucket size associated with the LCH; in those steps, the WTRU considers all LCHs associated with the concerned MAC entity. The WTRU may then perform step 3 to allocate remaining resources considering all LCHs in decreasing priority order, which priority for a LCH associated with a DRB configured with UL split is either the DRB-specific value or the value associated to the LCH of the concerned MAC. In this first example, step 1 and 2 are the primary loop while step 3 is the secondary loop. With step 3, if the aggregated sum of the bucket for all LCH(s) of the DRB with split UL is larger than zero, the WTRU may decrement the bucket associated to the MAC for which the LCH is being served by the amount of data served in step 3; if the resulting value becomes negative, the WTRU may transfer the negative part of the bucket value for that first LCH to the bucket value of a second LCH associated to the concerned DRB and corresponding to the other MAC until either the bucket value Bj of the second LCH reaches 0 (i.e. the absolute value of the bucket size of the first LCH was larger than the positive value of the first bucket size) or until the bucket value of the first LCH reaches 0 (i.e. otherwise).

In a second example of this approach, step 1, 2 and 3 that comprises two loops are the primary loops and are performed using MAC-specific values, while the WTRU performs step 3 as one additional secondary loop as per the first example for this method. In other words, in this second example one additional MAC-specific loop may be used compared to the first example.

The first example described above may be described in terms of LTE standards for logical channel prioritization. For example, in current LTE standards a WTRU allocates resources to logical channels by allocating resources to all the logical channels with Bj>0 in a decreasing priority order (where Bj is a variable maintained by the WTRU indicating priority for each logical channel j.). If the PBR of a radio bearer is set to "infinity," the WTRU shall allocate resources for all the data that is available for transmission on the radio bearer before meeting the PBR of the lower priority radio bearer(s). The WTRU then decrements Bj by the total size of MAC SDUs served to logical channel j; and if any resources remain, all the logical channels are served in a strict decreasing priority order (regardless of the value of Bj) until either the data for that logical channel or the UL grant is exhausted, whichever comes first. Logical channels configured with equal priority should be served equally.

In these terms, according to the first example described above, the WTRU may decrement the value of Bj by the total size of the MAC SDU served to logical channel j for a logical channel associated to a DRB configured with UL split; if the value Bj becomes negative, the WTRU shall transfer as much of this negative amount to the bucket of the logical channel associated to the concerned DRB in the other MAC entity such that each bucket becomes of equal value (a negative value is possible).

The second example described above may also be described in terms of LTE standards for logical channel prioritization discussed above.

In these terms, according to the second example described above, after either the data for the logical channel or the UL grant is exhausted, if any resources remain, all the logical channels associated to a DRB configured with split UL are served in a strict decreasing priority order (regardless of the value of Bj) until either the data for that logical channel or the UL grant is exhausted, whichever comes first. Logical channels configured with equal priority should be served equally. The WTRU shall decrement the value of Bj of the logical channel associated to the concerned DRB in the other MAC entity such that each bucket becomes of equal value (including a negative value).

Variants of the above examples are possible where the amount by which the bucket associated to each LCH of a DRB configured with UL split is varied in different manners, including changing any negative value to a zero value or resulting is unequal values using e.g. a ratio.

In another approach, data for a split UL DRB may be subject to LCP procedure per bearer. For bearers configured with UL split, assuming that the WTRU performs the LCP procedure for each MAC entity using a common bucket Bj i.e. using a value for Bj that is DRB-specific as described above, in this example approach the MAC entity determines what LCH to serve as part of the LCP procedure using legacy logic; where the WTRU determines for a first MAC that a LCH is to be served, the LCP is performed for the corresponding DRB for the first MAC entity but the WTRU also takes into account the amount of data that may be transmitted as a result of the LCP in the second MAC entity.

In another approach, a prioritization procedure may be run on a per-radio bearer basis. For example, a WTRU may perform LCP on a per-radio bearer basis using radio-bearer specific priorities. Using this approach, the WTRU may perform all the existing steps of the LCP procedure on a radio bearer basis instead of on a LCH basis. In every step, the WTRU may determine how much of the resources from each MAC are allocated to a radio bearer, possibly taking into consideration data from this RB that can only be transmitted to a certain MAC, such as RLC status PDU's or data in RLC buffers (e.g. segments). For each radio bearer, the WTRU may prioritize transmission of such MAC-specific data.

In the following discussion, example implementations of the above approaches are described. For each example below, the WTRU is configured with a primary MAC entity (PMAC) and a secondary MAC entity (SMAC).

In an example of selective transmission, the WTRU may be scheduled by a base grant with a PUSCH transmission for a cell of the primary MAC entity and with another base grant for a cell of a secondary MAC entity. The WTRU may determine that by performing both transmissions simultaneously using their respective base grant, it would exceed its maximum transmission power; the WTRU then determines that a prioritization function should be applied. The WTRU may further determine that the PUSCH transmission of the primary MAC entity has higher priority than the one of the secondary MAC entity, for example, because it contains control plane signaling. The WTRU may then determine that it has a valid alternative grant suitable to replace the base grant of the transmission for the secondary MAC instance, and determines that selective transmission may be used as the prioritization function for the concerned transmissions. The WTRU may then perform the transmission for the primary MAC entity according to the base grant and the one for the secondary MAC entity according to the alternative grant if the corresponding transmissions are within the WTRU's maximum transmit power; otherwise, the WTRU may perform additional (or alternate) prioritization.

In an example of explicit signaling, the WTRU may be configured such that transmissions associated to a SMAC have higher priority. In such case, the WTRU first allocate transmission power to the SMAC and any remaining power to transmission(s) of the PMAC. Possibly, the WTRU decodes uplink DCI format(s) associated to the PMAC such that a prioritization signal may be received.

The WTRU may be scheduled by a grant with a PUSCH transmission for a cell of the primary MAC entity and with another grant for a cell of a secondary MAC entity. The WTRU may determine that by performing both transmissions simultaneously using their respective grant, it would exceed its maximum transmission power; the WTRU then determine that a prioritization function should be applied. The WTRU may further determine that the PUSCH transmission of the primary MAC entity has higher priority than the one of the secondary MAC entity e.g. because the DCI received for the PMAC indicates that the transmission shall be given higher priority. The WTRU may then perform the transmission for the primary MAC entity according to the received grant and with higher priority while possibly applying power scaling to other transmissions if needed. Such priority may remain for the duration of the concerned HARQ process.

In another example, the WTRU may be configured such that transmissions associated to a SMAC have higher priority. In such case, the WTRU first allocate transmission power to the SMAC and any remaining power to transmission(s) of the PMAC. Possibly, the WTRU decodes uplink DCI format(s) associated to the PMAC such that a prioritization signal may be received.

The WTRU may be scheduled by a downlink assignment with a PDSCH transmission for a cell of the primary MAC entity and with another PDSCH transmission for a cell of a secondary MAC entity. The WTRU may determine that in the subframe at which the WTRU is expected to transmit the corresponding HARQ feedback for each transmission, it would exceed its maximum transmission power; the WTRU then determine that a prioritization function should be applied. The WTRU may further determine that the HARQ feedback associated to the PDSCH transmission of the primary MAC entity has higher priority than the one of the secondary MAC entity e.g. because the DCI received for the PMAC indicates that the transmission shall be given higher priority. The WTRU may then perform the transmission for the primary MAC entity accordingly (i.e. either using PUSCH or PUCCH, depending of other scheduling information applicable for the concerned TTI) and with higher priority while possibly applying power scaling to other transmissions if needed. Such priority may remain for the duration of the concerned HARQ process e.g. until the HARQ feedback for the prioritized HARQ process is ACK.

In an example of simultaneous random access procedures toward different eNBs, the WTRU has a first ongoing random access (RACH) procedure using a first MAC entity. The WTRU then determines that a second RACH procedure is triggered.

In another example, if the trigger for the second RACH procedure is associated to the same MAC entity as the ongoing RACH procedure, the WTRU may perform using legacy behavior (i.e. the decision whether to continue with the ongoing procedure or to abort it and start a new one is up to the WTRU implementation) while otherwise the WTRU performs both procedure concurrently. In the latter case, the WTRU always first allocates power to a preamble transmission that is associated to the PCell of the PMAC entity; for preamble transmission associated to other cells of the PMAC, the WTRU determines how to allocate power as a function of the priority between MAC entities: if the WTRU prioritizes a PRACH transmission for a PMAC instance before any other transmissions associated to the SMAC, the WTRU allocates power first to the PRACH transmission associated to the PMAC and allocates remaining power to other transmissions; for a preamble transmission associated to the SMAC, the WTRU determines how to allocate power as a function of the priority between MAC entities: if the WTRU prioritizes a PUSCH transmission for a PMAC instance before any other transmissions associated to the SMAC (e.g. in the offload case, which assumes that PMAC mainly handles higher priority data) the WTRU allocates power first to transmissions associated to the PMAC and allocates remaining power to the transmissions associated to the SMAC. If the WTRU determines that the preamble associated to the SMAC cannot be transmitted at the expected transmission power, then, in one example, the WTRU scales the transmission power for the transmission of the preamble but does not increase the count of preamble transmission PREAMBLE_TRANSMISSION_COUNTER (i.e. the WTRU may extend the total duration of RACH procedure by up to a certain amount of transmissions at the expense of longer UL RLF detection time). However, this may be bounded in total number of attempts and/or in time to avoid excessive and unpredictable delay to the preamble transmission e.g. such that the WTRU may at most transmit up to an integer multiple of the maximum allowed/configured preamble transmission. One consequence of not increasing the preamble count is that the power ramping is delaying accordingly.

If no Random Access Response is received within the RA Response window, or if none of all received Random Access Responses contains a Random Access Preamble identifier corresponding to the transmitted Random Access Preamble, the Random Access Response reception is considered not successful and the WTRU shall:

If power scaling was not applied to the transmitted Random Access Preamble, increment PREAMBLE_TRANSMISSION_COUNTER by 1;

Else if power scaling was applied to the transmitted Random Access Preamble, increment SCALED_PREAMBLE_TRANSMISSION_COUNTER by 1;

If PREAMBLE_TRANSMISSION_COUNTER=preambleTransMax+1, or

If PREAMBLE_TRANSMISSION_COUNTER+SCALED_PREAMBLE_TRANSMISSION_COUNTER=(2*preambleTransMax)+1:

if the Random Access Preamble is transmitted on the PCell:

indicate a Random Access problem to upper layers;

if the Random Access Preamble is transmitted on an SCell:

consider the Random Access procedure unsuccessfully completed.

Note: The WTRU always first allocate transmission power to a preamble transmitted on the PCell.

In one example that extends the previous example, the WTRU always allocate power first to a preamble transmission initiated by PDCCH order (i.e. network-triggered RACH procedure);

If no Random Access Response is received within the RA Response window, or if none of all received Random Access Responses contains a Random Access Preamble identifier corresponding to the transmitted Random Access Preamble, the Random Access Response reception is considered not successful and the WTRU shall:

If power scaling was not applied to the transmitted Random Access Preamble, increment PREAMBLE_TRANSMISSION_COUNTER by 1;

Else if power scaling was applied to the transmitted Random Access Preamble, increment SCALED_PREAMBLE_TRANSMISSION_COUNTER by 1;

If PREAMBLE_TRANSMISSION_COUNTER=preambleTransMax+1, or

If PREAMBLE_TRANSMISSION_COUNTER+SCALED_PREAMBLE_TRANSMISSION_COUNTER=(2*preambleTransMax)+1:

if the Random Access Preamble is transmitted on the PCell:

indicate a Random Access problem to upper layers;

if the Random Access Preamble is transmitted on an SCell:

consider the Random Access procedure unsuccessfully completed.

Note: In case the random access procedure is initiated by a PDCCH order for the PCell, the WTRU always first allocate transmission power to the preamble transmission.

In one example, the WTRU instead may transmit the preamble in a subsequent available PRACH occasion;

The Random Access Resource selection procedure shall be performed as described in greater detail hereafter. The WTRU or Node-B may be configured to determine the next available subframe containing PRACH permitted by the restrictions given by the prach-ConfigIndex, the PRACH Mask Index and physical layer timing requirements (a WTRU may take into account the possible occurrence of measurement gaps and available transmission power when determining the next available PRACH subframe);

In one example that extends the previous example, the WTRU transmits the preamble in a subsequent available PRACH occasion for a preamble transmission initiated by PDCCH order (i.e. network-triggered RACH procedure).

The Random Access Resource selection procedure may be performed as described hereafter. The WTRU or Node-B determine the next available subframe containing PRACH permitted by the restrictions given by the prach-ConfigIndex, the PRACH Mask Index and physical layer timing requirements (a WTRU may take into account available transmission power in the case of a random access procedure that is not initiated for the PCell by a PDCCH order and the possible occurrence of measurement gaps when determining the next available PRACH subframe).

In one approach, where the WTRU receives a RAR for an ongoing RACH procedure, and the RAR includes a grant for an uplink transmission, the WTRU performs the following:

For a contention-based RACH (CBRA) procedure associated to the PMAC, the WTRU may prioritize any transmission associated to the HARQ process for transmission of msg3. The WTRU may first allocate transmission power to the corresponding (re)transmissions until the completion (successful or not) of the concerned RACH procedure.

For a CBRA procedure associated to the SMAC, the WTRU may scale the transmission power associated to the HARQ process for transmission of msg3, if necessary (i.e. if the WTRU prioritizes other transmissions e.g. transmissions for the PMAC). In this case, then the WTRU does not increment the count of HARQ transmissions similarly as for the case of the preamble count described above.

For a contention-free RACH (CFRA) procedure associated to the PMAC, the WTRU prioritizes any transmission associated to the HARQ process that uses the grant received in the RAR. The WTRU may first allocate transmission power to the corresponding (re)transmissions until the completion (successful or not) of the concerned HARQ process. In one example, this may be done only for a RACH procedure associated to the PMAC. In another example, this may be done only for a RACH procedure associated to the PCell of the PMAC.

For a CFRA procedure associated to the SMAC, the WTRU may prioritize any transmission associated to the HARQ process that uses the grant received in the RAR for the SMAC such that such transmission have higher priority than any other transmission for the SMAC and also higher priority than any PUSCH transmission for the PMAC which are not associated with an absolute priority (e.g. a preamble transmission for PCell as per the above, or a prioritized PUSCH transmission). The WTRU may allocate transmission power to the corresponding (re)transmissions using such priority order until the completion (successful or not) of the concerned HARQ process. In one example, this may be done only for a RACH procedure associated to the special cell of the SMAC.

In one approach, when the WTRU receives a RAR for an ongoing RACH procedure, and the RAR includes a grant for an uplink transmission, the WTRU assigns the same priority level to the transmission associated with the grant as it has previously assigned to the transmission of the preamble.

In one approach, when the WTRU receives a RAR for an ongoing contention-based RACH procedure and the RAR includes a grant for an uplink transmission, if the WTRU determines that a prioritization function such as power scaling is applied to the transmission of msg3, the WTRU may exclude the time between the transmission and the next retransmission of the msg3 from the contention resolution window. Possibly, the WTRU may also exclude the transmission from the count of msg3 (re)transmissions. Possibly, the latter may be limited up to a maximum delay for a successful msg3 transmission.

In one approach, if the WTRU cannot perform the transmission of a preamble in a given subframe due to some impairment (e.g. total WTRU transmission power exceeds the allowed maximum) the WTRU prioritizes the transmission of the preamble only for the RACH procedure associated to the PMAC entity by first allocating transmit power to this transmission. Similarly, the same approaches may be applied to the transmission of msg3.

Semi-static priority and dynamic signaling to override configuration: In one approach, the WTRU may be configured with a semi-static priority between MAC instances and the WTRU may receive control information that overrides such configuration for a scheduled transmission which control information may be received together with the corresponding scheduling information. More specifically, the WTRU may be configured with a first MAC instance and with a second MAC instance. The WTRU may be configured such that power is normally first allocated to transmissions associated to the second MAC instance. The WTRU then may apply legacy power scaling across transmissions associated to a given MAC instance when the WTRU determines that insufficient power is available for transmissions in a given TTI. The WTRU may additionally be configured such that it can receive physical layer control signaling on a cell associated to the first MAC instance. The control signaling may be received in a downlink control information (DCI) on the scheduling channel such as PDCCH and may include control information that dynamically modifies the configured priority of the power allocation such that power is first allocated to the first MAC instance. Such control signaling may be applicable to a downlink assignment and/or to an uplink grant. The WTRU may prioritize transmissions associated to the first MAC instance when it receives such control signaling with a downlink assignment such that at least the transmission of HARQ feedback is prioritized, or when it receives such control signaling with an uplink grant such that at least the transmission of data on PUSCH is prioritized.

PHR triggered by reception of dynamic signaling and power scaling event: In one approach, the WTRU may trigger a PHR where the absolute priority applicable between MAC instances was last set by reception of dynamic control signaling and where the WTRU determines that power scaling is applied to at least one transmission associated to a MAC instance for the first time since the reception of such control signalling. The WTRU may trigger the PHR in the TTI for which power scaling is applicable or, the WTRU may trigger the PHR such that a PHR may be included in a transmission for the concerned TTI. The WTRU may trigger PHR at least for a first MAC instance when it determines that power scaling is applied to at least one transmission of a second MAC instance and when the absolute priority between MAC instances was modified by dynamic control signaling such that power was first allocated to transmissions associated to the first MAC instance.

Synchronous and Asynchronous Uplink Transmissions across CGs: The WTRU may apply a first prioritization function (e.g. a power allocation method and/or a scaling) when it determines that uplink operation between configured CG's is synchronous and a second prioritization function where it determines that uplink operation between configured CG's is asynchronous.

The WTRU may determine to allocate power using proactive scaling (i.e. with look ahead) for synch case, and with guaranteed power otherwise. For example, the WTRU may determine that it should perform power allocation according to a first method if it determines that the uplink operation is synchronous and according to a second method otherwise. For example, the first method may be based on a determination of the power allocated to each CG by considering required power for each CG, while a second method may be based on a determination of the power allocated to each CG based on the required power for the CG for which transmissions start earliest in time and based on a guaranteed amount of power for the other CG.

The WTRU may determine to perform power scaling using scaling over both cell groups for synch case, and using allocation by cell group and scaling by cell group otherwise. For example, the WTRU may determine that it should perform power scaling according to a first method when it determines that the uplink operation is synchronous and according to a second method otherwise. For example, the first method may be based on scaling transmissions by considering all transmissions across both CGs according to priority between such transmissions (e.g. by type), while a second method may be based on scaling power per CG e.g. by first allocating power per CG and then performing scaling across transmissions of a given CG only.

Example methods for a WTRU to determine whether an uplink operation is synchronous or asynchronous are described further herein.

In one example, the WTRU may determine whether an uplink operation is synchronous or asynchronous based on an L3 indication from MeNB. The WTRU may receive an indication from the network such that it may determine whether or not the uplink operation is synchronous e.g. by L3 RRC signaling during a RRC Connection Reconfiguration procedure. Such reconfiguration procedure may include a reconfiguration that adds or modifies at least one aspect of the WTRU's configuration for a SCG. For example, the network may indicate whether or not an uplink operation is synchronized using RRC signaling that adds at least the special cell (i.e. that initially configures the SCG for the WTRU) and/or that modifies the configuration of such special cell of the SCG (e.g. such that the cell is changed.) This may, for example, be applicable in a case where the uplink operation is determined by the network and as a function of the DL timing difference between the PCell of the MCG and the special cell of the SCG.

In one method, the WTRU may determine whether an uplink operation is synchronous or asynchronous based at least in part on WTRU autonomous behavior. In one method, the WTRU may determine the type of uplink operation autonomously and/or the WTRU may monitor the relative timing synchronization between cells of different CGs such as to detect possible synchronization error. For example, the WTRU may receive explicit signaling from the network that indicates synchronous uplink operation between CGs; where configured for dual connectivity, the WTRU may then monitor the synchronization between cells of the CGs e.g. according to methods described herein and, in case it detects a synchronization problem, perform error handling as described below.

In an example, the WTRU may receive L3 RRC signaling that indicates that the uplink operation is synchronous between cells of different CGs. The WTRU may then use a single behavior for allocation of power between different CGs. Possibly, the WTRU may monitor DL timing of the PCell of the MCG and that of the special cell of the SCG such that it may detect if it exceeds a specific threshold and/or detect that synchronization is above such threshold when it performs uplink transmissions such that it may not comply for at least one uplink transmissions; in this case, the WTRU may perform error handling as described below.

In another example, the WTRU may receive L3 RRC signaling that indicates that the uplink operation is asynchronous between cells of different CGs. The WTRU may then use a single behavior for allocation of power between different CGs. In such case, the WTRU may not be required to monitor for synchronization problems between cells of different CGs.

In a further example, the WTRU may receive L3 RRC signaling that indicates that the uplink operation is asynchronous between cells of different CGs. The WTRU may then monitor for the timing difference between cells of different CGs e.g. according to other methods described herein. The WTRU may perform power allocation according to a first method if it determines that the uplink operation is synchronous and according to a second method otherwise.

Further WTRU autonomous methods related to how UE monitors, detects synchronization between CGs are discussed herein.

In one approach, whether the WTRU operates synchronously or unsynchronously (or asynchronously) with respect to uplink transmissions between its configured cell groups (CG) may be defined based on the relative time difference between the start of the CG's respective UL subframe.

For example, the WTRU may consider that the uplink operation between configured CGs is synchronous if the time difference between the start of the CG's respective UL subframe is less than or equal to a specific threshold. Such threshold may be specified as a fixed value, may be bounded by the guard time between two consecutive subframes in the system, or it may be a configuration aspect. Optionally, such threshold may include a hysteresis period such that if the WTRU may transit between one mode (e.g. synchronous) and the other mode (e.g. asynchronous) the WTRU does not perform unnecessary transitions when operating close to such threshold. For example, the WTRU may transmit to the unsynchronous mode of uplink operation upon reaching such threshold, but may remain in this mode only until the relative time difference reverts to less than the threshold minus an additional period of time X (i.e. the WTRU would move quickly to the unsynchronized mode but remain in such mode until it goes back within a fair margin of the threshold).

Evaluation of Time difference between CGs: More generally, if the WTRU is configured with multiple TAGs for a given CG, such time difference may be determined based on at least one of the following:

PCell to SpSCell: The start of the uplink subframe associated to the TAG that contains the CG's special cell. For example, this may be the PCell for the primary CG (MCG), and the Special SCell (e.g. the SCell that is configured with PUCCH resources and/or for which RLM is performed) for the secondary CG (SCG). For example, in this case the relative time difference would be the difference between the start of the uplink subframe of the PTAG of the MCG and the start of the uplink subframe of the PTAG of the SCG. In this case, the term "applicable cells" when used hereafter refers to those cells for this method.

Largest absolute value between start of any two transmissions: The start of the uplink subframe associated to the TAG of the MCG and that of the TAG of the SCG for which the relative time difference is the largest in absolute value. In this case, the term "applicable cells" when used hereafter refers to any cell of the concerned TAGs for this method.

Largest absolute value between start of any two uplink subframes: The start of the uplink subframe associated to the TAG of the MCG for which the WTRU performs at least one transmission in this subframe, and that of the TAG of the SCG for which the WTRU performs at least one transmission in this subframe, in between which the relative time difference is the largest in absolute value. In this case, the term "applicable cells" when used hereafter refers to any applicable cell(s) (e.g. for which the WTRU performs at least one transmission) of the concerned TAGs for this method.

Largest absolute value between start of a transmission in PCell and any transmission in a SCG: The start of the uplink subframe associated to the PTAG for the MCG, and the start of the uplink subframe associated to the TAG of the SCG for which the resulting relative time difference is the largest in absolute value. In this case, the term "applicable cells" when used hereafter refers to the PCell and to any cell of the concerned TAG of the SCG for this method.

If the WTRU determines such time difference only when it performs uplink transmissions in cells that are applicable for the concerned method as described above, or only when it performs at least one uplink transmission in at least one cell of each CG, then the WTRU may consider the start of an applicable transmission as the start of the uplink subframe (possibly with the exception of a transmission signal that does not span all symbols of a subframe e.g. SRS).

Determination of the uplink operational mode: In one approach, the WTRU may determine the applicable operational mode according to at least one of the following:

Based on L3 signalling/configuration: The WTRU may determine the applicable uplink operational mode from an indication received by L3 signalling. In such case, the type of uplink operational mode may be a semi-static component of the WTRU's configuration. For example, the WTRU may receive control signaling that indicates the uplink operational mode as part of the configuration for dual connectivity. For example, the WTRU may receive the type of uplink operational mode as part of the configuration for dual connectivity that first adds a SCG. This may include whether the WTRU shall assume synchronous operation only, asynchronous operation only or possibly, this may include an indication that the WTRU shall autonomously determine the uplink mode of operation, for example according to any of the methods described herein. Possibly, the WTRU may receive as part of the configuration an indication of the applicable power allocation function. Possibly, the WTRU may receive a configuration of a power allocation function for the concerned applicable operational mode.

Relative timing difference between CGs calculated based on downlink timing reference for the applicable cell of the CG: The WTRU may estimate the amount of time difference between corresponding downlink subframe of the applicable cell of each CG. The WTRU may compare such time difference with a threshold, from which comparison it may determine whether the uplink operational mode is synchronous or asynchronous. Such threshold may be a configuration aspect of the WTRU. The WTRU configured with dual connectivity may determine the applicable uplink operational mode by evaluating the relative timing difference between applicable cells of different CGs and comparing it to such threshold.

Relative timing difference between CGs calculated based on uplink subframe alignment for the applicable cell of the CG, using received TAC (or Nta_ref): The WTRU configured with dual connectivity may determine the applicable uplink operational mode by evaluating the relative timing difference between applicable cell of different CGs and comparing it to a threshold.

The WTRU may estimate the amount of time difference between corresponding uplink subframe of the applicable cell of each CG. Such estimation may be performed using the respective amount of timing compensation applied to each cell as a result form the last received TAC for each applicable cell.

The WTRU may estimate the time difference when a stored UL timing reference changes e.g. as a result of NW signaling: In such case, the WTRU may perform such estimation at least before it first performs one or more transmissions in each CG which occur simultaneously at or following the subframe in which the TAC is first applied. Possibly, only when such transmissions would require the use of a power allocation function for a power-limited situation. For example, the WTRU may perform such estimation when it receive a TAC, when it first apply the receive value in the TAC, when it first receives at least one grant for each CG that leads to simultaneous transmission after the last reception of at least one TAC, or when it first determines that power is to be allocated such that it exceeds either the total available power for a CG (if less than the maximum available WTRU transmit power) and/or the maximum available WTRU transmit power for such simultaneous transmissions.

The WTRU may compare such time difference with a threshold, from which comparison it may determine whether the uplink operational mode is synchronous or asynchronous. Such threshold may be a configuration aspect of the WTRU.

Relative timing difference between CGs calculated based on uplink subframe alignment for the applicable cell of the CG, using Nta (or including the WTRU-autonomous compensation): The WTRU configured with dual connectivity may determine the applicable uplink operational mode by evaluating the relative timing difference between applicable cell of different CGs and comparing it to a threshold.

The WTRU may estimate the amount of time difference between corresponding uplink subframe of the applicable cell of each CG. Such estimation may be performed using the respective amount of timing compensation applied to each cell as a result of the WTRU's autonomous compensation mechanism e.g. from changes in DL timing.

The WTRU may estimate the time difference when UL timing compensation changes without NW involvement: In such case, the WTRU may perform such estimation in any subframe for which it determines whether or not it should autonomously apply a compensation (for example, by tracking DL timing). In some implementations, this may be done only in a subframe with PSS/SSS. Alternatively, the WTRU may perform such estimation at least before it first performs one or more transmissions in each CG which occur simultaneously with, or following, the subframe in which compensation is autonomously applied. In some implementations this may be done only when such transmissions would require the use of a power allocation function for a power-limited situation. For example, the WTRU may perform such estimation where it first determines a change in DL timing for at least one applicable cell, where it first applies such compensation to the uplink timing, where it first receives at least one grant for each CG that leads to simultaneous transmission after it last autonomously adjusted the compensation, or where it first determines that power is to be allocated such that it exceeds either the total available power for a CG (if less than the maximum available WTRU transmit power) and/or the maximum available WTRU transmit power for such simultaneous transmissions.

The WTRU may compare such time difference with a threshold, from which comparison it may determine whether the uplink operational mode is synchronous or asynchronous. Such threshold may be a configuration aspect of the WTRU.

The WTRU estimates the time difference for compensation of DL timing changes: For any of the WTRU-autonomous methods described above that are based on estimation of DL timing, the WTRU may perform such comparison dynamically e.g. according to at least one of the following:

Continuously, for DL: in every subframe (e.g. continuously), or in every DL subframe (e.g. continuously for DL subframes in TDD), or in every DL subframe in which the WTRU decodes PDCCH for at least one applicable cell in each CG (e.g. when the WTRU is in DRX active time).

When a WTRU may autonomously determine that it should apply a compensation for DL timing changes if such is detected: in a subframe for which the WTRU estimates DL timing for at least one applicable cell of a CG (e.g. based on using a cell used as DL timing reference for the concerned TAG and/or CG).

Only when PSS/SSS is available: in a subframe in which the WTRU decodes PSS/SSS.

Only after it adjusted UL timing, and first when it needs to apply a power allocation function since then: following a subframe in which it determines that a compensation should be applied, when it first determines that it has uplink resources available to perform one or more transmissions in each CG (or that it needs to allocate power for such) which occur simultaneously for both CGs.

The WTRU estimates the time difference in relation to maintenance of UL timing: In addition, for any of the WTRU-autonomous methods described above that are based on maintenance of UL timing, the WTRU may perform such comparison dynamically e.g. according to at least one of the following:

a. WTRU receives/applies TAC: in a subframe for which it receives (or apply) a received TAC (or updates Nta_ref).
b. WTRU autonomously updates Nta: in a subframe for which the WTRU determines that it should autonomously add a compensation to the uplink timing alignment (Nta) e.g. based on change in estimated DL timing, or when it first apply it.
c. Combinations of a. and b. are also possible.

The WTRU may use different power allocation behavior as a function of determined operational mode. In one approach, the WTRU may use a first power allocation method if it determines that it operates in the synchronized mode, while it may use a second power allocation function if it determines that it operates in the asynchronous mode. For example, the first power allocation function may implement power sharing such that power may be dynamically allocated between transmissions associated to different CGs while the second power allocation methods may implement a semi-static splitting function of the total available WTRU transmission power between transmissions associated to different CGs.

The WTRU may support, as a WTRU capability, whether or not it is capable of dynamic power allocation independently of the operational mode. In one approach, the WTRU may report as part of the WTRU capability exchange whether or not a single method may be applied to both synchronous and asynchronous uplink operation when configured with dual connectivity. For example, the WTRU may report that it may be capable of dynamic power sharing for the power allocation function for both modes. Such capability would typically imply a specific level of implementation complexity, which may for example require additional processing such as proactive power allocation. For example, the WTRU may report that it may be capable of dynamic power sharing for the power allocation function only in one mode. For example, such mode may be the synchronous mode. Such capability would typically require less implementation complexity. When the WTRU receives a configuration for dual connectivity, such reported capability may implicitly determine that a specific power allocation behavior shall be used for the synchronous and/or for the asynchronous mode. For example, such power allocation behavior may be a dynamic power sharing function for the synchronous case, while it may be a semi-static splitting function for the unsynchronous case. Possibly, the WTRU may include information related to the type of power allocation supported for dual connectivity. The WTRU may report as part of the WTRU's capability a value that represent the maximum processing delay that may be added for the purpose of power allocation. Such value may be signaled as a maximum time difference that may be applicable between uplink subframes of different CGs.

New PHR trigger: The WTRU may trigger a PHR when it determines that it should perform a switch of the uplink operational mode. Possibly, the WTRU trigger such PHR when it determines that it should perform at least one uplink transmission in each CG simultaneously for the first time since it last performed a switch in uplink operational mode. Possibly, only if such transmission requires the application of a power allocation function that implement some form of prioritization (including scaling) and/or sharing of the total WTRU available power.

WTRU assistance for determination of the timing difference between cells is discussed further herein. The WTRU may be configured to measure DL timing for one or more cells. For example, such cells may correspond to one or more cells of the measurements configuration. The WTRU may additionally be configured to report the DL timing difference between such cells and the PCell of the WTRU. For example, such report may include whether or not the difference in timing is above or below a threshold. Alternatively, such timing difference may be an absolute value as a function of the granularity of the reporting. For example, such reports may be transmitted together with measurements reports, e.g. when such measurement reporting is triggered according to existing measurements triggers.

Handling of error cases; Determination of error case: The WTRU may determine that there is a problem with its uplink operation with dual connectivity (e.g. a radio link problem with the SCG) when it determines that the time difference between CGs exceeds a threshold. Possibly, such threshold relates to a capability of the WTRU. Possibly, such threshold may be the same threshold as described above and used for the determination of the uplink mode of operation. For example, the WTRU may only have the capability of operating with dual connectivity for the synchronized mode of uplink operation and make such determination e.g. using any of the methods described herein.

Action upon occurrence of an error case: When the WTRU determines such problem, the WTRU may perform at least one of the procedures described in greater detail hereafter.

a. The WTRU may consider that it no longer has valid UL timing alignment (e.g. TAT is expired).
  i. Possibly, only for one (or all) TAG(s) of the SCG.
b. The WTRU may report the error situation to the network, e.g. to the MeNB using L3 signalling.
  i. Such L3 signalling may include a RRC procedure.
  ii. Such RRC procedure may be the procedure used to report radio link failure (RLF) of the SCG (S-RLF) to the MeNB.
  iii. Such report may include the cause e.g. as being "incorrect synchronization".
  iv. The WTRU may stop the connection to the SCG, and may not resume it autonomously.
c. The WTRU may invalidate the SCG configuration.
d. The WTRU may trigger a PHR for the MCG.
e. The WTRU may initiate the RRC Connection Re-establishment.

Handling of SRS transmissions is described further herein.

In a legacy behavior, the SRS may typically be transmitted in the last symbol of a subframe.

In another legacy behavior, a WTRU configured with multiple TAGs may typically drop the SRS transmission if it overlaps with the PUCCH/PUSCH transmission for a different serving cell (same or different TAG) in the same subframe or in the next subframe, if the WTRU's total transmit power would otherwise exceed the maximum available transmission power (e.g. Pcmax) on any overlapped portion of the symbol.

In a further legacy behavior, a WTRU configured with multiple TAGs and more than 2 serving cells may typically drop the SRS transmission if it overlaps with the SRS transmission of a different serving cell in the same subframe and if it overlaps with the PUCCH/PUSCH transmission for another serving cell in the same subframe or in the next subframe, if the WTRU's total transmit power would otherwise exceed the maximum available transmission power (e.g. Pcmax) on any overlapped portion of the symbol. When compared with the previous rule, it is akin to selection of what SRS to drop in such case (as the other SRS may not overlap with the PUCCH/PUSCH transmission).

In another legacy behavior, a WTRU configured with multiple TAGs may typically drop the SRS transmission if it overlaps with the network-controlled PRACH transmission in a SCell of a different TAG if the WTRU would otherwise exceed the total WTRU available power (e.g. Pcmax) for any overlapping portion of the symbol.

Legacy dropping rules for SRS can be applied when more than two TAGs are configured and/or when multiple CGs are configured i.e. dual connectivity. In one method, the legacy rules for dropping SRS may be applicable for a WTRU configured with dual connectivity, including the case where SRS transmission overlaps with PUCCH/PUSCH for either the PCell of the MCG or the special cell of a SCG.

Legacy scaling rules for SRS may be only applicable within one CG, and unless legacy dropping rules considered for all transmissions of the WTRU do not lead to dropping a SRS. In one method, a WTRU configured with dual connectivity may scale the power allocated to the transmission of a SRS signal according to legacy rules if and only if all concerned SRS transmissions are performed on cells of the same CG. Possibly, this may be done also when the WTRU's total transmit power for the concerned CG would otherwise exceed the maximum available transmission power for the CG (e.g. Pcmax,enb) on any overlapped portion of the symbol. In one example, if the CG is configured with at most one serving cell with uplink resources (e.g. the PCell of the MCG or the special cell of the SCG), the maximum WTRU transmit power of the concerned CG (e.g.

Pcmax,enb) may be equivalent to the total WTRU available power for the concerned cell (e.g. Pcmax,c).

The WTRU may determine that it should transmit one or more SRS signals associated to a specific CG. The WTRU may make such determination according to any of the methods described below, for example to handle cases where SRS may overlap in time between CGs and/or where SRS overlaps with other transmissions of the same or different CGs, or the like.

Overlapping SRS across CGs are discussed further herein.

In a case where Pcmax is exceeded, SRS may be dropped if two SRS transmissions from different CGs overlap and Pcmax is exceeded. In one method, the WTRU configured with dual connectivity may drop the transmission of a SRS if the transmission of the SRS in a symbol for a serving cell of a first CG overlaps with a SRS transmission in a symbol for a serving cell in another CG and if the total transmit power of the WTRU in the overlapped portion would exceed the total WTRU available power (e.g. Pcmax).

In a case where Pmax per CG is exceeded, for one CG, SRS may be dropped if two SRS transmissions from different CGs overlap and Pmax,eNB exceeded. In one method, the WTRU configured with dual connectivity may drop the transmission of a SRS if the transmission of the SRS in a symbol for a serving cell of a first CG overlaps with a SRS transmission in a symbol for a serving cell in another CG and if the total transmit power associated to the concerned CG in the overlapped portion would exceed the total WTRU available power for the concerned CG (e.g. Pcmax,enb). In one example, if the CG is configured with at most one serving cell with uplink resources (e.g. the PCell of the MCG or the special cell of the SCG), the maximum WTRU transmit power of the concerned CG (e.g. Pcmax,enb) may be equivalent to the total WTRU available power for the concerned cell (e.g. Pcmax,c).

Overlapping between SRS and PRACH across CGs is discussed further herein. There is no handling in legacy behavior for the case where the transmission of SRS would overlap with the transmission of a WTRU-autonomous preamble (e.g. RA-SR). However this case is now possible with dual connectivity.

WTRU-autonomous PRACH in MCG and SRS in SCG is discussed further herein. In one method, a WTRU configured with dual connectivity may drop a SRS transmission for a serving cell of a first CG if it overlaps with a transmission on PRACH for a serving cell of another CG if the WTRU transmit power would otherwise exceed a maximum available power. This may be done only if the WTRU's total transmit power exceeds its maximum available power (e.g. Pcmax) for the overlapped portion. This may also be done if the PRACH transmission cannot be allocated up to its required power using the corresponding CG's guaranteed power allocation. Further, this may be done only if the preamble transmission is for a contention-free random access, or only if the serving cell of the second CG is the special cell of a SCG. This may also be done if the WTRU's transmit power for a given CG exceeds a maximum available power for that CG (e.g. Pcmax,enb).

SRS transmission power within the framework of guaranteed power and power sharing is discussed further herein. Once the WTRU has determined that it should perform SRS transmission(s), it may allocate power according to one or more of the following methods:

SRS transmission power capped by the guaranteed power of the CG: For example, the WTRU may allocate transmission power to SRS such that the amount of power allocated to the SRS transmission(s) does not exceed the guaranteed power for the CG. In other words, the sounding procedure may take into account the configuration of the power allocation function and the split allocation between eNBs for the guaranteed part of the total WTRU power.

$SRS_X$ for $CG_X$ may be from 0 up to max $[P_{XeNB}]$: For example, the WTRU may allocate power (e.g. $SRS_X$) to SRS transmission(s) for a first CG (e.g. $CG_X$) to at most up to the total WTRU available power (e.g. $P_{CMAX}$) less the guaranteed power of the other CG (e.g. $P_{XeNB}$).

In particular for PCM2: For example, the WTRU may perform such allocation of power for a specific power control method, e.g. such as for a power allocation method where any remaining power may be allocated to transmission(s) of the group of cells (or CG, or MAC instance) for which the transmissions start earliest in time (e.g. PCM2).

$SRS_X$ for $CG_X$ may be from 0 up to max $[P_{XeNB}, P_{CMAX}-P_{YeNB}]$;

In particular for PCM1: For example, the WTRU may allocate any unused power in the other CG if the WTRU can determine the exact power requirements of any possible overlapping transmissions at least ahead of the transmission of the SRS (e.g. the WTRU is capable of look-ahead). In other words, the sounding procedure may additionally take into account the part of the total WTRU power that is not used by the other scheduler, when necessary, as a dynamic component of the SRS power allocation.

For example, for PCM1 (WTRU is capable of look ahead), SRS may use up to the maximum available power (e.g. $P_{CMAX}$) less the power allocated to the other CG (e.g. $P_{CGy}$) e.g. $P_{CMAX}-P_{CGy}$.

For example, for PCM2 (WTRU does not perform look ahead), SRS may use up to the maximum available power (e.g. $P_{CMAX}$) less the guaranteed power of the other CG (e.g. $P_{YeNB}$) e.g. $P_{CMAX}-P_{YeNB}$.

For example, the WTRU may perform the following:
  The WTRU may first determine the desired amount of power for the SRS transmission(s) of the CG, using applicable power control formulas for SRS e.g. as per legacy methods;
  The WTRU may determine that the maximum amount of power than can be allocated to the SRS transmission(s) for the CG is the maximum available power (e.g. $P_{CMAX}$) less the guaranteed power of the other CG (e.g. $P_{YeNB}$); in case the other CG has on-going transmissions higher than its guaranteed power at the beginning of the subframe, the maximum power of SRS may be limited by the maximum available power less the power of the on-going transmission. In case other transmissions (PUCCH/PUSCH) continue in the symbol containing SRS for the same CG, the maximum power of SRS may be further reduced by the power of these continuing transmissions;
  If the WTRU determines that the desired power is more than the maximum amount of power available for SRS, the WTRU may either drop or scale the SRS transmission(s). Possibly, the scaling may be performed according to legacy methods for SRS scaling.

The WTRU may possibly perform the above power allocation method for SRS transmission(s) if the maximum power level allocated to PUSCH/PUCCH transmission(s) associated to the same CG and for the same subframe does not exceed the power level of the SRS.

The WTRU may possibly perform the above power allocation method for SRS transmission(s) if the WTRU does not perform any PUSCH/PUCCH transmission associated to the same CG and for the same subframe.

The WTRU may possibly perform such power allocation function depending on the type of trigger for SRS; for example, the WTRU may perform the above power allocation function for periodic SRS transmissions.

SRS transmission power capped by the PUSCH/PUCCH power of the same CG is further discussed herein. In some implementations, SRS transmission power may always be capped by the amount of power allocated to PUSCH/PUCCH power. $SRS_X$ for $CG_X$ may be from 0 up to $[P_{CGx}$ (PUSCH/PUCCH)]

For example, the WTRU may determine that it should transmit (one or more) SRS signal associated to a specific CG. The WTRU may allocate transmission power to SRS such that the amount of power allocated to the SRS transmission(s) does not exceed an amount of power as calculated for PUCCH/PUSCH transmissions of the same CG in the same subframe, if any. Such amount of power may include at least one of the following:

a. The power allocated to the PUSCH/PUCCH transmission(s) for that CG (e.g. $P_{CGx}$ (PUSCH/PUCCH)). This may be a simple alternative complexity-wise but may yield a slightly less accurate power level for SRS.

b. The upper bound (e.g. $P_{CMAX\_high}$) of the power range determined in the calculation of the maximum power that may be allocated to the PUSCH/PUCCH transmission(s) for that CG before applying a power reduction due to e.g. MPR, A-MPR. This may be useful to remove the impact of the power reduction applied to PUSCH/PUCCH transmissions (which power reduction is specific to the type of transmission and to the type of modulation e.g. the applied reduction is typically less for QPSK than for higher modulation order such as 16QAM) and may be slightly more complex at least when the modulation order differs for PUSCH/PUCCH transmissions and for SRS transmissions.

c. A power level in a range that may be different than the other subframe symbols and specifically determined for the SRS(s) symbol based on its specific applicable MPR or A-MPR. This may be the most accurate approach in all situations.

In one example, the power for SRS is always limited by the amount of power allocated to the PUSCH/PUCCH when there is such a transmission in the same subframe and for the same CG. In one example, the power for SRS may be limited by the maximum amount of power that can be allocated to PUSCH/PUCCH transmission(s) before applying a power reduction (such as MPR, A-MPR) when there is such transmission(s) in the same subframe and for the same CG. For example, the WTRU may allocate power to the SRS transmission up to the upper bound of the $P_{CMAX}$ range (e.g. $P_{CMAX\_high}$ of the PUSCH/PUCCH) for the CG when calculating the value of $P_{CMAX}$ for PUSCH/PUCCH transmission(s) of the CG.

In other words, the sounding procedure may take into account the power allocated to the CG in a given subframe, as a dynamic component of the power allocation function for SRS.

The WTRU may perform such allocation of power for a specific power control method, for example such as for a power allocation method where any remaining power may be allocated to the CG with transmission(s) that start the earliest for a given subframe. This may be done without taking into account transmissions of the other CG that may overlap in time for a subsequent subframe, for example, when the WTRU is not capable of look ahead. This may relate in particular to PCM2 as further described herein.

Additionally, guaranteed power may also be available as a minimum. $SRS_X$ for $CG_X$ may be from 0 up to max $[P_{XeNB}, P_{CGx}$ (PUSCH/PUCCH)]

In another example, the WTRU may also allocate power to SRS transmission(s) at most up to the guaranteed power for the CG when the amount of power allocated to PUCCH/PUSCH transmissions of the same CG for the same subframe is less than the guaranteed power (including the case where no power is allocated to PUCCH/PUSCH transmissions).

In particular for PCM1: In an example, the WTRU may perform such allocation of power for a specific power control method, e.g. such as for a power allocation method where any remaining power may be allocated to transmission(s) of the group of cells (or CG, or MAC instance) by taking into account transmissions of the other CG and that may overlap in time for a subsequent subframe e.g. the WTRU is capable of look ahead.

$SRS_X$ for $CG_X$ may be from 0 up to max $[P_{XeNB}, P_{CMAX} - P_{CGy}]$:

In particular for PCM1: The WTRU may allocate any unused power in the other CG if the WTRU can determine the exact power requirements of any possible overlapping transmissions at least ahead of the transmission of the SRS (e.g. the WTRU is capable of look-ahead).

For example, the WTRU may perform the following:

The WTRU may first determine the desired amount of power for the SRS transmission(s) of the CG, using applicable power control formulas for SRS e.g. as per legacy methods; ($SRS_X$ for $CG_X$ may be from 0 up to max $[P_{XeNB}, P_{CMAX} - P_{CGy}]$);

The WTRU may determine that the maximum amount of power that can be allocated to the SRS transmission(s) for the CG is the maximum between the guaranteed power of the associated CG and the maximum available power (e.g. $P_{CMAX}$) less the allocated power of the other CG (e.g. $P_{CGy}$);

If the WTRU determines that the desired power is more than the maximum amount of power available for SRS, the WTRU may either drop or scale the SRS transmission(s). The scaling may be performed according to legacy methods for SRS scaling.

In one example, the WTRU may allocate power to SRS transmission(s) of a CG at least up to the sum of the guaranteed power for the CG and any portion of the remaining power used by PUCCH/PUSCH for the same CG.

The WTRU may possibly perform the above power allocation method for SRS transmission(s) only if the WTRU perform PUSCH/PUCCH transmission(s) associated to the same CG and for the same subframe.

The WTRU may possibly perform such power allocation function depending on the type of trigger for SRS. For example, the WTRU may perform the above power allocation function for aperiodic SRS transmissions (as such SRS request are typically associated with a grant for an uplink transmission e.g. PUSCH).

Processing Time Budget: The difference in timing between transmissions of each CG may impact the time available to the WTRU to process received scheduling information and the time available to perform power allocation, prioritization and other tasks required to determine one or more parameters of all transmissions for a given subframe in case at least one transmission is required in each CG for the concerned subframe.

In particular, this may be a challenge for WTRU implementations when such methods require that a certain amount of processing is completed for transmissions related to both CGs such that all transmissions applicable for the WTRU in the concerned subframe may be considered, e.g. such as for power allocation that dynamically allocates parts of the total WTRU available power across CGs or across all transmissions of the WTRU. In addition, different WTRU s may have different capabilities in terms of how fast it can process such information.

Different methods may differ in terms of how they threat timing differences between Tx. For example, different methods (such as prioritization functions, power allocation methods or scaling methods) such as those described herein may operate for a subset of transmissions (e.g. such as transmissions that all start simultaneously or within a certain time) either with or without consideration for transmissions that may start at a different time and that may be overlapping with each other in time.

Start time of transmissions from perspective of processing time reduction: With respect to WTRU processing time, examples of overlapping transmissions that start simultaneously include transmissions associated to the same CG and/or to the same Timing Advance Group (TAG). Examples of overlapping transmissions that start near-simultaneously within a certain time include transmissions associated to the same CG but possibly to different TAGs, or transmissions associated to different CGs but using the synchronized mode of uplink operation. Examples of overlapping transmissions that occur at different time include transmissions associated to different CGs when using the asynchronous mode of uplink operation.

A WTRU may thus determine what function or method to apply as a function of its determination of the available processing time. For example, if the WTRU determines that the available processing time is insufficient due to its estimation of the difference in timing for transmissions associated to the same subframe across CGs then the WTRU may perform a first method; otherwise if sufficient the WTRU may perform a second method. A first method may be a method that considers all transmissions for the WTRU for the concerned subframe while the second method may consider the required power of a first subset of the WTRU's transmissions only (e.g. those of a single CG, such that those transmissions occur earliest for the concerned subframe) and another value for the required power of the second subset of the WTRU's transmissions e.g. a minimum guaranteed value for transmissions of the other CG.

Available processing time, processing time reduction and threshold: Similarly as described in the previous section, the WTRU may apply a first prioritization function (e.g. a power allocation method and/or a scaling function) when it determines that uplink operation between configured CG's may lead to a time budget for the WTRU's processing that is below a certain threshold, and that it may apply a second prioritization function (e.g. a different power allocation method and/or a different method for the scaling function) otherwise. Equivalently, the WTRU may estimate the reduction in available processing time budget e.g. when comparing between the processing time with or without dual connectivity being configured and determine what method to use accordingly.

Minimum Required Processing Time: For example, the WTRU may consider as a threshold a minimum required WTRU processing time. Alternatively, the WTRU may equivalently consider a maximum processing time reduction.

Such threshold may be specified as a fixed value and/or may be part of the WTRU's capability. Alternatively, it may be implementation specific and only known to the WTRU. In the latter case, the selection of the method to be used by the WTRU to perform prioritization, power allocation and/or power scaling may be entirely up to the WTRU implementation.

Example definitions of processing time: The WTRU may define the quantity used in the comparison between required and available processing time according to any of the following, without precluding other definitions.

Time until all scheduling information can be known for both CGs.

In an example, processing time reduction may be defined as essentially equivalent to the difference in DL arrival time for scheduling information for each CG for a given subframe.

In one method, such processing time may represent the time required to receive downlink control signaling (e.g. on PDCCH and/or E-PDCCH) and to process the received control information. In other words, it may represent a quantity that include the earliest time (e.g. either first symbol of the subframe or first symbol of the control channel for that subframe) for which the WTRU may start receiving control signaling in subframe n across all cells of the WTRU's configuration, until the WTRU may first determine all necessary parameters for all transmissions for a given CG or for both CGs.

In this case, the processing time reduction may be equivalent to the difference in DL timing between a subframe associated to the earliest TAG of the WTRU (e.g. from the earliest CG) and a subframe associated to the latest TAG of the WTRU (e.g. from the latest CG).

In another example, processing time reduction may be defined as essentially equivalent to the difference in start UL subframe for each CG for a given subframe.

In one method, the WTRU may determine that the processing time reduction is equal to the difference between the start of the UL subframe of the earliest TAG (e.g. for the earliest CG) and the start of the UL subframe of the latest TAG (e.g. for the latest CG) for the concerned subframe. Possibly, only based on Nta_ref i.e. using the timing alignment value last updated by network signaling for each concerned TAG.

In another example, processing time reduction may be derived based on methods to determine whether the WTRU operates according to the synchronous or asynchronous mode of UL operation.

In one method, the WTRU may determine the reduction in processing time using a method described herein, for example regarding synchronous and unsyncrhonous uplink transmissions across CGs.

In another example, processing time may be defined as a time from end of last (E-)PDCCH reception until all scheduling information can be known.

In another example, processing time reduction would be essentially equivalent to the difference in DL arrival time for scheduling information for each CG for a given subframe.

In one method, such processing time may represent the processing time required to determine all parameters necessary to apply a prioritization function, such as performing power allocation and/or power scaling, once the control channels that occur last in time has been received.

In another example, processing time may be defined as time left for power allocation/scaling once all scheduling information is known for both CGs.

In one method, such processing time may represent the time budget related to the processing required to perform a prioritization function, such as performing power allocation and/or power scaling, for example, once the WTRU has already determined all parameters necessary to perform the prioritization function.

In another example, processing time may be essentially equivalent to time between DL arrival time for scheduling information of latest CG in a given subframe n and start of UL subframe of earliest CG in subframe n+4.

In one method, such processing time may be determined as time from the end of a subframe n on which the WTRU may receive control signaling for the latest TAG (e.g. for the latest CG) and the time of the start of the UL subframe for the earliest TAG (e.g. for the earliest CG) in subframe n+4.

Methods to determine available processing time budget: In some methods, the WTRU may consider only a TAG with at least one activated cell. Alternatively in some methods, the WTRU may consider any cell of its configuration, independently of activation state. In some methods, the WTRU may further consider only a cell that is used as a DL timing reference e.g. when the WTRU determines a parameters as a function of a downlink component (e.g. timing of reception of control signaling, start of DL subframe or the likes).

Methods to determine the available processing time budget: The WTRU may determine the available processing time budget and compare it to the minimum required WTRU processing time (i.e. a threshold). The WTRU may determine the available processing time based on the principles described above for the definition of the processing time. Details of such method are further described below.

Time reduction as difference in uplink timing: For example, the WTRU may determine that the reduction in available processing time is equal to the timing difference of uplink subframe for each CG e.g. according to any of the method described herein, including with respect to synchronous and unsynchronous uplink transmissions across CGs.

Available processing time: For example, the WTRU may determine the available processing time based on the time between a "DL timing component" and an "UL timing component." For example, such DL timing component may be related to reception of downlink signal. Such downlink signal may comprise downlink signaling information for scheduling of an uplink transmission for a first CG (e.g. downlink control signaling received in subframe n). Such UL timing component may be related to a transmission of a signal in the uplink. Such uplink transmission may comprise an uplink transmission for the corresponding subframe for a second CG (e.g. subframe n+4).

First CG may be the later CG—i.e. latest Downlink component for subframe n: For example, the first CG may be the CG for which the WTRU determines that the start of a downlink subframe n occurs later than that of the corresponding subframe n for the other CG. Possibly, only for the applicable Timing Advance Group (TAG) and/or cell for the respective CG. For example, such TAG may be the TAG that includes the special cell of the CG (e.g. the cell configured with PUCCH resources and/or the cell that is always active).

Second CG may be the earlier CG—i.e. earlier Uplink component for subframe n (or n+4): For example, the second CG may be the CG for which the WTRU determines that the start of an uplink subframe (or transmission for subframe) n occurs earlier than that of the corresponding subframe n for the other CG. Possibly, only for the applicable Timing Advance Group (TAG) and/or cell for the respective CG. For example, such TAG may be the TAG that includes the special cell of the CG (e.g. the cell configured with PUCCH resources and/or the cell that is always active).

DL timing component: For example, a DL timing component may be based on signaling such as a DCI received on PDCCH (or E-PDCCH) for the CG. For example, such timing of the downlink signaling may be one of Start/end of the subframe in which DCI is received; Start/end of the PDCCH on which DCI is received; Start/end of PDCCH decoding process for the received DCI; or End of processing of received DCI; as in the following:

Start/end of the subframe in which DCI is received: The time of the first (or last) symbol of the subframe of the cell of the CG that corresponds to the downlink resources on which the WTRU received the said control signaling. Similarly, the WTRU may use the DL timing estimation for the corresponding cell (or Timing Advance Group).

Start/end of the PDCCH on which DCI is received: The time of the first (or last) symbol of the PDCCH (or E-PDCCH) on which the said control signaling is received.

Start/end of PDCCH decoding process for the received DCI: The time at which the WTRU may start attempts to decode the said control signaling or, alternatively, the time at which the WTRU may successfully decodes the said control signaling.

End of processing of received DCI: The time at which the WTRU has completed processing of the said control signaling. For example, this may correspond to the time instant at which the WTRU has all the necessary information to calculate the power for all transmissions of a CG.

"UL timing component:" For example, such UL timing component may be based on the start of a transmission for the CG.

Example realizations of estimation of available processing time are disclosed in greater detail hereafter.

Start of latest PDCCH until start of earliest UL subframe: In one example of the above methods, the WTRU may first determine that is has a minimum required processing delay when operating with dual connectivity. Such processing delay may represent the delay from the time it starts receiving the latest occurrence of a PDCCH in subframe n across any of the configured (and possibly activated) serving cells of its configuration up to the time it is required to perform the first transmission across any of the (possibly activated) serving cells with configured uplink in subframe n+4. The WTRU may then determine that it is expected to perform at least one uplink transmission in each of the configured CGs in subframe n+4; such may include any combination of PUSCH, PUCCH, SRS or PRACH transmissions. The WTRU may determine the available time budget and compare it with the minimum required processing time.

Completion of decoding of all PDCCH until start of earliest UL subframe: In another example of the above methods, the WTRU may first determine that is has a minimum required processing delay when operating with dual connectivity. Such processing delay may represent the delay from the time it has successfully completed decoding of all PDCCH occurrences in subframe n across any of the configured (and possibly activated) serving cell of its configuration up to the time it is required to perform the first transmission across any of the (possibly activated) serving cells with configured uplink in subframe n+4. The WTRU may then determine that it is expected to perform at least one uplink transmission in each of the configured CGs in subframe n+4; such may include any combination of PUSCH, PUCCH, SRS or PRACH transmissions. The WTRU may determine the available budget and compare it with the minimum required processing time.

Start/end of latest subframe until start of earliest UL subframe: In another example of the above methods, the WTRU may first determine that is has a minimum required processing delay of x milliseconds (ms) when operating with dual connectivity. Such processing delay may represent the delay from the start (or the end) of the subframe of the serving cell(s) that starts latest in time in subframe n across any of the configured (and possibly activated) serving cells of its configuration up to the time it is required to perform the first transmission across any of the activated serving cells with configured uplink in subframe n+4. The WTRU may then determine that it is expected to perform at least one uplink transmission in each of the configured CGs in subframe n+4; such may include any combination of PUSCH, PUCCH, SRS or PRACH transmissions. The WTRU may determine the available budget and compare it with the minimum required processing time.

In another example of the above methods, the WTRU may be required to perform a PRACH transmission (or retransmission) following reception of certain DL control signaling or after the end of a random access response window. For instance, the WTRU may be required to transmit (or retransmit) PRACH following reception of a "PDCCH order," following reception of a random access response that does not contain a response to a previously transmitted preamble sequence, or if no random access response is received in the last subframe of the random access response window.

The WTRU may determine a minimum processing time threshold corresponding to the duration between the end of the subframe in which PRACH transmission or retransmission is triggered in a first cell group (e.g. the subframe in which PDCCH order is received, or a random access response is received, or the last subframe of the window), and the start of the first subframe s0 in which the WTRU is required to be ready to transmit a preamble if a PRACH resource were available in this subframe. In case a transmission initiated in a second cell group before the start of subframe s0 overlaps with PRACH of the first cell group transmitted in subframe s0, i.e. when the available processing time is lower than the minimum, the WTRU may prioritize the transmission of the second cell group over the PRACH transmission of the first cell group. In case a transmission initiated in a second cell group overlaps with PRACH of the first cell group transmitted at least one subframe after subframe s0, and the transmission of the second cell group did not start more than one subframe before PRACH, i.e. when the available processing time is higher than the minimum, the WTRU prioritizes the PRACH transmission of the first cell group over the transmission of the second cell group unless the latter is another PRACH transmission of higher priority, such as PRACH of Pcell. Stated differently, the WTRU may prioritize PRACH of a first cell group over another transmission of a second cell group if the transmission timing of PRACH (in subframe s1) is such that the WTRU is ready to transmit the PRACH at least one subframe before this subframe (i.e., in subframe s1−x, where x>=1) and provided that the transmission of the second cell group does not start earlier than 1 subframe before the PRACH of the first cell group and is of lower priority rank.

Different WTRU behaviors depending on available processing time: For all examples above, the WTRU may further determine that power should be allocated to transmissions of the CG that occurs first by considering that a specific amount of power should be reserved to transmissions of the other CG (e.g. a semi-static, possibly configured, value such that a minimum guaranteed amount of power may be allocated to that CG) if the available processing time is insufficient; in other words, the WTRU may not be not mandated to consider the power required for the actual transmissions for that CG and may subsequently perform scaling of the power for one or more transmissions for that CG in case the allocated amount of power is less than the amount required. Otherwise if the available processing time is sufficient, the WTRU may further determine that power should be allocated to transmissions of the CG that occurs first by considering the power required for transmissions of the other CG; if the total amount of power required exceed the maximum available power of the WTRU, the WTRU may perform scaling of power across all transmissions of the WTRU using any of the prioritization methods described herein.

Triggers are disclosed in greater detail hereafter to perform estimation of available processing time.

When to determine available processing time: For all examples above, the WTRU may determine the available processing time when at least one of the following events occur: Periodic events, Reconfiguration events, Gaining timing alignment events, Updating timing alignment events, or Overlapping transmission events as described in the following:

a. Periodic events: When a timer expires, e.g. periodically. The WTRU may restart such timer once it has determined and/or updated the available WTRU processing time.

b. Reconfiguration events, i.e., reconfiguration that may indicate that timing characteristics of one or more configured serving cell(s) have changed: Subsequent to a RRC reconfiguration that adds or remove at least one timing advance group (TAG) from the WTRU's configuration. This may include initial configuration of a SCG, initial addition of at least one cell to a TAG or the likes.

c. Gaining timing alignment events, i.e., when gaining UL timing alignment for a TAG: When the WTRU performs a procedure following which the WTRU has a valid timing alignment for a TAG, e.g. upon applying a received TAC in a RAR in the random access procedure, upon receiving a MAC TAC CE and/or when restarting at least one TAT that was previously expired.

d. Updating timing alignment events, i.e. when updating UL timing alignment for a TAG: When the WTRU receives a MAC TAC for a TAG, e.g. upon applying a received TAC in a RAR in the random access procedure, upon receiving a MAC TAC CE and/or when restarting at least one TAT.

Overlapping transmission events, i.e. when it determines that at least one uplink transmission may be performed for each CG in a given subframe. When the WTRU determines that overlapping transmissions may occur in a given subframe n+4, e.g. after completion of processing of DL control signaling for subframe n.

Further Example Realizations

The WTRU may determine to allocate power with look ahead if processing time budget is sufficient, and with guaranteed power otherwise. For example, the WTRU may determine that it should perform power allocation according to a first method when it determines that processing time reduction is below a certain threshold and according to a second method otherwise. For example, the first method may be based on a determination of the power allocated to each CG by considering required power for each CG, while a second method may be based on a determination of the power allocated to each CG based on the required power for the CG for which transmissions start earliest in time and based on a guaranteed amount of power for the other CG.

For the first method, the WTRU may perform power allocation and/or power scaling per CG (e.g. per CG allocation) or across all transmissions of the WTRU (e.g. flat scaling) e.g. according to a method described herein. For the second method, any remaining power not used for transmissions of the earliest CG may then be allocated to the other CG.

The WTRU may determine to perform power scaling using flat scaling if processing time budget is sufficient, and on the power for a CG otherwise. For example, the WTRU may determine that it should perform power scaling according to a first method when it determines that processing time reduction is below a certain threshold and according to a second method otherwise. For example, the first method may be based on scaling transmissions by considering all transmissions across both CGs according to priority between such transmissions (e.g. by type), while a second method may be based on scaling power per CG e.g. by first allocating power per CG and then performing scaling across transmissions of a given CG only.

Additional power sharing methods between transmissions of different MAC instances are further discussed herein. In some implementations, the WTRU may allocate power to transmissions associated to different MAC entities (hereafter a "cell group" or "CG") in a given subframe such that a first amount (or fraction e.g. $P_{MeNB}$) of the total WTRU available power (e.g. $P_{CMAX}$) is reserved to transmissions of a first CG ("Primary CG", or "MCG"), and a second amount (or fraction e.g. $P_{SeNB}$) of the total WTRU available power (e.g. $P_{CMAX}$) is reserved to transmissions of a second CG ("Secondary CG", or "SCG"). If the sum of $P_{MeNB}$ and $P_{SeNB}$ is less than the total available transmission power $P_{CMAX}$ the WTRU may also allocate the remaining power according to specific priority rules between CGs and/or between transmissions associated to each CGs.

It is noted that a MAC entity (or MAC instance) may be configured with one or more serving cells which may then form a Cell Group (CG). For the MAC instance or the CG that is associated to serving cells of a first eNB (e.g. the MeNB), such may be referred to as the Primary CG (PCG) or the Master CG (MCG); in this case, the concerned first MAC entity may also be referred to as the Primary MAC entity. Similarly, the MAC instance or the CG that is associated to serving cells of a second eNB (e.g. the SeNB) may be referred to as the Secondary CG (SCG) or the SeNB CG (SCG); in this case, the concerned second MAC entity may also be referred to as the Secondary MAC entity.

The WTRU may perform such allocation of power according to a specific power control mode ("PCM"), where the applicable PCM may be signaled as part of the WTRU's configuration for dual connectivity operation.

For example, the WTRU may apply a first PCM ("PCM1") (if configured) such that it may share any of the remaining power across transmissions associated to different CGs according to a prioritization determined based on the type of UCI associated to the different transmissions. The WTRU may apply a second PCM ("PCM2") (if supported by the WTRU and if configured) such that it may reserve $P_{MeNB}$ and $P_{SeNB}$ for transmissions associated to the corresponding CG (e.g. MCG, and SCG respectively) if there is a potential overlapping uplink transmission. The WTRU may first make available all remaining power to the transmission(s) of the CG associated with the transmission(s) that are earlier in time.

The WTRU may determine whether or not it may perform additional sharing of power between CGs, including whether or not some (or all) of the guaranteed power of a second CG may be allocated to the transmissions of a first CG.

In one example, the WTRU may determine whether or not there is at least one transmission for the second CG, i.e. whether or not the required power for the second CG is zero for the concerned transmission time interval and/or for the overlapping part in time between CGs (hereafter "subframe"). Such determination may be performed according to at least one of semi-static aspects, dynamic aspects, or a WTRU-autonomous determination.

Semi-static aspects may include aspects related to L3/RRC configuration signalling. For example, the WTRU may perform such determination according to at least one of subframe type or subframe blanking.

Regarding determination according to subframe type i.e. whether the subframe is for uplink transmissions or for downlink reception only, the determination may be based at least one of frame structure type, UL/DL configuration, or half-duplex operation, Regarding determination based on frame structure type (e.g. type 1 FDD or type 2 TDD), for example, the WTRU may be configured with a cell for TTD operation. Possibly, a CG may be configured such that all cells of the CG are for TDD operation.

Regarding determination based on UL/DL configuration e.g. for TDD, for example, the WTRU may be configured with a TDD UL/DL configuration. Such configuration may be common to all cells with configured uplink resources of a given CG. In this case, the WTRU may determine that no uplink transmission is expected for the CG in a DL-only given subframe.

Regarding determination based on half duplex operation e.g. for FDD, for example, the WTRU may report half-duplex-only capability for a given supported band. A CG may be configured such that all cells of the CG correspond to such band. In this case, the WTRU may determine that no uplink transmission is expected for the CG in a given subframe if at least one downlink transmissions is expected in the concerned subframe. For example, the WTRU may make such determination for a subframe for which the WTRU is configured with a downlink assignment. The WTRU may make such determination for a subframe for which the WTRU is required to monitor PDCCH e.g. for reception of system information, paging (for notification of update to system information) or the like.

Regarding determination according to subframe blanking, for example, the WTRU may be configured by L3 such that one (or more) type(s) of transmissions is not possible for some subframes. In this case, the WTRU may determine that no uplink transmission is expected for the CG in the subframe.

Regarding determination according to periods of absolute priority in a power allocation period (e.g. for multi-RAT), for example, the WTRU may be configured such that transmissions associated to a specific MAC entity have absolute priority for one (or more) periods (or TTIs) within a configured power allocation period. Such period(s) with absolute priority may be L3 configuration aspect, and/or may be determined based on dynamic aspects such as L1/L2 control signaling as described in other sections. In this case, the WTRU may determine that no uplink transmission is expected for the CG in the corresponding power allocation period.

Dynamic aspects may include aspects associated with scheduling activity and related signalling. For example, the WTRU may perform such determination according to at least one of DRX operation, RRC procedure, Timing Alignment, or Enhanced Interference Mitigation and Traffic Adaptation ("eIMTA") UL/DL configuration.

Regarding determination according to DRX operation, the WTRU may be configured with a DRX pattern and related parameters. Such pattern may represent the time during which the WTRU may be scheduled for transmissions (e.g. DRX Active Time). Such DRX Active Time may include an On-Duration period, which occurs periodically and which has a fixed length. Such DRX Active Time may be further controlled by the reception of downlink control signaling such that the DRX Active Time may be extended (e.g. by scheduling activity) or stopped until the start of the next On-Duration period (e.g. by reception of a MAC DRX CE). Such DRX pattern and Active Time may differ between CGs. Determination of such DRX patterns and Active Time (or equivalent) may differ between CGs when configured with different radio access technology. In an example, the WTRU may determine that no uplink transmission is expected for the CG for subframe(s) during which the WTRU knows that it is not part of DRX Active Time. In another example, the WTRU may determine that no uplink transmission is expected for the CG for a subset of subframe(s) during which the WTRU knows that it is not part of DRX Active Time. This may be only for such subframe for which the WTRU knows with absolute certainty, e.g. such as for the period that starts a certain amount of processing time following the last subframe of the DRX Active Time such that the DRX Active Time cannot be extended in the last few subframes of the DRX Active Time and/or such as the period that start after the reception of a MAC DRX CE. In both cases, the period may extend until the start of the next On-Duration period or until the WTRU triggers a SR (possibly even up to n+7 subframes following the transmission of the first SR for a given SR trigger).

Regarding determination according to RRC procedure and related interruption, the WTRU may initiate a L3/RRC procedure that leads to an interruption of the radio front end associated to transmissions for one of the CGs only. For example, the WTRU may receive a RRC Connection Reconfiguration message and initiate the reconfiguration of a CG. In such case, the WTRU may be allowed to not be active in transmissions for up to a certain amount of time, e.g. for 15 ms following the successful reception of the RRC PDU. In this case, the WTRU may determine that no uplink transmission is expected for the CG during that time. The WTRU may for example determine that no uplink transmission is expected for the CG while timer T304s is running. The WTRU may start T304s when it receives the RRC Connection Reconfiguration message with the mobility control information element that modifies the SCG. The WTRU may determine that no uplink transmission is expected for the CG when it declares RLF for the CG. For example, the WTRU may determine that RLF has occurred on the SCG and declared S-RLF, which stops all uplink transmissions for the SCG until the WTRU receives a reconfiguration that modifies the SCG.

Regarding determination according to maintenance of timing alignment (synchronization state), the WTRU may determine that no uplink transmission is expected for the CG when a Timing Alignment Timer (TAT) associated to the primary Timing Advance Group (pTAG) and/or associated to the special cell of the CG (e.g. the PCell for the MCG, and the PSCell for the SCG) is not running. WTRU may additionally determine that no uplink transmission is expected for the CG between the subframe in which the WTRU starts or restarts the TAT of the pTAG for the CG and until the first occasion for an uplink transmission. For example, if the TAT is restarted from the reception of a RAR that includes a TAC and a grant for an uplink transmission in subframe n, the WTRU may determine that no uplink transmission is expected for the CG until subframe n+x where x is the allowed processing time (x may be equal to 6 ms, for example). This may thus include the time during the RAR window (time while RA Response Timer is running) as well as the time from the reception of the first grant in the RAR up of the subframe for the first PUSCH transmission with this grant.

Regarding determination according to eIMTA uplink/downlink configuration, the WTRU may determine that no uplink transmission is expected for the CG based on the outcome of the procedure for determining the eIMTA-uplink/downlink configuration. Such determination may take place based on the reception of PDCCH scrambled by a specific RNTI (eIMTA-RNTI) in a previous subframe, or the absence of reception thereof, as well as higher layer information.

WTRU autonomous determination may relate to implementations where the WTRU may perform such determination according to at least one of S-RLF, WTRU capabilities exceeded, in-device coexistence (IDC) or other impairment situations.

Regarding determination according to S-RLF, the WTRU may determine that no uplink transmission is expected for the CG when it declares RLF for the CG. For example, the WTRU may determine that RLF has occurred on the SCG and declared S-RLF, which stops all uplink transmissions for the SCG until the WTRU receives a reconfiguration that modifies the SCG.

Regarding determination according to exceeded WTRU capabilities, the WTRU may determine that no uplink transmission is expected for the CG when it determines that one or more of its capabilities are exceeded for a given period and/or subframe.

Regarding determination according to In-Device Coexistence (IDC), a WTRU may autonomously ignore a grant and/or drop a transmission if it has overlapping transmissions for another radio technology or other reception such as GPS that could be disrupted, if such transmission(s) would otherwise interfere with possibly critical transmissions of the other radio technology. Such behavior may affect transmissions of a single CG, e.g. the CG operating in the same frequency band as the other radio technology. Such behavior may also be conditioned by a pattern known to the WTRU e.g. in case of predictable traffic. In such case, the WTRU may determine that no uplink transmission is expected for the CG when such overlap occurs.

Regarding determination according to other impairment situations, the WTRU may determine that no uplink transmission is expected for the CG when an impairment situation that precludes one or more transmissions (or all) for a CG occurs for a given subframe.

The WTRU may allocate some or all of the guaranteed power of the second CG to transmissions of the first CG when it determines that there is no transmission associated to the second CG for the concerned subframe and/or overlapping period. In some implementations, the WTRU may perform such reallocation of at least part of the guaranteed power of the second CG only if it also determines that the similar condition is also determined for transmissions of the second CG in the subsequent subframe and/or overlapping period. For example, the WTRU may perform such reallocation of the guaranteed power of the second CG only if it also determines that there is no transmission expected for the second CG in the subsequent subframe and/or overlapping period.

It may be determined whether or not the power required is within a specific range. For example, in one method the WTRU may determine whether or not the transmission power required for the second CG in a given subframe may be equal or below a certain threshold (but possibly non-zero).

In some implementations the WTRU may perform such determination by considering only specific type(s) of uplink transmissions. For example, the WTRU may perform such determination using the above methods but only based on PUSCH transmissions, such that the WTRU may determine that the total power required for PUSCH is zero. In some implementations, the WTRU may perform such determination also including any possible PRACH transmission. Further determination may be based on other type(s) of transmission and/or of UCI type(s), e.g. PUCCH for ACK/NACK, CQI, SR or SRS. Such further determination may be based on the exact power requirement(s) of the CG for the concerned subframe, or based on a probabilistic assessment (e.g. based on previous transmission levels for similar transmissions and/or by taking into account a certain margin of error). Such threshold may correspond a level that is below the value of guaranteed power for the CG (hereafter $P_{xCG}$). Possibly, such threshold may correspond to the value of $P_{xCG}$ applicable to the concerned subframe less a certain margin of error. Such margin of error may correspond to the maximum open loop adjustment expected for a given period of time. Possibly, this corresponds to the maximum step unit for such open loop adjustment.

Such further determination may be performed according to at least one of UE-autonomous transmission or retransmission, data available for transmission, Scheduling Request (SR) pending, last reported BSR, or L2 configuration, including DRB type.

Regarding determination according to UE-autonomous transmission or retransmission, such transmission types may include a configured uplink grant such that all parameters of a PUSCH transmission may be known for a subframe n+4, a WTRU-autonomous non-adaptive retransmission for an ongoing HARQ process that has not yet completed successfully, and/or a downlink configured grant such that all parameters of a possible PUCCH transmission (for HARQ ACK/NACK feedback) may be known for subframe n+8, where subframe n is the scheduling occasion corresponding to the scheduling (i.e. possibility to adapt) occasion for the PUSCH or the PDSCH transmission, respectively. In this case, the WTRU may determine the power required by such transmissions in advance of their relative scheduling occasion in subframe n if it may also determine that no other transmissions may be scheduled (or required), for example based on other methods as described herein and including the case where the subframe in question corresponds to the scheduling occasion (e.g. subframe n) such that the concerned transmissions or retransmissions may be performed but may not be adapted. This may also be applicable for any HARQ processes that are suspended and that may not be restarted such that the WTRU is not expected to perform an autonomous non-adaptive retransmission in the concerned subframe (i.e. the WTRU may determine that zero power is required for such processes).

Regarding determination according to data available for transmission, the WTRU may determine that there is no data available for transmission for a given subframe for a given CG, such that reception of a grant would lead to transmission of padding information or no transmission at all. In this case, the WTRU may determine that zero power is required for PUSCH for the CG in the concerned subframe, although other transmissions may be possible.

Regarding determination according to whether a scheduling request (SR) is pending, The WTRU may determine that it has triggered a SR. In this case, the WTRU may determine that no PUSCH transmission(s) are expected from the time the WTRU triggers the SR until the time it may first receive a grant for an uplink transmission e.g. at least until the subframe of the initial transmission of the SR and possibly up to a certain (eNB) processing time after (e.g. 3 ms). The WTRU may however take into account the (exact, or maximum possible) power required for SR on PUCCH (if applicable) or the power required for one or more preamble transmissions or retransmissions (otherwise) for the applicable subframe (D-SR occasion or PRACH occasion, respectively) during this interval. In some implementations the WTRU may consider this aspect only if the SR was triggered due to new data becoming available for transmission while the WTRU's buffers for radio bearers (or LCH) associated to the CG were previously empty.

Regarding determination according to a last reported BSR, the WTRU may determine that it last reported a certain amount of data in its buffers and determine from this that it may no longer receive grants for uplink transmission that would be useful for transmission of any data for bearers associated to a given CG. For example, the WTRU may have last reported empty buffers, e.g. by including a padding BSR in the last uplink transmission, possibly only if no new data has been made available for transmission for the CG since the last transmission of a BSR. In this case, the WTRU may determine that no PUSCH transmission(s) are expected for a given subframe during which this condition may be true.

Regarding determination according to L2 configuration, including DRB type, the WTRU may determine that it is configured such that no user plane traffic may be transmitted using resources of the CG. In this case, the WTRU may determine that no PUSCH transmission or transmissions are expected for the CG for a given subframe.

For example, the WTRU may determine that the SCG is configured only with a split DRB (for the downlink) such that the uplink path is mapped only to the other CG i.e. the MCG. In this case, only L2 control PDUs may be carried on PUSCH, if any. For example, the WTRU may be configured with split DRBs (e.g. DRBs that are associated to both CGs at least for downlink traffic) and without SCG-only DRB. In this case, if the WTRU is additionally configured such that a single uplink path (or CG) may be used for transmission of user plane data (e.g. PDCP PDUs) and this CG is the MCG, then the WTRU may determine that no user plane data is expected to be transmitted using uplink resources of the SCG. The WTRU may determine that PUCCH, SRS, PRACH may be expected while for PUSCH only transmissions using small transport blocks (e.g. containing RLC control PDUs) may be expected sporadically at times known by the WTRU. For example, the WTRU may be configured with split DRBs (e.g. DRBs that are associated to both CGs at least for downlink traffic) and without MCG-only DRBs. In this case, if the WTRU is additionally configured such that a single uplink path (or CG) may be used for transmission of user plane data (e.g. PDCP PDUs) and this CG is the SCG, then the WTRU may determine that no user plane data is expected to be transmitted using uplink resources of the SCG. The WTRU may determine that PUCCH, SRS, PRACH may be expected while for PUSCH only transmissions using small transport blocks (e.g. containing RLC control PDUs) or transmissions containing SRB data may be expected, both sporadically at times known to the WTRU.

In another example, the WTRU may determine that it is not expected to perform any transmission of a specific type using uplink resources associated to a specific CG. For example, the WTRU may determine that it is not expected to perform any PUSCH transmission (e.g. such that only PRACH, PUCCH, SRS may be possible). For example, the WTRU may determine this based on the level of data available for UL transmission in the WTRU's buffer associated to this CG. For example, the WTRU may determine that it has no data available for transmission for this CG or otherwise that such nonzero amount of data can be served by granted resources already known to the WTRU and applicable to a different subframe. For example, the WTRU may also determine that any PUCCH/SRS would not exceed a certain amount within the guaranteed power (PL estimate, few semi-static parameters e.g. PUCCH format). Such determination may be possible because the information that may not be available to the WTRU may only cause an error in the setting of the power up to a maximum threshold e.g. such as 3 db in case of a TPC command, which error may be accounted for in the setting of the transmission power. For example, the WTRU may also determine the power setting for a Periodic SRS transmission in advance as the setting of the power for such transmission is based on a semi-static configuration. For example, the WTRU may also determine whether or not power is required for an Aperiodic SRS transmission using similar methods as for determination for PUSCH transmission, because the request for an Aperiodic SRS transmission is typically received together with a grant for a PUSCH transmission. In other words, the WTRU determines that it is not expected to transmit an Aperiodic SRS when it determines that it is not expected to perform a PUSCH transmission e.g. using methods described herein. In some implementations the WTRU may determine an upper bound for all transmissions of the CG for a given subframe, based on such determinations as described above. Such upper bound may be a function of the estimated path loss and/or the format of the transmissions for the concerned subframe or the like (e.g. PUSCH format.)

The WTRU may allocate some or all of the guaranteed power of the second CG possibly up to a value equal to the applicable threshold less the calculated or estimated amount or required power for transmissions of the second CG. Such power may be reallocated to transmissions of the first CG. In some implementations, power may be reallocated to transmissions of the first CG only if the required power for a specific type of transmission is equal (or at least expected to be equal) to zero e.g. there are no PUSCH transmissions for the second CG.

In some implementations the WTRU may perform such reallocation of at least part of the guaranteed power of the second CG only if it also determines that the similar condition is also determined for transmissions of the second CG in the subsequent subframe and/or overlapping period. For example, the WTRU may perform such reallocation of at least part of the guaranteed power of the second CG only if it also determines that at least the same level of reallocated power is not expected to be required for transmissions of the second CG in the subsequent subframe and/or overlapping period.

In one method, the WTRU may first perform such determination for a given subframe by performing at least one of the following steps, possibly in the order listed below:

1. The WTRU may first calculate the $P_{CMAX}$ for the possible overlapping part of the transmissions across both CGs;
2. The WTRU may then calculate power requirements for the second CG;
3. If the (possibly, estimation of the) power required for the second CG is less than the power corresponding to the guaranteed portion of $P_{CMAX}$, the WTRU may reallocate the unused part of such portion to transmission(s) of the other CG.

In some implementations the WTRU may perform such determination only when the WTRU is configured with PCM2. In some implementations the WTRU may apply such determination only if the WTRU reports that it supports such capability. In some implementations the WTRU may apply such determination only if the WTRU is explicitly configured to perform such determination. In some implementations the WTRU may apply such determination only such that it can reclaim some of the guaranteed power of a second CG to the benefit of a first CG. For example, the first CG may be the MCG always, or the CG that is associated to transmissions that occurs earliest in time for a given subframe. For example, the second CG may be the SCG always, or the CG that is associated to transmissions that occurs latest in time for a given subframe.

If the WTRU makes an incorrect determination such that scheduling requires the WTRU to allocate more power to transmissions of a specific CG while the CG has insufficient power (including less power than the guaranteed amount) due to power reallocation according to the above methods for a given subframe, the WTRU may simply apply other prioritization methods such as e.g. scaling within the reallocated amount. In such case, the WTRU may refrain from such power reallocation in subsequent subframe(s). In some implementations the WTRU may refrain from such power reallocation until it determines that any impacted transmission has succeeded and/or until the WTRU determines that it is not power limited.

Additional signalling methods supporting scheduling cooperation are further discussed herein. Methods are described herein whereby the WTRU may report certain aspects to one or more scheduling functions for the purpose of improving cooperation between schedulers. Signalling methods and other aspects described below may additionally apply to methods described in other sections herein. For example, happy bit indication may use similar signaling as described below. Similarly, signaling described below may alternatively be combined with methods described in other sections herein.

In an example scenario for illustrating additional signalling methods supporting scheduling cooperation, a WTRU may be associated with a specific category in terms of its capabilities. Such capability may include (but is not limited to) sustained data rate and processing e.g. in terms of number of soft buffer bits that can be handled (e.g. received and/or transmitted) in a given period of time (e.g. a TTI or a subframe). For example, a WTRU supporting LTE Carrier Aggregation with 2 uplink carriers may support a Dual Connectivity feature with a synchronous mode of operation (e.g. PCM1 only) or both the synchronous and the asynchronous modes of operation based on their declared capabilities. Based on the WTRU's category, such WTRUs may thus have a similar sustained data rate and processing capabilities.

When a WTRU is configured with more than one serving cell according to LTE CA, a single scheduler may drive the data rate and the scheduling opportunities. This may enable a well-defined DL/UL traffic flow that can be based on a WTRU declared category. In such a controlled environment, it may be expected that the WTRU will support its sustained data rates and that its processing capabilities should not be exceeded.

However, in a WTRU configured with more than one serving cell according to LTE Dual Connectivity, scheduling of the WTRU may involve independent schedulers operating in separate eNBs. The concerned eNBs may coordinate (e.g. using X2 signalling) a number of aspects related to the WTRU's capability. Such aspects may include (but are not limited to) buffer data split in downlink, buffer data split in the uplink, maximum number of UL-SCH transport block bits transmitted in a TTI, maximum number of DL-SCH transport block bits received in a TTI, and/or total available power in the form of UL power ratio between cell groups (e.g. $P_{MeNB}$ and $P_{SeNB}$) for uplink transmissions. While the WTRU category is known, the opportunistic scheduling in both MeNB and SeNB may lead to a WTRU processing overload, such that one (or more) of the WTRU's capabilities might be exceeded. For example, the WTRU may experience a soft buffer shortage or may not have enough processing power to get its physical layer soft buffers released fast enough. Such situation may arise and may eventually lead to other impairments that may further impact the operation of the physical layer and/or the operation of other protocols such as L2 protocols (MAC, RLC, PDCP). For example, such impairment may include a failure to successfully complete an uplink HARQ process which may in turn cause a RLF (for a primary MAC instance, MCG) or an interruption of all uplink transmissions with the trigger for an uplink notification (for a secondary MAC instance, SCG).

Methods are described below which may overcome such problems. The following described solutions may be used as standalone methods, in combination with each other, or in combination with other methods described in other sections, and include methods to determine an impairment condition, methods to signal an impairment condition, further methods for a condition related to uplink transmissions, and a trigger for S-RLF.

Methods to determine an impairment condition are further discussed herein. For example, the WTRU may detect that at least one of its capabilities are exceeded, and may initiate a procedure to signal such condition to the network (e.g. signaling towards either the MeNB, the SeNB or both). Such capabilities may include the total maximum number of UL-SCH transport block bits transmitted in a TTI, the total maximum number of DL-SCH transport block bits received in a TTI, the total amount of WTRU available power or more generally a threshold related to processing capabilities. Similarly, such signaling may be triggered when a condition related to QoS is not met, or similar.

The WTRU may initiate signaling of such a condition according to at least one of the possible triggers: 1) a threshold being exceeded for a certain amount of time (a timer may set before triggering such that the state has been sustained for a certain amount of time) or 2) a threshold being exceeded in a specific CG, i.e. either the MCG or the SCG (a timer, e.g. one for each CG, may be envisioned here before triggering such that the state has been sustained for some time).

In some implementations such indication may apply per MAC instance and/or per CG. In some implementations such indication may apply per WTRU. Optionally, such indication may be per carrier and/or per serving cell.

Additionally, the above triggers may be linked through a DL/UL 2 bit combination indicating the transmission direction of the processing issue that is being problematic.

In some implementations, either in combination with the above or alternatively to such signaling, the WTRU may apply any other configured prioritization function during such period e.g. such as the use of one or more alternative grant(s) as described herein.

Methods to signal an impairment condition are further discussed herein. Such methods may include specific values in CQI reporting, indications on PUCCH or in UCI on PUSCH, indications using a CSI feedback process, indications using SR over PUCCH, and/or indications using MAC CE signaling, as further discussed below.

When the WTRU initiates the signaling of an impairment condition, e.g. using triggers as described above or any other trigger, the WTRU may use signaling as described below. Upon reception of such indication, the concerned eNB may use a more conservative scheduling approach such as lowering the transport block size, scheduling less frequently or simply stop scheduling the WTRU e.g. until an indication that the condition is no longer valid. For example such indication may be a valid CQI value (i.e. CQI back in range) signaled by the WTRU.

In some implementations, the methods described to signal an impairment condition may be applied only to indicate the condition associated with a specific transmission direction e.g. for downlink transmissions such as the maximum number of DL-SCH transport block bits received in a TTI has been exceeded or e.g. for uplink transmissions such as the maximum number of UL-SCH transport block bits to be transmitted in a TTI has been exceeded.

Specific value in CQI reporting is further discussed herein. In one method, upon detection of such an impairment condition or when reaching/approaching or overshooting a threshold and possibly for a certain amount of time, the WTRU may signal such condition using a specific CQI value in the signaling for CQI reporting. For example, the WTRU may use the out-of-range (OOR) CQI value. Such indication may be triggered such that it is transmitted using resources of a single CG, or both CGs.

Indication on PUCCH or in UCI on PUSCH is further discussed herein. In one method, the WTRU may use one (or more) bit(s) signaled on PUCCH or inside UCI transmitted on PUSCH to indicate the impairment condition. For example, for PUCCH, format 1b (2 bits) may be used such that the second bit may report the condition. For example, one bit in PUCCH format 3 may be reserved for such indication.

Indication using a CSI feedback process is further discussed herein. In one method, the WTRU may be configured with a dedicated second CSI feedback process for indicating an impairment condition. For example, the WTRU may use the CSI feedback process to provide overload state indication/clearance per MAC entity, per CG or even per carrier.

This indication may be extended to a mapping similar to that described herein for MAC CE signaling.

Indication using Scheduling Request (SR) over PUCCH is further discussed herein. In one method, the WTRU may use a Scheduling Request message to indicate such impairment condition. For example, for PUCCH, format 1b (2 bits) may be used such that the second bit may report the condition. The reinterpretation of the bits contained in the SR message for indication/clearance and other mapping information per eNB/carrier may also be possible.

Indication using MAC CE signaling is further discussed herein. In one method, the WTRU may use a MAC CE for signaling of such impairment condition. For example, the MAC CE may contain a map of the WTRU load per MAC instance or per CG. Such mapping may be for a single direction (uplink or downlink), or for both. This map may be expressed in percentages, may express the current load on DL, UL or both and may have a sufficient granularity for eNB to adjust the traffic. This mapping may be per carrier/direction and may simply indicate which carrier/direction is the most problematic. Such MAC CE may be sent to a single eNB or both MeNB and SeNB.

Further methods for a condition related to uplink transmissions are further discussed herein. In one method, such condition resulting from uplink transmissions and/or uplink scheduling instructions may be mitigated by using the proposed alternative grant in the uplink direction as described herein. The WTRU may use such condition for the selection of an alternative grant using the overload processing or soft bits memory depletion as a trigger. In this case, the WTRU may lower the grant for its uplink transmissions. In some implementations, the WTRU may perform such alternative grant selection only for a period during which the condition is experienced such as in a period in processing overload state and/or only for UL overload or power limitation.

The WTRU may use the alternative grant selection method in combination with any of the signaling methods described in this document for indicating such condition e.g. the processing overload state.

A trigger for S-RLF with new cause is further discussed herein. In one method, the WTRU may avoid failure for an ongoing HARQ process by performing additional behavior upon detection of such condition. This may be useful to avoid a HARQ failure that would be a consequence of such condition such that the WTRU may remain with suitable connectivity towards the network.

The WTRU may autonomously stop all uplink transmissions for the SCG if it determines such condition. Additionally, the WTRU may initiate uplink signaling to indicate the condition using uplink resources of the MCG. Such indication may be according to signaling described above. Such signaling may be L3/RRC signaling such as the WTRU failure notification procedure. In the latter case, the WTRU may determine that the SCG is experiencing S-RLF when such condition is detected e.g. once the impairment state is sustained for a certain amount of time. The WTRU may report a new condition such as "WTRU capabilities exceeded" or similar.

For example, the WTRU may start a timer when a certain processing power percentage is reached or when a threshold corresponding to one aspect of its capabilities is exceeded. If this state is sustained over a certain amount of time, the timer will expire and the S-RLF procedure can be initiated. The WTRU will indicate the condition to the MeNB and it will stop all transmissions using resources associated with the SeNB. In some implementations, the WTRU may continue performing measurements, as well as its monitoring of the radio link. It may also maintain its protocol entities and user plane buffer; until MeNB will reconfigure the WTRU (remove the SeNB connection).

Prioritization and Power allocation between MAC instances of different RATs is further discussed herein. An example embodiment based on guaranteed power and different TTI lengths e.g. for multi-RAT is further discussed herein. An example wherein a WTRU determines the power allocation period and related timing of the prioritization function is further discussed herein.

In one method, the WTRU may be configured with CGs associated to TTIs of different duration. For example, the WTRU may be configured with a primary MAC entity associated to a LTE physical layer (e.g. 1 ms TTI); the WTRU may additionally be configured with a secondary MAC entity associated to a HSPA physical layer (e.g. 2 ms TTI) or with a secondary MAC entity associated to a Wifi physical layer. The WTRU may perform any of the prioritization methods described herein, and in this case apply such prioritization using a period that corresponds to the longest TTIs across all configured MAC instances. Alternatively, such period may correspond to an integer multiple of the shortest TTI across all configured MAC entities which multiple corresponds to the smallest common denominator for all configured physical layer. Such period may be configured by higher layer (e.g. L3/RRC). The WTRU may determine the start of such period based on the timing of a specific MAC entity and/or based on the downlink timing of a specific cell of the WTRU's configuration for that specific MAC entity. Such cell may be a primary cell of the primary MAC entity. Such timing may be the downlink timing for such cell. Such period may correspond to a configured power allocation period Guaranteed power per power allocation period is further discussed herein. The WTRU may be configured with a minimum guaranteed power for different CGs (or MAC instances). Possibly, the WTRU may additionally be configured with a power control mode (PCM) or, the WTRU may determine what PCM to use based on the type of radio access technology associated with the configuration of each MAC entity. The WTRU may apply one or more prioritization function and/or power allocation function per power allocation period. The WTRU may apply the configured minimum guaranteed power per power allocation period. For example, the configuration of power allocation periods may include an indication of priority for the concerned MAC entity for one or more period. For example, for some periods, a primary MAC entity may have absolute priority over the other MAC entity. For example, for some periods, the WTRU may instead allocate (or reserve) an amount of power corresponding to the configured guaranteed power to each MAC entity. Look ahead and scheduling uncertainty for a MAC entity with shortest TTI length is further discussed herein. The WTRU may determine how to perform power allocation at the start of the power allocation period. The WTRU may have the capability to determine all required (or possible) uplink transmissions for the secondary MAC entity (e.g. the physical layer with the longest TTI length) while it may only have the capability to determine a subset of the transmissions required for the primary MAC entity (e.g. the physical layer with the shortest TTI length). In such case, the WTRU may first determine the respective priority associated to the transmission of each MAC entity (e.g. according to any other method described herein). If such determination is based on one or more dynamic aspects and if such dynamic aspect(s) include at least some of the dynamic scheduling information (e.g. at least for the primary MAC entity), the WTRU may determine an amount of power to be assigned to each MAC instance of the power allocation period based on at least the transmission requirements for (and/or based on the prioritization function applied using) the first TTI of the primary MAC entity. The WTRU may then apply the same amount to subsequent TTIs of the same power allocation period. For example, if the WTRU determines from the priority associated to each MAC entity that the primary MAC entity shall have absolute priority for the entire power allocation period, the WTRU may use the total WTRU available power for the transmissions of that MAC entity for all TTIs of the power allocation period. For example, if the WTRU determines from the applicable prioritization function that the total available power of the WTRU is split to different MAC entities according to a specific ratio for transmission starting at the beginning of the power allocation period, the WTRU may enforce the same ration for all TTIs of the power allocation period. Such prioritization function may be a semi-static split of the total available power.

Power allocation period aligned with DRX/DTX functionality is further discussed herein. In one example, a period associated with an absolute priority for a specific MAC instance may correspond (or be aligned with) an inactivity period of the other MAC entity. Such inactivity period may be based on a DRX algorithm or equivalent. Conversely, a period associated with an absolute priority for a specific MAC instance may induce an inactivity period for the other MAC entity.

Calculation of total available uplink power for first RAT uses reduction due to other MAC/RAT entity is further discussed herein. In one example, the WTRU may calculate the total amount of available power for uplink transmission for transmissions associated to one (or more) MAC entities of the same type of radio access technology as a function of the power allocation in one (or more) MAC entities of a different type of radio access technology. For example, for transmissions associated to a LTE MAC entity the WTRU may deduce a certain amount of power allocated to the other MAC entity (e.g. $P_{HSPA}$ for HSPA or $P_{WIFI}$ for Wifi) and apply such amount as a power reduction when calculating $P_{CMAX}$. For example, the configured maximum output power $P_{CMAX,c}$ may be set within the following bounds:

$$P_{CMAX\_L,c} \leq P_{CMAX,c} \leq P_{CMAX\_H,c}$$

with $$P_{CMAX\_L,c} = \text{MIN}\{P_{EMAX,c} - \Delta T_{C,c}, P_{PowerClass} - \text{MAX}(DCPR_i + MPR_c + A\text{-}MPC_c + \Delta T_{IB,c} + \Delta T_{C,c}, P\text{-}MPR_c)\} P_{CMAX\_H,c} = \text{MIN}\{P_{EMAX,c}, P_{PowerClass}\}$$

Where $DCPR_i$ is the power made available to each MAC entity i that is of a different type of radio access technology than the LTE MAC entity(ies) and where other parameters may correspond to 3GPP TS 36.101 v12.5.0 (2014-09) section 6.2.5, for example. Possibly, $DCPR_i$ may vary as a function of a prioritization function such as any method described herein. Possibly, the WTRU may perform such calculation once per power allocation period.

A permanent hard split is further discussed herein. In another method, the WTRU may be configured with different values for the maximum allowed WTRU output power per MAC entity and/or per MAC entity of the same radio access technology e.g. $P_{EMAX}$ or equivalent. Such value may correspond to $DCPR_i$ above when calculating available WTRU power for LTE MAC entity(ies).

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

The invention claimed is:

1. A wireless transmit/receive unit (WTRU) comprising:
   a processor configured to receive information which includes a grant for an uplink transmission, wherein the information is received based on a first radio network temporary identifier (RNTI) or a second RNTI;
   the processor further configured to determine a parameter for the uplink transmission, wherein the processor determines the parameter from a first set of parameters on a condition that the information is received based on the first RNTI or from a second set of parameters on a condition that the information is received based on the second RNTI; and
   the processor further configured to transmit the uplink transmission based on the determined parameter.

2. The WTRU of claim 1, wherein the information comprises a downlink control information (DCI).

3. The WTRU of claim 1, wherein the parameter comprises a modulation and coding scheme (MCS).

4. The WTRU of claim 1, wherein the first set of parameters comprises a first MCS table, and the second set of parameters is a second MCS table.

5. The WTRU of claim 1, wherein the uplink transmission comprises a physical uplink shared channel (PUSCH) transmission.

6. The WTRU of claim 1, wherein the processor determines the parameter implicitly based on a search space in which the information is decoded.

7. The WTRU of claim 1, wherein the processor determines the parameter explicitly based on the RNTI based on which the information is received.

8. A method implemented in a wireless transmit/receive unit (WTRU), the method comprising:
   receiving information which includes a grant for an uplink transmission, wherein the received information is received based on a first radio network temporary identifier (RNTI) or a second RNTI;
   determining a parameter for the uplink transmission from a first set of parameters on a condition that the information is received based on the first RNTI or from a second set of parameters on a condition that the information is received based on the second RNTI; and
   transmitting the uplink transmission based on the determined parameter.

9. The method of claim 8, wherein the information comprises a downlink control information (DCI).

10. The method of claim 8, wherein the parameter comprises a modulation and coding scheme (MCS).

11. The method of claim 8, wherein the first set of parameters comprises a first MCS table, and the second set of parameters is a second MCS table.

12. The method of claim 8, wherein the uplink transmission comprises a physical uplink shared channel (PUSCH) transmission.

13. The method of claim 8, wherein the parameter is determined implicitly based on a search space in which the information is decoded.

14. The method of claim 8, wherein the parameter is determined explicitly based on the RNTI based on which the information is received.

15. A base station comprising:
- a processor configured to transmit information which includes a grant for an uplink transmission, wherein the information is transmitted based on a first radio network temporary identifier (RNTI) or a second RNTI, wherein a parameter is determinable for the uplink transmission from a first set of parameters on a condition that the information is transmitted based on the first RNTI or from a second set of parameters on a condition that the information is transmitted based on the second RNTI; and
- the processor is further configured to receive the uplink transmission based on the parameter.

16. The base station of claim 15, wherein the information comprises a downlink control information (DCI).

17. The base station of claim 15, wherein the parameter comprises a modulation and coding scheme (MCS).

18. The base station of claim 15, wherein the first set of parameters comprises a first MCS table, and the second set of parameters is a second MCS table.

19. The base station of claim 15, wherein the uplink transmission comprises a physical uplink shared channel (PUSCH) transmission.

20. The base station of claim 15, wherein the parameter is determinable implicitly based on a search space in which the information is decoded, or explicitly based on the RNTI based on which the information is received.

* * * * *